(12) United States Patent
Rabe et al.

(10) Patent No.: US 12,386,831 B2
(45) Date of Patent: Aug. 12, 2025

(54) QUERY EXECUTION VIA SCHEDULING SEGMENT CHUNKS FOR PARALLELIZED PROCESSING BASED ON REQUESTED NUMBER OF ROWS

(71) Applicant: Ocient Holdings LLC, Chicago, IL (US)

(72) Inventors: Benjamin Daniel Rabe, Sandy, UT (US); Greg R. Dhuse, Chicago, IL (US); Richard George Wendel, III, Cincinnati, OH (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/411,484

(22) Filed: Jan. 12, 2024

(65) Prior Publication Data
US 2025/0231938 A1    Jul. 17, 2025

(51) Int. Cl.
*G06F 16/2453*    (2019.01)
(52) U.S. Cl.
CPC .. *G06F 16/24542* (2019.01); *G06F 16/24532* (2019.01)
(58) Field of Classification Search
CPC .............. G06F 16/24542; G06F 16/24532
See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,633,772 B2 | 10/2003 | Ford | |
| 7,499,907 B2 | 3/2009 | Brown | |
| 7,908,242 B1 | 3/2011 | Achanta | |
| 11,645,273 B2 | 5/2023 | Dhuse et al. | |
| 11,803,544 B2 | 10/2023 | Veselova et al. | |
| 2001/0051949 A1 | 12/2001 | Carey | |
| 2002/0032676 A1 | 3/2002 | Reiner | |
| 2004/0162853 A1 | 8/2004 | Brodersen | |
| 2008/0133456 A1 | 6/2008 | Richards | |
| 2009/0063893 A1 | 3/2009 | Bagepalli | |

(Continued)

OTHER PUBLICATIONS

U.S. Appl. No. 18/310,177, filed May 1, 2023, Veselova et al.

(Continued)

*Primary Examiner* — Ann J Lo
*Assistant Examiner* — Fernando M Mari Valcarcel
(74) *Attorney, Agent, or Firm* — GARLICK & MARKISON; Timothy W. Markison

(57) ABSTRACT

A processing module of a database system is operable to determining a query for execution. A plurality of row sets are processed over a temporal period in conjunction with execution of the query based on automatically selecting a requested number of rows to be included in each row set based on row scheduling parameters, generating a scheduling request for the requested number of rows, and receiving each row set for processing in response to the scheduling request via access to one segment of a set of segments required for execution of the query. A query resultant for the query is generated based on processing of the plurality of row sets, and further based on processing of an additional plurality of rows included in the set of segments via a set of other processing modules implemented in parallel with the processing module.

18 Claims, 78 Drawing Sheets database system 10

(56) References Cited

U.S. PATENT DOCUMENTS

| | | | |
|---|---|---|---|
| 2009/0183167 A1 | 7/2009 | Kupferschmidt | |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |
| 2011/0219169 A1 | 9/2011 | Zhang | |
| 2012/0109888 A1 | 5/2012 | Zhang | |
| 2012/0151118 A1 | 6/2012 | Flynn | |
| 2012/0185866 A1 | 7/2012 | Couvee | |
| 2012/0254252 A1 | 10/2012 | Jin | |
| 2012/0278587 A1* | 11/2012 | Caufield | G06F 9/505 |
| | | | 711/E12.002 |
| 2012/0311246 A1 | 12/2012 | McWilliams | |
| 2013/0332484 A1 | 12/2013 | Gajic | |
| 2014/0047095 A1 | 2/2014 | Breternitz | |
| 2014/0136510 A1 | 5/2014 | Parkkinen | |
| 2014/0188841 A1 | 7/2014 | Sun | |
| 2014/0214799 A1* | 7/2014 | Li | G06F 16/24532 |
| | | | 707/718 |
| 2015/0205607 A1 | 7/2015 | Lindholm | |
| 2015/0244804 A1 | 8/2015 | Warfield | |
| 2015/0248366 A1 | 9/2015 | Bergsten | |
| 2015/0293966 A1 | 10/2015 | Cai | |
| 2015/0310045 A1 | 10/2015 | Konik | |
| 2016/0034547 A1* | 2/2016 | Lerios | G06F 16/24537 |
| | | | 707/602 |
| 2019/0317727 A1* | 10/2019 | Antonopoulos | G06F 3/0604 |
| 2020/0301903 A1* | 9/2020 | Barry | G06F 16/2282 |
| 2022/0019589 A1* | 1/2022 | May | G06F 9/5061 |
| 2022/0335030 A1* | 10/2022 | Brewster | G06F 16/24539 |
| 2022/0398128 A1* | 12/2022 | Jose, Jr. | G06F 9/4881 |

OTHER PUBLICATIONS

U.S. Appl. No. 18/322,688, filed May 24, 2023, Kondiles et al.
U.S. Appl. No. 18/355,505, filed Jul. 20, 2023, Veselova et al.
U.S. Appl. No. 18/485,861, filed Oct. 12, 2023, Schieferstein et al.
A new high performance fabric for HPC, Michael Feldman, May 2016, Intersect360 Research.
Alechina, N. (2006-2007). B-Trees. School of Computer Science, University of Nottingham, http://www.cs.nott.ac.uk/~psznza/G5BADS06/lecture13-print.pdf. 41 pages.
Amazon DynamoDB: ten things you really should know, Nov. 13, 2015, Chandan Patra, http://cloudacademy. .com/blog/amazon-dynamodb-ten-thing.
An Inside Look at Google BigQuery, by Kazunori Sato, Solutions Architect, Cloud Solutions team, Google Inc., 2012.
Big Table, a NoSQL massively parallel table, Paul Krzyzanowski, Nov. 2011, https://www.cs.rutgers.edu/pxk/417/notes/contentlbigtable.html.
Distributed Systems, Fall2012, Mohsen Taheriyan, http://www-scf.usc.edu/-csci57212011Spring/presentations/Taheriyan.pptx.
International Searching Authority; International Search Report and Written Opinion; International Application No. PCT/US2017/054773; Feb. 13, 2018; 17 pgs.
International Searching Authority; International Search Report and Written Opinion; International Application No. PCT/US2017/054784; Dec. 28, 2017; 10 pgs.
International Searching Authority; International Search Report and Written Opinion; International Application No. PCT/US2017/066145; Mar. 5, 2018; 13 pgs.
International Searching Authority; International Search Report and Written Opinion; International Application No. PCT/US2017/066169; Mar. 6, 2018; 15 pgs.
International Searching Authority; International Search Report and Written Opinion; International Application No. PCT/US2018/025729; Jun. 27, 2018; 9 pgs.
International Searching Authority; International Search Report and Written Opinion; International Application No. PCT/US2018/034859; Oct. 30, 2018; 8 pgs.
MapReduce: Simplified Data Processing on Large Clusters, OSDI 2004, Jeffrey Dean and Sanjay Ghemawat, Google, Inc., 13 pgs.
Rodero-Merino, L.; Storage of Structured Data: Big Table and HBase, New Trends In Distributed Systems, MSc Software and Systems, Distributed Systems Laboratory; Oct. 17, 2012; 24 pages.
Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 node 37 data set query processing system 2502 database system 10

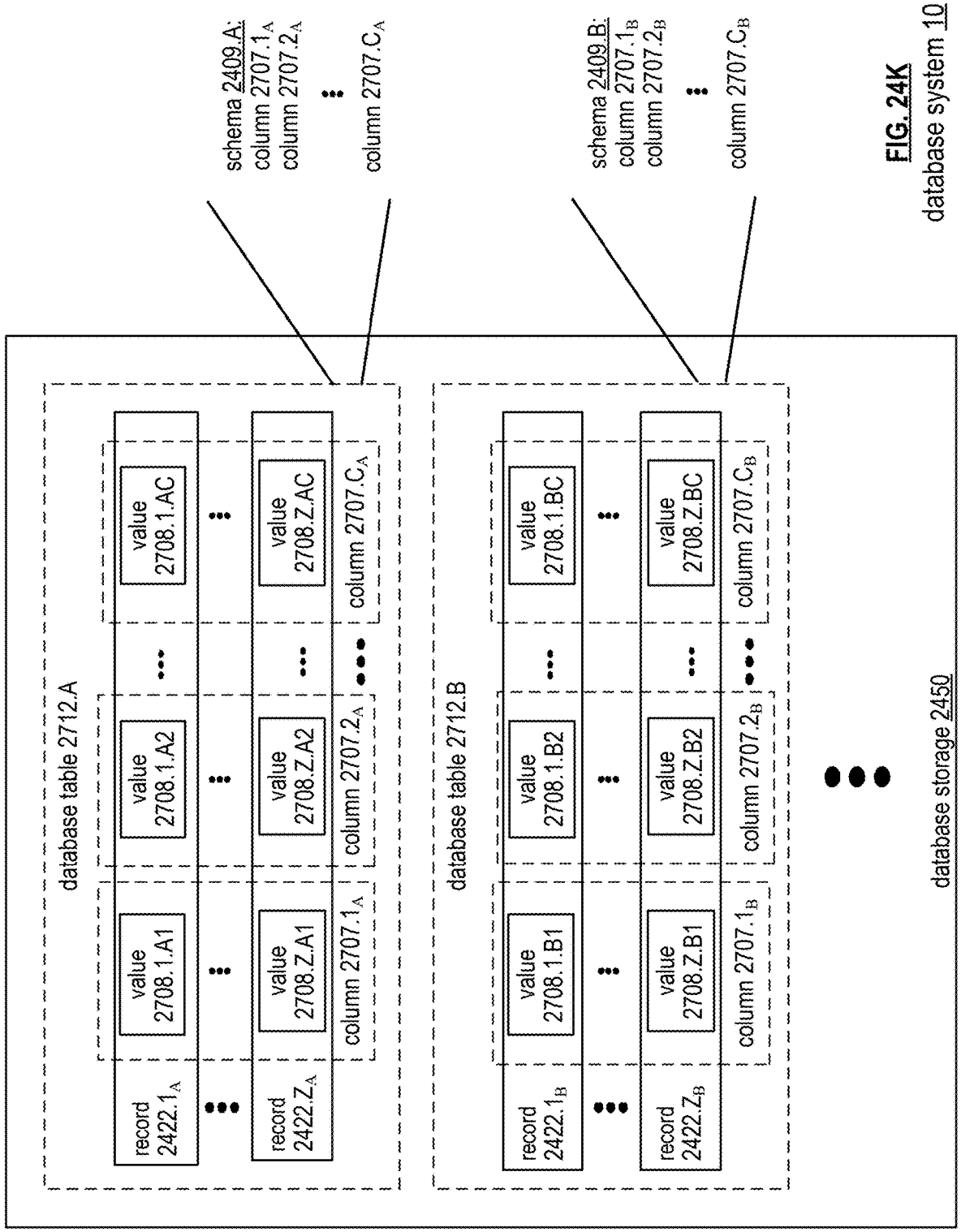

query execution module 2504

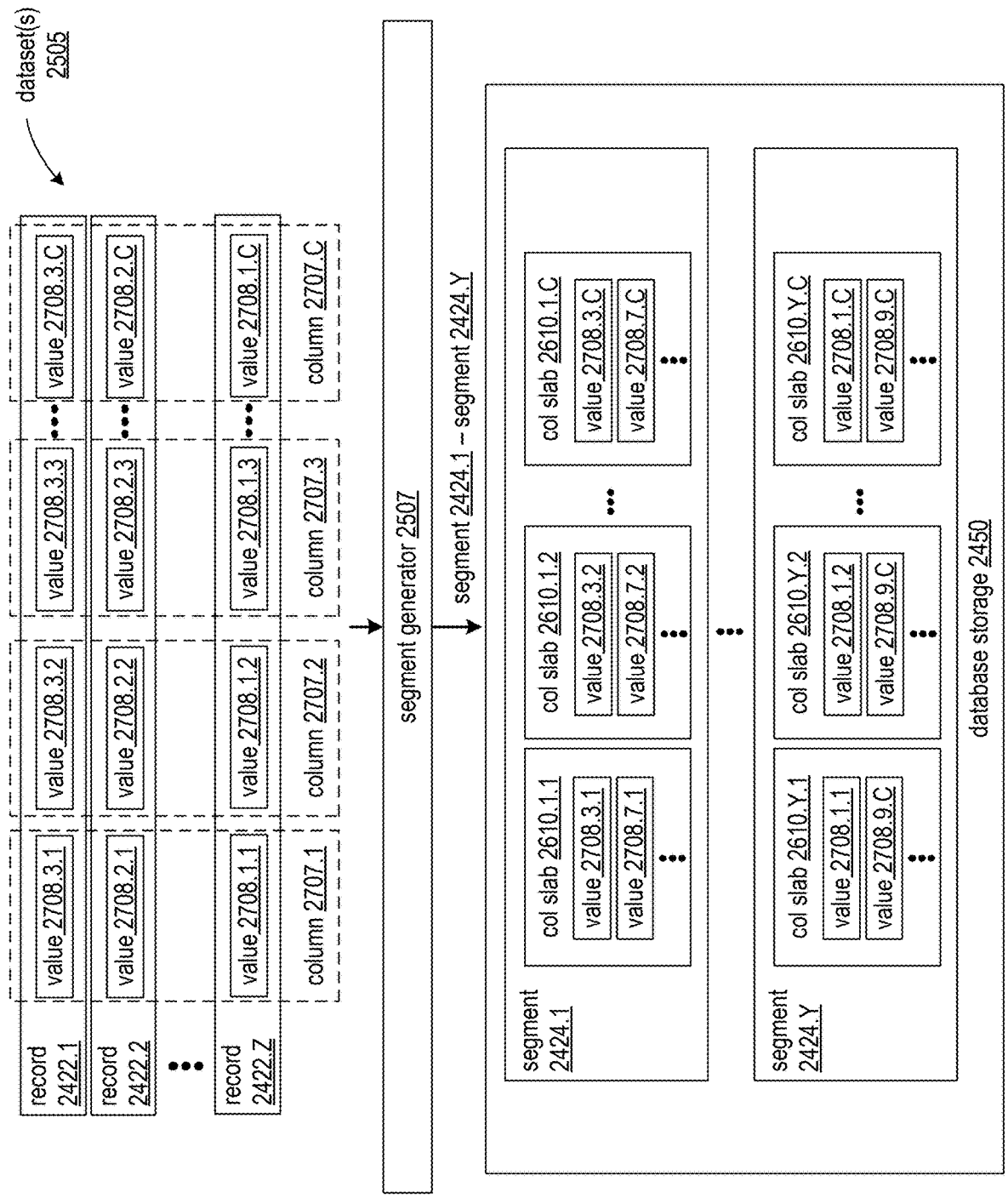

database system 10 query processing system 2510 query processing system 2510 database system 10 node 37-1 node 37-2 node 37-1 node 37-1 database system 10 database system 10

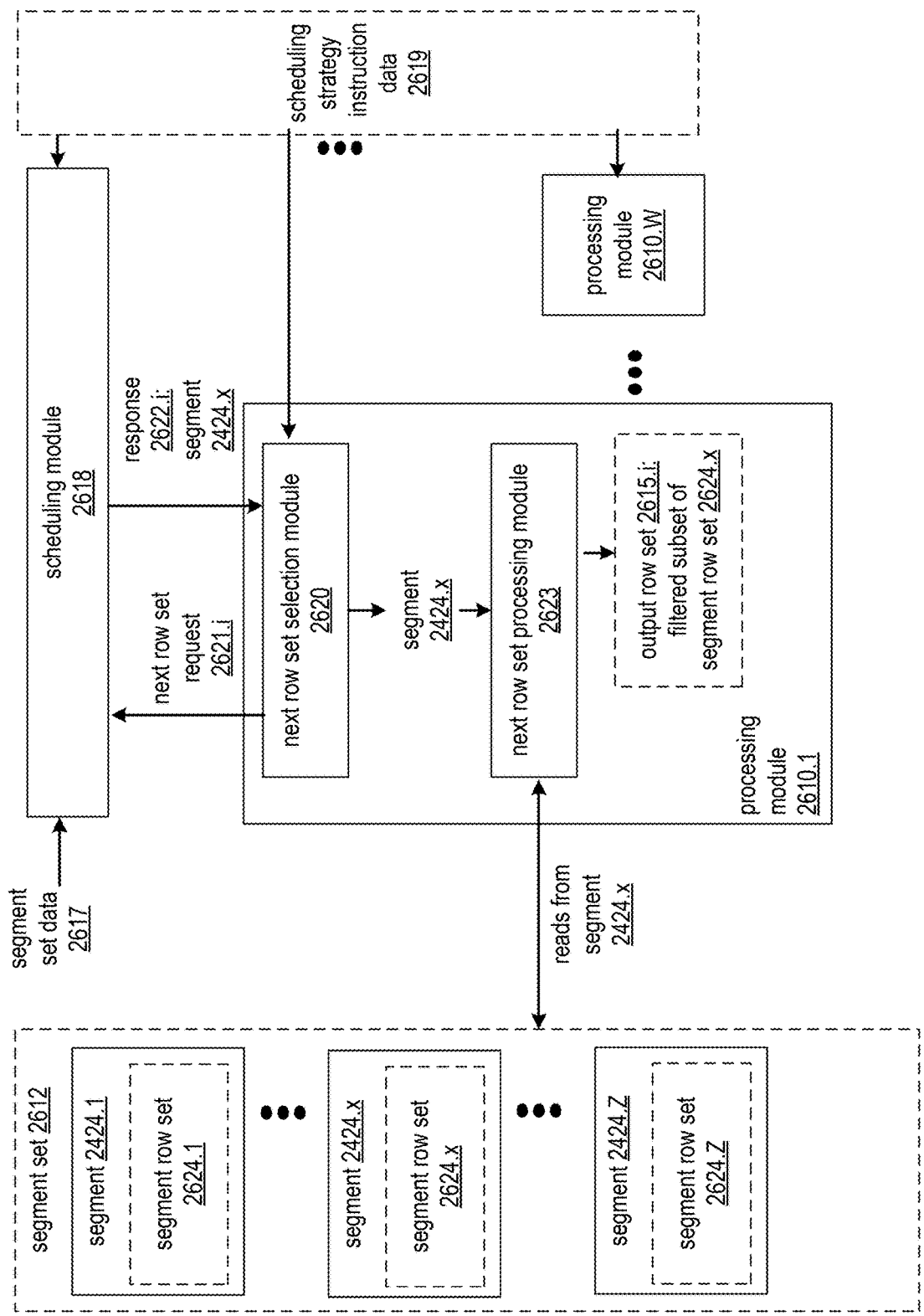

database system 10 database system 10 database system 10

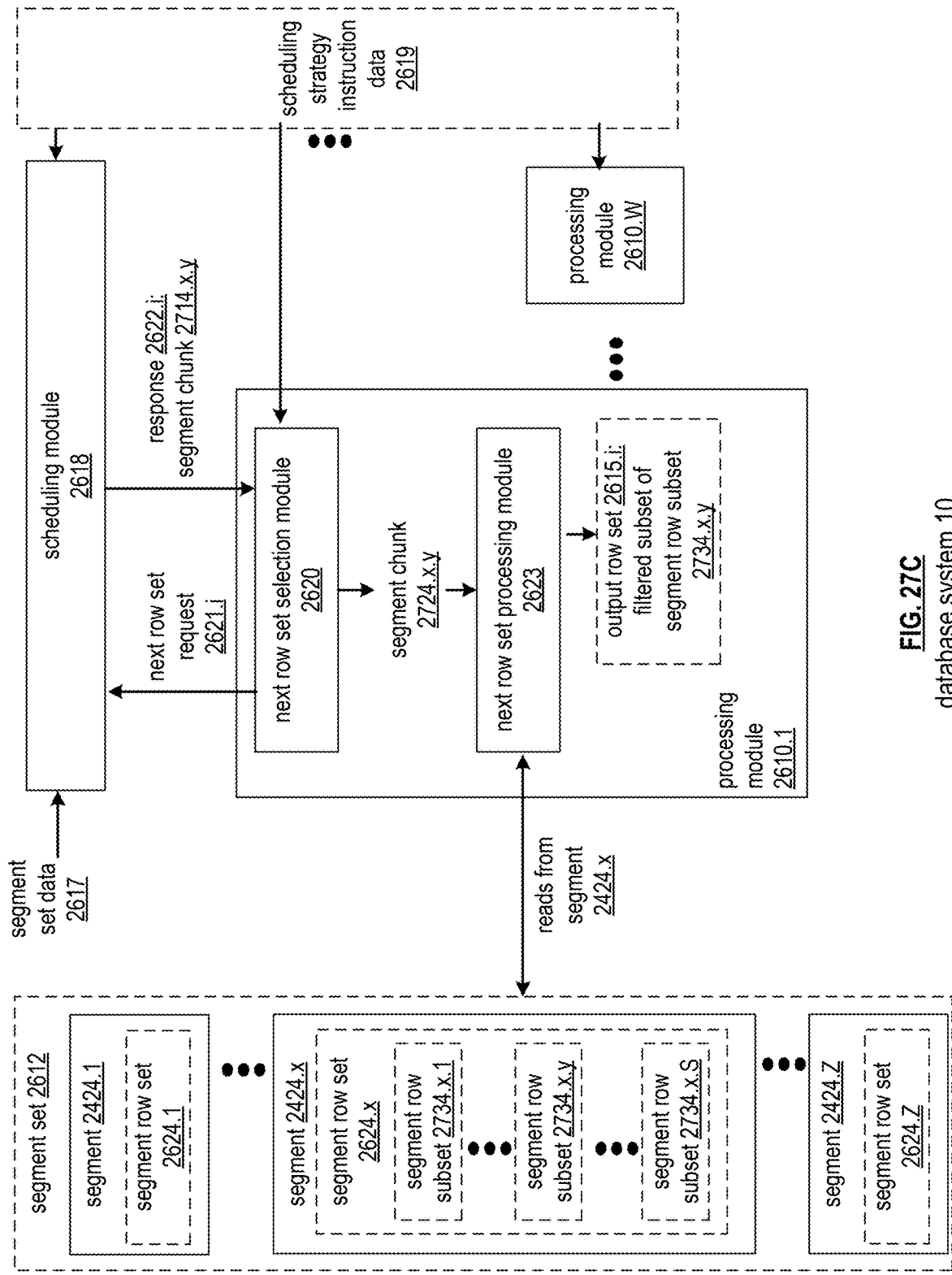

database system 10 database system 10 database system 10 database system 10 processing module 2610 database system 10 database system 10 database system 10

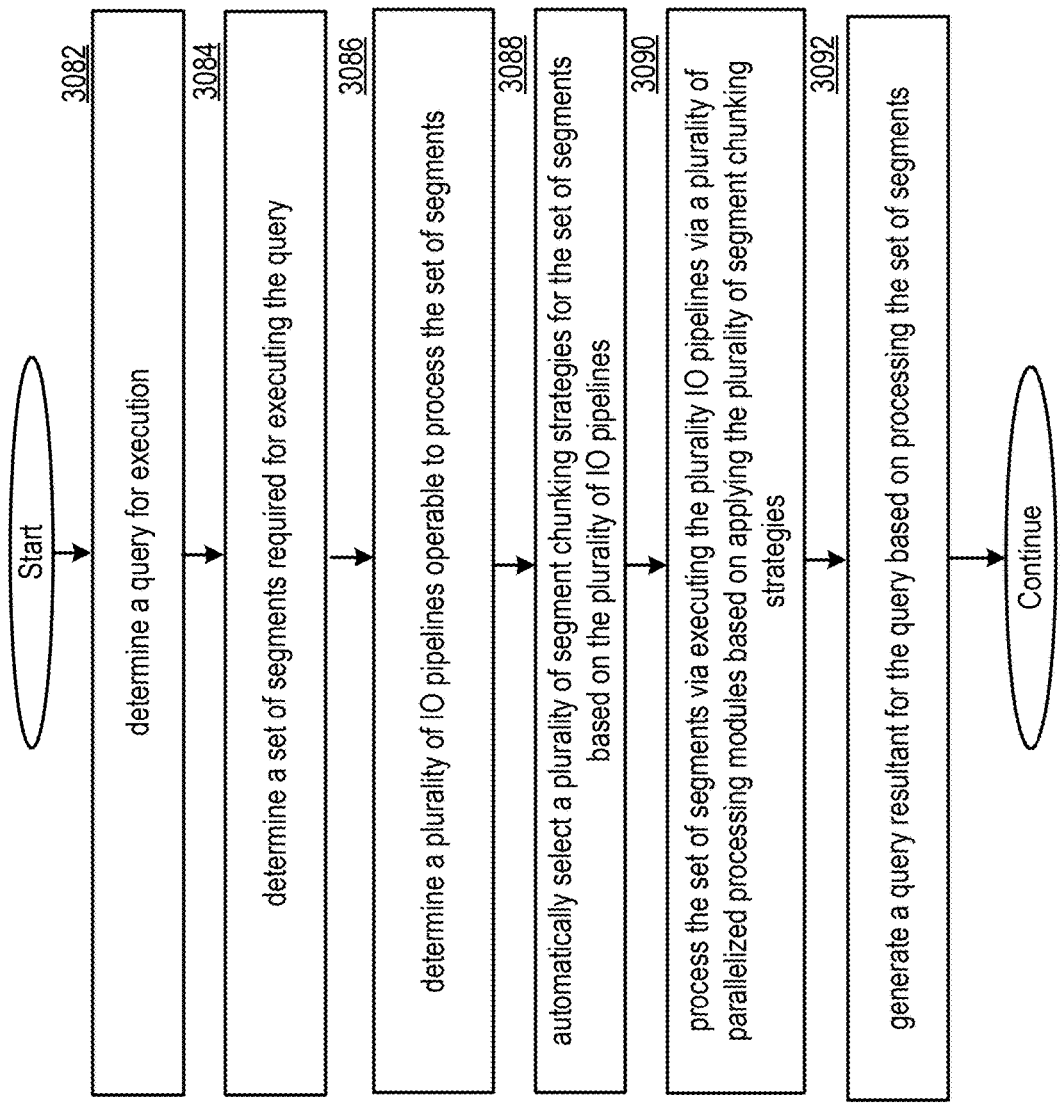

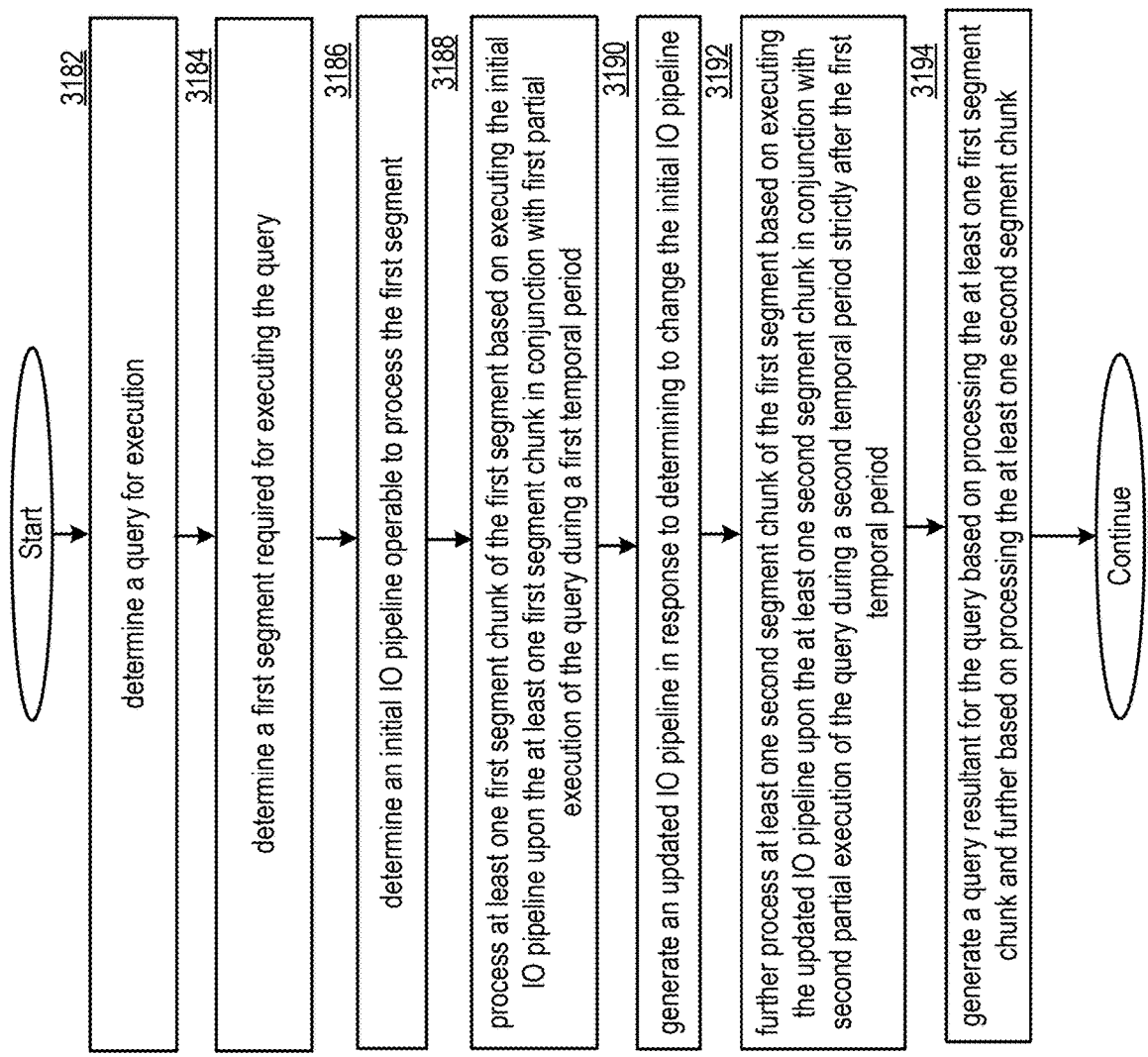

QUERY EXECUTION VIA SCHEDULING SEGMENT CHUNKS FOR PARALLELIZED PROCESSING BASED ON REQUESTED NUMBER OF ROWS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 24K illustrates an example embodiment of a plurality of database tables stored in database storage in accordance with various embodiments;

FIG. 24O is a schematic block diagram of a database system that implements a segment generator that generates segments from a plurality of records in accordance with various embodiments;

FIG. 26C is a schematic block diagram of a scheduling module that communicates with a plurality of processing modules in accordance with various embodiments;

FIG. 27C is a schematic block diagram of a scheduling module that communicates with a plurality of processing modules in accordance with various embodiments;

FIG. 30D is a logic diagram illustrating a method for execution in accordance with various embodiments;

FIG. 31C is a logic diagram illustrating a method for execution in accordance with various embodiments.

DETAILED DESCRIPTION OF THE INVENTION

Figure 1:
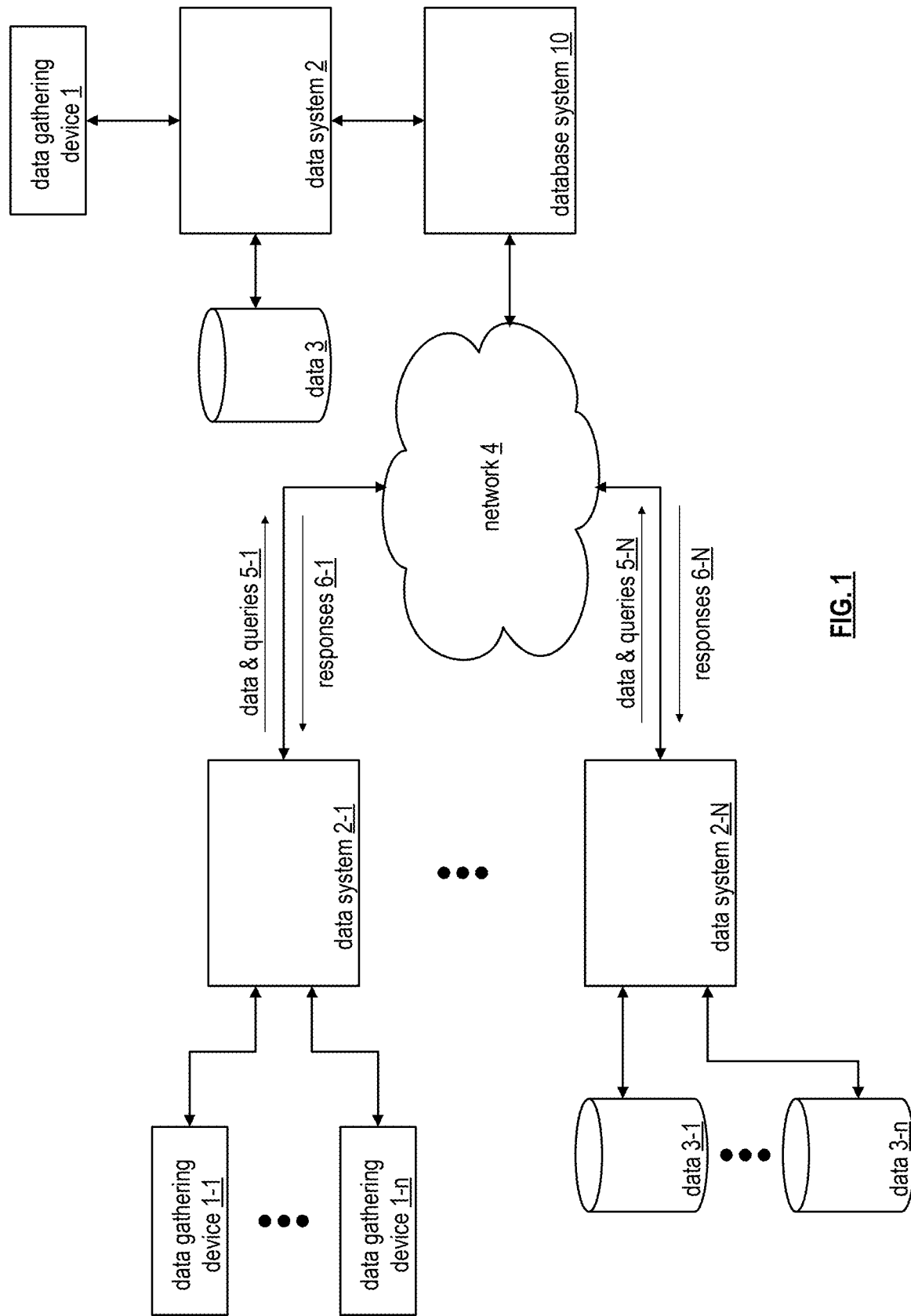
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
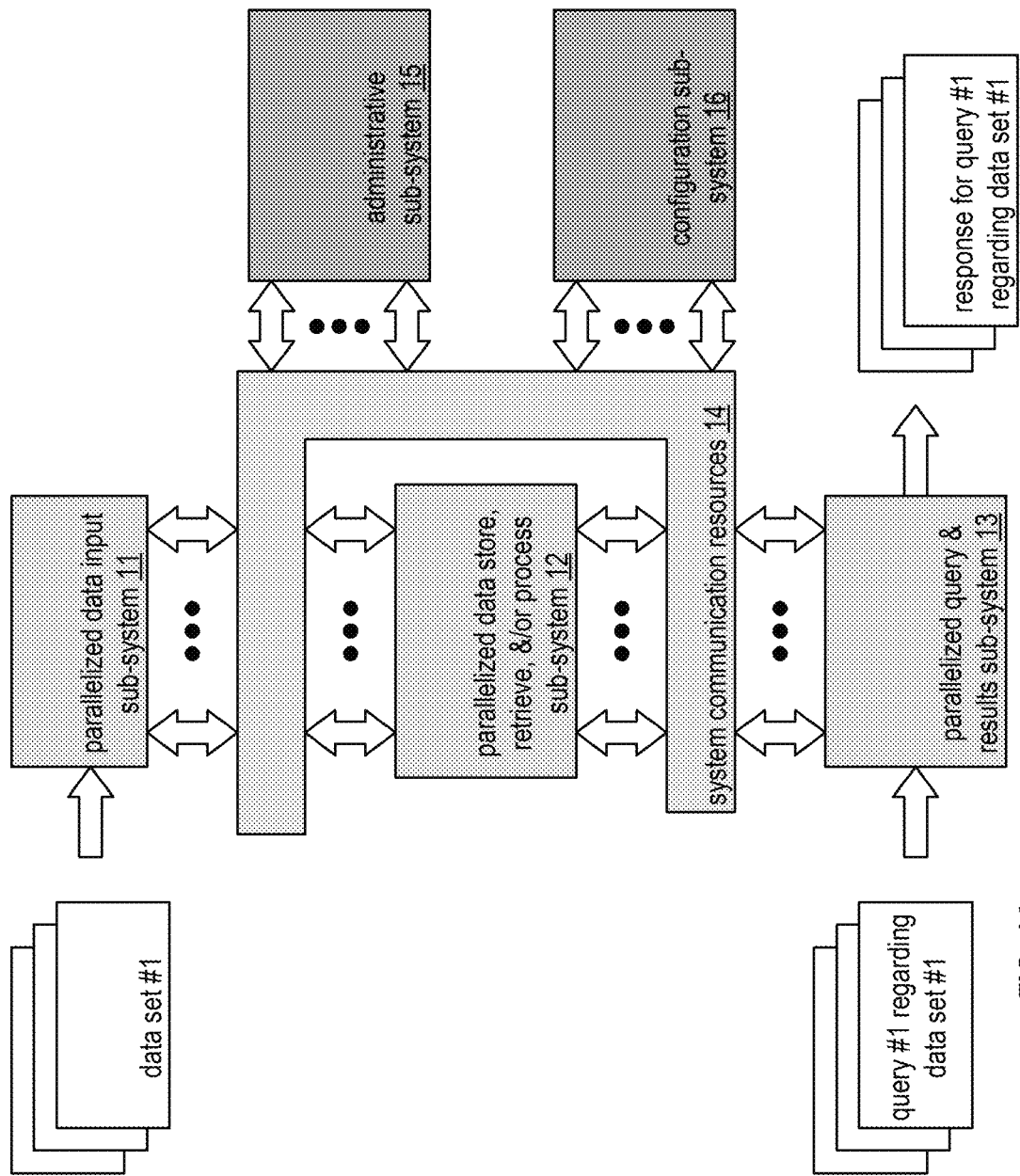
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
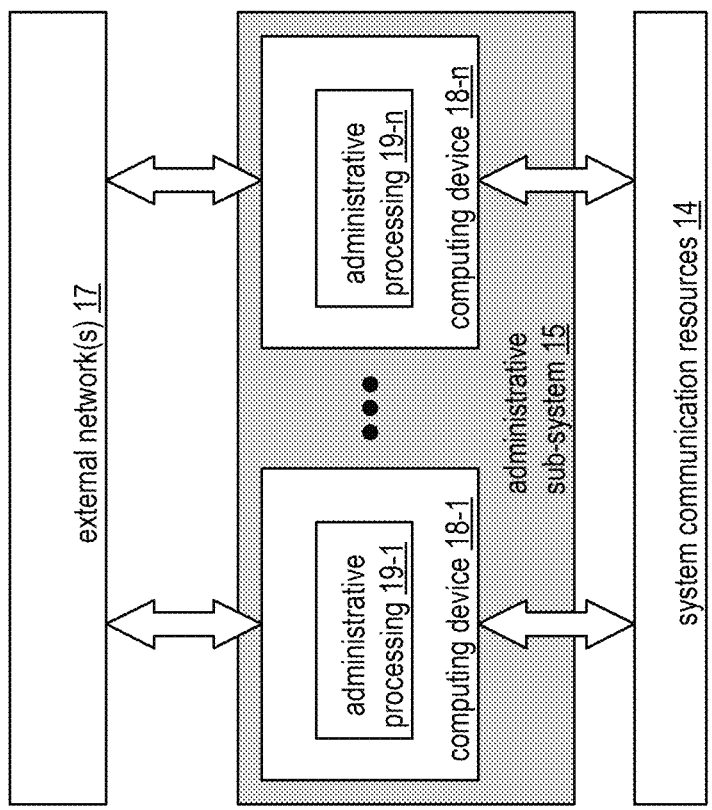
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
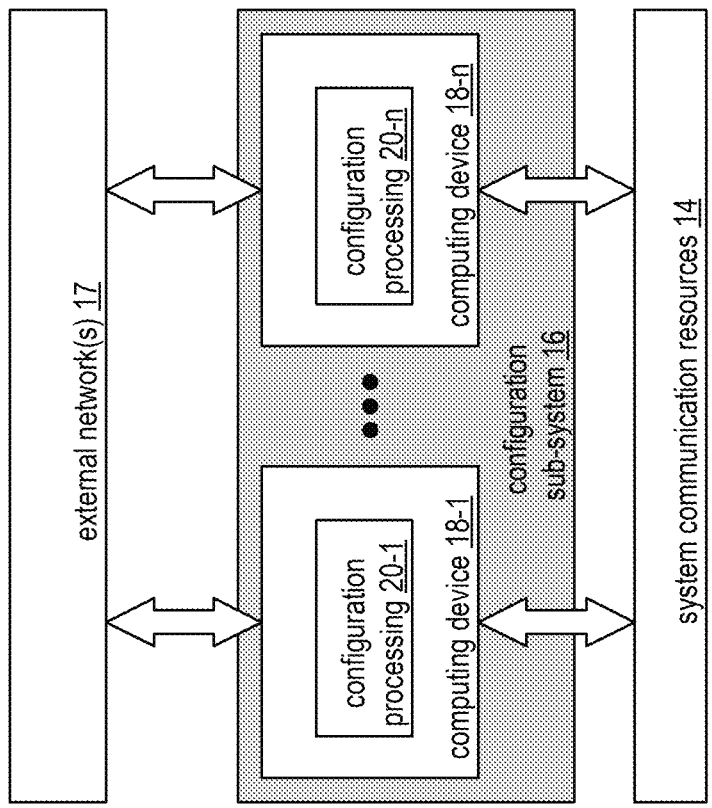
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through 18-*n*. Each of the computing devices executes a configuration processing function 20-1 through 20-*n* (which includes a plurality of configuration operations) that coordinates system level configurations of the database system. Each computing device is coupled to the external network 17 of FIG. 2, or networks, and to the system communication resources 14 of FIG. 1A.

Figure 4:
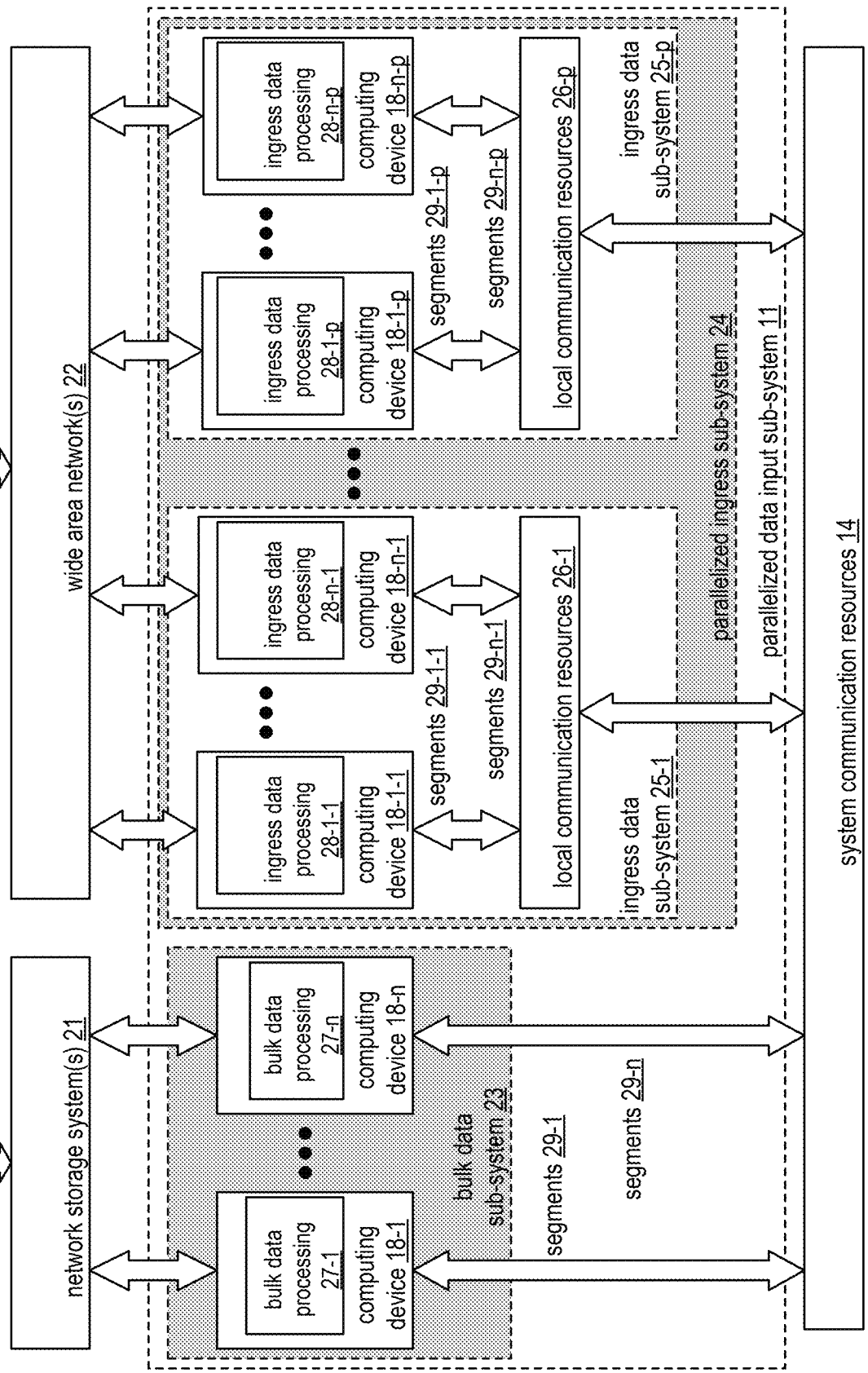
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-*n*. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-*p* that each include a local communication resource of local communication resources 26-1 through 26-*p* and a plurality of computing devices 18-1 through 18-*n*. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-*p*, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
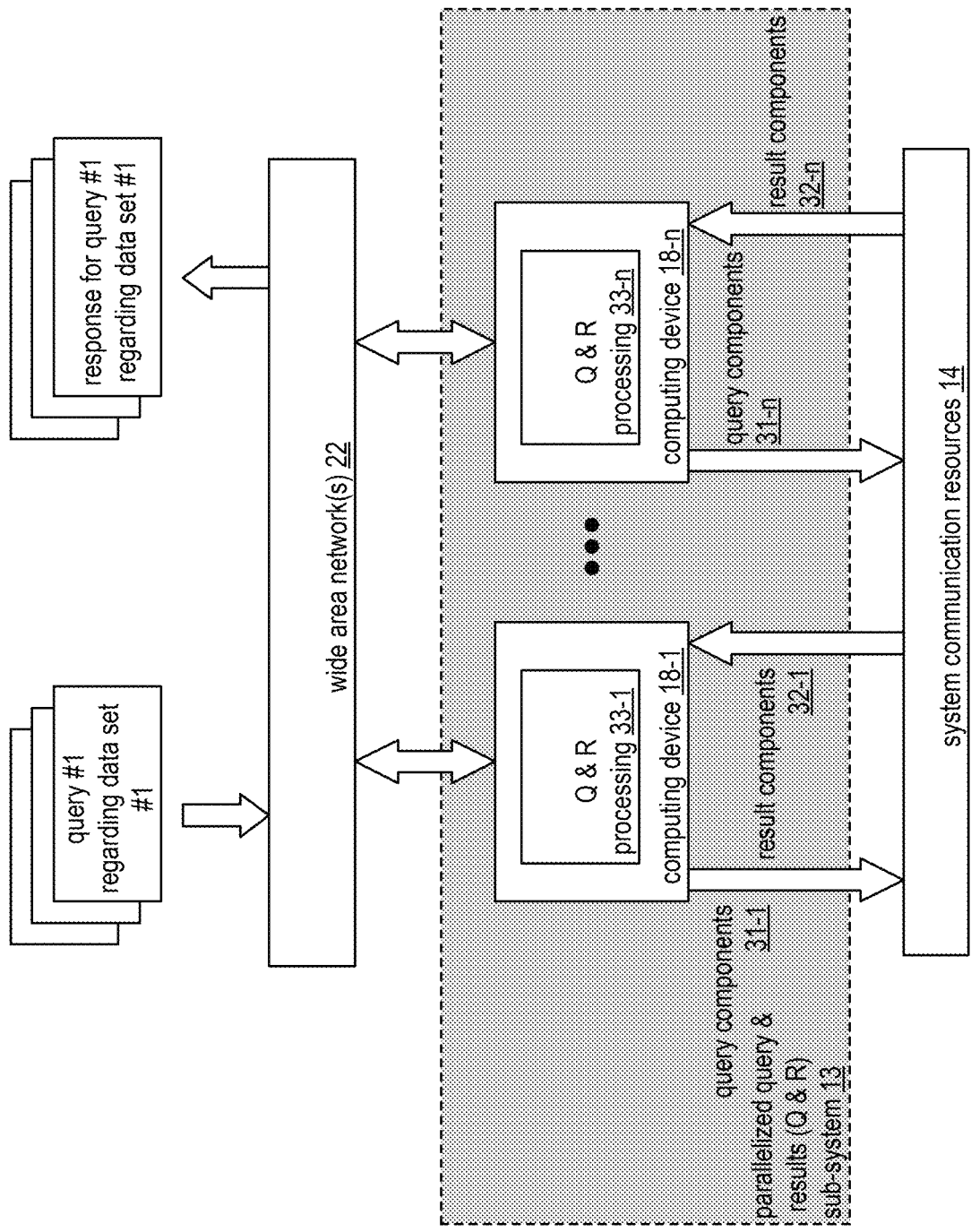
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-*n*. Each of the computing devices executes a query (Q) & response (R) processing function 33-1 through 33-*n*. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-*n*. The computing device of the Q&R sub-system 13 processes the result components to produce a query response.

The Q&R sub-system 13 allows for multiple queries regarding one or more tables to be processed concurrently.

For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
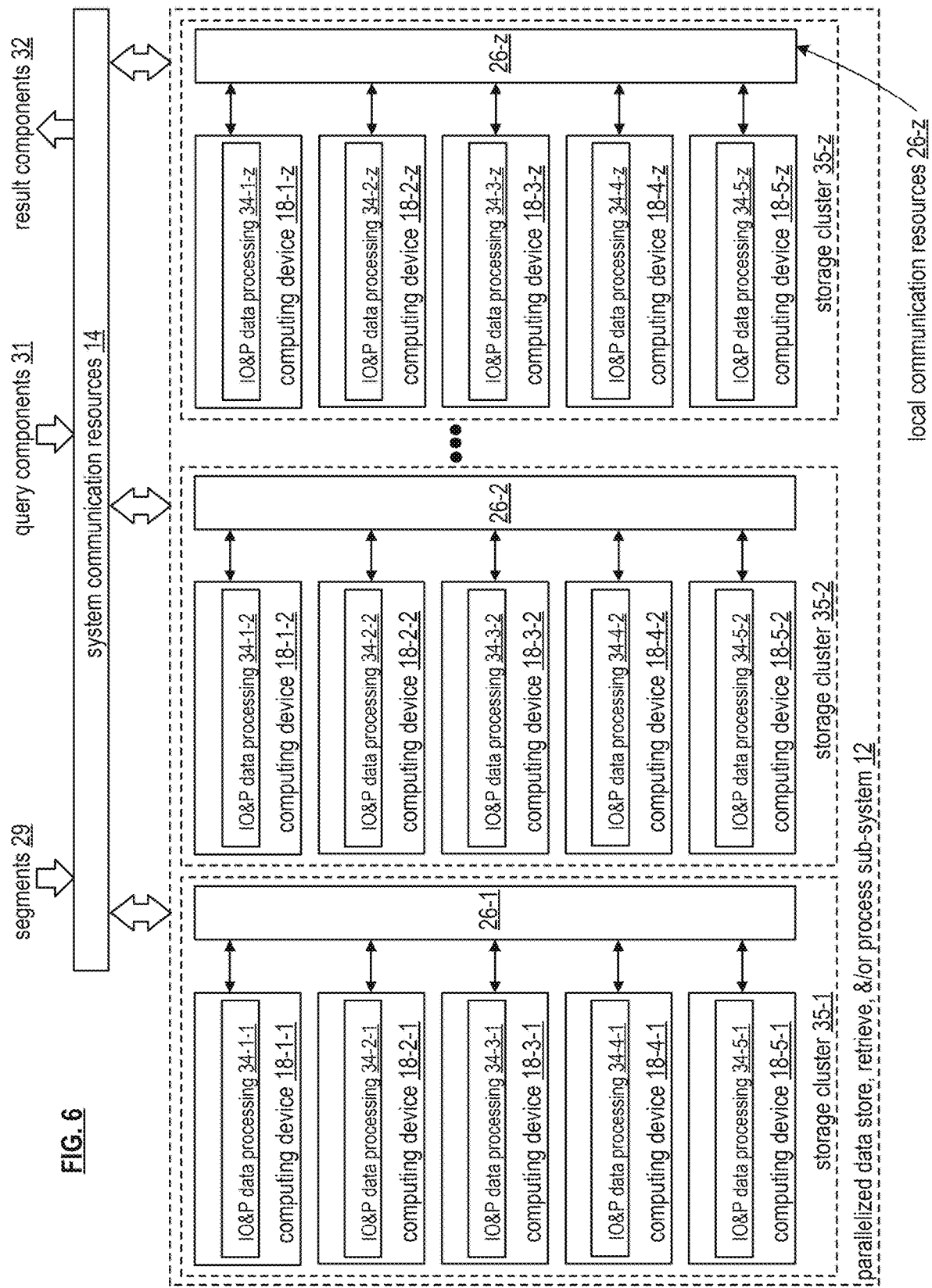
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-*z*. Each storage cluster includes a corresponding local communication resource 26-1 through 26-*z* and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
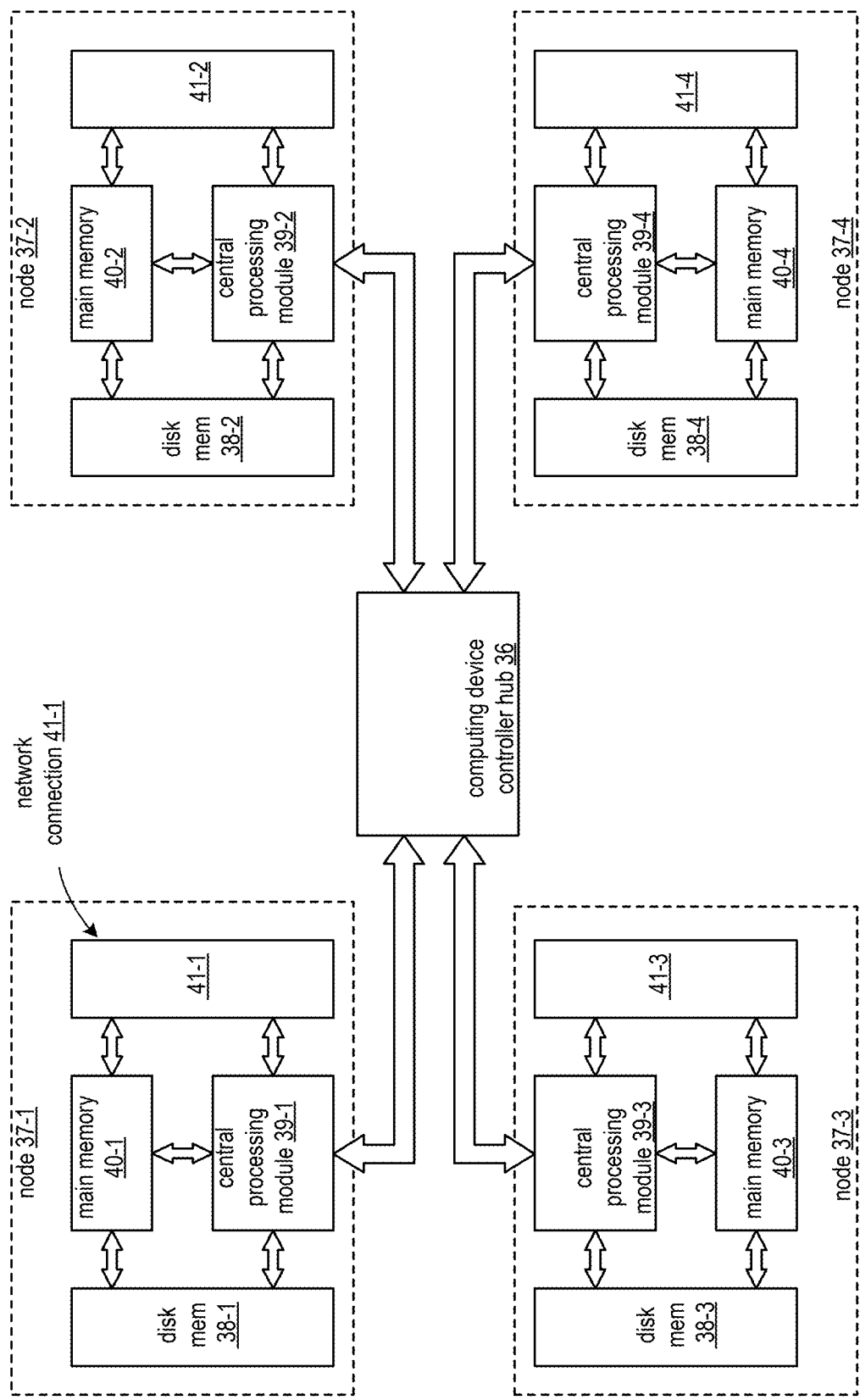
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
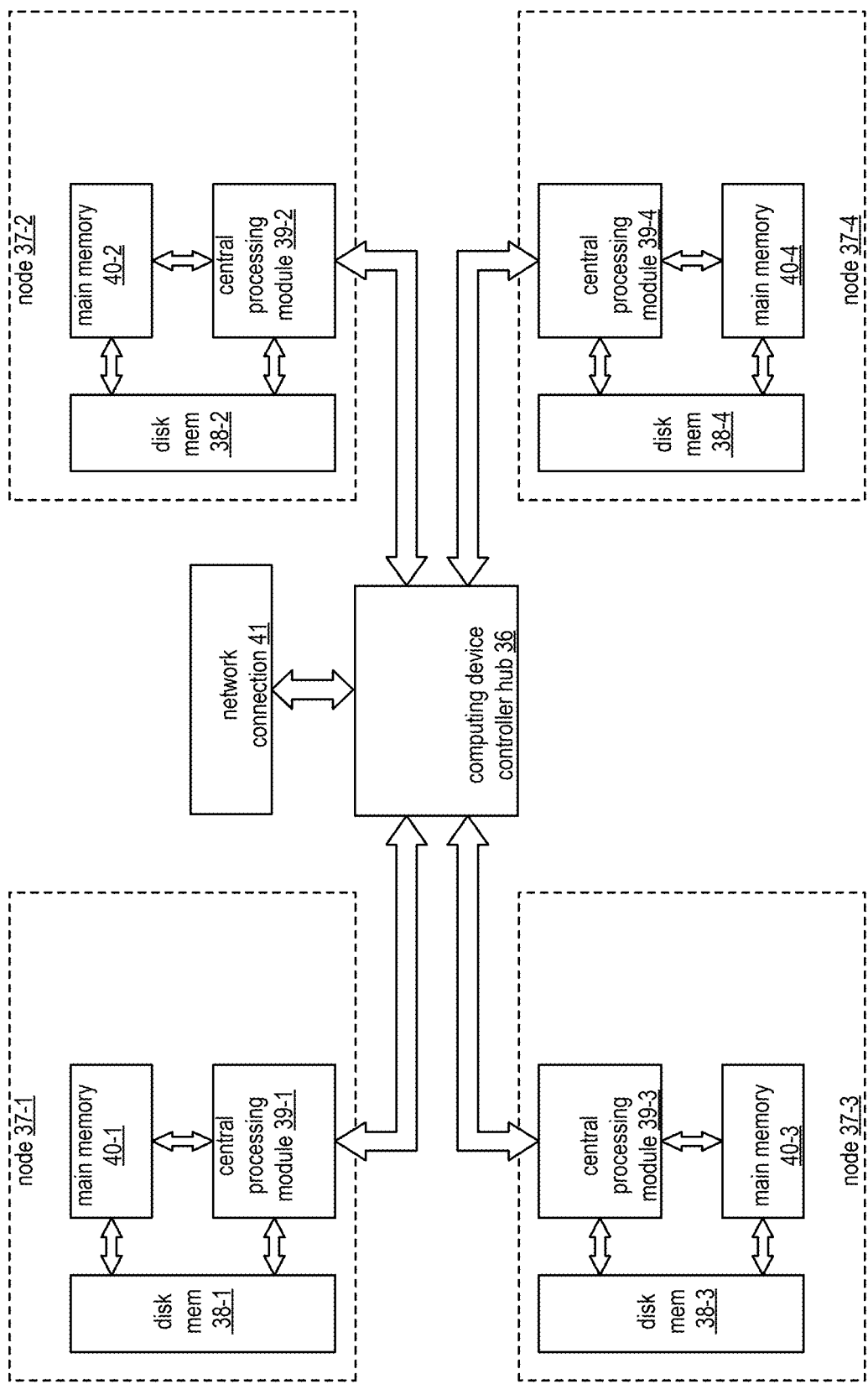
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
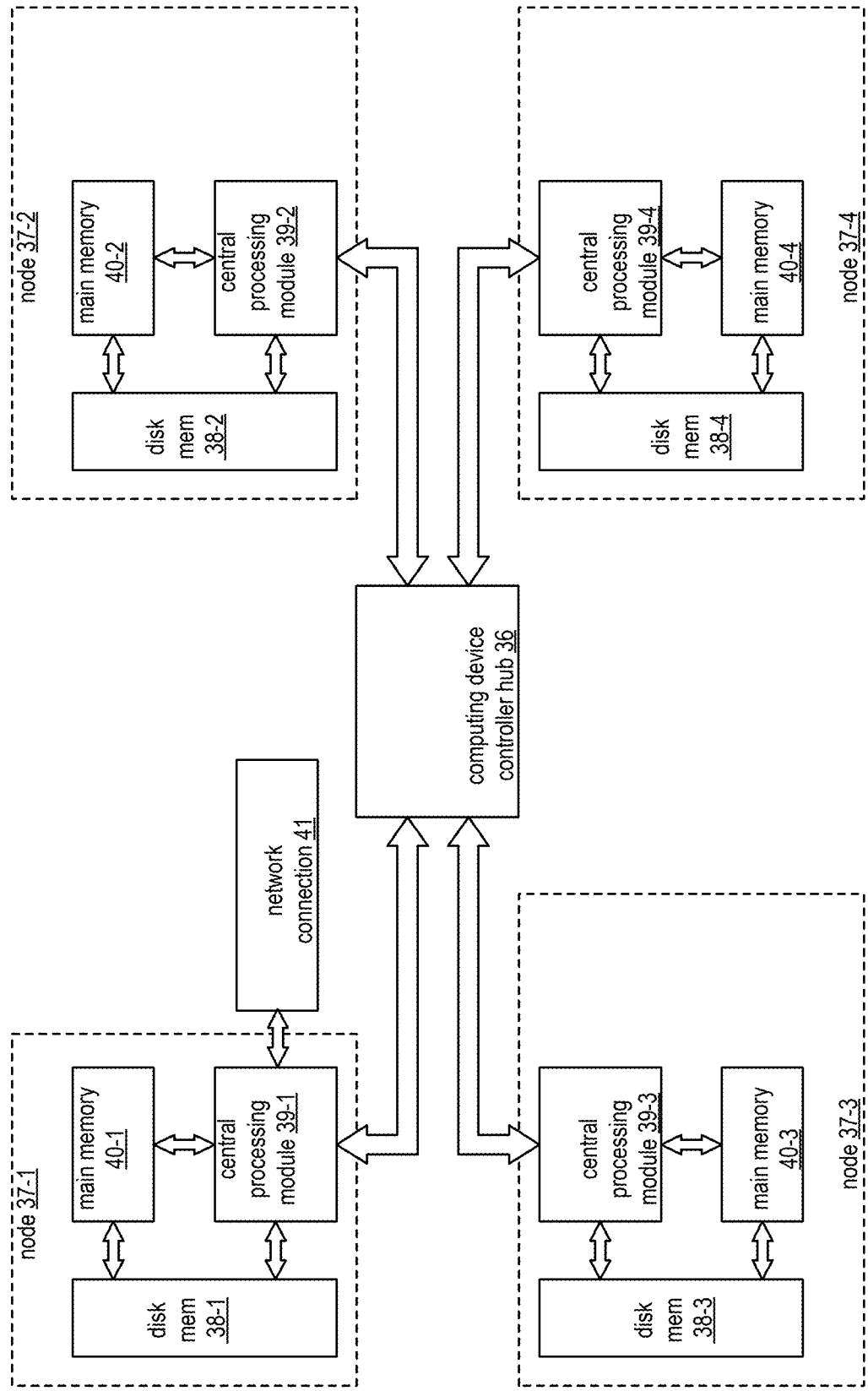
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
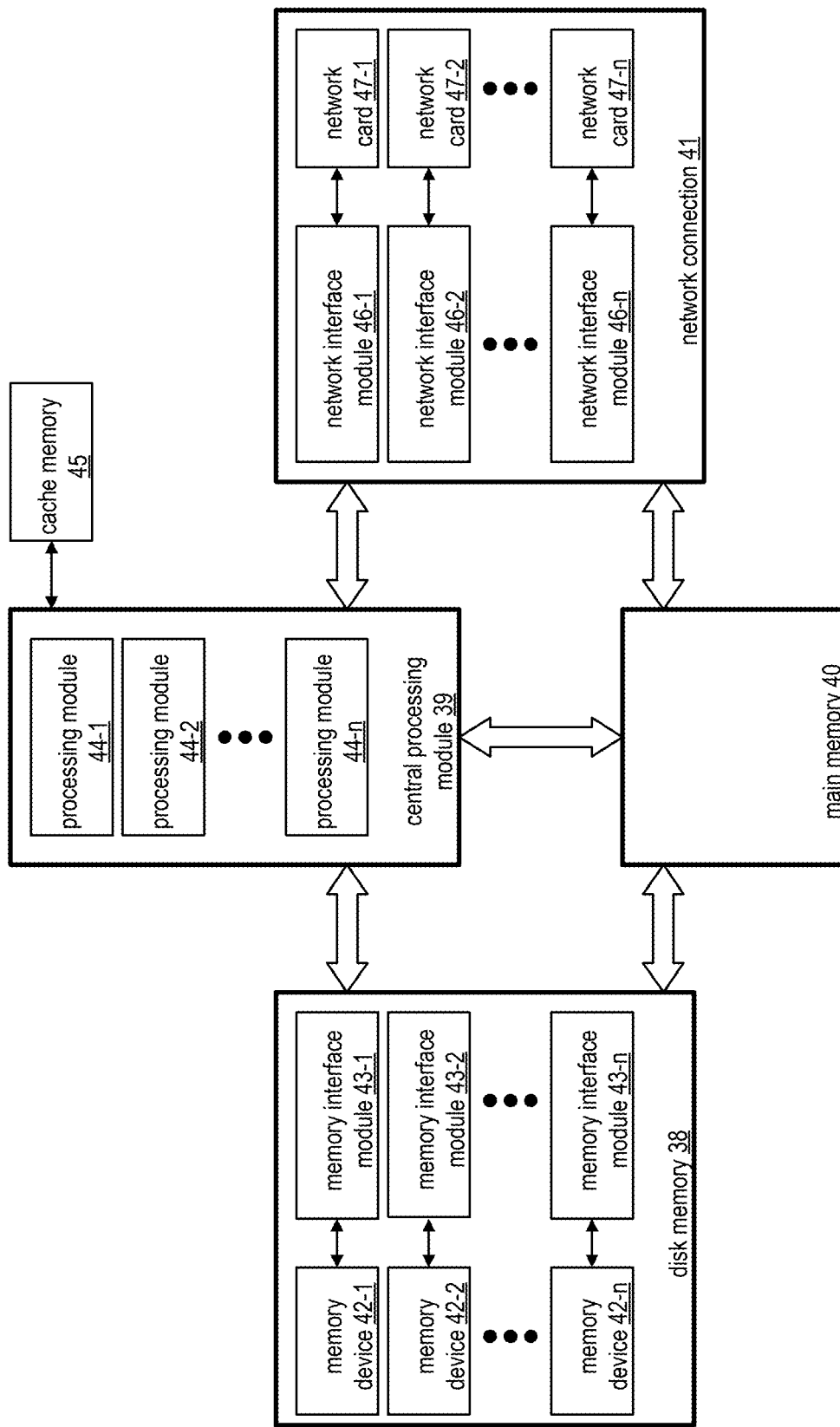
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
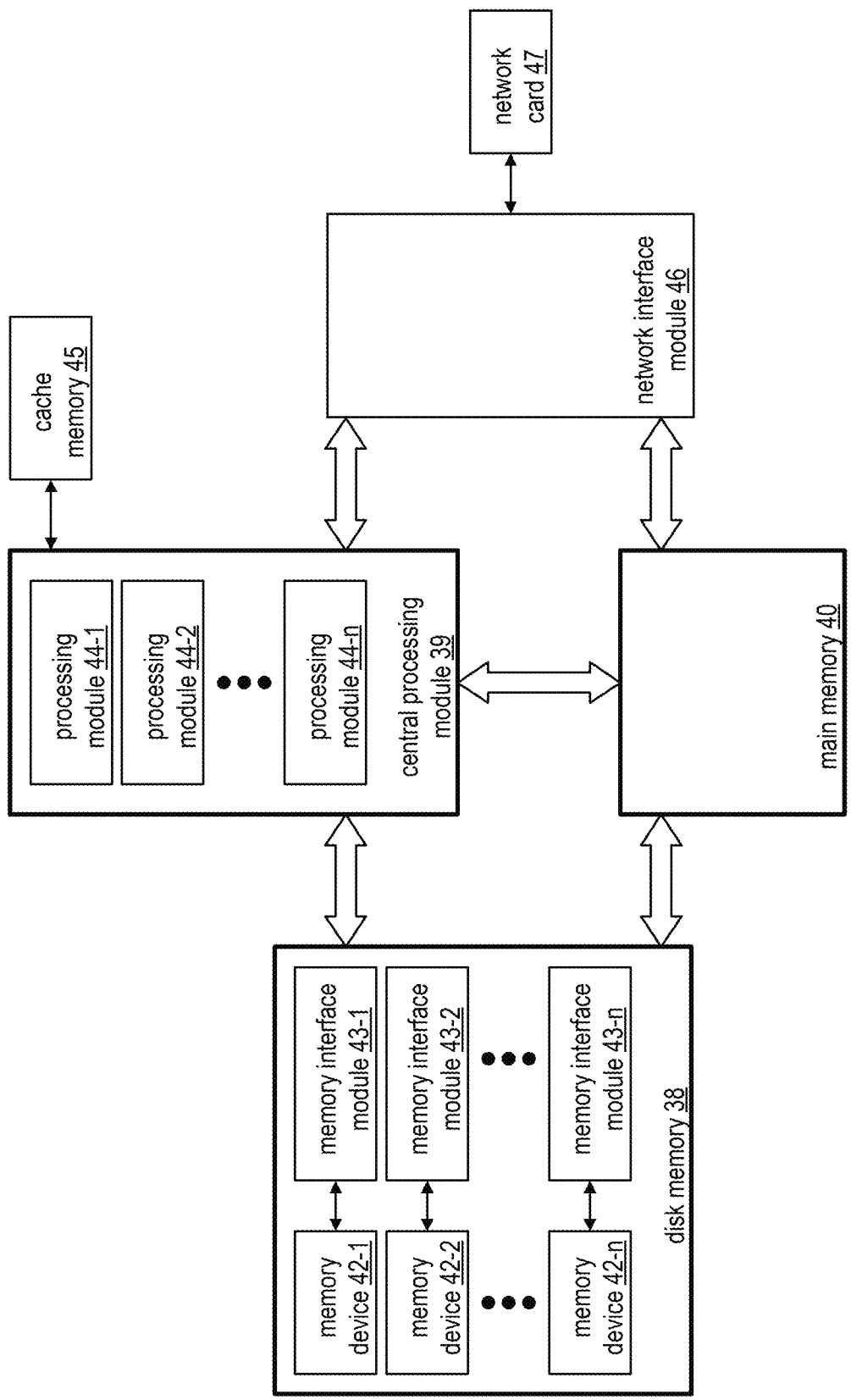
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
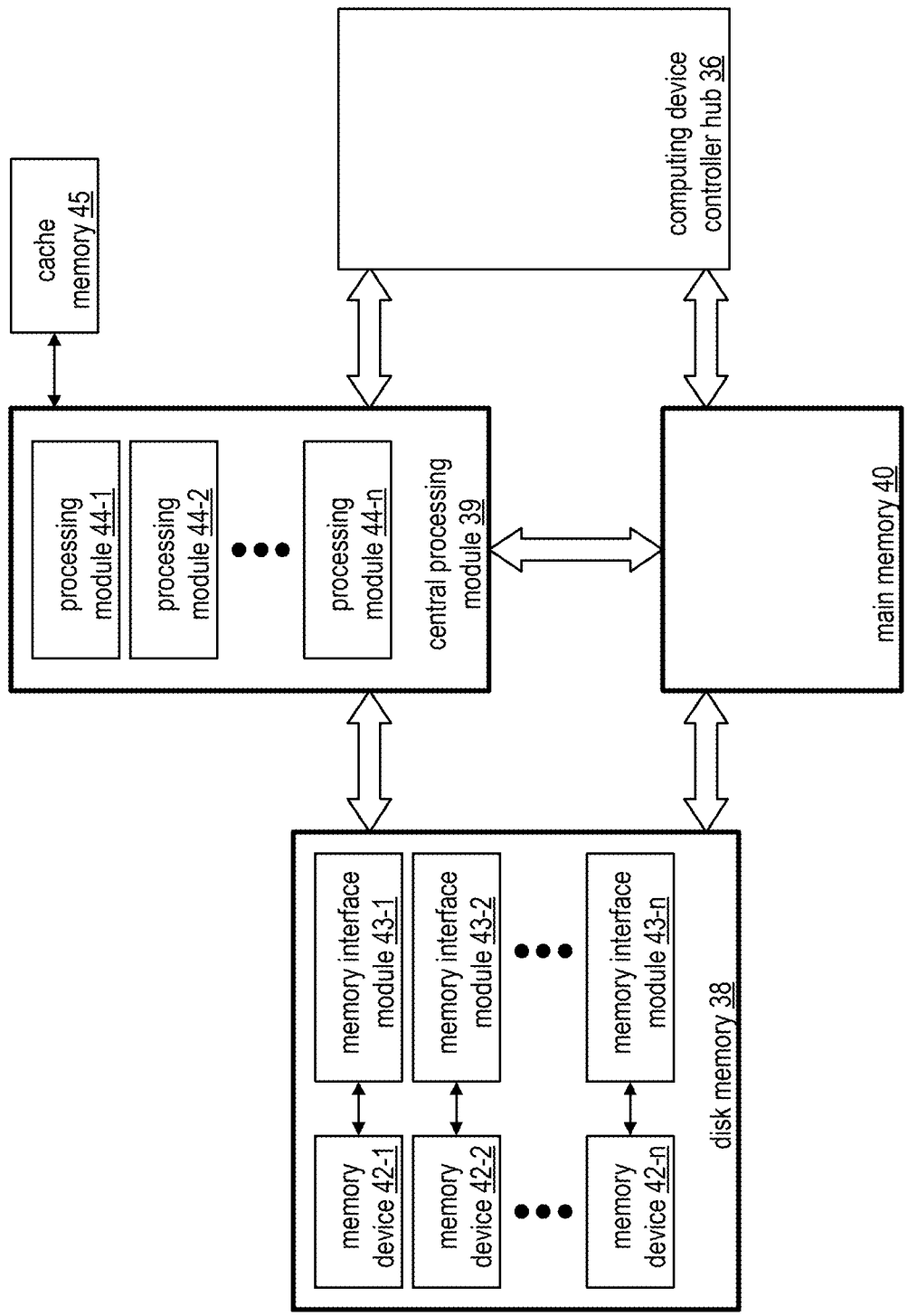
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
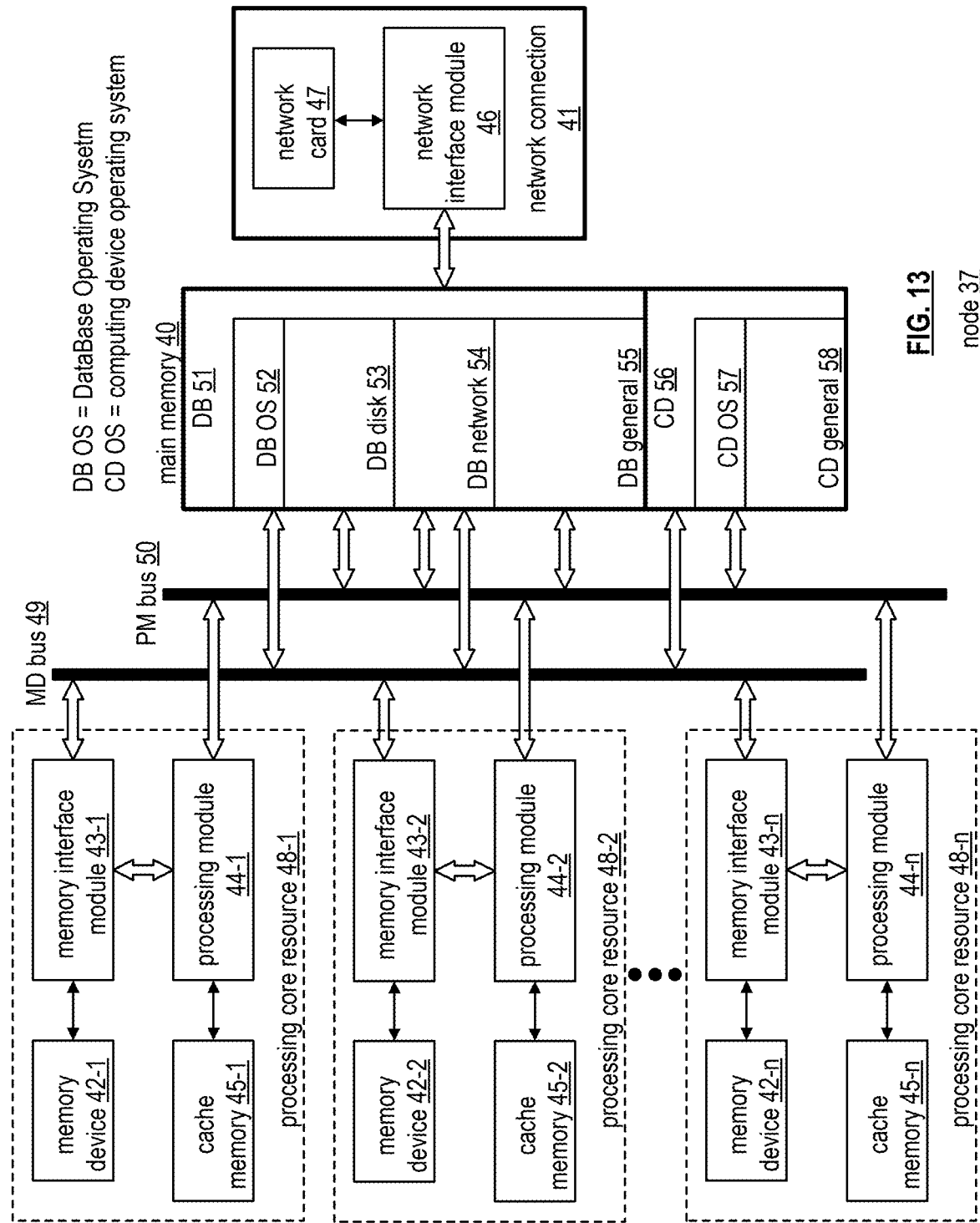
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
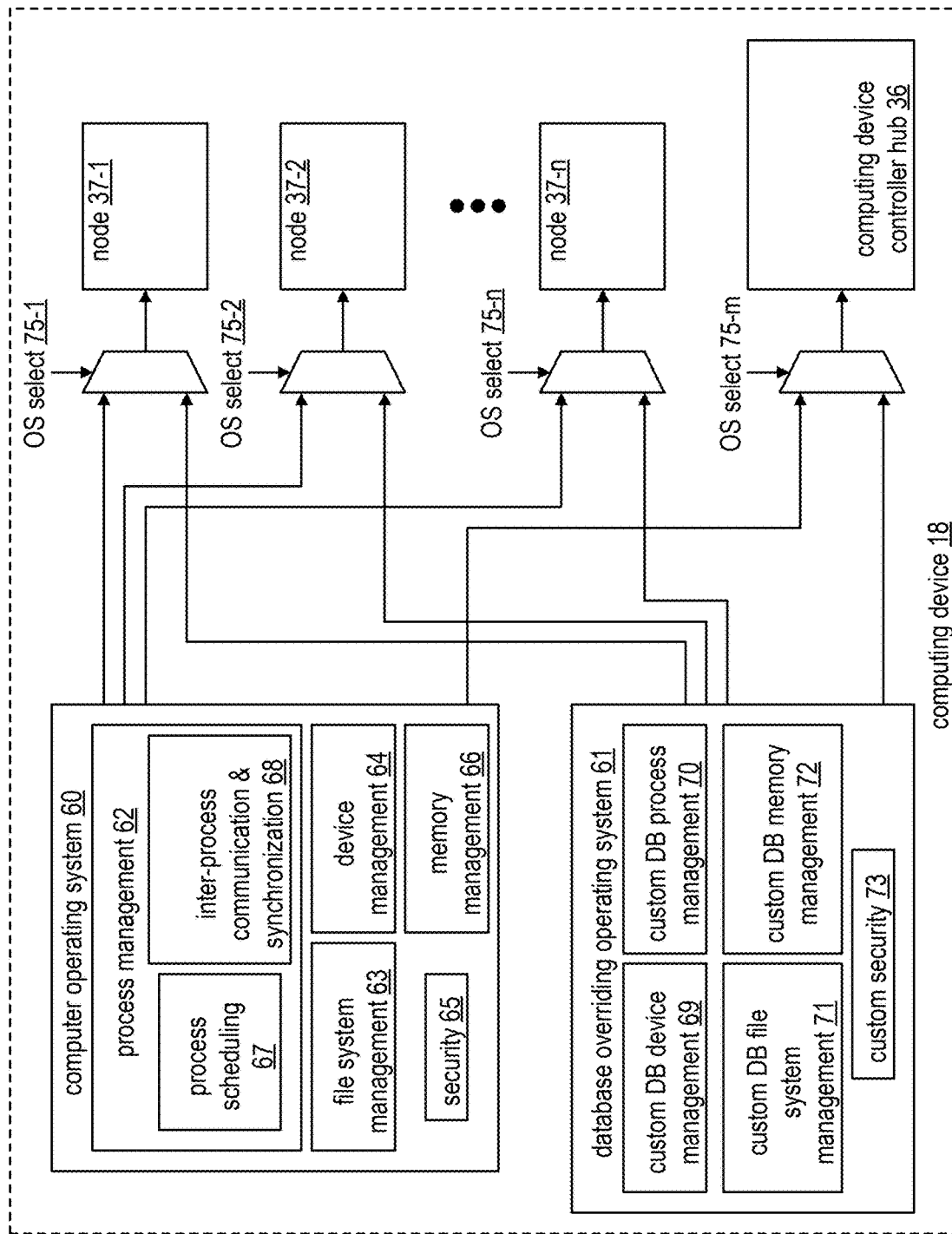
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
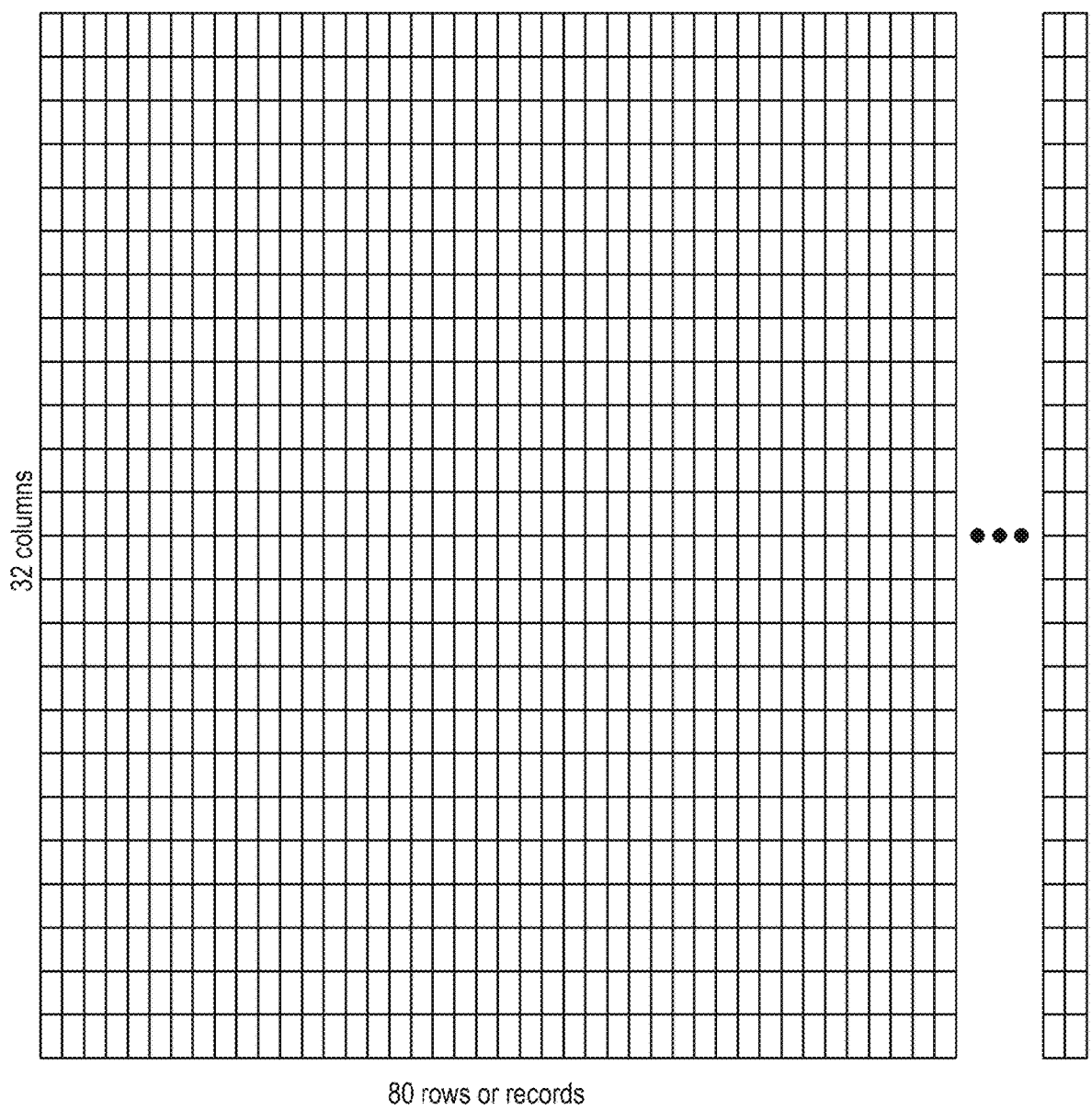
FIGS. 15-23 are schematic block diagrams of an example of processing a table or data set for storage in the database system in accordance with various embodiments.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
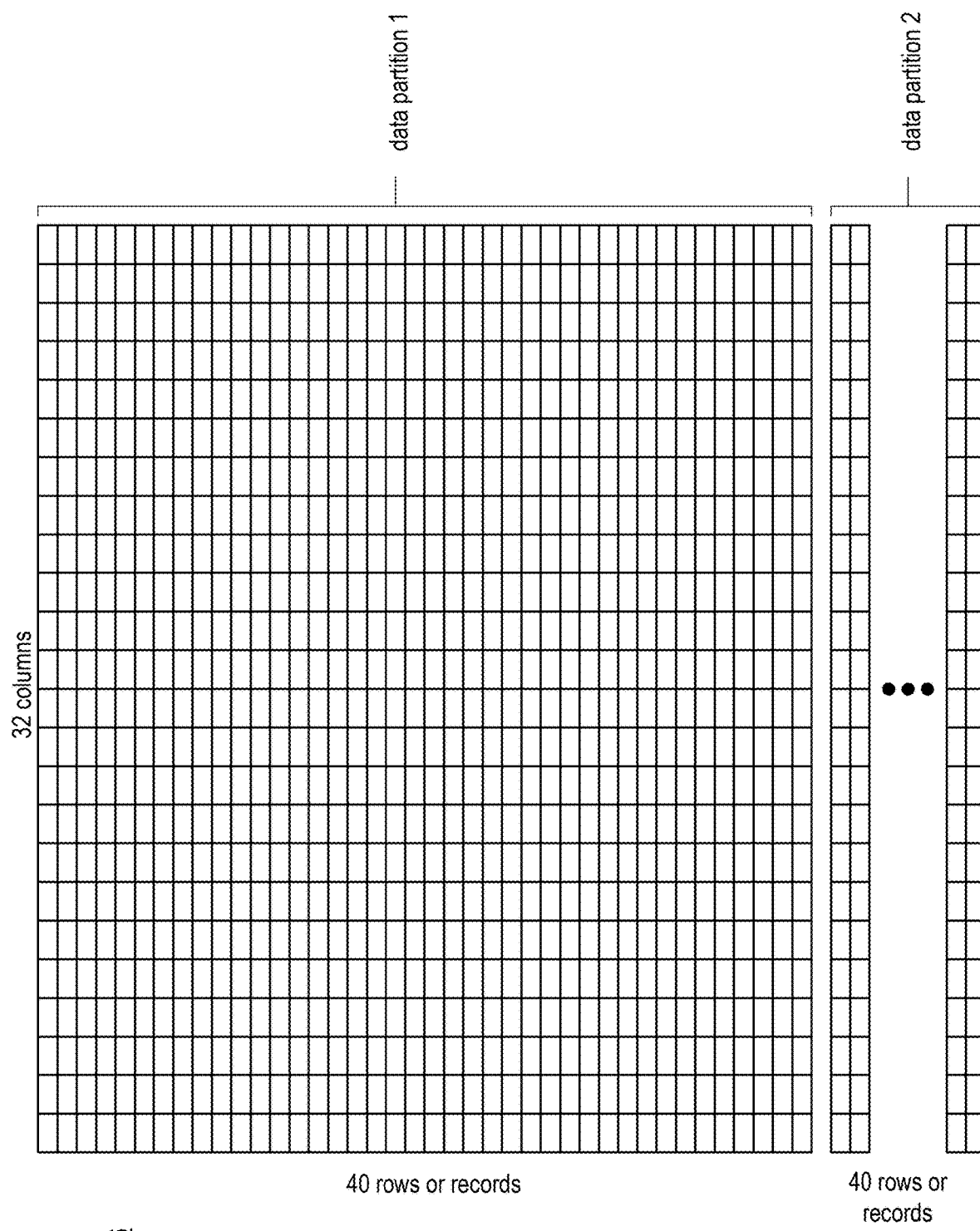

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
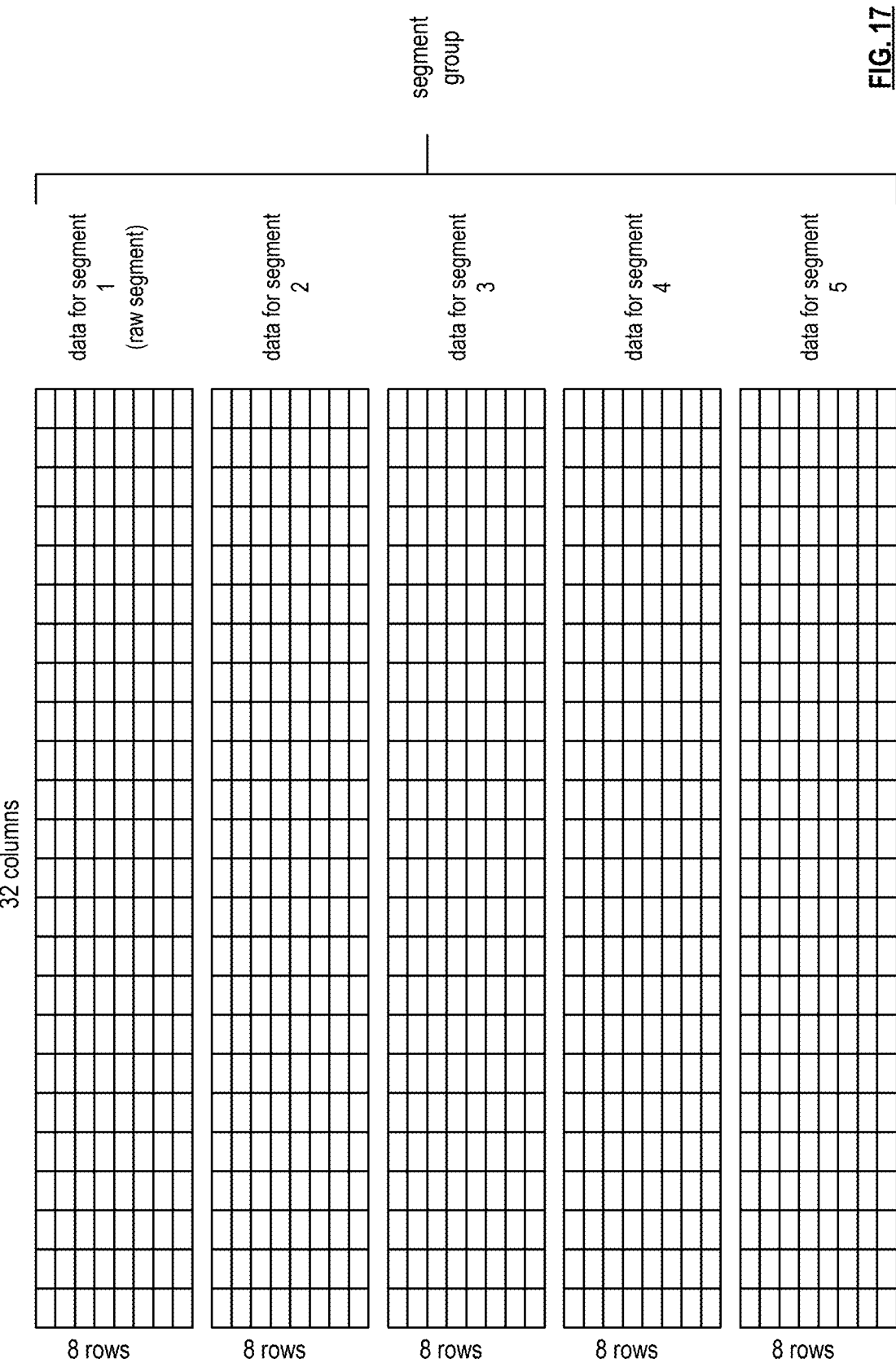

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
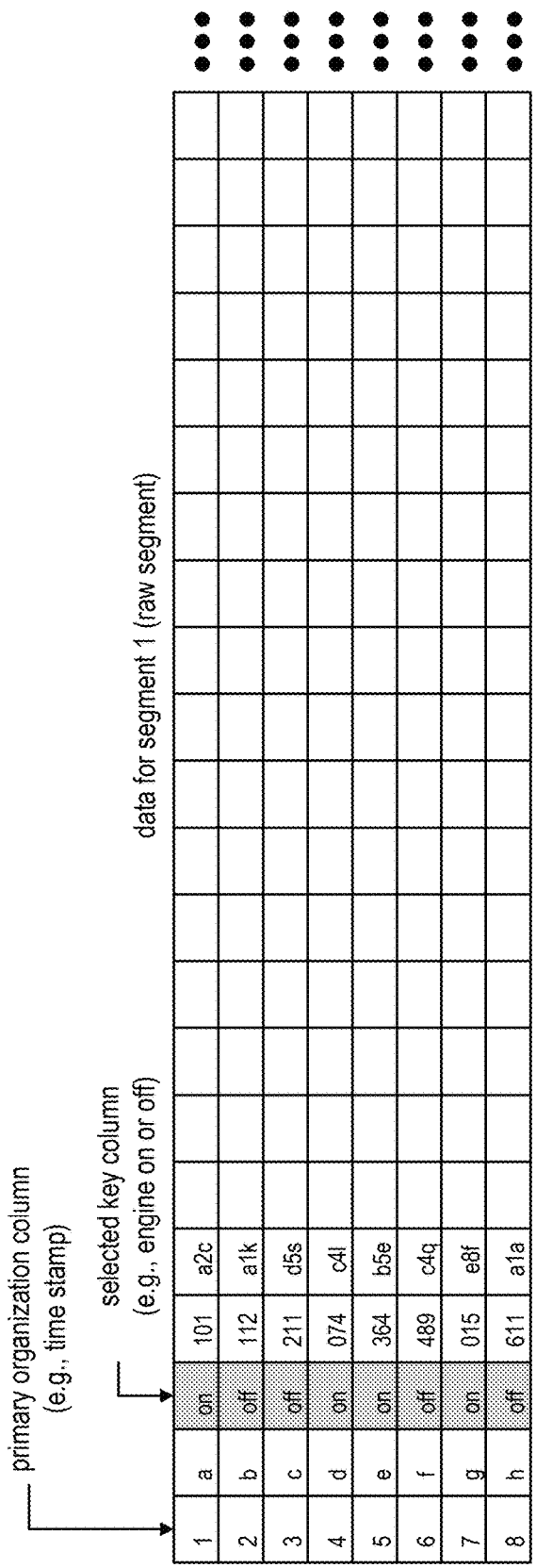

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record).

The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
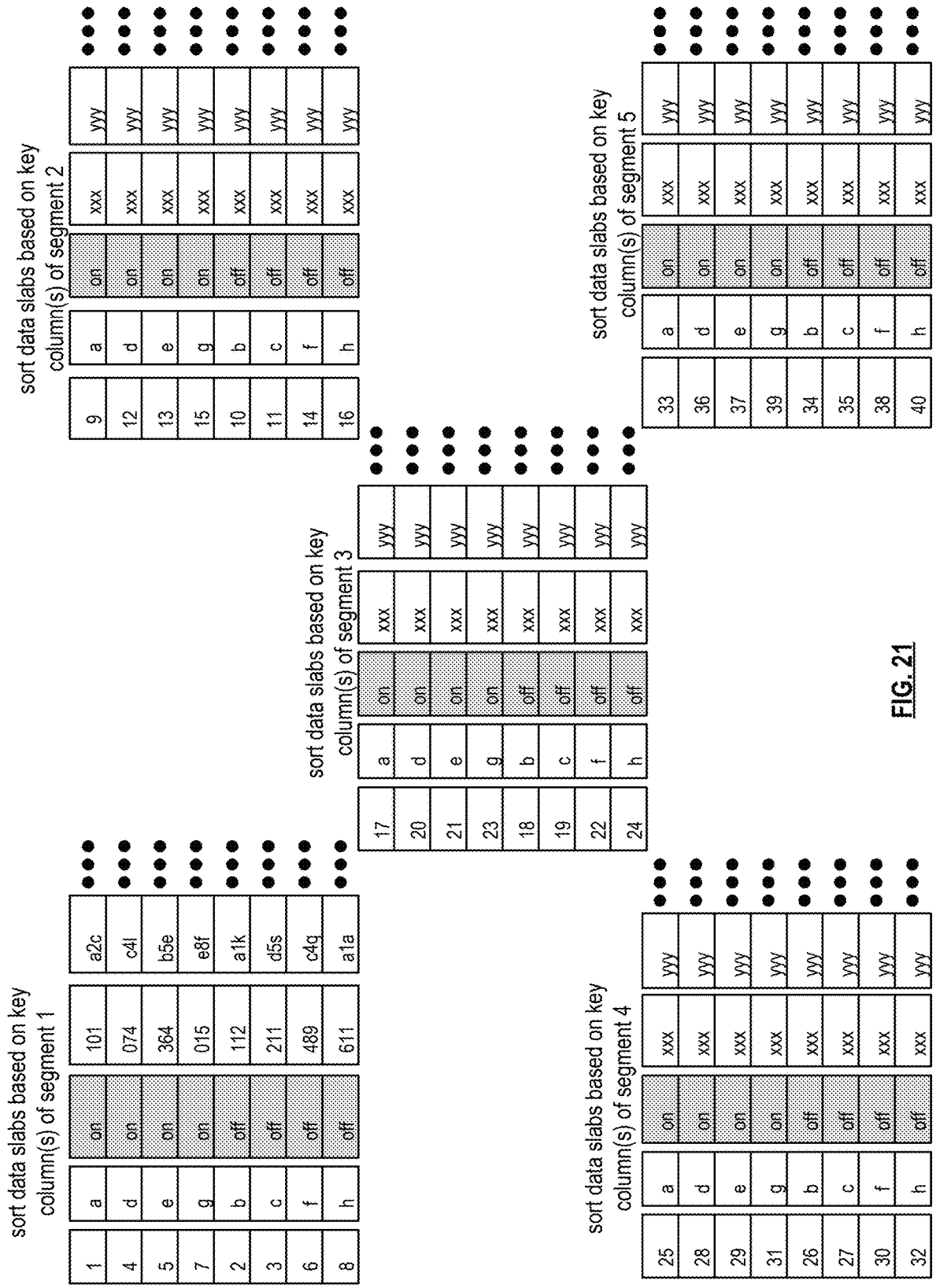

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
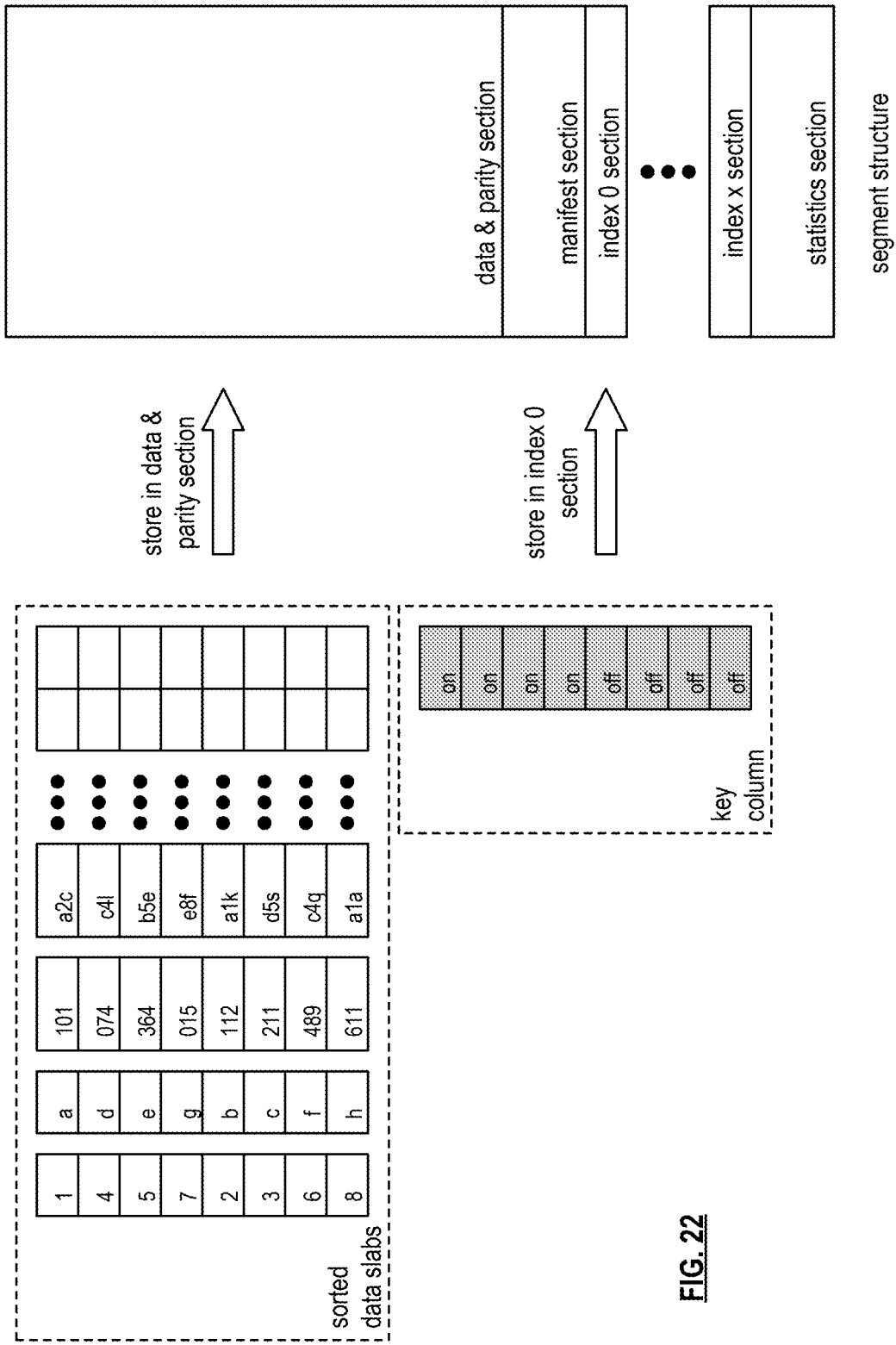

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
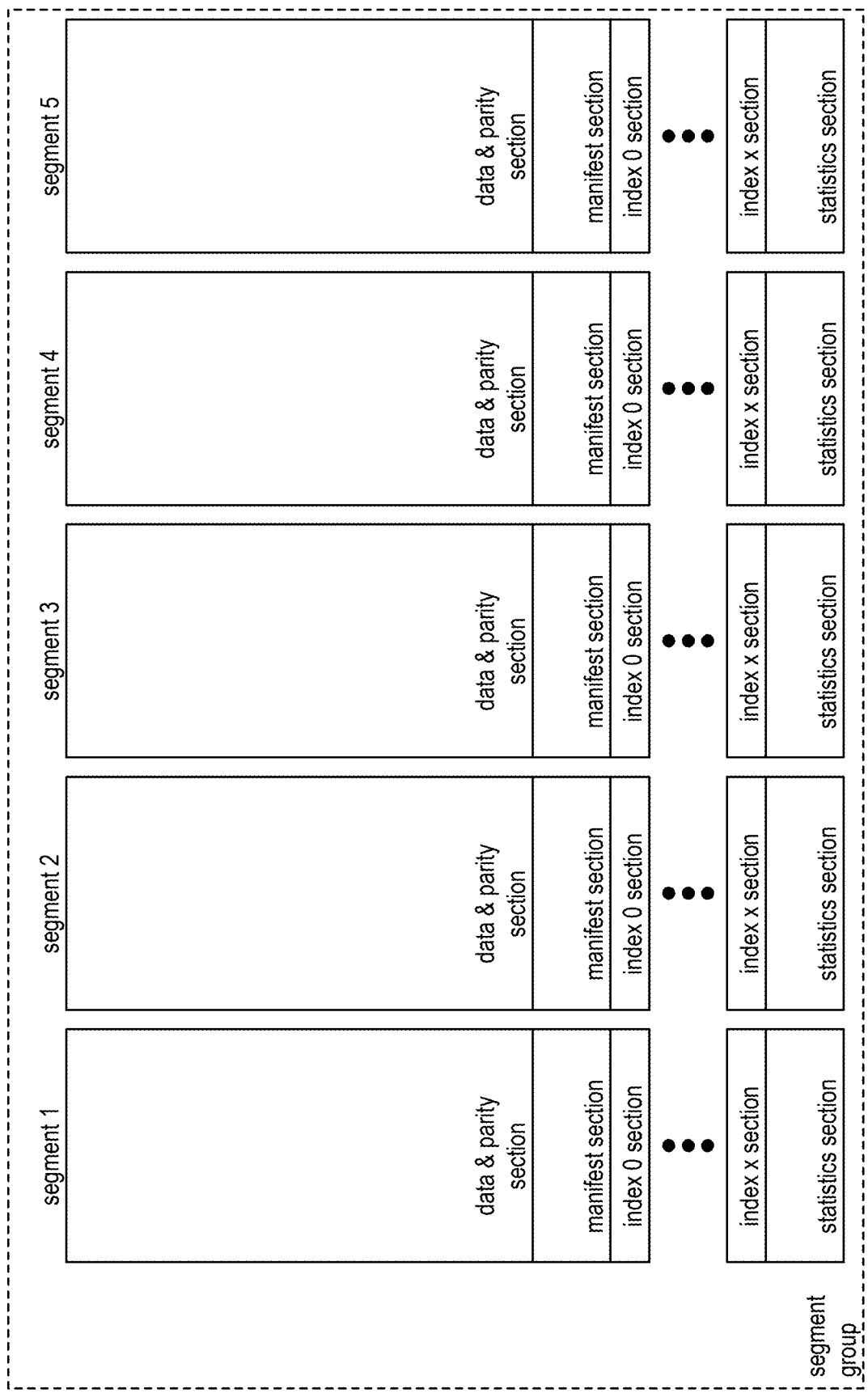

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
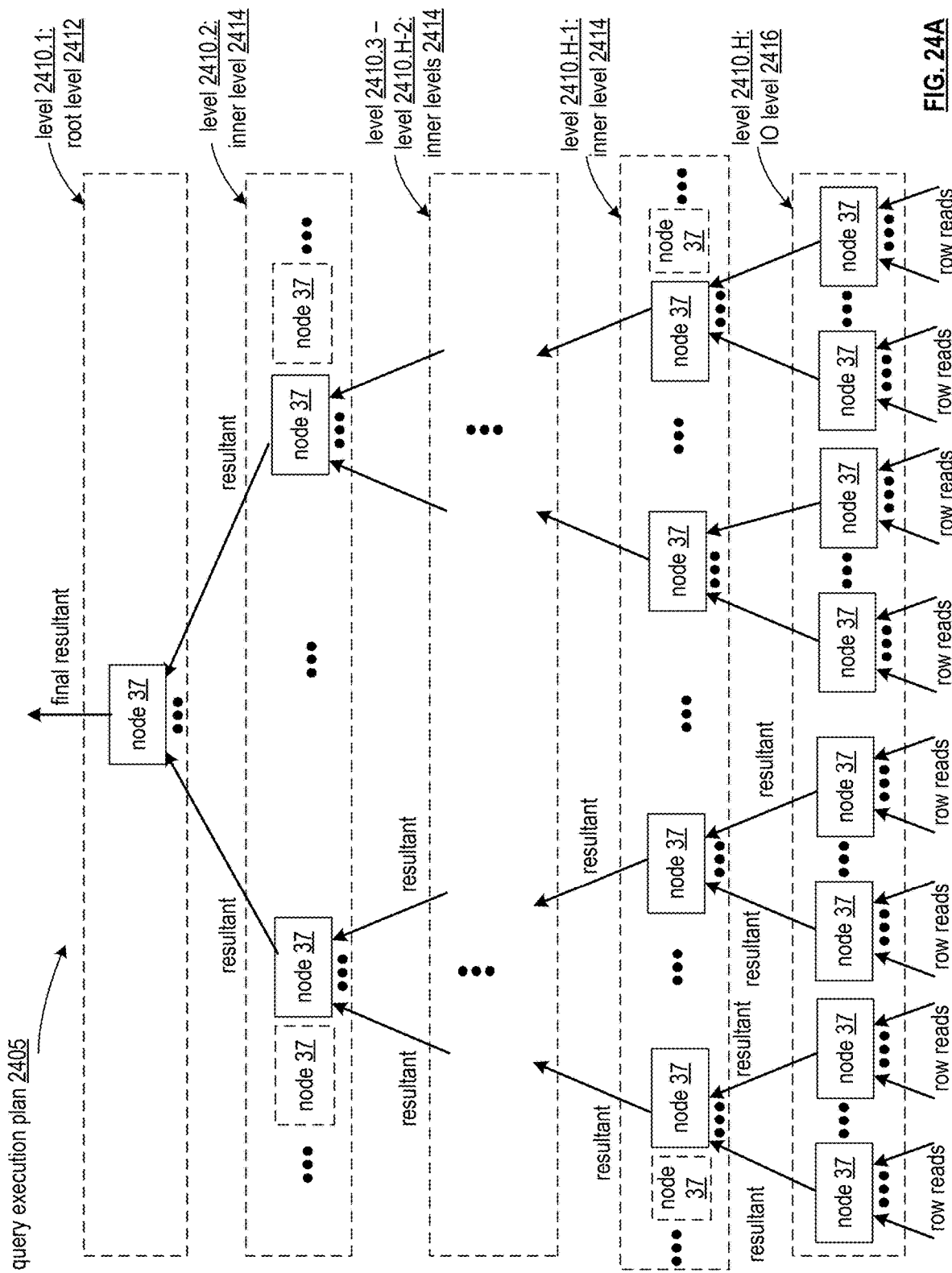
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata applied across a plurality of nodes 37, for example, where at least one node 37 participates in some or all features and/or functionality of FIG. 24A based on receiving and storing the system metadata in local memory of the at least one node 37 as configuration data and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
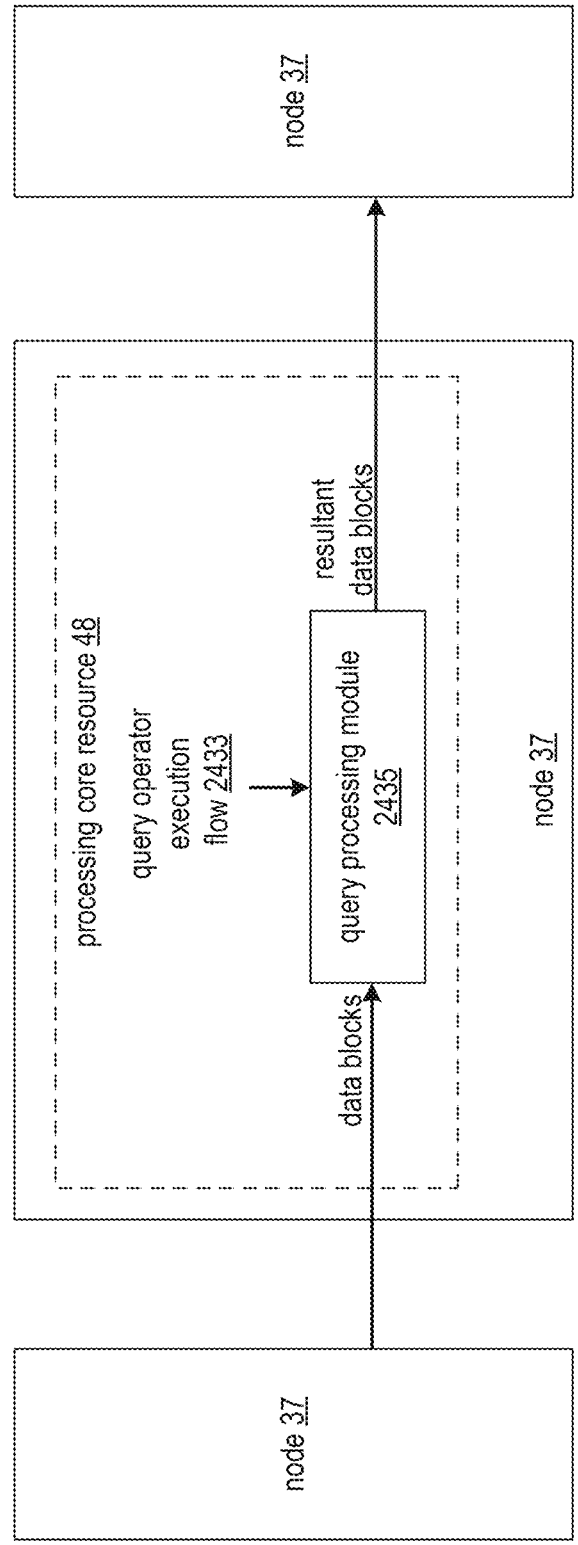
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata applied across a plurality of nodes 37 that includes the given node, for example, where the given node 37 participates in some or all features and/or functionality of FIG. 24B based on receiving and storing the system metadata in local memory of given node 37 as configuration data and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
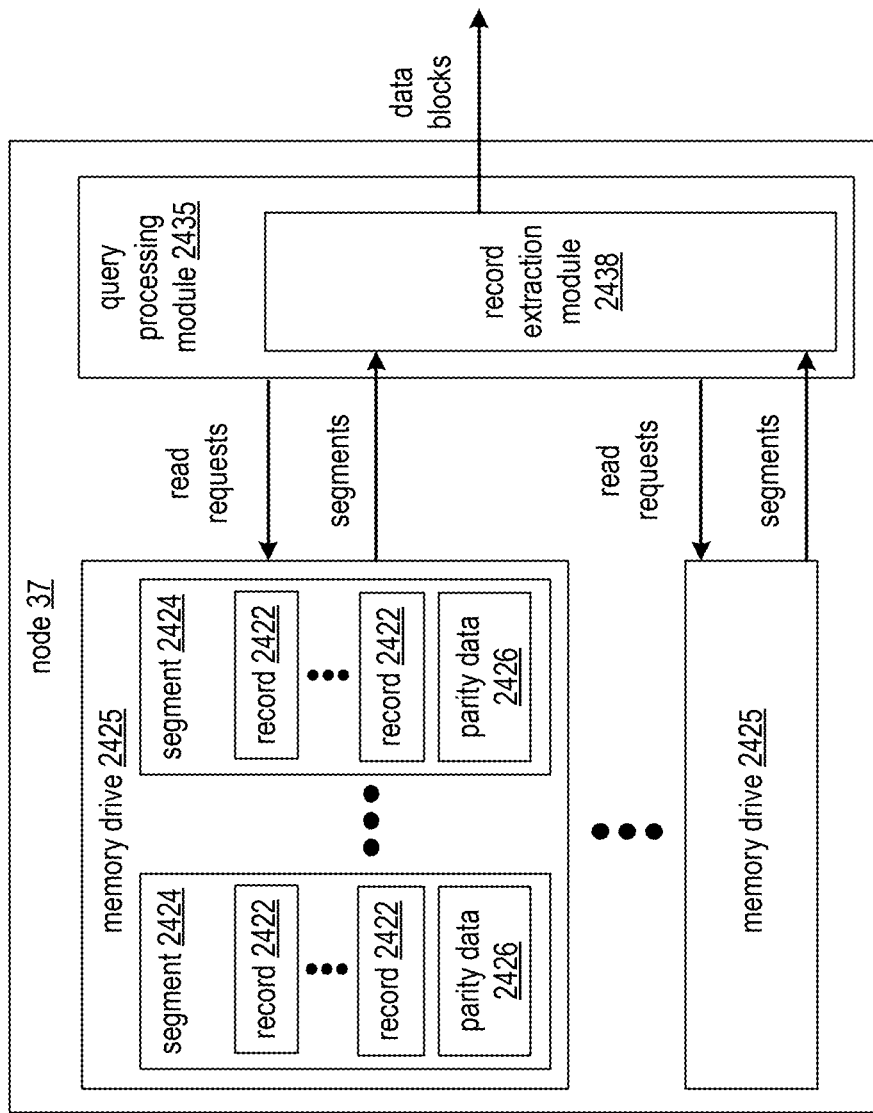

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata applied across a plurality of nodes 37 that includes the given node, for example, where the given node 37 participates in some or all features and/or functionality of FIG. 24C based on receiving and storing the system metadata in local memory of given node 37 as configuration data and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
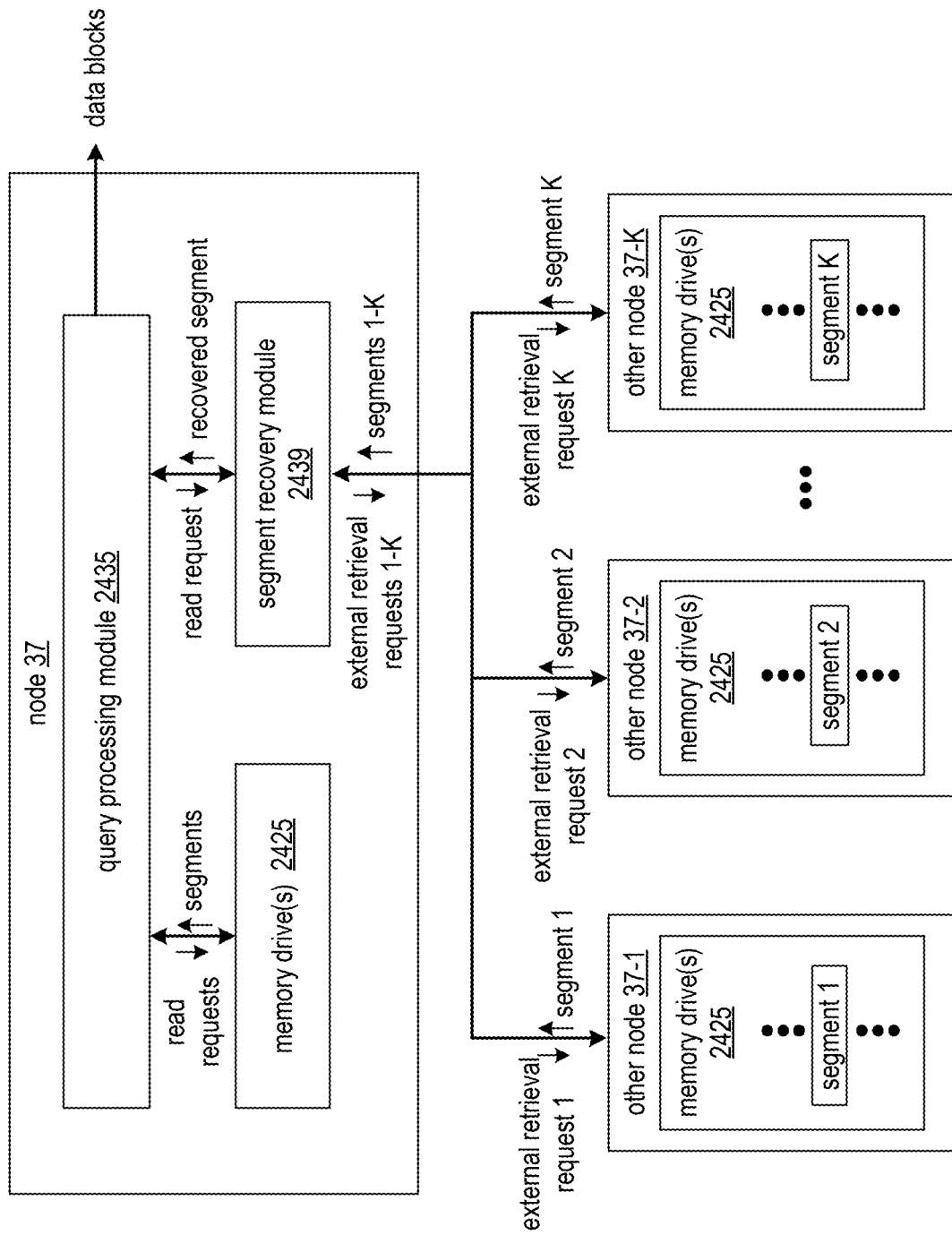

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata applied across a plurality of nodes 37 that includes the given node, for example, where the given node 37 participates in some or all features and/or functionality of FIG. 24D based on receiving and storing the system metadata in local memory of given node 37 as configuration data and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
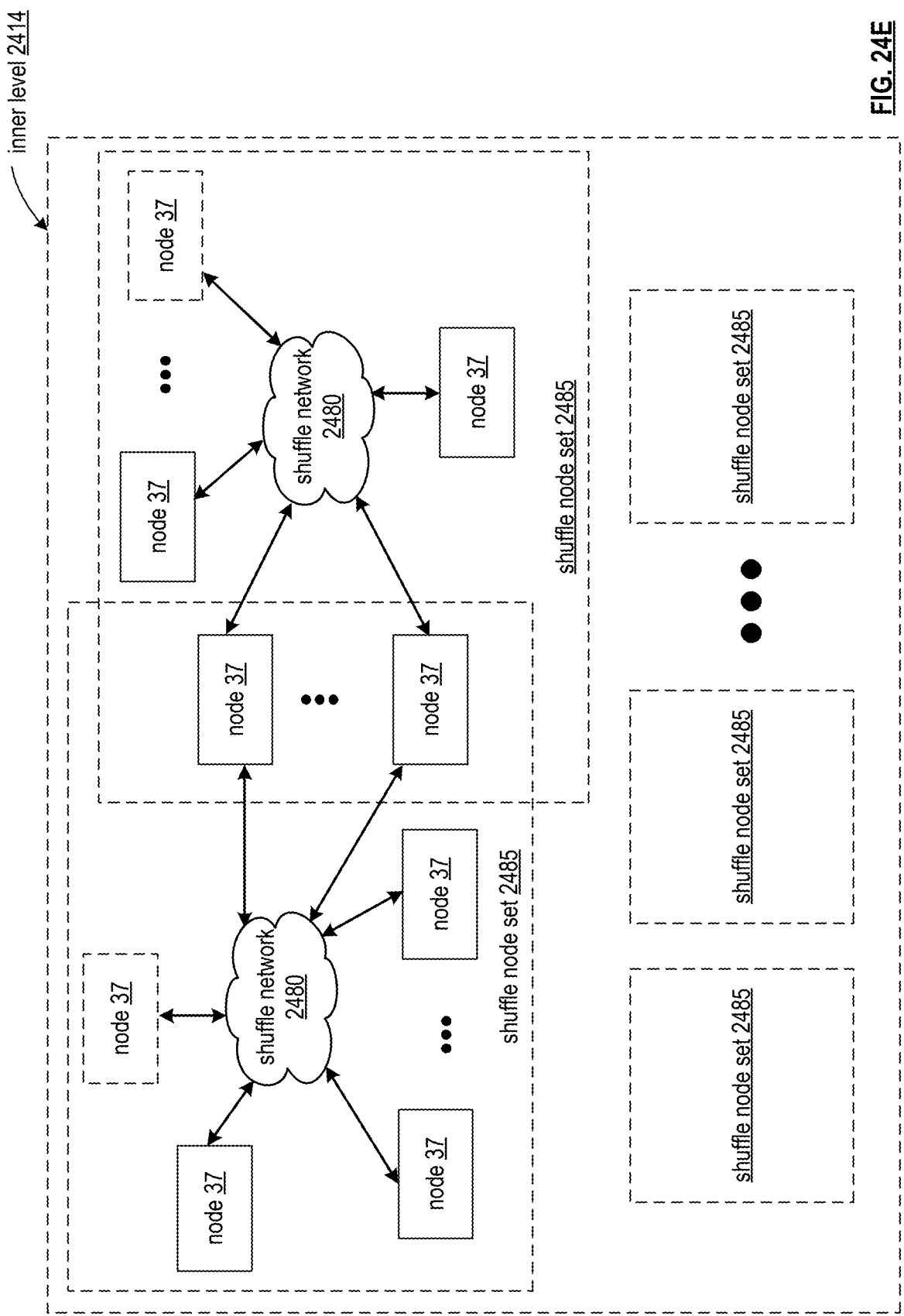
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata applied across a plurality of nodes 37, for example, where at least one node 37 participates in some or all features and/or functionality of FIG. 24E based on receiving and storing the system metadata in local memory of the at least one node 37 as configuration data and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
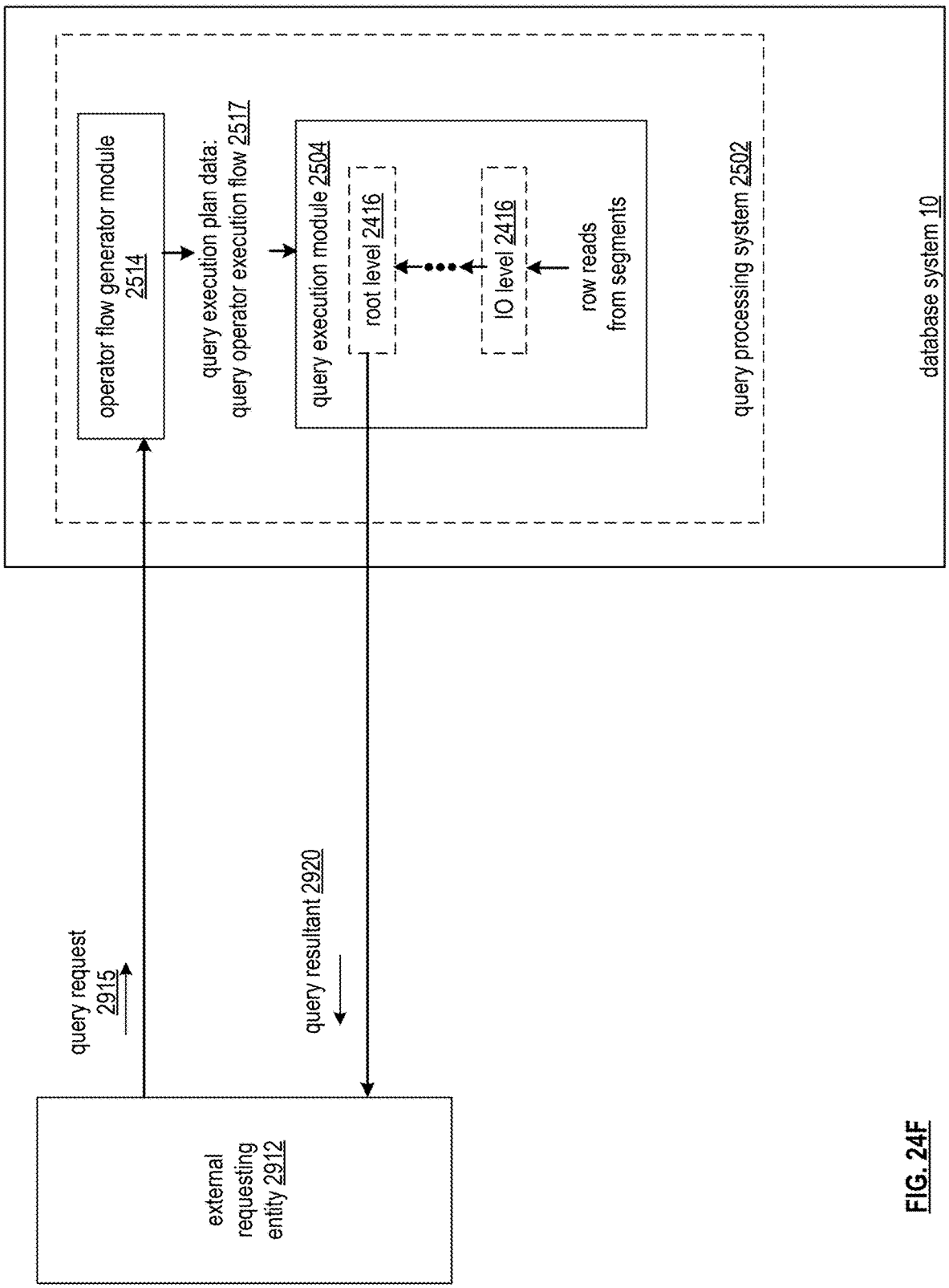
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2915. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2915 for execution via the database system 10, where the corresponding query resultant 2920 is transmitted back to the computing device, for example, for storage by the computing device and/or for display to the corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
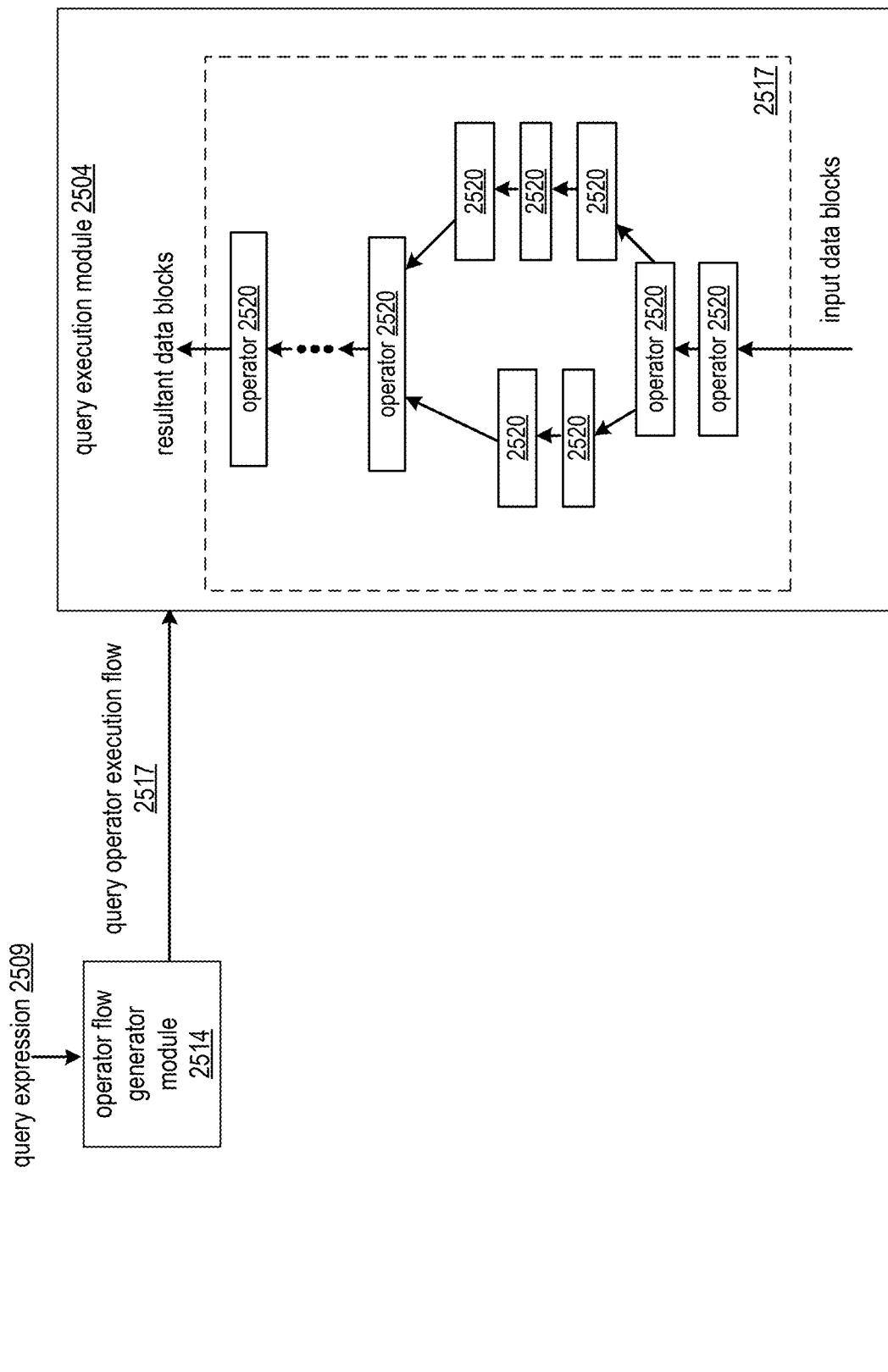
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24H:
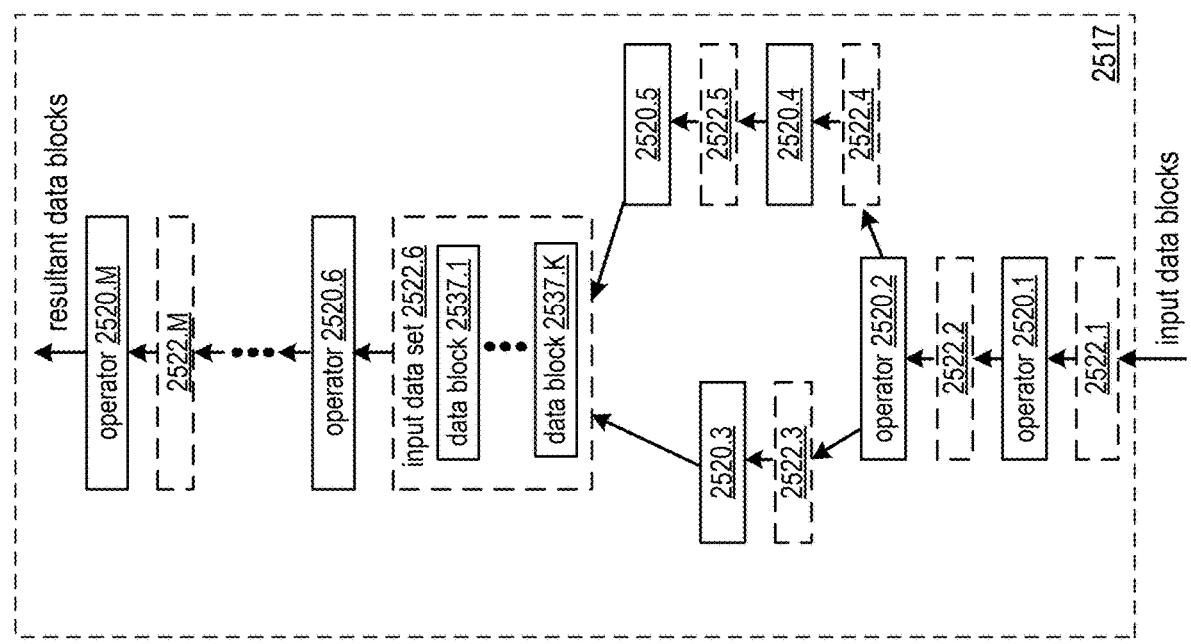
FIG. 24H is a schematic block diagram of a query operator execution flow in accordance with various embodiments.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator $2520.i$ to one or more other nodes to be input data set 2522 the next operator $2520.i+1$ in the common query operator execution flow 2433 of the one or more other nodes 37, the particular node also receives output generated via some or all of these one or more other nodes' execution of this particular operator $2520.i$ in their own query operator execution flow 2433 upon their own corresponding input data set 2522 for this particular operator. The particular node adds this received output of execution of operator $2520.i$ by the one or more other nodes to the be input data set 2522 of its own next operator $2520.i+1$.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator $2520.i+1$ corresponds to and/or is utilized to implement JOIN operator and/or a custom-join operator of the query operator execution flow 2517, and where the operator $2520.i+1$ thus utilizes input received from many different nodes in the shuffle node set in accordance with their performing of all of the operators serially before operator $2520.i+1$ to generate the input to operator $2520.i+1$.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
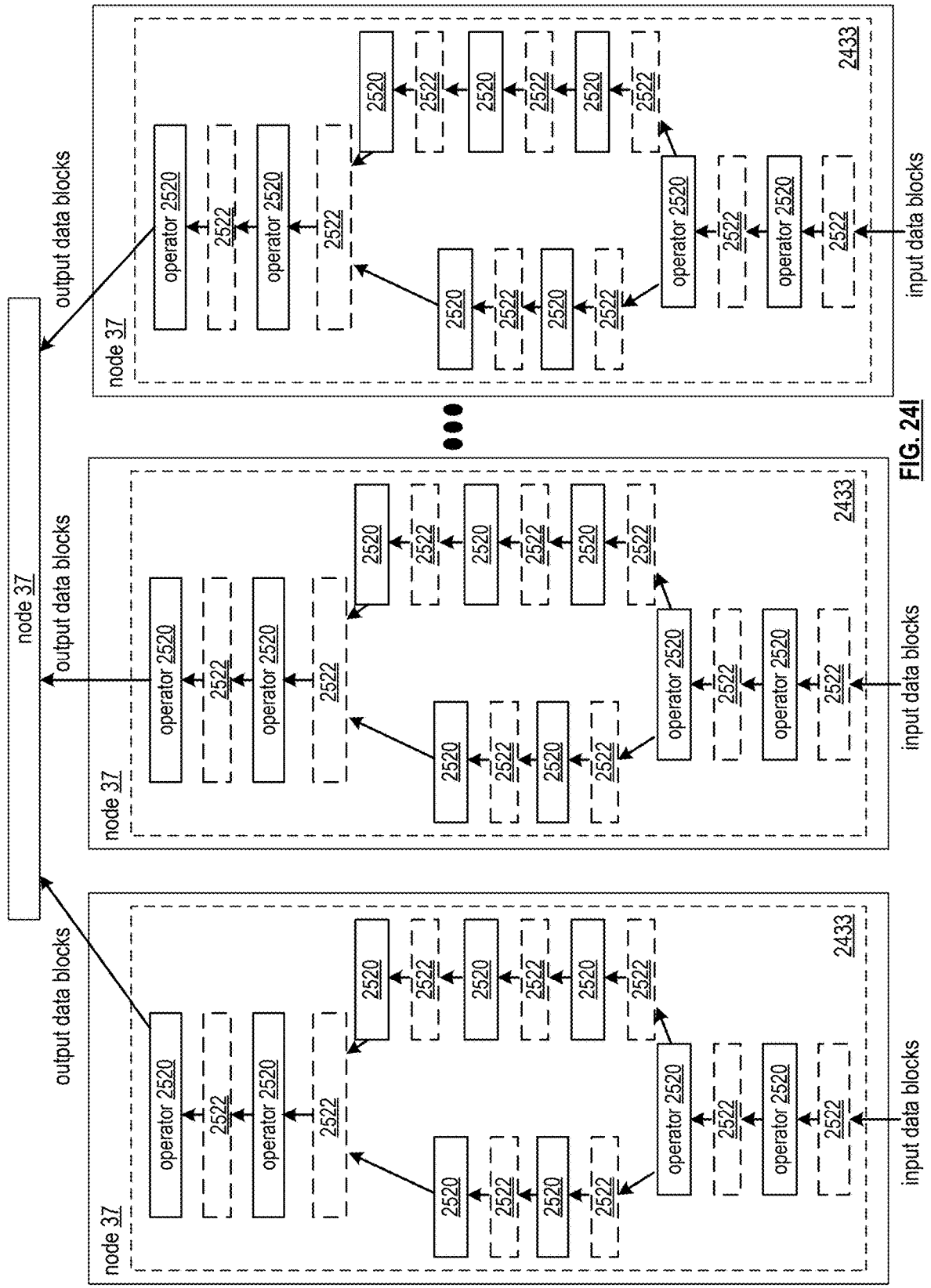
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
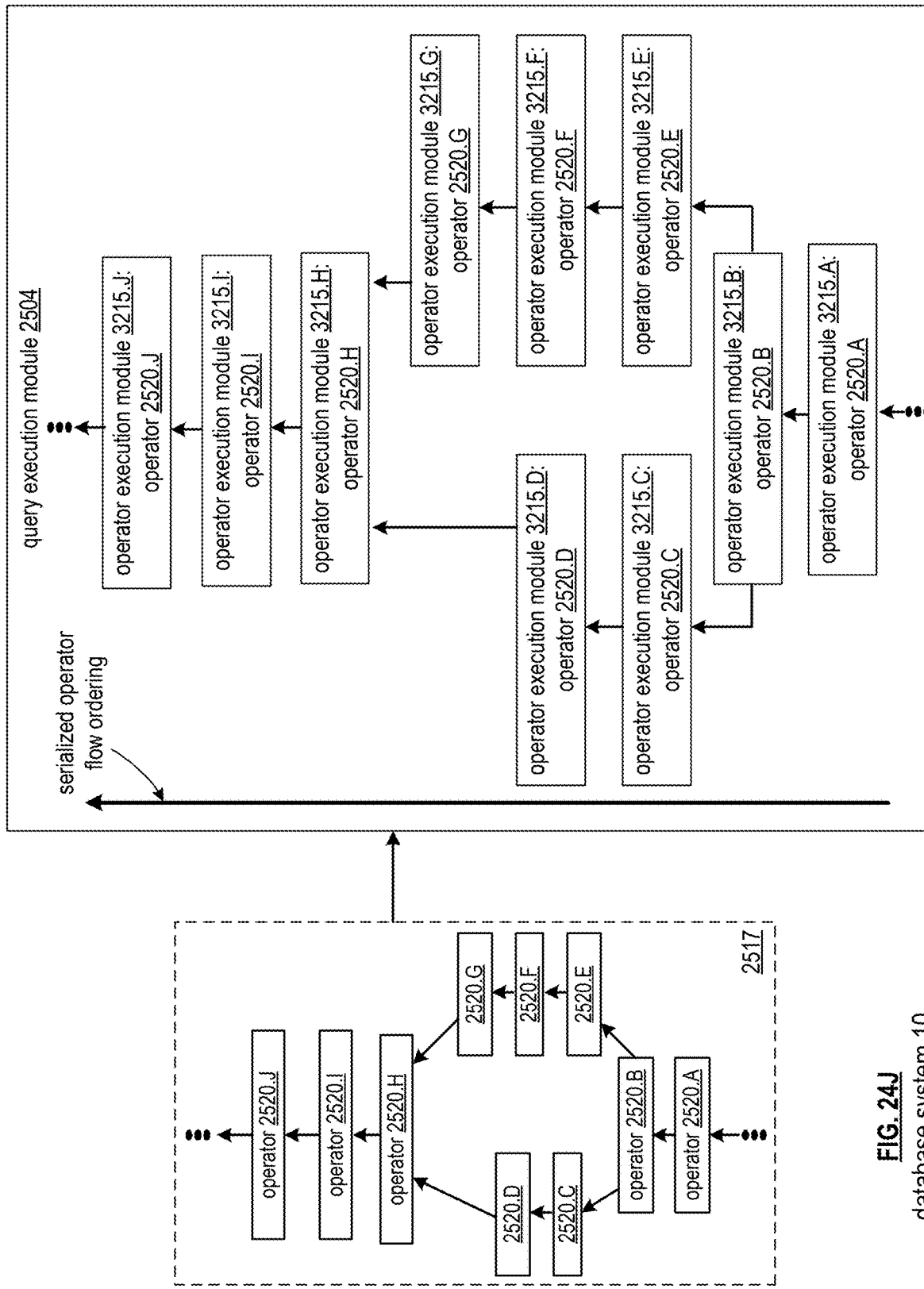
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns 2707.1A-2707.CA of schema 2709.A for database table 2712.A can have a different number of columns than and/or can have different datatypes for some or all columns of the set of columns 2707.1B-2707.CB of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
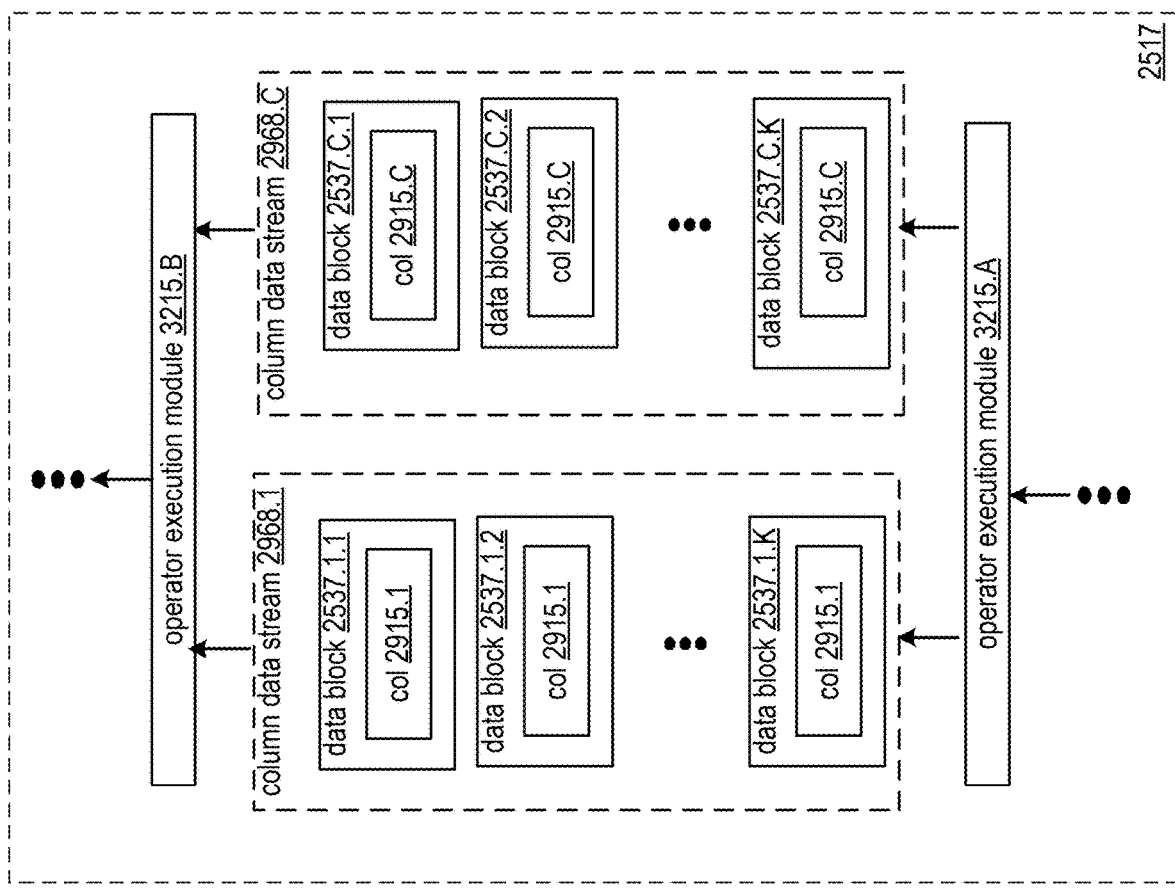
FIG. 24L is a schematic block diagram of a query execution module that implements a plurality of column data streams in accordance with various embodiments.
Figure 24M:
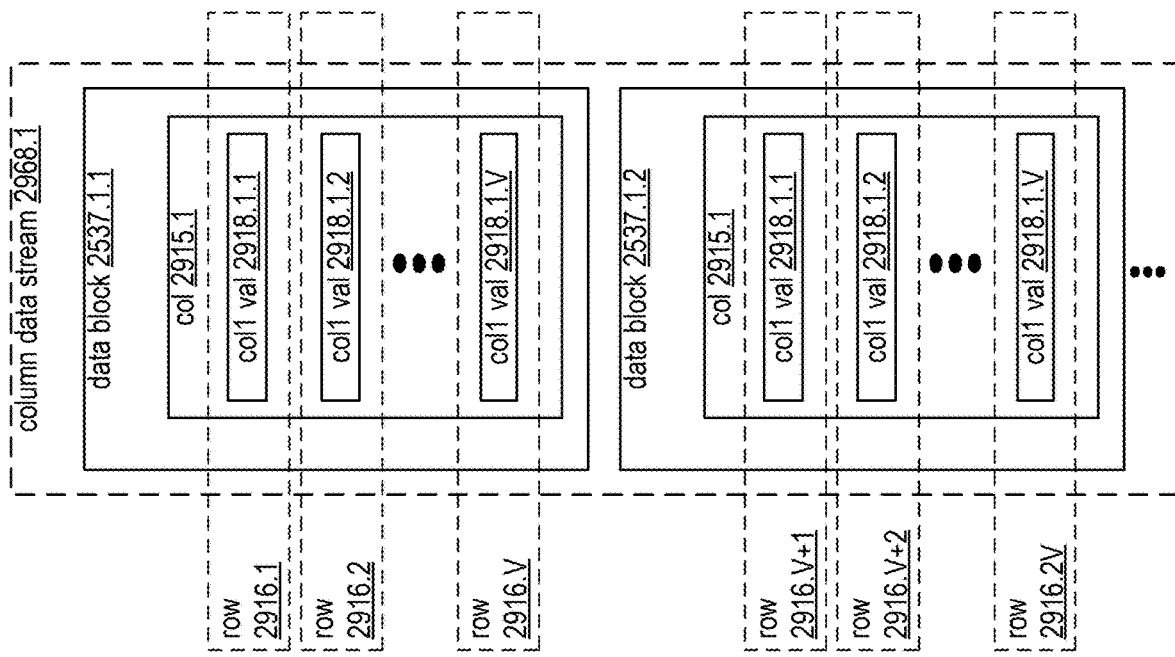
FIG. 24M illustrates example data blocks of a column data stream in accordance with various embodiments.

FIGS. 24L-24M illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24L-24M can implement any embodiment of query execution module 2504 described herein and/or any performance of query execution described herein. Some or all features and/or functionality of column data streams 2968 of FIGS. 24L-24M can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24L, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24M, each data block 2537 of a given column data stream 2968 can include values 2918 for the respective column for one or more corresponding rows 2916. In the example of FIG. 24M, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24N:
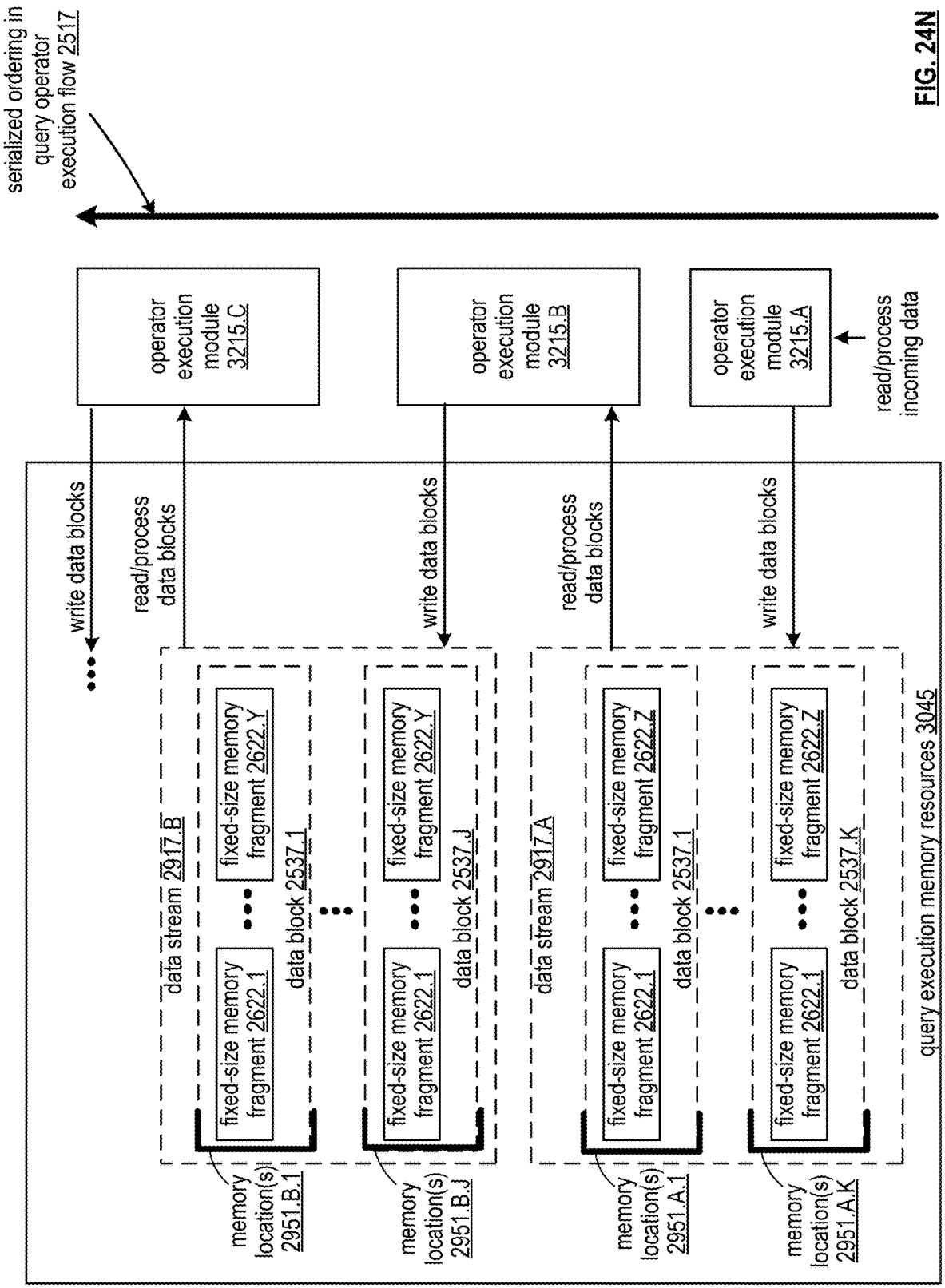
FIG. 24N is a schematic block diagram of a query execution module illustrating writing and processing of data blocks by operator execution modules in accordance with various embodiments.

FIG. 24N illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24N can implement the operator execution modules of FIG. 24J and/or can implement any query execution described herein. The data blocks 2537 can implement the data blocks of column streams of FIGS. 24L and/or 24M, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

FIG. 24O illustrates an embodiment of a database system 10 that implements a segment generator 2507 to generate segments 2424. Some or all features and/or functionality of the database system 10 of FIG. 24O can implement any embodiment of the database system 10 described herein. Some or all features and/or functionality of segments 2424 of FIG. 24O can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24P:
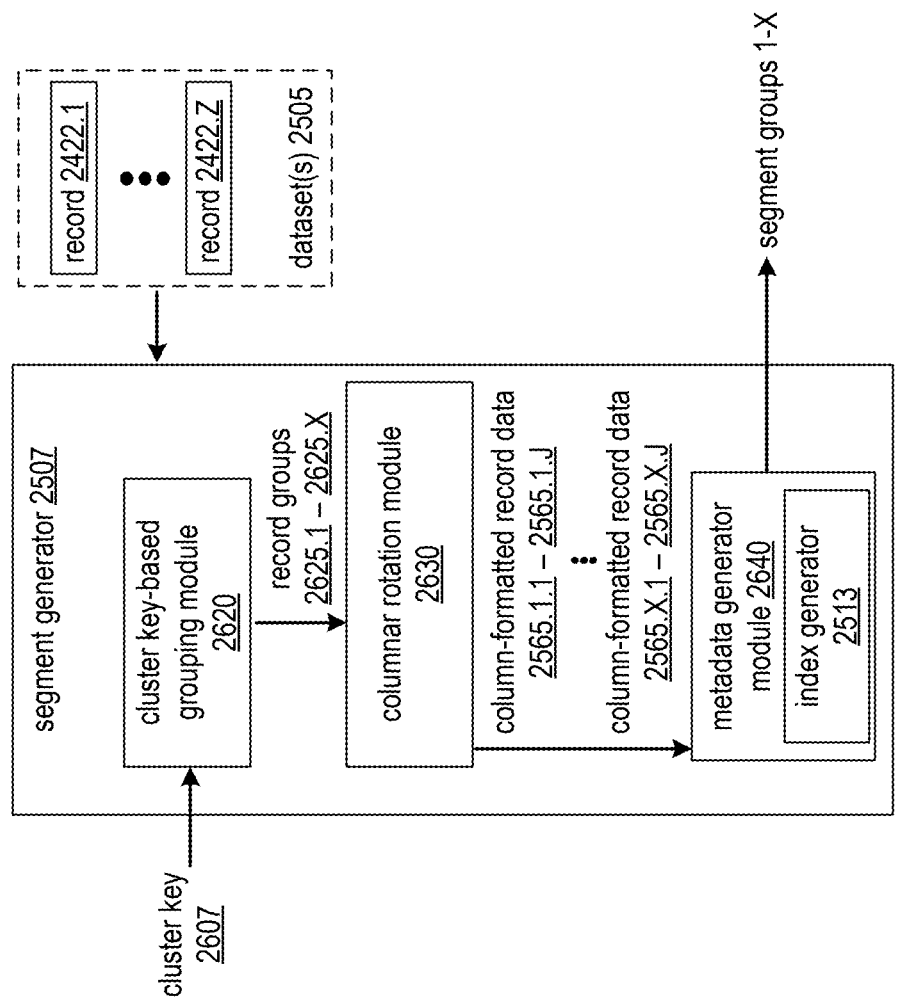
FIG. 24P is a schematic block diagram of a segment generator that implements a cluster key-based grouping module, a columnar rotation module, and a metadata generator module in accordance with various embodiments.

FIG. 24P illustrates an example embodiment of a segment generator 2507 of database system 10. Some or all features and/or functionality of the database system 10 of FIG. 24P can implement any embodiment of the database system 10 described herein. Some or all features and/or functionality of the segment generator 2507 of FIG. 24P can implement the segment generator 2507 of FIG. 24O and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator 2517 as disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system 2505 of U.S. Utility application Ser. Nos. 16/985,723, 16/985,957, and/or 16/985,930.

Figure 24Q:
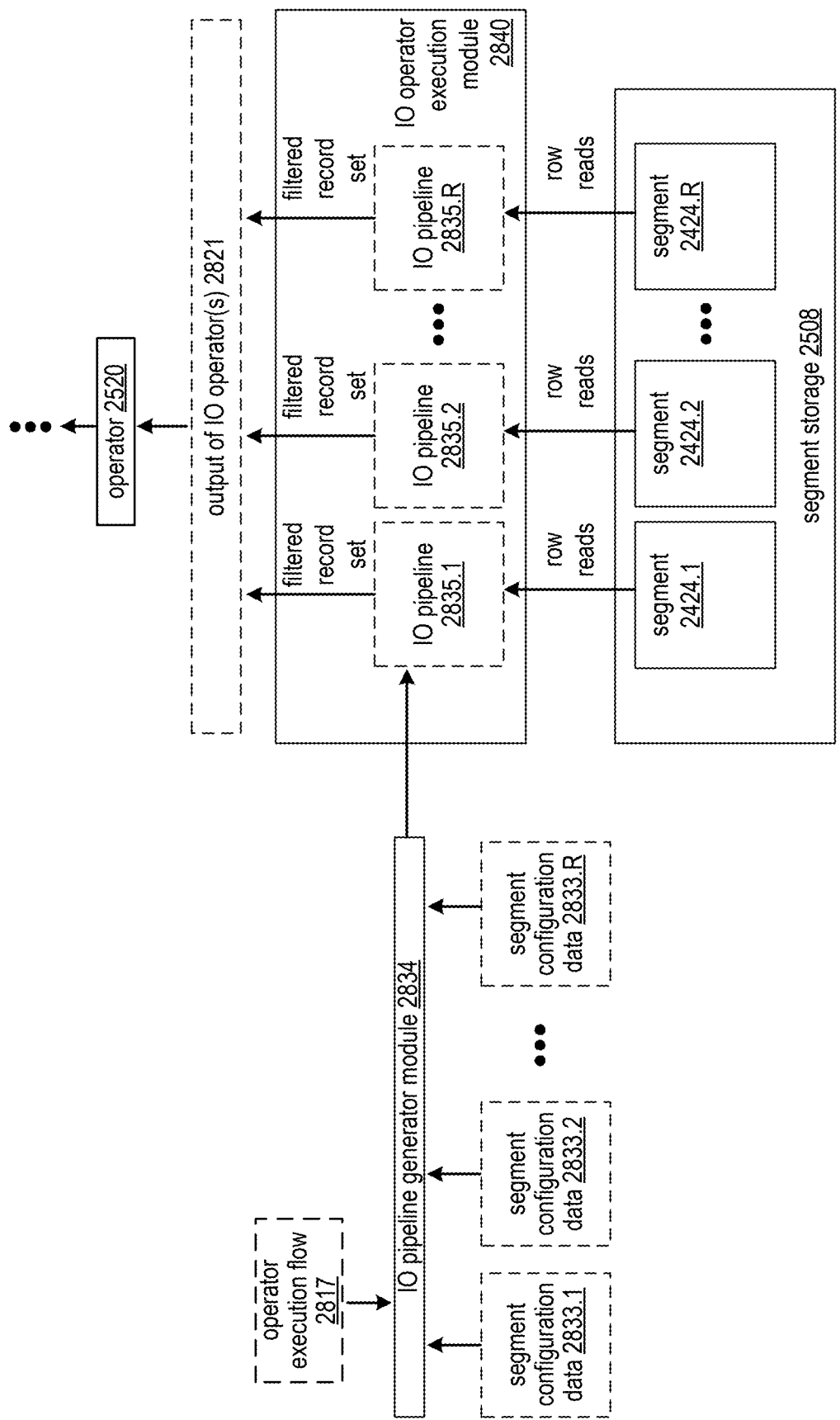
FIG. 24Q is a schematic block diagram of a query processing system that generates and executes a plurality of IO pipelines to generate filtered records sets from a plurality of segments in conjunction with executing a query in accordance with various embodiments.

FIG. 24Q illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24Q can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24R:
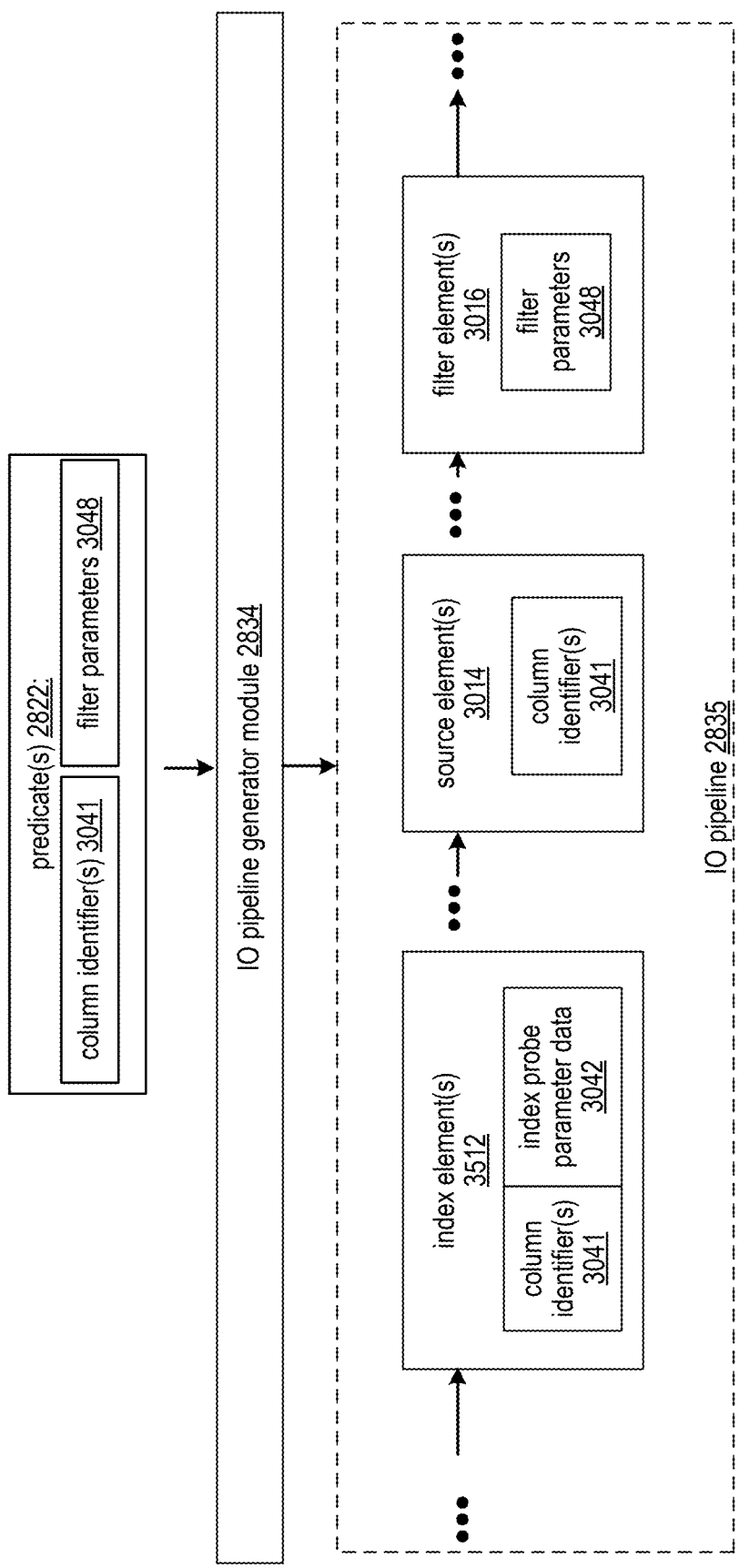
FIG. 24R is a schematic block diagram of a query processing system that generates an IO pipeline for accessing a corresponding segment based on predicates of a query in accordance with various embodiments.

FIG. 24R illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24R can implement the IO pipeline 2835 and/or IO pipeline generator module 2834 of FIG. 24Q, and/or any embodiment of IO pipeline 2835, of IO pipeline generator module 2834, or of any query execution via accessing segments described herein.

In some embodiments, the IO pipeline generator module 2834, IO pipeline 2835, and/or IO operator execution module 2840 implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING", filed May 28, 2021, which is hereby incorporated herein by reference in its entirety and made part of the present U.S. Utility Patent Application for all purposes. For example, the database system 10 can implement the indexing of segments 2424 and/or IO pipeline generation as execution for accessing segments 2424 during query execution via implementing some or all features and/or functionality as described in U.S. Utility application Ser. No. 17/303, 437.

Figure 24S:
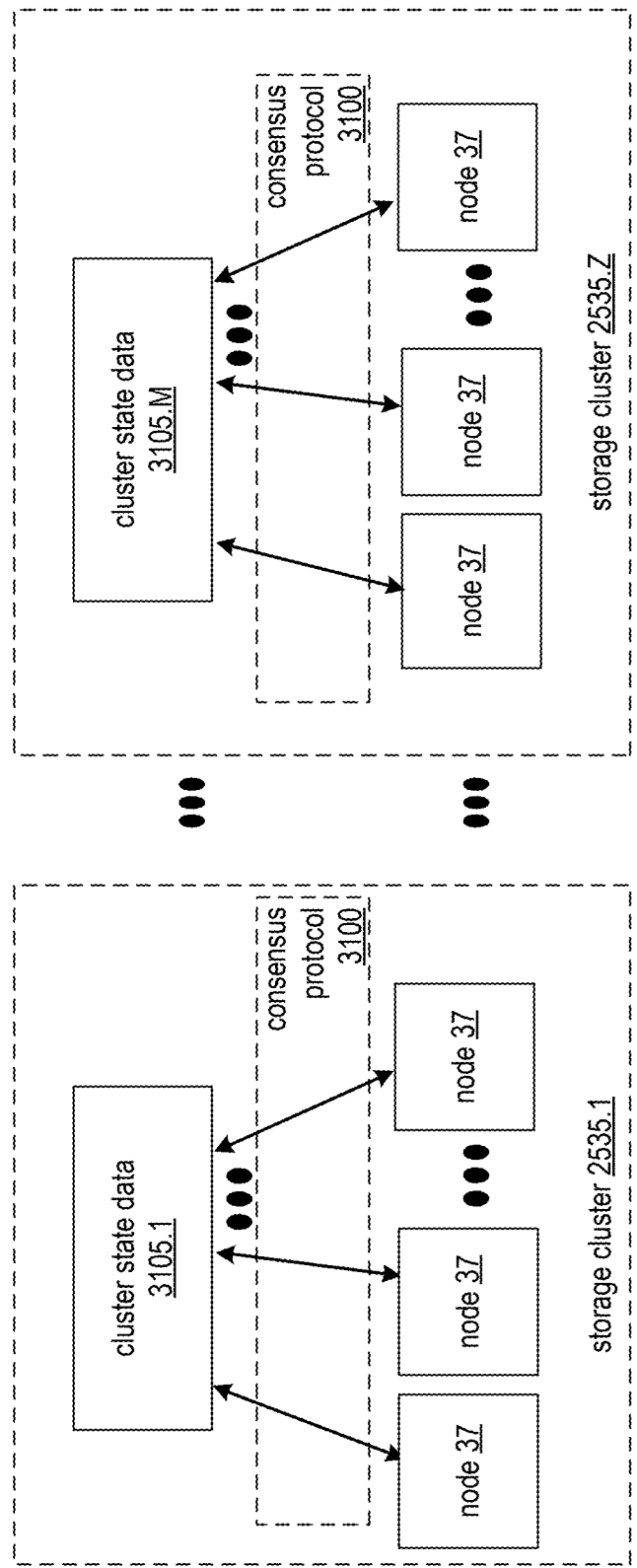
FIG. 24S is a schematic block diagram of a database system that includes a plurality of storage clusters that each mediate cluster state data via a plurality of nodes in accordance with a consensus protocol.

FIG. 24S presents an embodiment of a database system 10 that includes a plurality of storage clusters 2535. Storage clusters 2535.1-2535.Z of FIG. 24S can implement some or all features and/or functionality of storage clusters 35-1-35-Z described herein, and/or can implement some or all features and/or functionality of any embodiment of a storage cluster described herein. Some or all features and/or functionality of database system 10 of FIG. 24S can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster 2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

FIGS. 25A-25M illustrate embodiments where the segment scheduling module 2410 of a node 37 utilizes data ownership information to determine the segment sets 2418 for the set of queries 2405 in the query set 2415. The embodiments illustrated in 25A-25M can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The embodiments of node 37 discussed in conjunction with FIGS. 25A-25M can be utilized to implement any other nodes 37 of database system 10 discussed herein.

As discussed previously, multiple nodes 37, such as a particular group of nodes in a same storage cluster 35, can generate query resultants for the same query, where the query resultants generated by a storage cluster of nodes 37 in series and/or parallel to ultimately generate the full resultant of the query. For a given query, a full set of segments stored across and/or accessible by the storage cluster of nodes 37 executing the query is required. To ensure that the final query result generated via the combined efforts of this storage cluster 35 is correct, each one of the set of segments must be processed. Furthermore, each one of the set of segments must be processed exactly once to ensure that corresponding rows are not duplicated, which could affect the final resultant of the query. Therefore, for a given query, each segment must be retrieved and/or processed by exactly one node in the storage cluster 35, such as exactly one node at an IO level of a query execution plan.

Figure 25A:
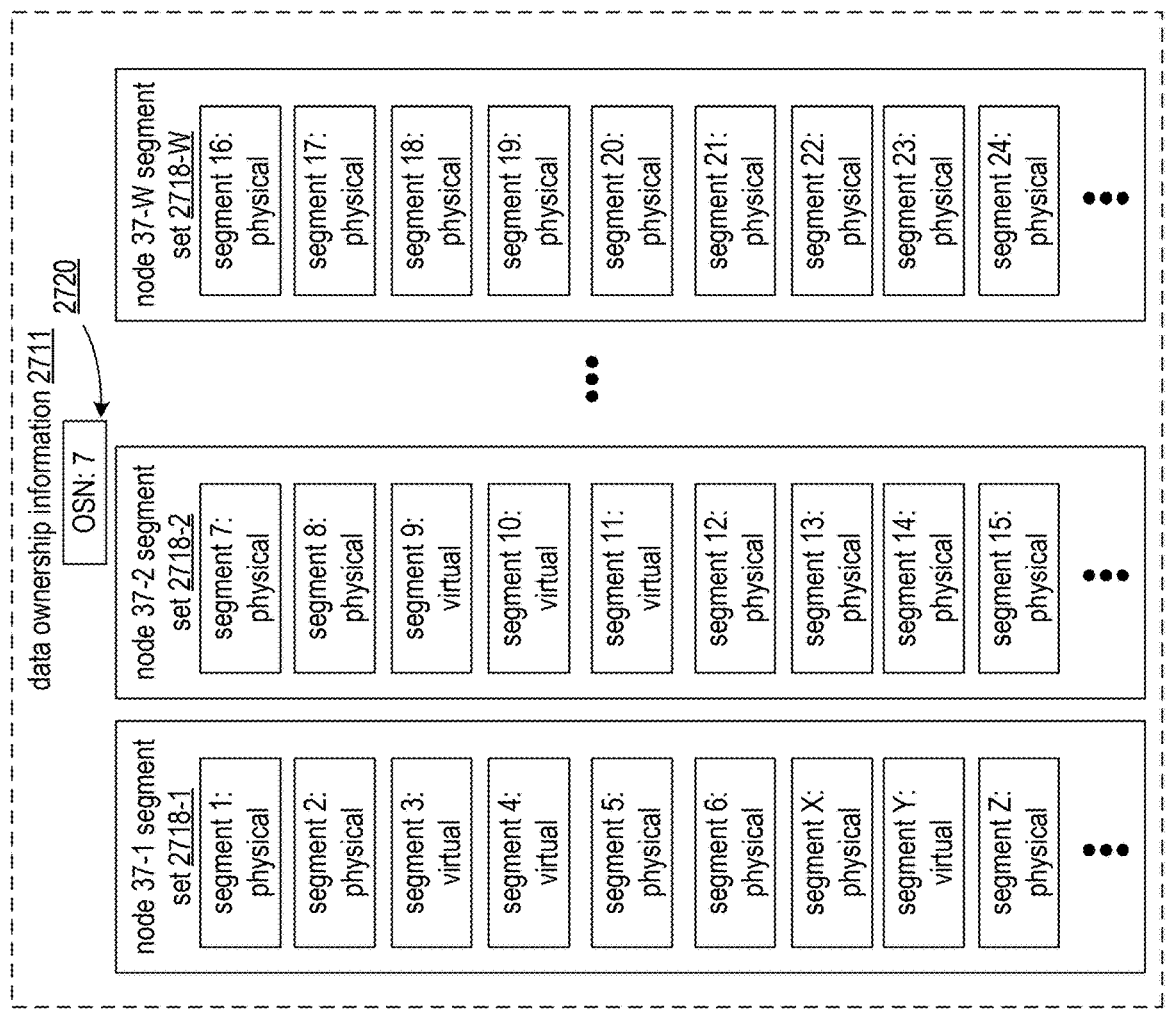
FIG. 25A illustrates an embodiment of data ownership information in accordance with various embodiments.

To ensure that each segment of a query is processed exactly once, all nodes 37 of a storage cluster 35 can store and/or access data ownership information 2711. An example embodiment of the information included in data ownership information 2711 is depicted in FIG. 25A. These nodes responsible for storing data ownership information 2711 can include all nodes 37 in a group of nodes that are included in an IO level of a query execution plan, and/or that are otherwise responsible for performing read steps to read rows in facilitation of query execution. For example, if the storage cluster 35 includes 5 computing devices as illustrated in the example of FIG. 6, and if each computing device includes 4 nodes all illustrated in the example of FIG. 7, the storage cluster can include a set of 20 nodes. The data ownership information can include a plurality of node segment sets 2718 for the corresponding plurality of nodes in the storage cluster. As illustrated in FIG. 25A, a plurality of nodes 37-1-37-W of the storage cluster can each have a corresponding node segment set 2718 of a corresponding plurality of node segment sets 2718-1-2718-W. Each node segment set can indicate the full set of segments that are owned by the segment. As used herein, a node's "ownership" of a segment corresponds to a node being assigned to read and/or process this segment in accordance with processing queries and/or that the node is otherwise responsible for retrieval, recovery, and/or processing of the corresponding segments in its execution of queries in its query set 2405.

Each node segment set 2718 can further indicate whether the corresponding node is responsible for processing these segments as virtual or physical segments. Some or all the segments in a node segment set 2718 for a particular node can be physical segments that are directly accessible by the node via its segment storage 2442. Some or all of the segments in a node segment set 2718 for a particular node can be virtual segments that are accessible via a recovery scheme. Thus, a node's "ownership" of some segments can correspond to virtual segments that are not stored by the node in its own segment storage 2442.

In the example presented in FIG. 25A, node 37-1 owns a plurality of segments that include segments 1, 2, 3, 4, 5, 6, X, Y, and Z; node 37-2 owns a plurality of segments that include segments 7-15; and node 37-W owns a plurality of segments that include segments 16-24. These segment numbers are included to label the segments, and do not necessarily indicate any ordering of these segments. In this example, the node segment set of node 37-1 indicates segments 3, 4, and Y are owned by node 37-1 virtual segments, and the node segment set of node 37-2 indicates segments 9, 10, and 11 are owned by node 37-2 as virtual segments.

The nodes 1-W can process their queries by generating corresponding segment sets 2418 of incoming queries. In particular for a given query 2405 to be processed by a node 37, it can determine the corresponding segment set 2418 to include all required segments for the given query that are owned by the node as indicated by the data ownership information 2711, and only the required segments for the given query that are owned by the node the data ownership information 2711. The node can further determine whether each particular segment in the segment set is to be processed as a physical or virtual segment based upon its corresponding indication in the data ownership information 2711.

The data ownership information 2711 can indicate, in exactly one node segment set 2718, each one of the full set of segments owned by the corresponding storage cluster 35, such as the full set of segments that are stored by the storage cluster and/or the full set of segments the corresponding storage cluster is responsible for. Thus, the plurality of node segment sets of a storage cluster's data ownership information 2711 can be mutually exclusive and collectively exhaustive with regards to the full set of segments owned by the corresponding storage cluster 35. In some cases, not all of the storage cluster's full set of segments are currently stored by the storage cluster 35, for example, where they are only recoverable as virtual segments due to the corresponding physical segments being unavailable.

The data ownership information 2711 can correspond to a particular storage cluster 35 and can include node segment sets for every one of its node 37-1-37-W, such as a distinct set of 20 nodes. Each storage cluster of a plurality of different storage clusters in the database system 10, such as the plurality of storage clusters 35-1-35-$z$, can each have its own corresponding data ownership information for its own corresponding set of nodes. Queries can be processed by nodes of a single storage cluster 35 and/or via nodes of multiple storage clusters 35, for example, if they include segments in data ownership information 2711 of different storage clusters. Thus, to maintain query correctness across multiple storage clusters, the plurality of full sets of segments of the corresponding plurality of storage clusters can be mutually exclusive and collectively exhaustive with regards to all segments that are stored and/or recoverable by the database system 10 as a whole.

The portion of data ownership information 2711 accessible by a particular node can indicate only the proper subset of the full set of segments stored nodes in the storage cluster that are owned by the particular node. For example, each node 37-1-37-W may store, access, and/or be able to determine its own node segment set 2718. In such cases, the particular node may not have knowledge of which other nodes 37 in the storage cluster 35 store particular other segments that aren't owned by the particular node. Alternatively, as the particular node 37 may need to access segments stored by particular other nodes as part of a recovery scheme utilized in processing virtual segments of a node segment set, each node 37 in the storage cluster can store, access, and/or otherwise determine the some or all of the full data ownership information 2711.

Figure 25B:
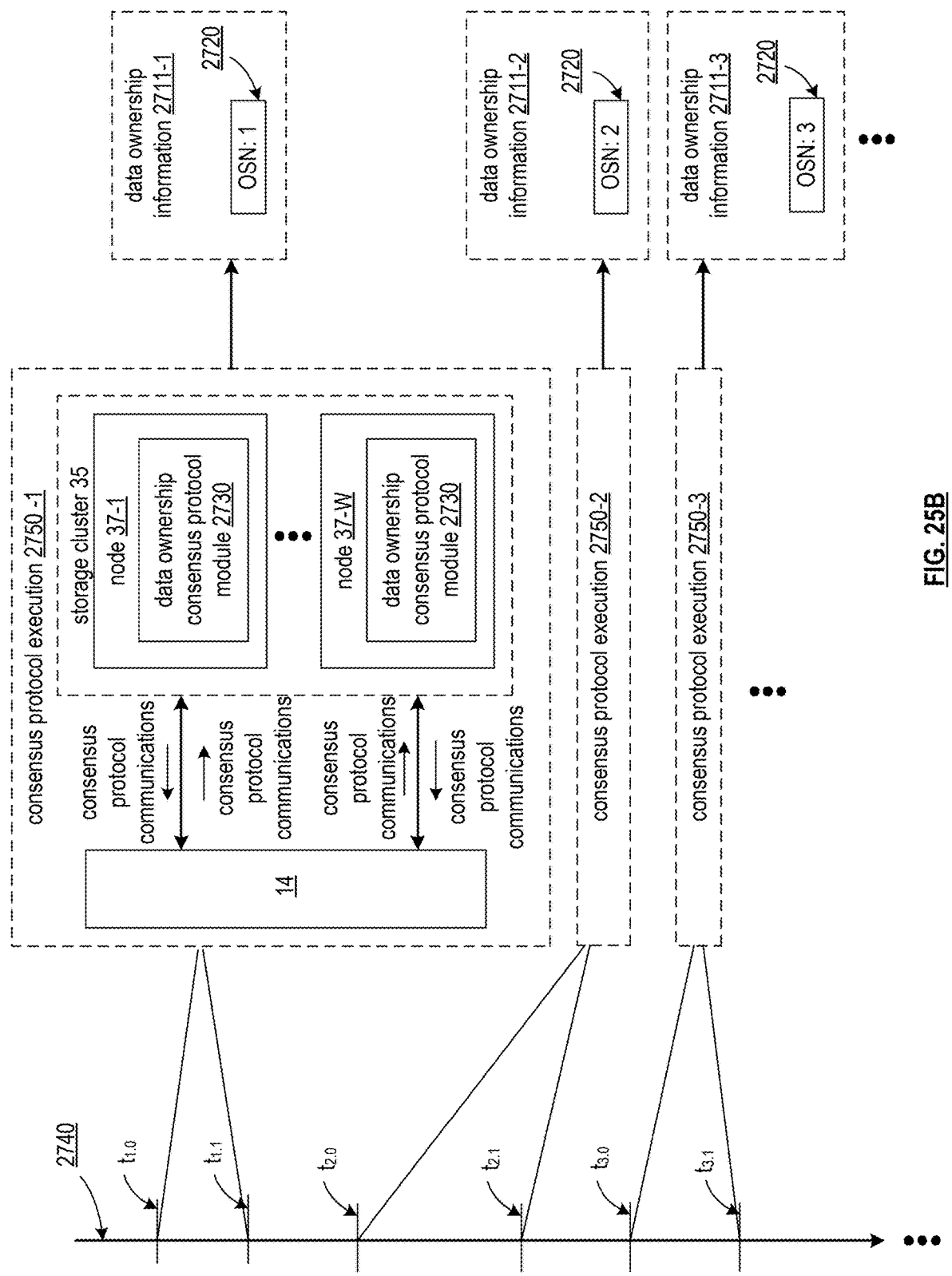
FIG. 25B illustrates a timeline of a plurality of consensus protocol executions in accordance with various embodiments.

In this example presented in FIG. 25A, node 37-1 can be implemented by the node 37 illustrated in FIG. 25B. The data ownership information 2711 is utilized by the segment scheduling module 2410 of node 37-1 to determine that segments 1, 2, 3, 4, 5, 6, X, Y, and Z are to be processed in queries accordingly, if required by particular queries 2405 in the node's query set 2415. For example, this node 37-1 determines its segment set 2418 for query 2 includes segment 3, segment 5, and segment Y in response to first determining a full set of segments required for execution of query 2, and by next determining its own segment set 2418 as a proper subset of this full set of segments required for execution of query 2, where other segments in this full set of segments required for execution of query 2 are processed by other nodes in the storage cluster 35. In particular, segments 3, 5 and Y are identified in this proper subset because they are included in the full set of segments required for execution of query 2, and are further included in node 37-1's node segment set 2718. Even if node 37-1 determines that other segments, such as segment 7, is required for execution of query 2, segment 7 will not be included in node 37-1's segment set 2418 for query 1 because it is not owned by the node, and will instead be processed by node 37-2 in accordance with query 2.

Continuing with this example, node 37-1's segment set indicates segments 1, 2, 5, 6, X, and Z are to be processed as physical segments, and that segments 3, 4, and Y are to be processed as virtual segments. This can be due to the data ownership information 2711 being determined in response to and/or during the outage of memory drive 2440-2 that stores segments 3, 4, and Y. For example, a previous version of data ownership information determined before the outage of memory drive 2440-2 may have indicated that segments 3, 4, and Y were owned by node 37-1 as physical segments due to their availability in segment storage.

Thus, the data ownership information 2711 can change over time, where updated versions of the data ownership information 2711 can be generated and utilized, for example, over one or more ones of the plurality of sequential time slices. In particular, data migration within the storage cluster or between different storage clusters, drive outages, or other changes in availability of particular segments can cause segments in full set of segments in a storage cluster to change ownership in different versions of the data ownership information over time; to change from being owned by the same or different node as a virtual or physical segment in different versions of the data ownership information over time; to include new segments added to the storage cluster, for example, as new data to the database system 10 and/or as migrated data from a different storage cluster, in different versions of the data ownership information over time; to drop the inclusion of segments removed from the storage cluster, for example, based on being migrated data to a different storage cluster and/or being deleted from the database system entirely, in different versions of the data ownership information over time; and/or to otherwise change over time.

Alternatively, the same storage cluster 35 will always maintain ownership of its full set of segments over time to guarantee consistency across multiple storage clusters while not requiring any coordination across multiple storage clusters, where changes in a storage cluster's data ownership information only includes changes in distribution of ownership across nodes within the storage cluster of its fixed full set of segments. In particular, as each single storage cluster stores all segments within each segment group for segments stored by the storage cluster, ownership of unavailable segments of the storage cluster can be maintained as virtual segments assigned to nodes in the storage cluster for recover via retrieval of other segments 1-K from other nodes 1-K in the same storage cluster.

Each version of the data ownership information 2711 can be tagged or otherwise be associated with a corresponding ownership sequence number (OSN) 2720. As illustrated in FIG. 25A, the data ownership information 2711 is tagged with OSN 7, for example, to indicate that it is the seventh version of the data ownership information 2711, where the OSN increments with each corresponding updated version of the data ownership information 2711 over time. Alternatively, the OSN can be any unique identifier that distinguishes the corresponding version of data ownership information 2711 from other versions.

Rather than necessitating global coordination and/or single entity responsible for assignment and sharing of data ownership information as new versions are generated over time, each new version of the data ownership information of a particular storage cluster 35 can be generated via a consensus protocol, which can be executed by some or all nodes 37 in a storage cluster participating in the consensus protocol, where the shared state mediated via the consensus protocol indicates the most updated ownership information. This mechanism improves database systems by guaranteeing consistency of data ownership information across nodes for usage in queries while not requiring global coordination.

For example, as illustrated in FIG. 25B, a plurality of consensus protocol executions 2750 can be performed via the nodes 37-1-37-W in a storage cluster 35 over time to generate a corresponding plurality of versions of data ownership information 2711. For example, as illustrated by timeline 2740, a first consensus protocol execution 2750-1 can be mediated across nodes in the storage cluster during timespan $t_{1.0}$-$t_{1.1}$ to generate a corresponding first version of data ownership information 2711-1. For example, the first consensus protocol execution 2750-1 can be initiated at time $t_{1.0}$ by one or more nodes in the storage cluster 35, and the first consensus protocol execution 2750-1 can be completed, for example, where some or all nodes in the storage cluster have determined and/or can access the resulting data ownership information 2711-1, at $t_{1.1}$. At some time after $t_{1.1}$, or perhaps instead at some time before the first the first consensus protocol execution 2750-1 is complete but after the first consensus protocol execution 2750-1 is initiated, a second consensus protocol execution 2750-2 can be mediated across the nodes in the storage cluster 35 to generate to generate a corresponding second version of data ownership information 2711-2 during timespan $t_{2.0}$-$t_{2.1}$. Similarly, a third consensus protocol execution 2750-3 can be mediated across the nodes in the storage cluster 35 to generate to generate a corresponding third version of data ownership information 2711-3 during timespan $t_{3.0}$-$t_{3.1}$, and this process can continue over time where consensus protocol executions 2750 are performed to generate corresponding data ownership information 2711 over time. Data ownership information 2711-1, 2710-2, and 2710-3 are tagged with their respective OSNs 2720 with values of 1, 2, and 3, respectively, or otherwise indicating the ordering of the revision with respect to the other revisions.

As discussed herein, consider the times $t_{1,1}$, $t_{2,1}$, $t_{3,1}, \ldots, t_{i,1}$ of timeline 2740 as the times where the resulting corresponding versions of data ownership information 2711-1, 2710-2, 2710-3, ... 2710-$i$, respectively, are available for utilization by the nodes 37 in the storage cluster for query execution as a result of consensus protocol executions 2750-1, 2750-2, 2750-3, ..., 2750-$i$ being completed across the set of nodes in the storage cluster 35, where i is any ith iteration of executing the consensus protocol to generate a corresponding ith version of the data ownership information 2711. The OSN for any ith version of the data ownership information can be tagged with a respective OSNs 2720 indicating that the version is the ith version in the ordering, for example, where the value of the OSN 2720 is equal to or otherwise indicates the value of i.

As illustrated in FIG. 25B, the consensus protocol can be executed via consensus protocol communications generated by nodes 37 and/or received and processed by nodes 37. For example, each node can implement a data ownership consensus module 2730, for example, by utilizing at least one processing module of the node. The data ownership consensus module 2730 can be utilized by each corresponding node 37 to generate consensus protocol communications in accordance with the storage cluster's execution of the current consensus protocol for transmission to one or more other nodes in the storage cluster in accordance with the storage cluster's execution of the current consensus protocol, for example, via system communication resources 14. The data ownership consensus module 2730 can be utilized by each corresponding node 37 to receive and/or process consensus protocol communications, generated by other nodes in the storage cluster 35 in accordance with the storage cluster's execution of the current consensus protocol. The consensus protocol can be a leader-mediated consensus protocol. Execution of the consensus protocol can include election or other determination of a leader by one or more nodes, voting by one or more nodes, and/or ultimately arriving at a consensus based on the voting by the one or more nodes to generate and/or communicate the resulting data ownership information.

One or more nodes can initiate a revision of the data ownership information 2711 by initiating a new execution of the consensus protocol, for example, in response to determining a changed data storage condition such as a drive outage, a full rebuild of data being completed, a migration being initiated or completed, current or scheduled upcoming data unavailability, or another change. Alternatively or in addition, new executions of the consensus protocol to generate revised data ownership information 2711 can occur at scheduled and/or predetermined times.

Because data ownership information is local only to a particular storage cluster 35, each storage cluster of a small number of nodes can execute the consensus protocol amongst themselves, rather than requiring consensus or other coordination across all nodes in the database system. Each of the storage clusters in the plurality of storage clusters 35-1-35-$z$ can independently generate their own iterative revisions of their own data ownership information over time in their own timeline 2740, where at any given point in time, different storage clusters may have independently generated a different number of revisions of their data ownership information. This improves database systems by ensuring that the execution of the consensus protocol remains scalable, where only local coordination is required to determine data ownership information, while ensuring that all segments across different storage clusters 35 has consistent ownership information.

As revised data ownership information is determined by particular nodes over time, most recent versions of the data ownership information 2711 can be implemented to execute incoming queries. However, if the node were to immediately adopt the most recent data ownership information for segment processing in executing queries in query set 2415, queries could be processed improperly. In particular, as an individual node executes a query over a span of time, if the node changes its segment set determined for the query based on a more recent versions of the data ownership information 2711 mid-execution, some segments needed for execution of the query across all nodes can be missed and/or duplicated. Furthermore, multiple nodes can be executing the same query within slightly different time spans based on their own segment scheduler module's initiation of execution of a particular query. Alternatively or in addition, the most recent data ownership information can be received and/or determined by the different nodes at slightly different times. As global coordination is not utilized and as nodes independently execute queries via the segments they determine to own, a mechanism to ensure all nodes execute each given query with the same data ownership information is required.

FIGS. 25C-25M illustrate an example of an embodiment of the present invention where nodes in a storage cluster utilize OSNs 2720 tagged to and/or determined for each query 2405 in the query set 2415 to determine which corresponding one of a plurality of data ownership information versions 2710 generated via the storage cluster's execution of the consensus protocol over time will be utilized to determine the corresponding segment set 2418 for each query 2405.

Figure 25C:
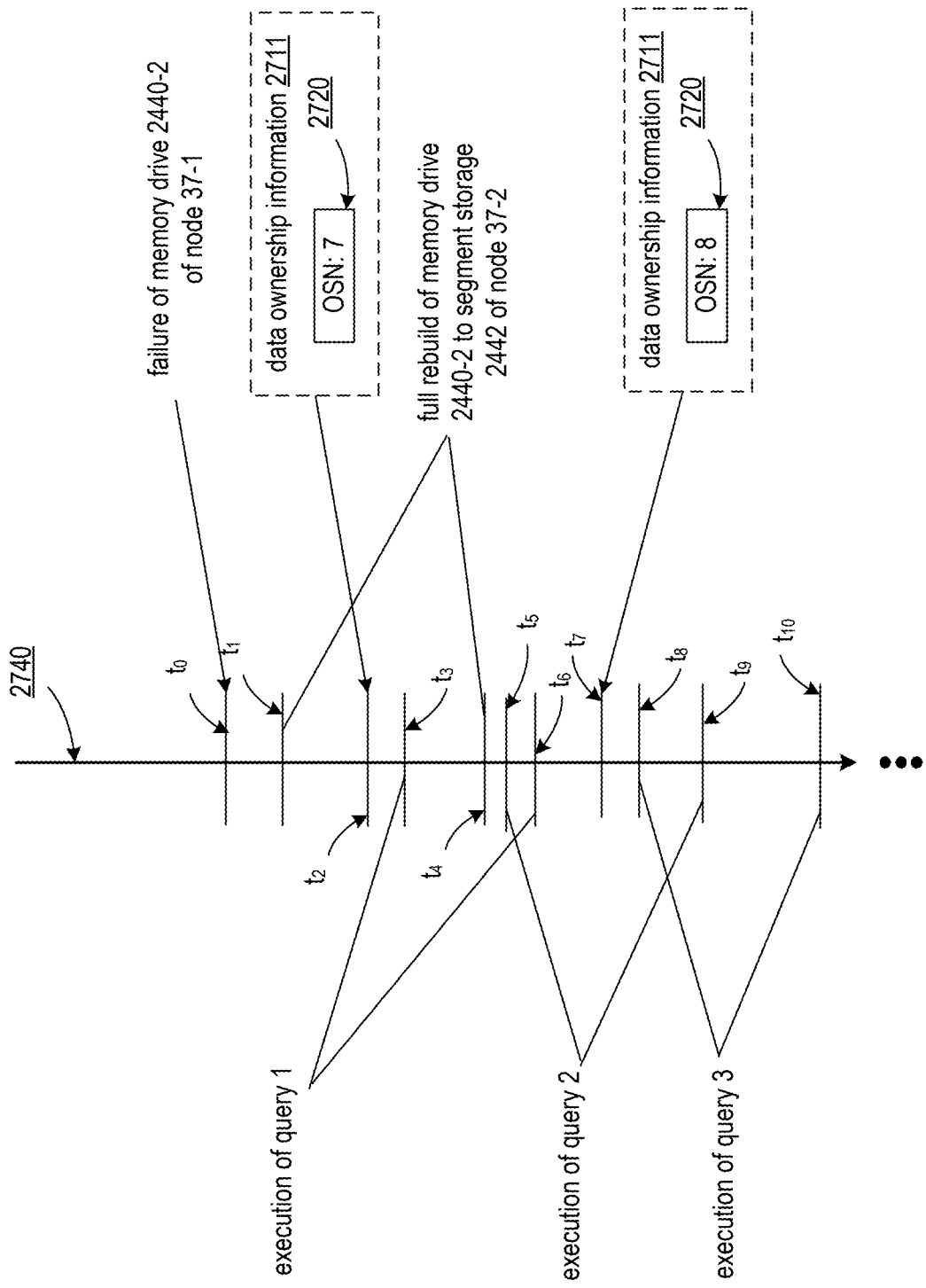
FIG. 25C illustrates an example timeline of execution of a plurality of queries in accordance with various embodiments.

FIG. 25C illustrates a particular example of timeline 2740 to illustrate the temporal relation between a series of events occurring at particular points in time and/or time spans $t_0$-$t_{10}$. At a point in time $t_2$, data ownership information 2711 with OSN 7 is generated. For example, the execution of the consensus protocol can be completed at time $t_2$ to render the resulting data ownership information. This particular version of the data ownership information may have been generated in response to a failure of memory drive 2440-2 of node 37-1 at time to. In this example, node 37-1 may have initiated the consensus protocol shortly after time to in response to detecting the failure and/or before time to in response to this outage being scheduled. Alternatively or in addition, another node 37 in the storage cluster may have detected the failure of the memory drive, for example, based on failing to retrieve data stored in this memory drive as part of a recovery scheme for recovering one of their owned virtual segments. Alternatively, the storage cluster may have otherwise determined to generate data ownership information 2711 with OSN 7 in response to this failure.

Figure 25D:
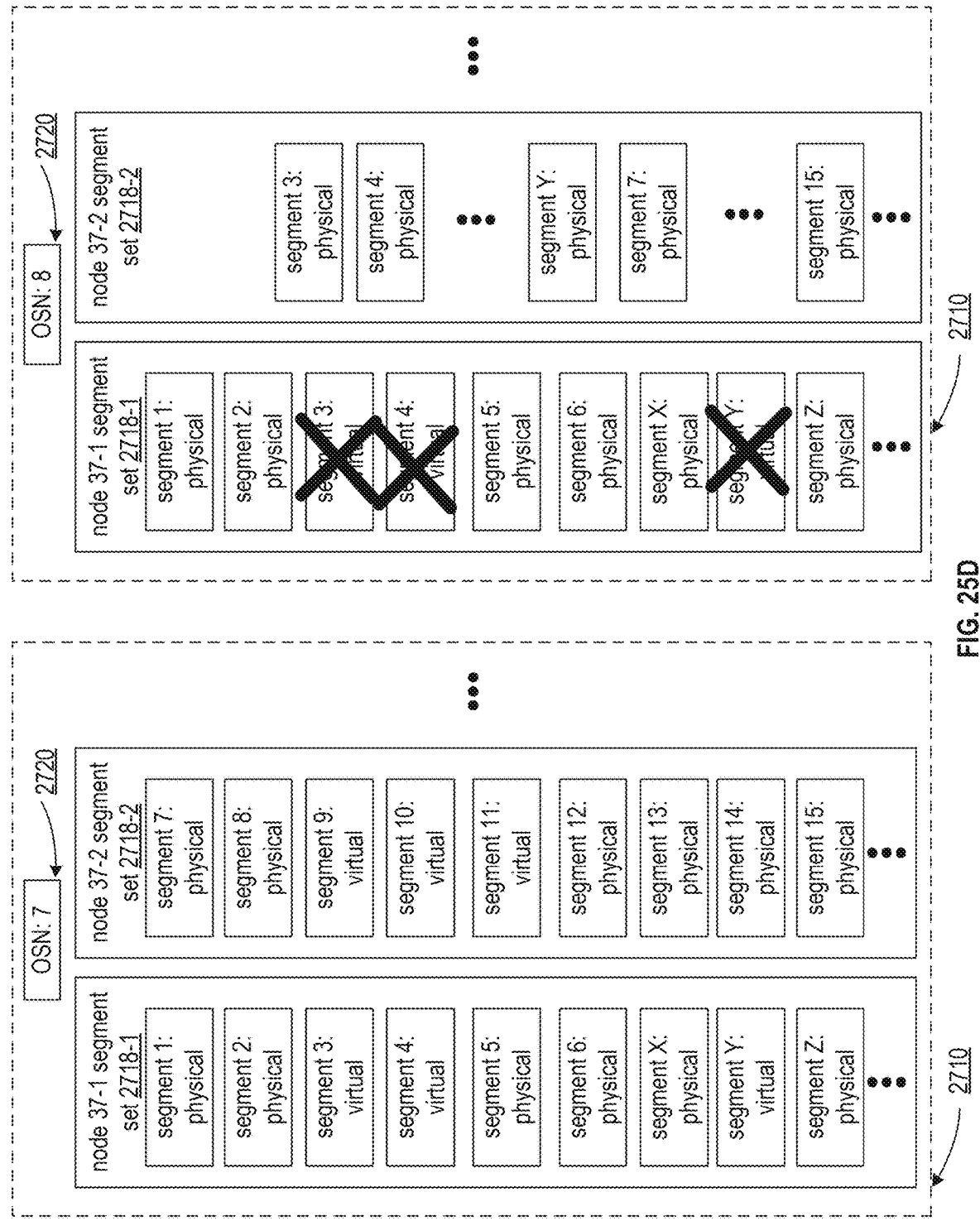
FIG. 25D illustrates an example embodiment of multiple versions of data ownership information in accordance with various embodiments.

This failure of memory drive 2440-2 can correspond to the particular example discussed in conjunction with FIG. 25B, where data ownership information 2711 with OSN 7 indicates that node 37-1 maintains ownership of some or all of the segments of memory drive 2440-2, but the designation has changed to virtual segments as these segments are unavailable as physical segments. The data ownership information 2711 with OSN 7 of this example is illustrated in FIG. 25D. In particular, segments 3, 4, and Y, which were stored on 2440-2 of 37-1, are indicated as virtual segments, for example, changing from designation as physical segments owned by 37-1 in prior data ownership information 2711 with OSN 6.

Timeline 2740 of FIG. 25C indicates a span of time in which a full a rebuild of the memory drive 2440-2 of node 37-1 takes place to recover and store some or all segments of memory drive 2440-2 as physical segments in one or more memory drives of the segment storage of another node 37-2. For example, this is initiated at time $t_1$, for example, based on determining of the memory drive 2440-2 failed at time to. The execution of the consensus protocol for the data ownership information of OSN 7 may have been initiated before or after this full rebuild began. However, as the full rebuild is lengthy and/or because the full rebuild was not completed when the initiation of data ownership the consensus protocol for generating the data ownership information of OSN 7 occurred, the data ownership information of OSN 7 reflects that these segments are not available physically and assigns ownership as virtual segments.

Timeline 2740 also illustrates that after the full rebuild of memory drive 2440-2 is completed, a next version of data ownership information 2711 is generated, tagged to OSN 8. For example, the execution of the consensus protocol for this next version can be completed at time $t_7$ to render the resulting data ownership information. In this example, node 37-2 or another node of the storage cluster may have initiated this consensus protocol shortly after time $t_4$ in response to determining the full rebuild is completed and/or that the corresponding segments are again available as physical segments.

Data ownership information 2711 of OSN 8 reflects the availability of these segments as physical segments of segment storage 2442 of node 37-2 by indicating assignment of some or all of these newly rebuilt segments to node 37-2 as physical segments. For example, as illustrated in FIG. 25D, the data ownership information 2711 with OSN 8 indicates that segments 3, 4, and Y have been added to node 37-2's node segment set 2718-2 as physical segments. Furthermore, as segments cannot be owned by multiple nodes, these segments are removed from node 37-1's node segment set 2718-1. The "X"s indicated in FIG. 25D serve to illustrate the prior inclusion of these segments in node segment set 2718-1 of data ownership information 2711 with OSN 7 have been removed in the next revision, where segments 3, 4, and Y are not included in the node segment set 2718-1 of the data ownership information 2711 with OSN 8.

This example serves to illustrate how the tagging of OSNs to particular queries can ensure that, despite this timeline of changing data availability circumstances that could lead to confusion regarding which segments are owned by a node at particular times and more specifically, for different queries being executed by the node at the same time. This improves database systems by ensuring that, despite different concurrently running queries at a given time by a given node, and despite the concurrent, independent execution of each concurrently running query across multiple nodes in the storage cluster, query accuracy of every query is guaranteed because all nodes will utilize the same data ownership information for any given query, even if different ownership information is utilized at a particular time for different, corresponding concurrently running queries. Thus, different queries with different OSNs can be safely running in parallel by each of a set of multiple nodes.

A first query, query 1, can be executed by the storage cluster 35 from time $t_3$-$t_6$. Time $t_3$ can correspond to a time at which query 1 was received and/or at which at least one node initiated a partial execution of query 1. Time to can correspond to a time at which execution of query 1 by all nodes in the storage cluster assigned to execute query 1 has completed. While execution spans of different nodes in the storage cluster may be different based on their own implementation of their segment scheduling module 2410, for the purposes of this example, assume that the time frame that both particular nodes 37-1 and 37-2 executed query 1 started between $t_2$ and $t_4$ and ended between $t_5$ and $t_7$.

A second and third query can similarly be executed by the storage cluster from times $t_5$-$t_9$ and times $t_8$-$t_{10}$, respectively. Again, for purposes of this example, assume that the time frame that both particular nodes 37-1 and 37-2 executed queries 2 and 3 started and ended substantially close to these times relative to other points illustrated in the timeline 2740 of this example. Also note that as illustrated, the execution of queries 1, 2, and 3 is overlapping, to reflect the concurrent execution of multiple queries implemented by the storage cluster and to further reflect the concurrent execution of multiple queries implemented by each node 37 in the storage cluster.

Figure 25E:
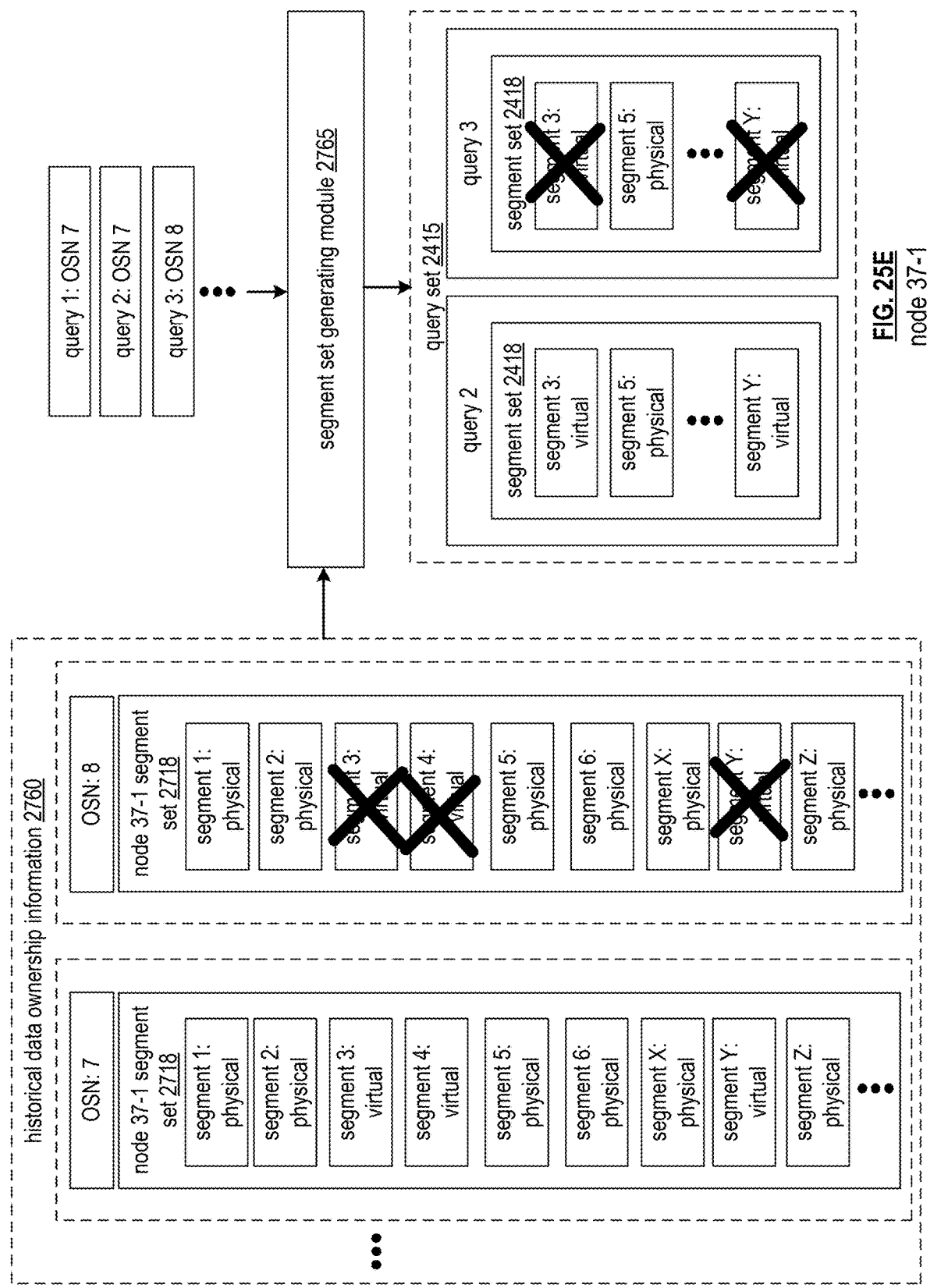
FIGS. 25E and 25F are schematic block diagrams of an embodiment of two example node that implement a segment set generating module in accordance with various embodiments.
Figure 25F:
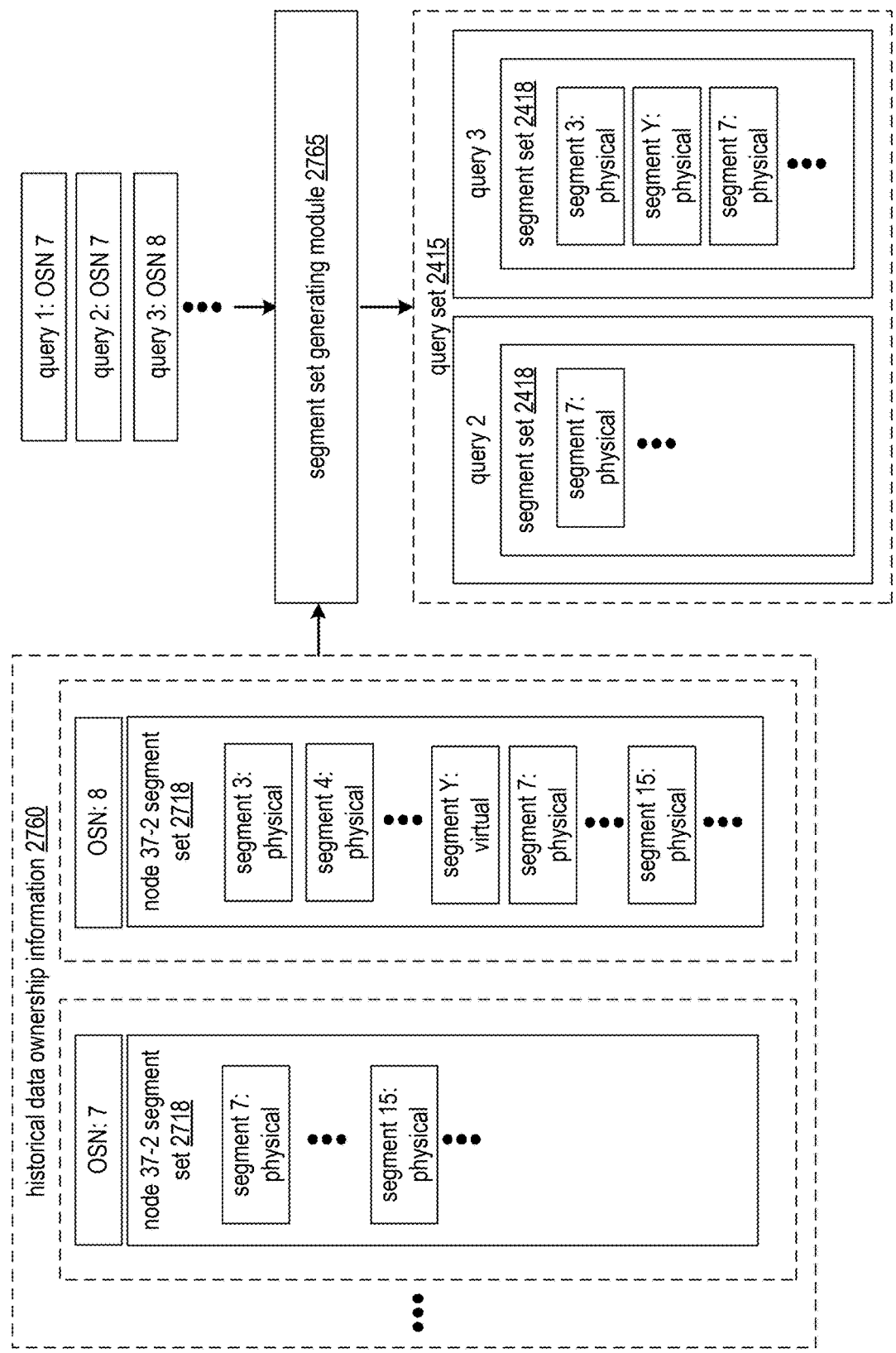

The execution of these queries by node 37-1 in accordance with determined OSNs for these queries is reflected in FIG. 25E, and the execution of these queries by node 37-1 in accordance with determined OSNs for these queries is reflected in FIG. 25F. FIGS. 25E and 25F illustrate nodes 37-1 and 37-2, respectively, that each implement a segment set generating module 2765. The segment set generating module 2765 can be implemented by any node 37 in the database system 10, for example, implemented by the segment scheduling module 2410 of the node and/or otherwise implemented utilizing at least one processing module of the node. The segment set generating module 2765 can be operable to generate some or all segment sets 2418 for corresponding queries 2405 of query set 2415 of the node that is utilized by a segment scheduling module to generate segment processing selection data dictating the ordering in which segments of different queries will be processed by the node. The segment set generating module 2765 can be operable to update this query set 2415 as new queries are received for execution over time, where segment sets 2418 for each incoming query 2405 are generated by the segment set generating module 2765 for inclusion in query set 2415.

In particular the segment set generating module 2765 can determine the segment set for each incoming query based on the OSN assigned to and/or determined for each incoming query. For a given query with a corresponding tagged OSN, segment set generating module 2765 can access its node segment set 2718 in the data ownership information 2711 with the corresponding OSN. In particular, each node can access locally stored, retrievable, or otherwise determinable historical data ownership information 2760 that indicates a plurality of versions, such as a subset of all versions over time corresponding to the most recent versions still determined to be relevant and/or all versions historically. Alternatively, if incoming queries are assigned an OSN tag for the most recent data ownership information 2711, only the most recent data ownership information 2711 need be stored and/or retrievable, as the necessary information for prior data ownership information 2711 with prior OSNs can be already reflected in previously generated segment sets 2418 for other queries still being executed in accordance with older data ownership information 2711.

While not illustrated, the historical data ownership information can be represented as a plurality of (segment, OSN) pairs for the node. The segments of the node's node segment set 2718 in the data ownership information for a given OSN can be each be indicated in a corresponding set of (segment, OSN) pairs with the given OSN. In executing a query tagged with a given OSN, only segments included (segment, OSN) pairs that reflect the corresponding OSN are utilized. Thus, the node segment set for a given OSN is derived from and/or represented as all of segments included in the node's (segment, OSN) pairs with the given OSN.

The particular node segment set 2718 in the data ownership information 2711 with the OSN tagged to an incoming query can be utilized to generate the segment set 2418 for this incoming query. In particular, the segment set 2418 of this incoming query must be a subset of the node segment set 2718 of the data ownership information 2711 with an OSN that matches that of the incoming query or otherwise compares favorably to the incoming query. In some cases, the segment set 2418 of this incoming query is only a proper subset of the corresponding node segment set 2718, for example, based on one or more nodes being determined not to be necessary to process the query and/or not being included in the query domain of the query. Filtering the node segment set 2718 to generate the corresponding segment set 2418 can include extracting information from the query itself to determine which particular proper subset of segments are required.

The OSN 2720 assigned to each query can be received by the node 37 in conjunction with receiving a request to execute the query and/or can be received in conjunction with the query itself, for example, where the OSN is generated by another entity of the database system 10 and/or of the corresponding storage cluster 35 and is sent to and/or accessible by all nodes executing the query in conjunction with information regarding the query for execution itself. The OSN of a given query can be alternatively determined by each node based on the query, for example, by comparing a timestamp of the query to timestamps associated with each of the plurality of versions, and selecting the most recent one of the plurality of OSN versions that has a corresponding timestamp indicating it was generated prior to the query and/or indicating it can be utilized on incoming queries after a particular point in time, such as $t_{i-1}$. The node can alternatively perform another deterministic function on a given query to determine the OSN assigned to the given query.

The mechanism utilized by a node to determine a query's OSN can be the same for all nodes in the storage cluster 35 to ensure that a given query executed by multiple nodes in the storage cluster 35 will assign a node the same OSN, thus ensuring a correct query result as each required segments will be read by a corresponding node, and as each required segment will be read by only one node.

Furthermore, if multiple storage clusters are required for execution of a query, nodes in different clusters will thus assign a given query different OSNs for corresponding different data ownership information of their storage cluster. However, despite different storage clusters being on different revisions of their data ownership data and mediating their data ownership data separately, query correctness can still be guaranteed where each required segment is read once and exactly once so long as nodes in the same storage cluster each utilize the same one of their revised data ownership information 2711 for the query, and so long as each storage cluster maintains ownership of their own fixed, full set of nodes in their set of revisions over time.

The generation of segment sets 2418 based on an OSN determined for the query to adhere to a corresponding version of the data ownership information ensures that a particular version of the data ownership information is used by every node in the storage cluster for execution of the query, and persists for the life of the query regardless of new versions of the data ownership information that are determined while the query is executing and/or regardless of changes in storage circumstances while the query is executing.

In particular, in this example, all nodes in the storage cluster, including nodes 37-1 and 37-2, determine to execute query 1 by utilizing the data ownership information with OSN 7, to execute query 2 by utilizing the data ownership information with OSN 7, and to execute query 3 utilizing the data ownership information with OSN 8. These determination of OSNs tagged to each query can be based on determining that the most recent OSN when each query was received and/or began executing. Queries 1 and 2 were received and/or began executing with data ownership information with OSN 7 being the most recent, as illustrated in timeline 2740 of FIG. 25C, and are tagged with OSN accordingly. The data ownership information was updated to the data ownership information with OSN 8 prior to receiving and/or initiating execution of query 3, so query 3 can be tagged to OSN 8.

Despite the full rebuild of segments of memory drive 2440-2 during query 1's execution, all nodes will maintain utilization of OSN 7 for the entirety of query 1's execution, and thus virtual segments of this memory drive will still be utilized by node 37-1 for the entirety of query 1's execution, and node 37-2 will not utilize these segments, despite being rebuilt and available to node 37-2, for its own execution of query 1.

Assume in this example that queries 2 and 3 require utilization of identical segments, and thus, if executed by the same node with the same OSN, would have identical segment sets 2418 for that node. However, in this example, each of these queries are tagged to different OSNs, and thus have different segment sets. As illustrated in FIG. 25E, for query 2, node 37-1 utilizes a segment set 2418 with segments 3, 4, and Y included as virtual segments, but these segments are not included in node 37-1's segment set 2418 for query 3, based on these nodes being included in node 37-1's node segment set 2718 for OSN 7, but not OSN 8, and based on query 2 being executed under OSN 7 and query 3 being executed under OSN 8.

Meanwhile, as illustrated in FIG. 25F, for query 2, node 37—utilizes a segment set 2418 that does not include segments 3, 4, and Y, but these segments are not included in node 37-2's segment set 2418 for query 3, based on these nodes being included in node 37-2's node segment set 2718 for OSN 8, but not OSN 7, and based on query 2 being executed under OSN 7 and query 3 being executed under OSN 8. In particular, despite segments 3, 4, and Y being available as physical segments to node 37-2 prior to query 2 being executed, these segments are not utilized for execution of query 2 because it is tagged to OSN 7 as the new data ownership information is not yet generated. Furthermore, despite the new ownership information with OSN 8 being generated during query 2's execution, both node's 37-1 and 37-2, as well as all other nodes in the storage cluster, will maintain utilization of OSN 7 for query 2 for the remainder of query 2's execution. Finally, note that in a period temporal period that includes the time span from $t_8$-$t_9$, nodes 37-1 and 37-2 are each concurrently executing multiple queries by utilizing different OSNs for these multiple queries during this temporal, where query 2 is being executed during the time span from $t_8$-$t_9$ utilizing prior data ownership information with OSN 7, and where query 3 is concurrently being executed during the time span from $t_8$-$t_9$ utilizing updated data ownership information with OSN 8.

Figure 25G:
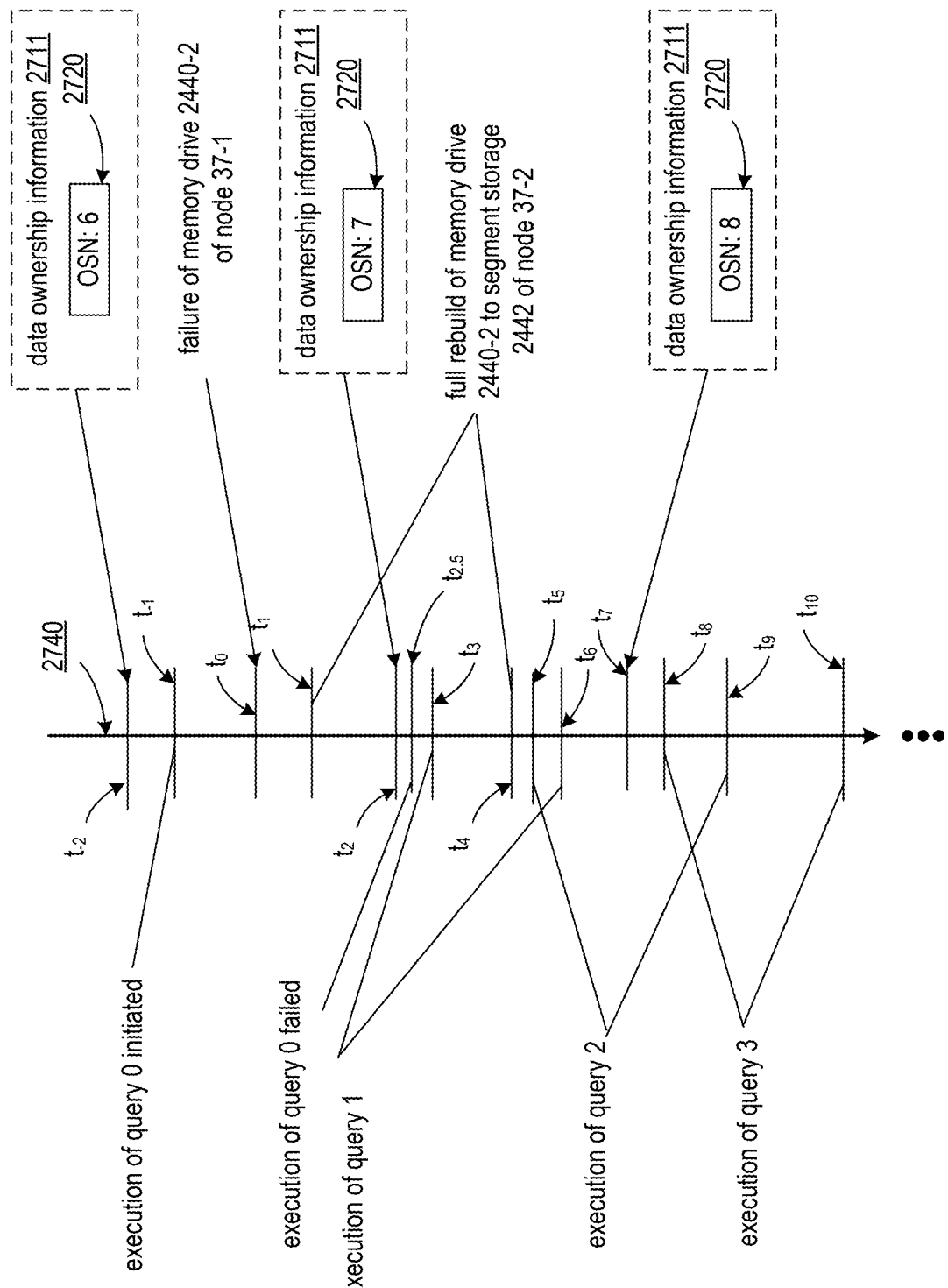
FIG. 25G illustrates an example timeline of execution of a plurality of queries in accordance with various embodiments.
Figure 25H:
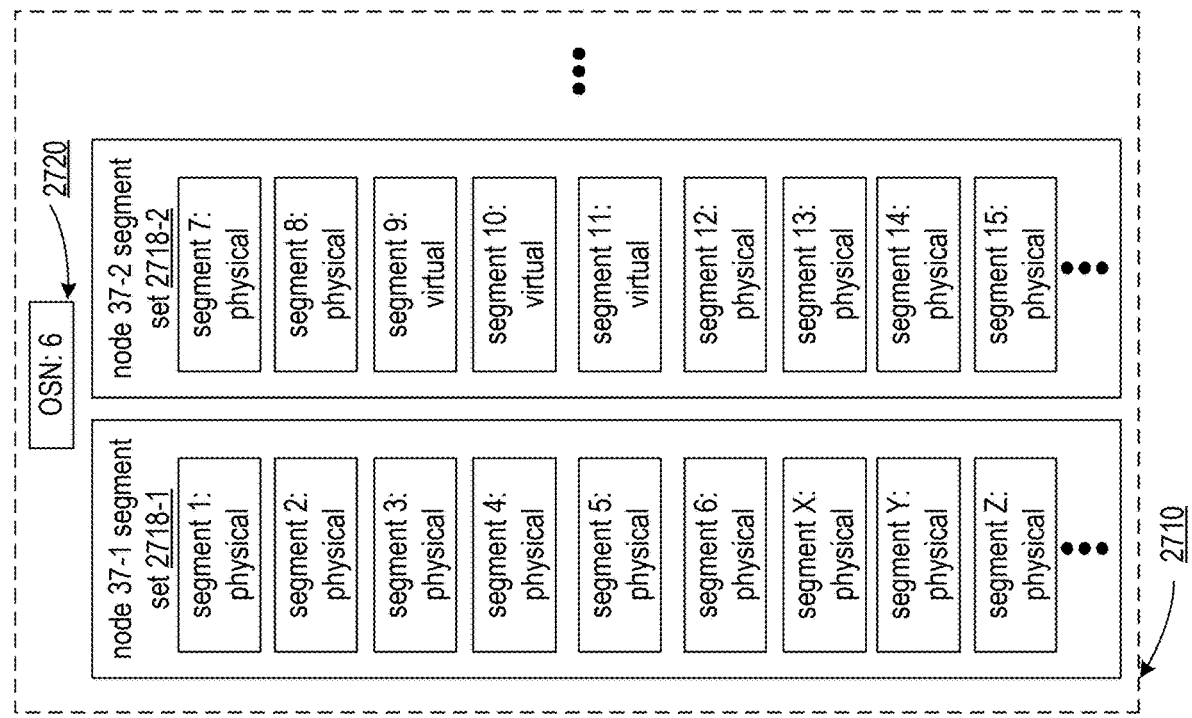
FIG. 25H illustrates an example embodiment of a version of data ownership information in accordance with various embodiments.
Figure 25I:
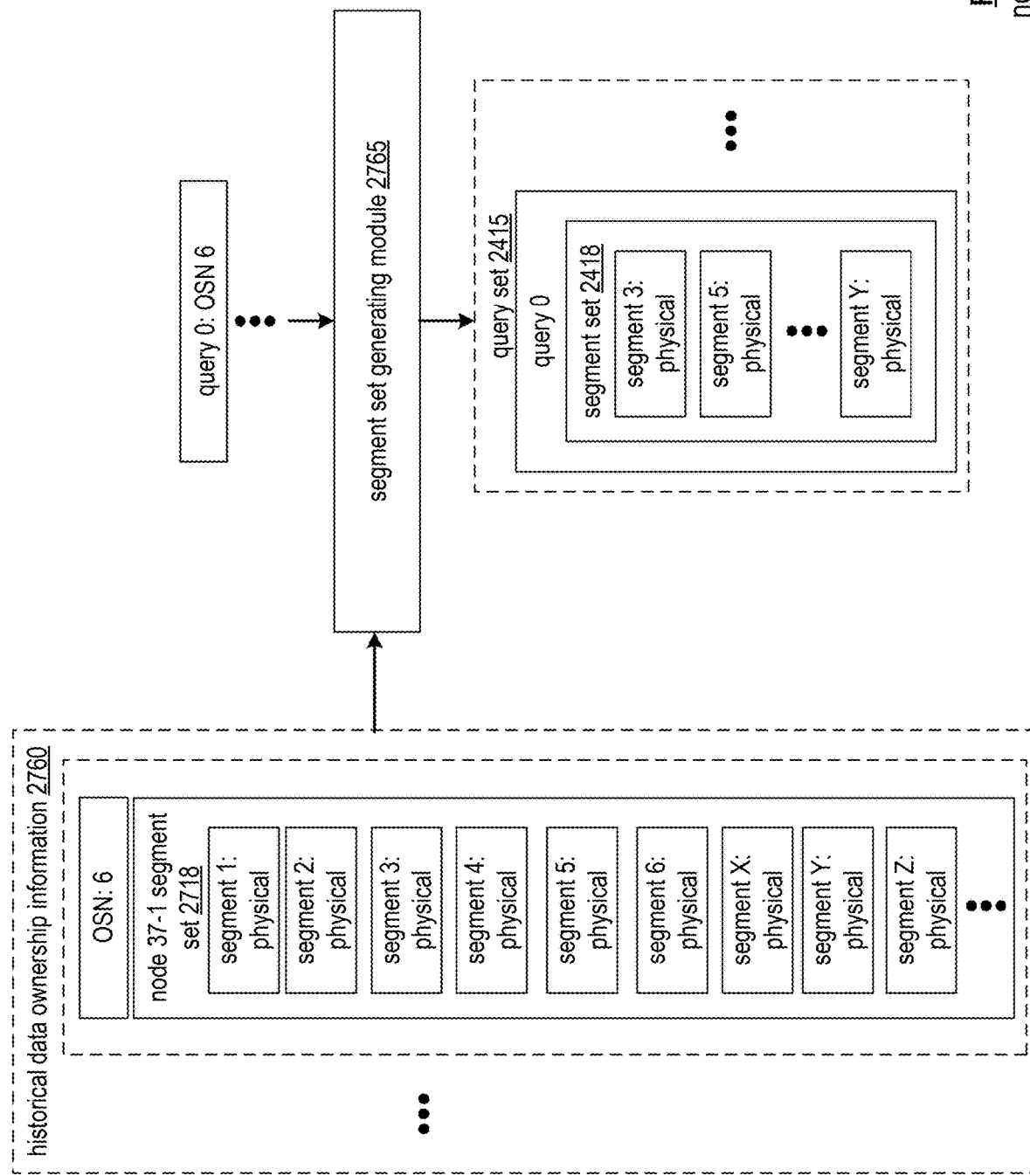
FIGS. 25I and 25J are schematic block diagrams of an example embodiment a node that implement a segment set generating module in accordance with various embodiments.

FIGS. 25G-25J illustrate an extension of the example of FIGS. 25C-25F. As illustrated in FIG. 25G prior to $t_0$, data ownership information 2711 with OSN 6 is determined at $t_2$, and where a query 0 is initiated at $t_1$ utilizing OSN 6. Data ownership information 2711 with OSN 6 is illustrated in FIG. 25G. In particular, node 37-1 owns segments of memory v, including segments 3, 4, and Y, as physical segments, for example, based on the storage cluster determining, during execution of the corresponding consensus protocol, that these nodes are available as physical segments stored in memory drive 2440-2 of node 37-1's segment storage 2442, based on the failure at to not having yet occurred. As illustrated in FIG. 25I, node 37-1 generates the segment set for query 0 in accordance with OSN 6, where segments 3 and Y are included as physical segments.

However, due to the failure of memory drive 2440-2, for example, prior to retrieval of segment 3 or segment Y by node 37-1 to execute query 0, the node 37-1 indicates failure in continuing to execute query 0. This can be communicated across the storage cluster and/or the database system to halt other executions by other nodes of query 0 or to otherwise not return a resultant of the query due to the execution of query 0 by node 37-1 failing. The time of failure is indicated in timeline 2740 as $t_{2.5}$, but can alternatively be any time after to. In general, nodes 37 can abort and/or indicate failure of any queries they execute that cannot be executed in accordance with the data ownership information assigned to them. In particular, in this example, node 37-1 has already determined new data ownership information OSN 7 prior to this error occurring. However, rather than attempting to continue execution the query via utilization of the virtual segments indicated in OSN 7, execution of the query is aborted, as utilization of OSN 7 mid-query can cause other conflicting ownership problems that could render the query incorrect, and/or the correctness of the query resultant is not guaranteed if the node were to change data ownership information version being utilized for the query after its begun executing under a prior version.

In this example, query 1 can correspond to a re-execution of query 0, and thus query 0 can be re-executed as query 1 by the nodes in the storage cluster based on receiving the updated data ownership information 2711 and based on execution of query 0 previously being aborted. Query 0 is re-executed as query 1 in accordance with OSN 7. This is acceptable, as all nodes in the storage cluster will re-execute query 0 as query 1 under the same data ownership information, and execution of query 1 under OSN 7 is maintained by all nodes including node 37-1 for the duration of query 1's execution.

Figure 25J:
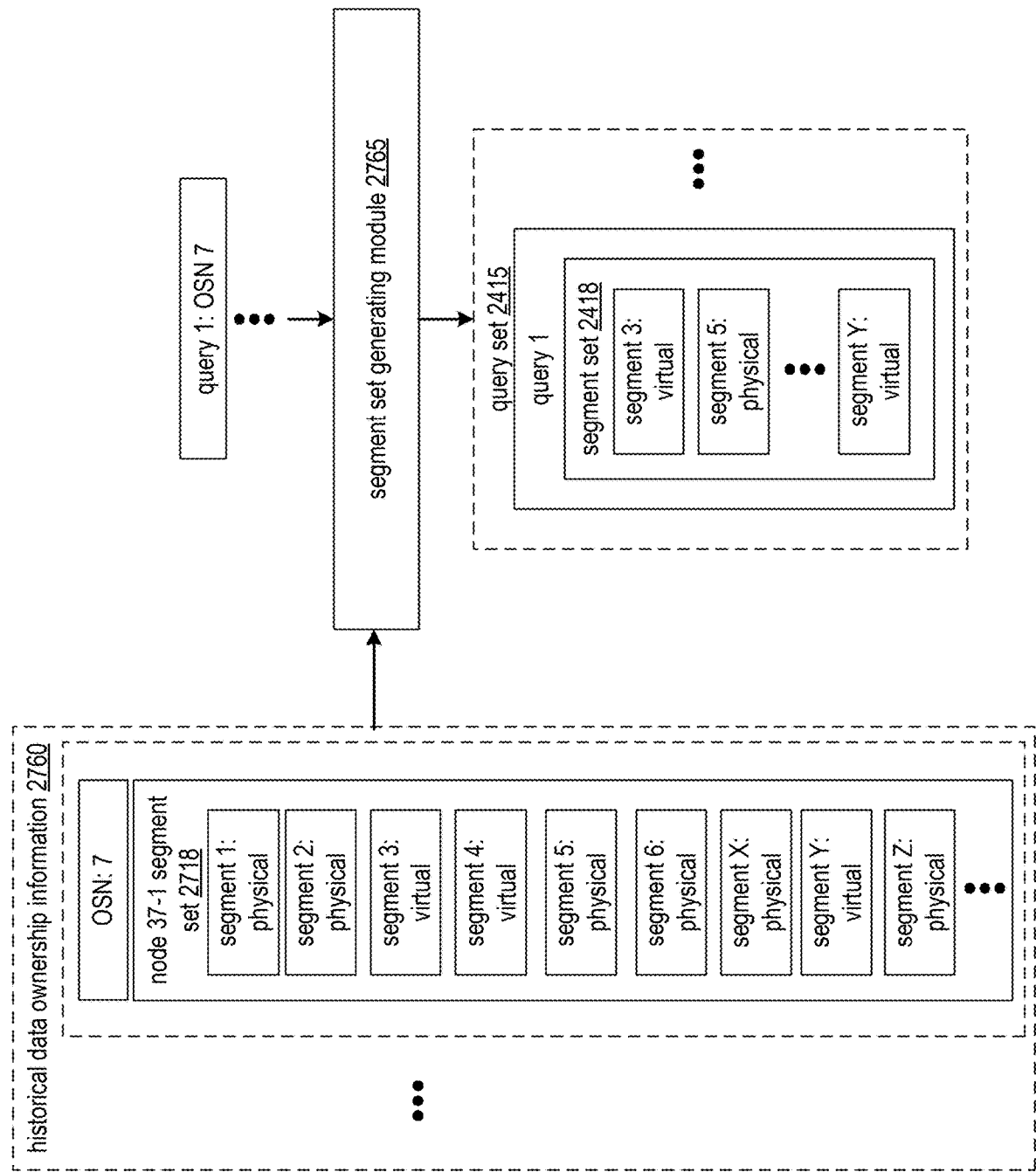

As illustrated in FIG. 25J, query 1 is determined to be executed by node 37-1 and is tagged to OSN 7. Query 1 is included in the query set with segments 3 and Y indicated as virtual segments based on the data ownership information of OSN 7. As segments 3 and Y can be recovered via the recovery scheme in response to being indicated for processing as virtual segments, in this example, execution of query 1 does not fail and its execution is completed at time $t_6$. Thus, query 0 is ultimately executed by the storage cluster when it is re-executed as query 1 with the data ownership information of OSN 7.

In various embodiments, a node of a computing device has at least one processor and memory that stores executable instructions that, when executed by the at least one processor, cause at least one processing module of the node to determine first data ownership information via participation in a first execution of a consensus protocol mediated with a plurality of other nodes in a storage cluster that includes the node. The first data ownership information indicates a first ownership sequence number. The first data ownership information further indicates the node's ownership of a first subset of a set of segments, where the set of segments is in a segment group stored by the plurality of nodes in the storage cluster. The executable instructions, when executed by the at least one processor, further cause the least one processing module of the node to determine second data ownership information via participation in a second execution of the consensus protocol mediated with the plurality of other nodes in the storage cluster. The second data ownership information indicates a second ownership sequence number that is different from the first ownership sequence number. The second data ownership information further indicates the node's ownership of a second subset of the set of segments, and where a set difference between the first subset and the second subset is non-null. The at least one processing module of the node receives a first query for execution and determines an ownership sequence number tag for the first query that indicates the value of the first ownership sequence number. The at least one processing module of the node facilitates execution of the first query by utilizing the first subset of the set of segments based on determining the ownership sequence number tag of the first query indicates the value of the first ownership sequence number.

Figure 25K:
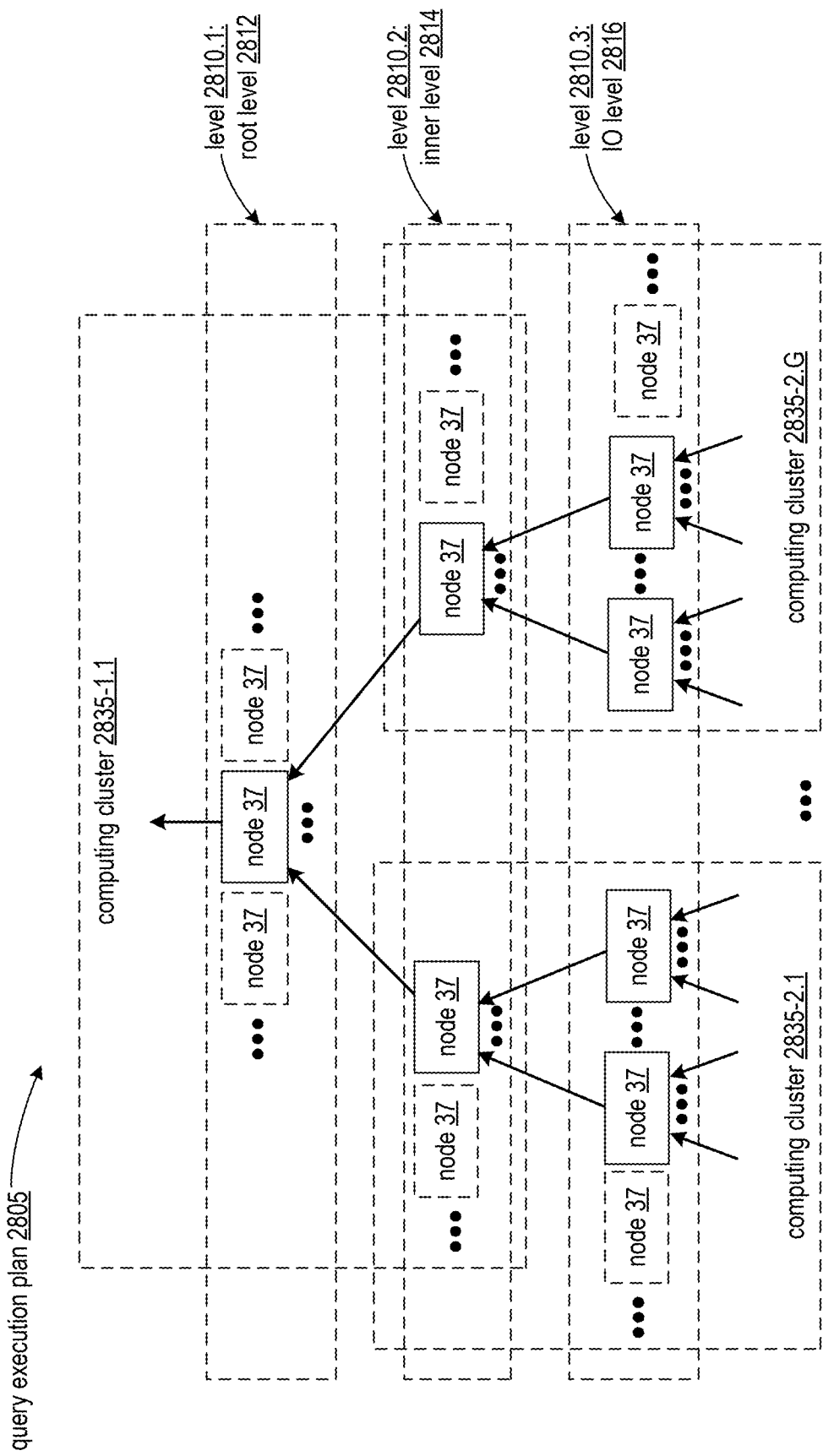
FIG. 25K is a schematic block diagram of an embodiment of multiple computing clusters utilized to implement a query execution plan in accordance with various embodiments.

FIG. 25K illustrates an embodiment where the query execution plan is segregated into a plurality of computing clusters 2835, illustrating a subset of possible sets of nodes from each computing cluster that are selected to process a given query. In this illustration, nodes 37 with a solid outline are again nodes involved in executing the given query. Nodes 37 with a dashed outline are again other nodes that are not involved in executing the given query, but could be involved in executing other queries in accordance with their level of the query execution plan in which they are included.

A computing cluster 2835 can be similar to storage clusters 35 and can include a set of possible nodes that can operate in accordance with at least two levels of the query execution plan. A computing cluster 2835 can include some or all nodes of exactly one storage cluster 35. A computing cluster 2835 can include some or all nodes of multiple storage clusters 35. For example, a computing cluster 2835 can correspond to a "sub-tree" of query execution plan, corresponding to the possible set of child nodes and corresponding possible set of parent nodes each child node will select a single node from to process their resultants. In this example, each computing cluster includes exactly two levels: a lower level corresponding to possible child nodes of the computing cluster and an upper level corresponding to possible parent nodes of the computing cluster. The computing cluster can be implemented as a virtual machine computing cluster, for example which each node in the cluster implemented as a virtual machine processing different queries in accordance with their selected level.

The set of computing clusters illustrated in FIG. 25K can be utilized to implement an entire, three level query execution plan 2805 with level 2810.1 implemented as root level 2812, with level 2810.2 implemented as the single inner level 2814, and with level 2810.3 implemented as the IO level 2810.3. Alternatively, if the query execution plan 2805 includes more than three levels, these computing clusters can correspond to a subset of the query execution plan's full set of computing clusters. In particular, an additional set of computing clusters can include corresponding subsets of nodes of level 2810.3 their corresponding upper level of possible parent nodes for corresponding possible child nodes of a subsequently lower level than level 2810.3. Alternatively or in addition, an additional computing cluster can include all possible parent nodes of computing cluster 2835 as possible child nodes, as well as possible parent nodes of one or more additional computing clusters 2835-1.2-2835-1.N with upper levels at level 2810.1 and lower levels at level 2810.2 as additional possible child nodes. This additional computing cluster could include its own set of possible parent nodes in the next higher level than level 2810.1. Any number of levels of the query execution plan can thus be implemented by corresponding computing clusters of the sub-trees. The query execution plan 2805 can be implemented via some or all features and/or functionality of query execution plan 2405.

For each given computing cluster 2835, for a given query, some or all possible child nodes, corresponding to nodes in the lower level of the computing cluster, will be assigned to process the query. The nodes with the solid outline at the lower level of each computing cluster 2835 correspond to the selected subset of possible child nodes executing the given query for the corresponding computing cluster 2835. For example, if the lower level of the computing cluster is the IO level 2816 of the query execution plan, the child nodes generate resultants by performing row reads. This example is illustrated by illustrated computing clusters 2835-2.1-2835-2.G that includes a set of nodes from level 2810.2 as possible parent nodes and includes a set of nodes from level 2810.3 as possible child nodes, where level 2810.3 in this example is the IO level.

As another example, if the lower level of the computing cluster is an inner level 2814 of the query execution plan, the child nodes receive resultants as input from child nodes of another, subsequently lower, computing cluster by being selected as the parent node for the subsequently lower computing cluster for the given query, gather these resultants, and generate their own resultant. This example is illustrated by illustrated computing cluster 2835-1.1 that includes a set of nodes from level 2810.1 as possible parent nodes and includes a set of nodes from level 2810.2 as possible child nodes. In this example, level 2810.1 can be the root level, as illustrated, or can be an inner level that is higher than inner level 2810.2.

As illustrated, for each computer cluster 2835, exactly one node at the upper level receives resultants from nodes at the lower level. Thus, for an execution of a given query by a given computing cluster 2835, every participating node at the lower level is operable to select, for example without global coordination, the same, single node at the upper level that will process their resultant as a selected parent node from the plurality of possible parent nodes included in the upper level. Each participating node at the lower level thus sends their resultants to this same selected parent node. The selected parent node for each illustrated computing cluster in FIG. 25K for executing the given query corresponds to the one node in the computing cluster's upper level that has a solid outline, selected over the other nodes in the computing cluster's upper level with dashed outlines. In some embodiments, if the upper level of computer cluster 2835 is the root level, the same single node is selected for every query, where the set of possible parent nodes includes exactly one node.

Alternatively or in addition, for execution of a given query by a given computing cluster 2835, each possible node at the lower level is operable to determine whether or not it is participating in the given query. In some embodiments, all nodes at the lower level that receive resultants from its own child nodes, for example, in accordance with a different computing cluster, is automatically determined to be participating at the lower level to ensure these resultants continue to be processed. In such embodiments, all nodes at the lower level that do not receive resultants from its own child nodes, for example, in accordance with a different computing cluster selecting a different parent node, is automatically determined to not participate at the lower level, as it has no resultants as input. In cases where the nodes at the lower level are nodes at the IO level, every node included in or otherwise assigned to the lower can determine to participate at the lower level for any given query. For example, every computing cluster with its lower level as the IO level, such as computing clusters 2835-2.1-2835-2.G in FIG. 25K, can determine that every node at the lower level is responsible for performing row reads, for example, in accordance with data ownership information 2711.

As discussed previously, it is desirable for nodes 37 to operate independently without global coordination. Utilizing inter-coordination between only nodes within the same computing cluster can aid in reducing global coordination. As illustrated in FIG. 25K, each computing cluster with the same upper and lower level, such as computing clusters 2835-1.1-2835-1.G, can include mutually exclusive sets of nodes as possible nodes in their respective upper and lower levels. Thus, each of these computing clusters 2835-1.1-2835-1.G can independently coordinate the mechanism for selecting a single parent node to which participating child nodes will send their resultants. To further reduce global coordination, in some embodiments, no computing clusters have overlapping sets of nodes. As a particular example, in embodiments with exactly the three levels as illustrated in FIG. 25K, only computing clusters 2835-2.1-2835-2.G are required, and computing cluster 2835-1.1. is not implemented. In such embodiments, the root level includes exactly one node that all nodes are predetermined to send resultants to for every query. In such embodiments, every computing cluster in the database system 10 can be mutually exclusive. In some cases, the database system 10 can implement multiple query execution plans 2805 for different queries, for example, operating on different, distinct sets of data stored by the corresponding distinct set of nodes at each query execution plan 2805's IO level. Alternatively, the database system implements the single query execution plan 2805 for all queries.

Each computing cluster can include the same or different number of total possible nodes across each of its levels. A computing cluster can include the same or different number of possible nodes for some or all of its levels as other computing clusters that include these same levels. Each computing cluster can include the same or different number of levels. For a given query, each selected parent node across different computing clusters at the same level can receive resultants from the same or different number of child nodes. A same or different number of child nodes can be participating in a given query in different computing clusters. Computing clusters that include the lower level as the IO level can include the same or different number of nodes at the IO level. In some cases, all nodes at the IO level and/or all available nodes at the IO level in every one of these computing clusters that include the lower level as the IO level can be included to implement every query. In some cases, at least one node at the IO level of at least one computing cluster will not be selected to perform row reads for some queries.

Figure 25L:
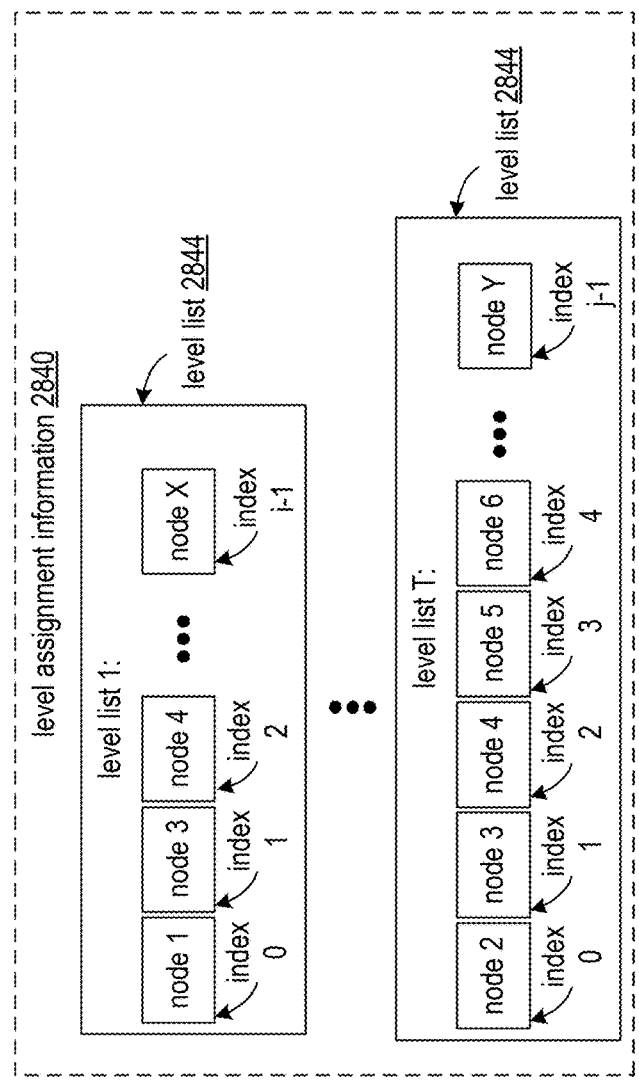
FIGS. 25L and 25M illustrate embodiments of level assignment information in accordance with various embodiments.
Figure 25M:
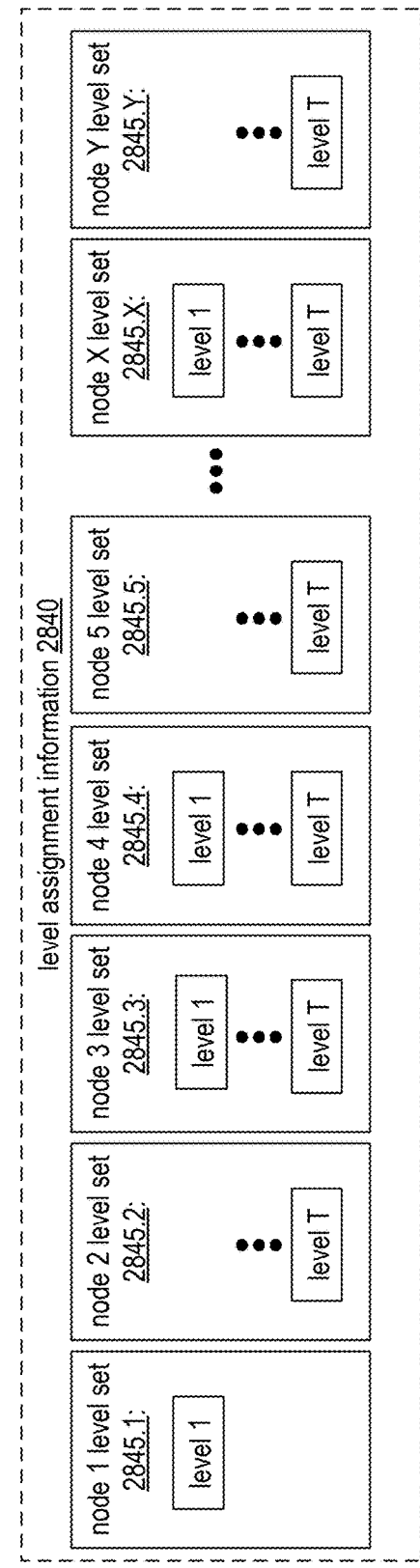

As illustrated in FIGS. 25L and 25M, each computing cluster 2835 can have corresponding level assignment information 2840. The level assignment information 2840 can be utilized by corresponding nodes in the computing cluster 2835 to determine which levels of the computing cluster 2835 it is assigned to for participation in some or all queries. In particular, the level assignment information 2840 can indicate a cluster-level mapping that indicates assignment of each of a plurality of subsets of the plurality of levels of the computing cluster 2835 to a corresponding one of the set of nodes. A node assigned to a particular level in the level in the level assignment information is included as in the set of possible nodes for that level, where its participation in a given query can be determined based on the query itself and/or based on whether the level is a root level, inner level, or IO level, As illustrated in FIG. 25L, the level assignment information 2840 can include, can be represented as, and/or can otherwise indicate a plurality of T level lists 2844-1-2844-T, corresponding to a plurality of levels of the computing cluster 2835. For example, if a computing cluster only includes an upper level and a lower level, level list 1 can correspond to the level list for the upper level, and level list T can correspond to the level list for the lower level, where T is equal to two. In other embodiments, T can include more than two levels for a corresponding computing cluster than includes nodes in more than two levels of the query execution plan. Each level lists includes a subset of nodes in the computing cluster that are assigned to the corresponding level as a possible node in the set of possible nodes for the level.

In this example, level list 1 includes a list of i nodes that includes node 1, node 3, node 4, and node X. Level list 1 has corresponding indices 0-(i−1), where node 1 is at index 0 of the list, node 3 is at index 1 of the list, node 4 is at index 2 of the list, and node X is at index i−1 of the list. Level list T includes a list of j nodes that includes node 2, node 3, node 4, node 5, and node Y. In this example, level list T does not include node 1. For example, if level list T corresponds to the IO level of the query execution plan 2805, level list T can include every node in the computing cluster 2835 and/or every available node in the computing cluster 2835 that has access to segment storage 2442 and/or that is included in a corresponding storage cluster 35 belonging to the computer cluster 2835. For example, node 1 is not included in level list T because it does not include or have access to segment storage 2442 and/or is not included in any storage clusters 35. In some embodiments, each of a computing cluster's level lists 2844 can include any number of nodes. For example, i can be greater than j, less than j, or equal to j.

The level lists 2844 of level assignment information can indicate, can be utilized to derive, and/or can be derived from a plurality of node level sets 2845.1-2845.Y. This is illustrated in FIG. 25M, which depicts identical level assignment information as the example of FIG. 25L in a different fashion. As illustrated in FIG. 25M, the level assignment information 2840 can include, can be represented as, and/or can otherwise indicate this set of node level sets 2845.1-2845.Y. Each node in the computing cluster 2835 has a node level set 2845 that can include one or more levels to which the node is assigned for the computing cluster 2835 as a possible node, or can indicate the node is assigned to no levels of the computing cluster 2835.

FIGS. 26A-31C illustrate embodiments of scheduling of a segment set 2612 of segments 2424 for processing via a plurality of processing modules 2610. Some or all features and/or functionality of FIGS. 26A-31C can implement any embodiment of database system 10 described herein.

In some embodiments of database system 10, data is stored in a plurality of segments, such as TKT segments (e.g. segments 2424), and/or each of which holds a disjoint subset of rows. These segments can be processed by via a pipeline IO operator (e.g. IO operator execution module 2840), which can be responsible for locating (e.g. subject to pushed-in filters and/or other plan characteristics) and/or streaming the data needed to service a given query.

In some embodiments, an implementation of segment scheduling requires each segment to be processed in full by a single operator instance (e.g. implemented via a corresponding processing module 2610 and/or a single virtual machine core/processing core). In such embodiments, when an operator instance requests a new segment (e.g. via a scheduleSegment( ) function), a segment scheduling module (e.g., a TKT segment scheduler, optionally implemented via some or all functionality of scheduling module 2618 described herein) can choose the next segment to assign to an operator instance/corresponding processing module 2610 for processing. This assignment of schedules by the segment scheduling module can include (1) finding a corresponding block device (e.g. memory structure storing segments, such as a memory drive 2425 or node 37)) with the least outstanding work, for example, measured as the sum of the row counts of segments of that device that have been handed out by the scheduler and not yet been completed (for example, as indicated via a call to completeSegment( ) function from the operator instance), and (2) returning the largest segment on that device.

In some embodiments, this strategy can be implemented to minimize IO contention, while also prioritizing larger segments earlier in query execution such that smaller segments (and as such, smaller units of work) are available at the tail of the query to minimize skew in processing time across operator instances. In some embodiments, if the number of segments to be processed is less than the parallelism factor, an operator compiler only instantiates a number of operator instances equal to the number of segments, for example, since the operator instances that did not get assigned a segment would remain idle. Remaining operator instances can be allocated for other work during this time (e.g. execution of other concurrently running queries).

In some embodiments, profiling of CPU utilization during queries that schedule segments using the above strategy can result in a problematic pattern of significant skew or imbalance between when the first and final operator instances finished processing their assigned segments. For example, a typical graph of utilization across cores (e.g. processing modules 2610) can correspond to the problematic case illustrated in the example of FIG. 26D, where idle core time due to skew is denoted. In some embodiments, this imbalance can mean that the query doesn't complete until a final core finishes processing. The completed cores can be available for the processing of concurrent queries, but serial performance of a given query can be determined by the finalization of the longest-running core.

Figure 26A:
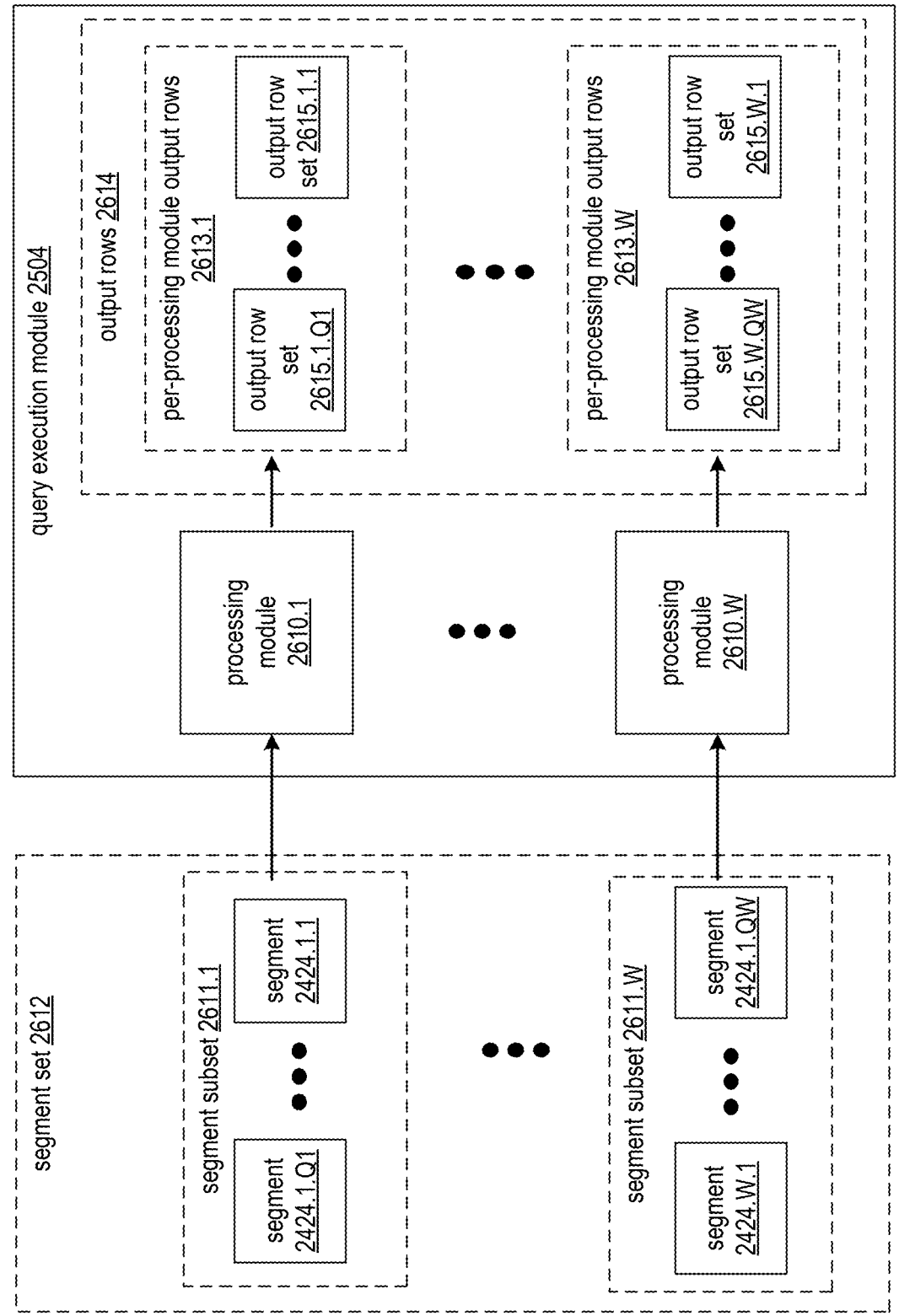
FIG. 26A is a schematic block diagram of a query execution module that generates output rows for a segment set via a plurality of processing modules in accordance with various embodiments.
Figure 26B:
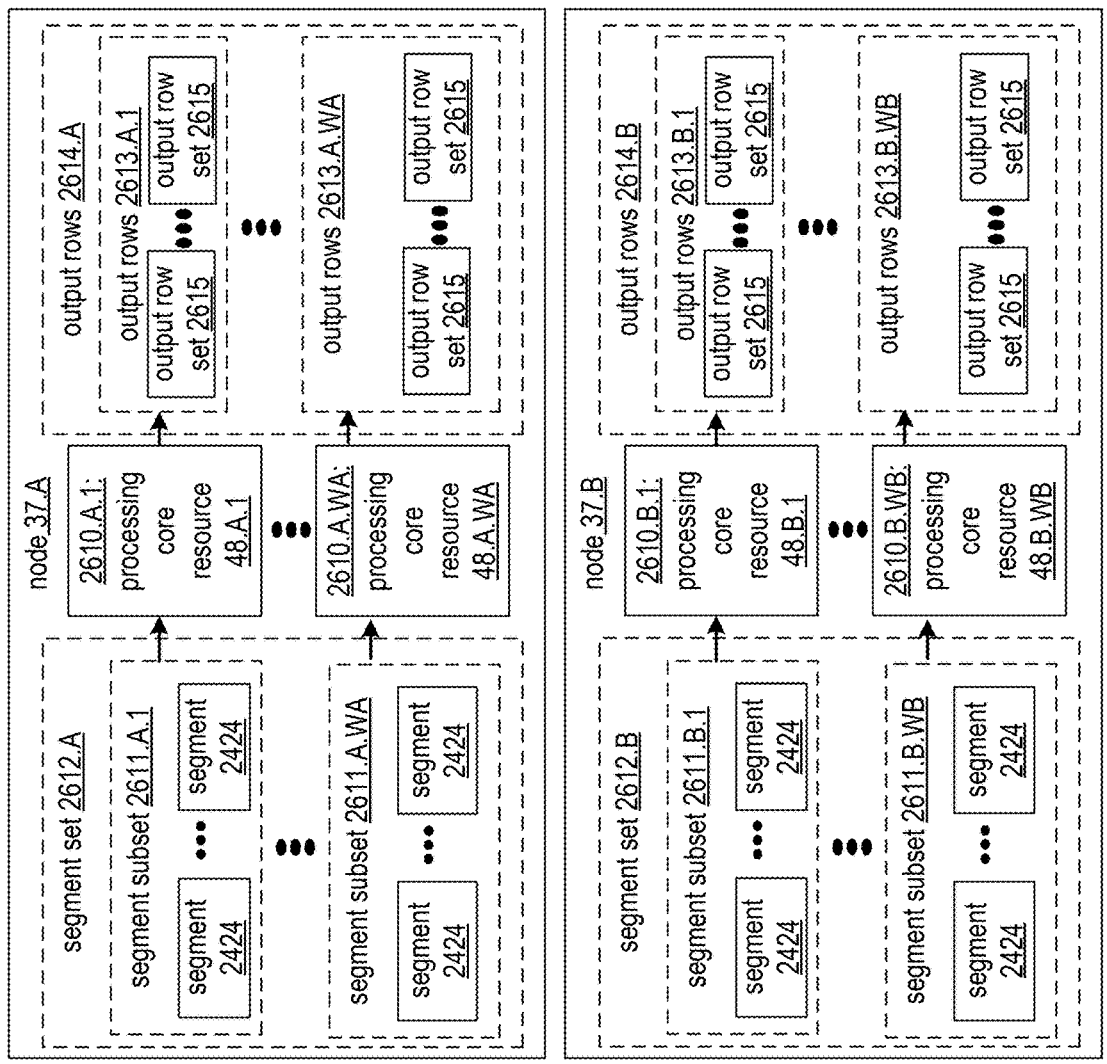
FIG. 26B is a schematic block diagram of a plurality of nodes of a database system that each generate output rows from a corresponding segment set via a corresponding set of processing core resources in accordance with various embodiments.
Figure 26D:
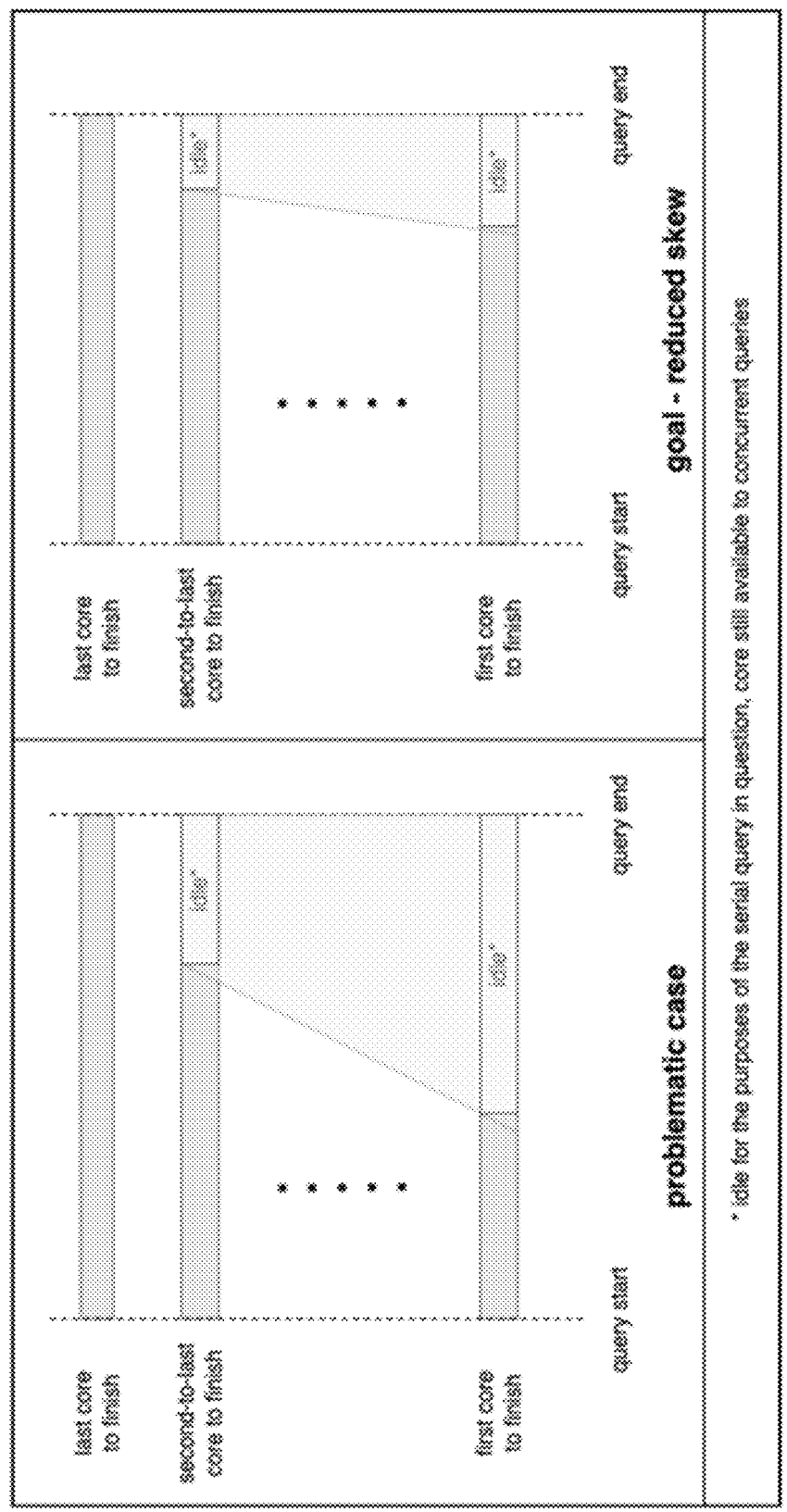
FIG. 26D illustrates example reduction of skew induced by idle time of processing modules in accordance with various embodiments.

Some or all features and/or functionality presented in FIGS. 26A-31C can be implemented to reduce this skew via scheduling segments in such a way that all cores finish as close together in time as possible, for example, to render less idle time as illustrated in the goal-reduced skew case in the example of FIG. 26D.

FIGS. 26A-26G present embodiments of implementing a first strategy for reducing such skew in segment scheduling. Some or all features and/or functionality of FIGS. 26A-26G can implement any embodiment of database system 10 described herein.

In some embodiments, a first strategy for reducing skew seen in utilization across cores can include computing the average number of rows present in all segments for a given query (e.g. indicated by the value of a variable avgRowsPerOpInst, which can be implemented as the target number of rows 2627 described herein), and/or allowing operator instances to request smaller segments as they approached or exceeded that target. This can be implemented in cases where row count alone is not a very good metric for the amount of time it takes to process a segment. For example, actual processing time can vary due to data locality within segments, whether or not the core processing it is a hyperthread core, and other factors. Such factors can cause some cores made a lot of progress early in the query, resulting in them queueing up many large segments for read-ahead.

In some embodiments, applying the first strategy to reduce such skew can include implementing operator instances such that, if an operator instance had processed less than avgRowsPerOpInst, it requests the minimum of (1) a read-ahead row count (e.g. implemented as read ahead row count 2628 described herein, optionally implemented as a predetermined number of rows to read ahead, or an actual number of rows that the operator instance had actually read ahead already), and (2) the number of rows remaining until avgRowsPerOpInst total rows were scheduled for the operator instance (e.g. implemented as the target number of rows 2627 minus the value of a total number of previously scheduled rows 2629 described herein). In such implementations, once the operator instance exceeds the avgRowsPerOpInst scheduled, it can request a segment of size 1, effectively giving it the smallest segment available. To give a higher likelihood of the segment scheduler finding a suitably sized segment, the segment scheduler can be implemented to enable searching of a configurable number n devices with the least work outstanding for the segment with number of rows closest to the requested number. For example, rather than selecting the segment with the closest number of rows across all outstanding segments, only the segments stored in the predetermined threshold number of devices with the least work outstanding work are available for selection.

FIG. 26A illustrates an embodiment of database system 10 where a segment set 2612 (e.g. required for execution of a given query) is processed via a plurality of processing modules 2610 to generate output rows 2614 (e.g. a filtered subset of rows included in segments of the segment set, corresponding values of one or more columns to be projected and/or further processed in conjunction with the query, etc.). For example, such processing is implemented via reading of each corresponding segment (e.g. reading of rows directly and/or utilizing index structures for the segment), for example, via executing corresponding IO pipelines 2835 as discussed previously. Some or all features and/or functionality of database system 10 and/or query execution module 2504 of FIG. 26A can implement any embodiment of database system 10 and/or query execution module 2504 described herein.

While not illustrated, the output rows 2614 can be further processed in conjunction with performing additional query operators of a given query to ultimately generate a query resultant. For example, the output rows 2614 are emitted via one or more nodes 37 implemented at IO level 2416 of a query execution plan 2405.

Each processing module 2610 of a set of parallelized processing modules responsible for processing the set of segments (e.g. some or all processing modules 2610 of query execution module 2504, such as processing modules available for executing the query and/or some or all processing modules on a corresponding node responsible for processing the set of segments 2612) can process segments of a corresponding segment subset 2611 of the segment set. For example, a scheduling module assigns particular segments 2424 of the segment set 2612 for processing in accordance with applying a corresponding scheduling strategy. The segments of a given segment subset 2611 are optionally not assigned to a corresponding processing module 2610 all at once (e.g. as a processing module 2610 needs more work it requests more segments). The segments of a given segment subset 2611 are optionally not in any particular order relative to the segment set 2612/are optionally not in any particular order relative to their storage in memory drives.

Processing of each segment by processing module 2610 can include generating a corresponding output row set 2615 for the corresponding segment (e.g. a filtered subset of rows included the corresponding segment, corresponding values in the segment of one or more columns to be projected and/or further processed in conjunction with the query, etc.). For example, such processing is implemented via reading of the corresponding segment (e.g. reading of rows directly and/or utilizing index structures for the segment), for example, via executing a corresponding IO pipeline 2835 configured for the segment as discussed herein. Each processing module 2610 can thus generate its own per-processing module output rows 2613 as a plurality of output row sets (or optionally one or zero row sets if only one or zero segments were processed). A given processing module 2610 can be processing a given segment 2424 to generate a corresponding given output row set 2615, concurrently with, in parallel with, and/or independently from some or all other processing modules 2610 processing their own given segments 2424 to generate their own corresponding given output row sets 2615.

Assignment of segments to processing modules can guarantee that each given row included in a given segment of segment set 2612 is processed only once to guarantee query correctness. In some cases, such as in applying the first strategy discussed above, each segment is processed, in full, by exactly one processing module 2610, ensuring that each given row included in a given segment of segment set 2612 is processed only once.

Different segment subsets 2611 of segment set 2612 can include same or different numbers of segments (e.g. the value of Q1 is the same or different from the value of QW). Different segments 2424 of segment set 2612 can include same or different numbers of rows.

FIG. 26B illustrates an example where the segment scheduling across processing modules 2610 of FIG. 26A is implemented via one or more individual nodes 37, such as some or all nodes executing the corresponding query via processing their own segment sets 2612 in conjunction with their participation at IO level 2416 of a corresponding query execution plan 2405. Some or all features and/or functionality of database system 10 and/or nodes 37 of FIG. 26B can implement any embodiment of database system 10 and/or nodes 37 described herein.

In this example, node 37.A processes a first segment set 2612.A via a corresponding set of processing core resources 48.A.1-48.A.WA to generate corresponding output rows 2614.A that includes output row sets across a plurality of per processing module output rows 2613.A.1-2613.A.WA, where the processing core resources 48.A.1-48.A.WA are optionally implemented as a first set of processing modules 2610.1-2610.W. Meanwhile, node 37.B processes a second segment set 2612.B via a corresponding set of processing core resources 48.B.1-48.B.WB to generate corresponding output rows 2614.B that includes output row sets across a plurality of per processing module output rows 2613.B.1-2613.B.WB, where the processing core resources 48.B.1-48.B.WB are optionally implemented as a first set of processing modules 2610.1-2610.W.

While not illustrated, any number of additional nodes can be implemented in a similar fashion, such as some or all other nodes 37 implemented at IO level of a given query execution plan 2405. A given node 37 can be processing a given segment set 2612 to generate corresponding output rows 2614, concurrently with, in parallel with, and/or independently from some or all other nodes 37 processing their own given segment sets 2612 to generate their own corresponding given output rows 2614. The output rows 2614 generated by a given node can be emitted as output data blocks for processing via other nodes (e.g. sent to a parent node at a higher level of the query execution plan).

The segment set 2612 of a given node 37 can include some or all segments stored in memory drives 2425 of the given node 37 and/or can include ones of the segments stored in memory drives 2425 of the given node 37 that are required for access in executing the corresponding query. The segment set 2612 of a given node 37 can optionally include a combination of physical segments and virtual segments.

The segment set 2612 of a given node 37 can optionally be determined via data ownership information, dictating which nodes are assigned which segments for processing during query executions, for example, as dictated by an OSN of a corresponding query. For example, a node 37 identifies its segment set 2612 via some or all features and/or functionality discussed in conjunction with some or all of FIGS. 25A-25N.

Different segment sets 2612 required by the query and processed by different nodes 37 can include same or different numbers of segments. Different sets of processing core resource 48 implemented by different nodes to execute the given query can include same or different numbers W of processing core resources 48 (e.g. WB is the same or different from WA).

FIG. 26C illustrates an embodiment communication between a scheduling module 2618 and a plurality of parallelized processing modules 2610.1-2610.W. Some or all features and/or functionality of processing modules 2610 and/or database system 10 of FIG. 26C can implement any embodiment of processing modules 2610 and/or database system 10 described herein.

Scheduling of segments for processing via processing modules 2610 can be in accordance with scheduling strategy instruction data 2619. For example, the scheduling strategy instruction data 2619 is determined based on being: predetermined; accessed in memory resources of database system 10; received from an external entity, such as a requesting entity, data supplier entity, and/or administrative entity; configured via user input; automatically determined and/or determined in part via artificial intelligence and/or an optimization performed via processing via database system 10; and/or otherwise determined. The scheduling strategy instruction data 2619 can be fixed or updated over time. The scheduling strategy instruction data 2619 can be the same of different for different queries, different datasets being accessed, different requesting entities requesting queries for execution, or other differences. The scheduling strategy instruction data 2619 can be implemented to render employing of the first strategy described above, a strategy configured to reduce idle time and/or to maximize core utilization, and/or to render implementation of any other strategy for scheduling segments.

An ith given segment 2424 assigned to a given processing module 2610 for processing can be determined based on a next row set selection module 2620 sending a next row set request 2621.$i$ to a scheduling module (e.g. via a call to a scheduleSegment( ) function), and a corresponding segment 2424.$x$ can be assigned in response, for example, via a response 2622.$i$ to request 2424.$i$.

The scheduling module 2618 can be implemented via any processing and/or memory resources of query execution module 2504, or a corresponding node 37, and/or of database system 10. The scheduling module 2618 optionally can be implemented as functionality performed in response to execution of a scheduleSegment( ) function, where a given request 2621 corresponds to a given call to scheduleSegment( ) and/or where responses 2622 correspond to a result/output/data returned in response to the given call to scheduleSegment( ) Some or all such functionality can optionally be performed via processing/memory resources of the corresponding processing module 2610 making the call to scheduleSegment( ) The scheduling module 2618 can be implemented to ensure each segment 2424 in segment set 2612 is processed via a processing module 2610, and that each segment 2424 in segment set 2612 is processed via only one processing module 2610.

The scheduling module 2618 can indicate which segment be selected based on parameters indicated in request 2621 and/or segment set data 2617. For example, the segment set data 2617 indicates which segments are included in segment set 2612, their respective sizes (e.g. number of rows and/or number of bytes), attributes of their respective IO pipelines, which index structures are employed, which segments are stored in which memory devices 2425/locations, which devices are most or least utilized at the given time and available for segment reads currently, which segments have already been assigned vs. are not yet assigned, and/or other information. The scheduling module can select which segment 2424.$x$ is best suited for processing by the processing module 2610 next, for example, based on the parameters indicated in request 2621 and relevant information in segment set data 2617, in accordance with the scheduling strategy instruction data 2619.

Based on this selection of segment 2424.$x$ for processing, a next row set processing module 2623 can generate an output row set 2615.$i$ as a filtered subset of segment row set 2624.$x$ (e.g. via execution of a corresponding IO pipeline 2835 for segment 2424.$x$).

Subsequent segments can be requested in this manner by processing module 2610.1 in conjunction with execution of the given query (and/or optionally in conjunction with execution of concurrently executing queries). Meanwhile, other processing modules 2610.2-2610.W can be implementing their own next row set selection modules 2620 and next row set processing modules 2623 in a same or similar fashion to render identification and corresponding processing of their own segments.

In this fashion, segments 2424 can be assigned to a given segment subset 2611 of a given processing module 2610 serially, and/or segments 2424 assigned to a segment subset 2611 can be processed serially to generate output row sets 2615 of per processing module output rows 2613 serially. For example, a given processing module 2610 generates its requests 2621 one at a time via next row set selection module 2620, and the segments indicated in corresponding responses are processed via next row set processing module 2623 one at a time.

Meanwhile, while a given processing module 2610 processes its own segments 2424 serially, the segments across different segment subsets 2611 of segment set 2612 can be processed in parallel based on the processing modules 2610 being implemented as parallelized processing resources of database system 10. For example, at a given time, some or all processing modules 2610 of the W processing modules are in the midst of processing exactly one segment 2424. Ideally, at any given time, all processing modules 2610 of the W processing modules are in the midst of processing exactly one segment 2424. The scheduling strategy employed, and indicated in scheduling strategy instruction data 2619 executed by next row set selection modules 2620 of processing modules 2610 and/or by scheduling module 2618, can be implemented to minimize the amount of time less than all of the W processing modules are in the midst of processing exactly one segment 2424 to maximize utilization in some or all cases of query execution.

FIG. 26D illustrates an example of how the scheduling strategy indicated in scheduling strategy instruction data 2619 can be implemented to reduce idle time of processing modules 2610 ("cores" of FIG. 26D, for example, based on the processing modules 2610 being implemented as corresponding processing cores). This can be ideal in improving utilization of the set of processing modules 2610 to improve query execution efficiency, where some or all functionality discussed herein renders the "goal-reduced skew" case vs. the problematic case in some or all query executions by database system 10.

Figure 26E:
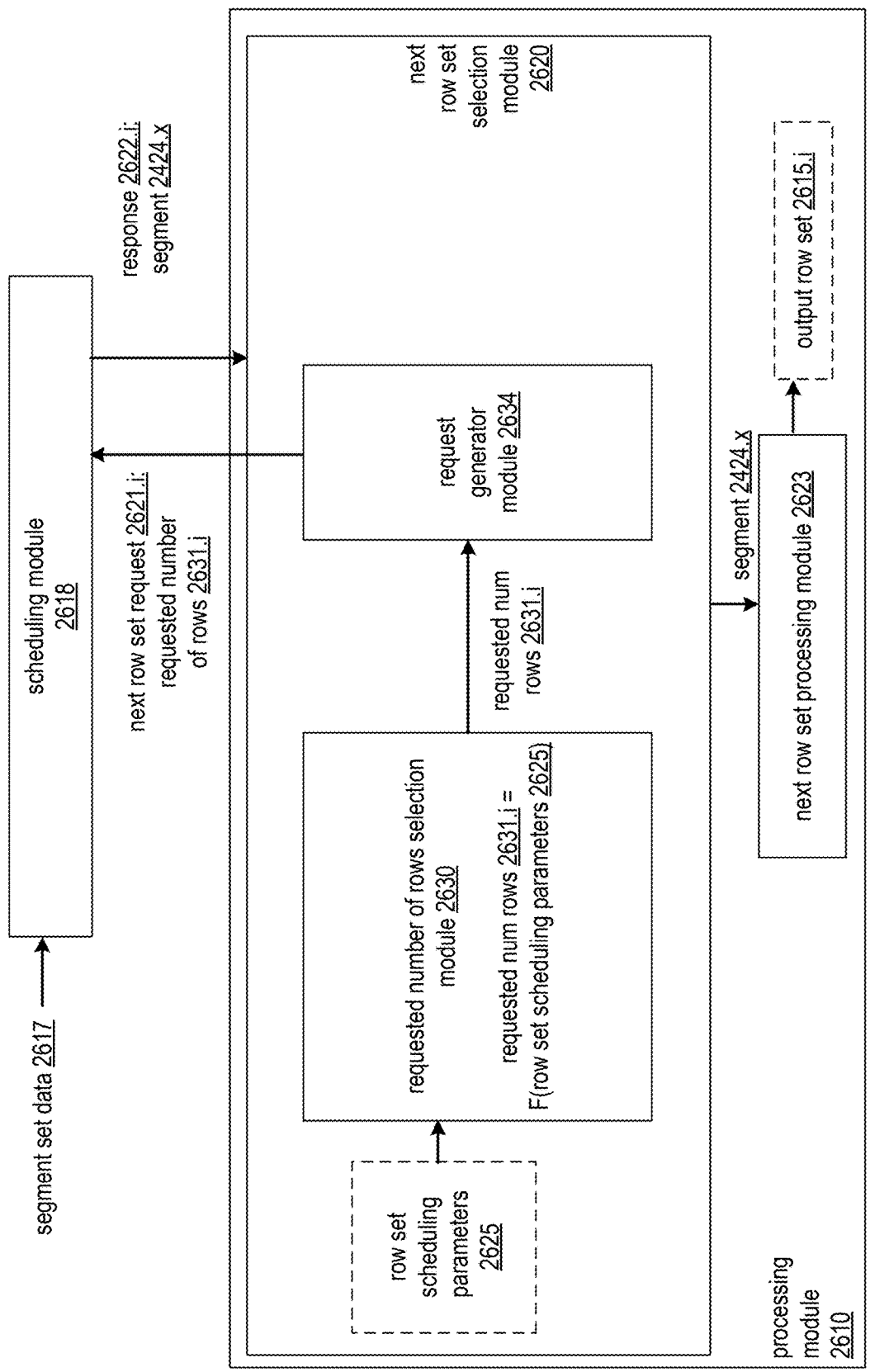
FIG. 26E is a schematic block diagram of a processing module that generates a next row set request indicating a requested number of rows in accordance with various embodiments.

FIG. 26E illustrates an embodiment of next row set selection module 2620 that implements a requested number of rows selection module 2630 to select a requested number of rows 2631.$i$ for the next segment to be scheduled, where a request generator module 2634 generates the corresponding request to indicate this selected requested number of rows 2631.$i$. Some or all features and/or functionality of the next row set selection module 2620, processing module 2610, and/or database system 10 of FIG. 26E can implement any embodiment of the next row set selection module 2620, processing module 2610, and/or database system 10 described herein.

The requested number of rows 2631.$i$ can be selected as a function F of row set scheduling parameters 2625. For example, the scheduling strategy instruction data 2619 dictates the row set scheduling parameters 2625 and/or the function F.

The scheduling module 2618 can select the segment 2424.$x$ based on the requested number of rows 2631.$i$ in the given next row set request 2621.$i$, and based on segment size data 2626 of the segment set 2612 indicated in segment set data 2617. For example, the segment size data 2626 indicates segment sizes of (e.g. number of rows included in) each segment 2424 of the segment set 2612 (e.g. based on segment metadata for the segments 2424 or other determination). For example, the segment with a closest number of rows to the requested number of rows 2631.$i$ is selected; a segment with a number of rows that is within a threshold amount strictly higher than, strictly lower than, or higher that or lower than the requested number of rows 2631.$i$ is selected; a segment with the closest number of rows stored in a least utilized device (e.g. least utilized memory drive 2425/least utilized node 37) at the given time is selected, a segment with the closest number of rows stored in any of a set of the n least utilized device (e.g. least utilized memory drive 2425/least utilized node 37) is selected, where the number n devices to search is configurable/is set by the scheduling strategy instruction data 2619, and/or other selection of segment 2424.$x$ is performed based on the requested number of rows 2631.$i$ and segment sizes 2626.

Figure 26F:
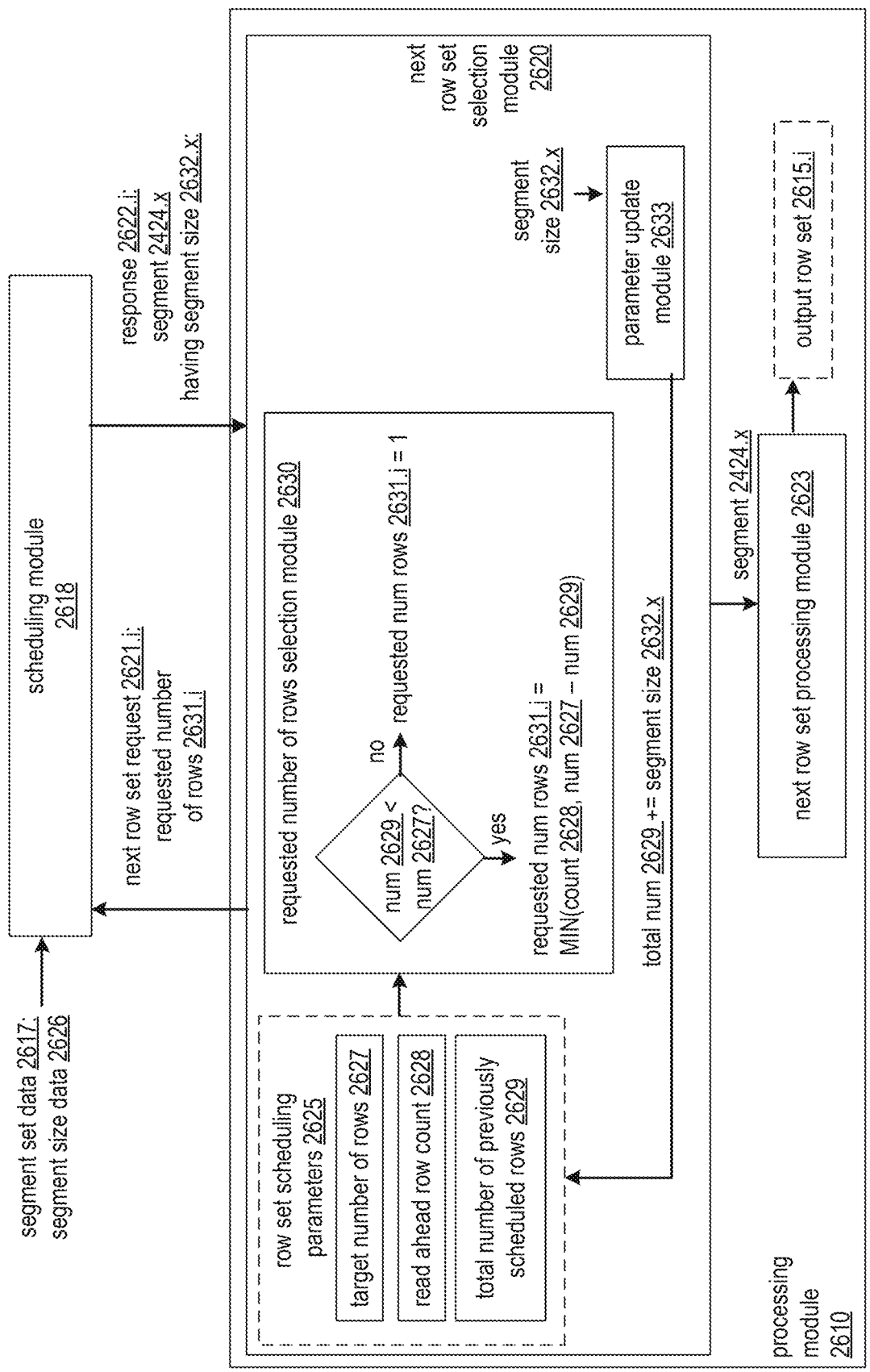
FIG. 26F is a schematic block diagram of a processing module that selects a requested number of rows via row set scheduling parameters in accordance with various embodiments.

FIG. 26F illustrates an example embodiment of next row set selection module 2620 selecting the requested number of rows as a particular function of particular row scheduling parameters. Some or all features and/or functionality of the next row set selection module 2620, processing module 2610, and/or database system 10 of FIG. 26F can implement any embodiment of the next row set selection module 2620, processing module 2610, and/or database system 10 described herein.

The row set scheduling parameters 2625 can indicate a target number of rows 2627, a read ahead row count 2628, and/or a total number of previously scheduled rows 2629. The target number of rows can be computed as the dividend determined by dividing the total number of rows across all segments in segment set 2612 by the number of processing modules W being implemented to process the segment set 2612. This target number of rows can be common across all processing modules 2610 in processing the given query, for example, to ensure all processing modules aim to process the same number of rows. In other embodiments, different processing modules have different targets, for example, based on differences in processing efficiency of different processing modules processing a given segment set, where more efficient processing modules have higher targets than less efficient processing modules.

The requested number of rows selection module 2630 can determine whether the total number of previously scheduled rows (e.g. total number of rows included in segments scheduled in previous requests 2631.1-2631.$i$-1) is less than the target number of rows 2627. When the total number of previously scheduled rows is less than the target number of rows 2627, the requested number of rows 2631.$i$ can be set as a minimum of the read ahead row count and number of remaining rows until the target as met, for example, computed as a difference between the target number of rows 2627 and the total number of previously scheduled rows 2629. When the total number of previously scheduled rows is less than the target number of rows 2627, the requested number of rows 2631.$i$ can be set as 1 (or some other predetermined minimum), for example, where the scheduling module selects the smallest segment (e.g. across all devices or only the set of least utilized devices) when this predetermined minimum is indicated in the next row set request 2621.

A parameter update module 2633 can update the total number of previously scheduled rows 2629 based on the segment size 2632.$x$ of the given segment, where the new total is utilized in generating the subsequent request 2621.$i$+1.

Figure 26G:
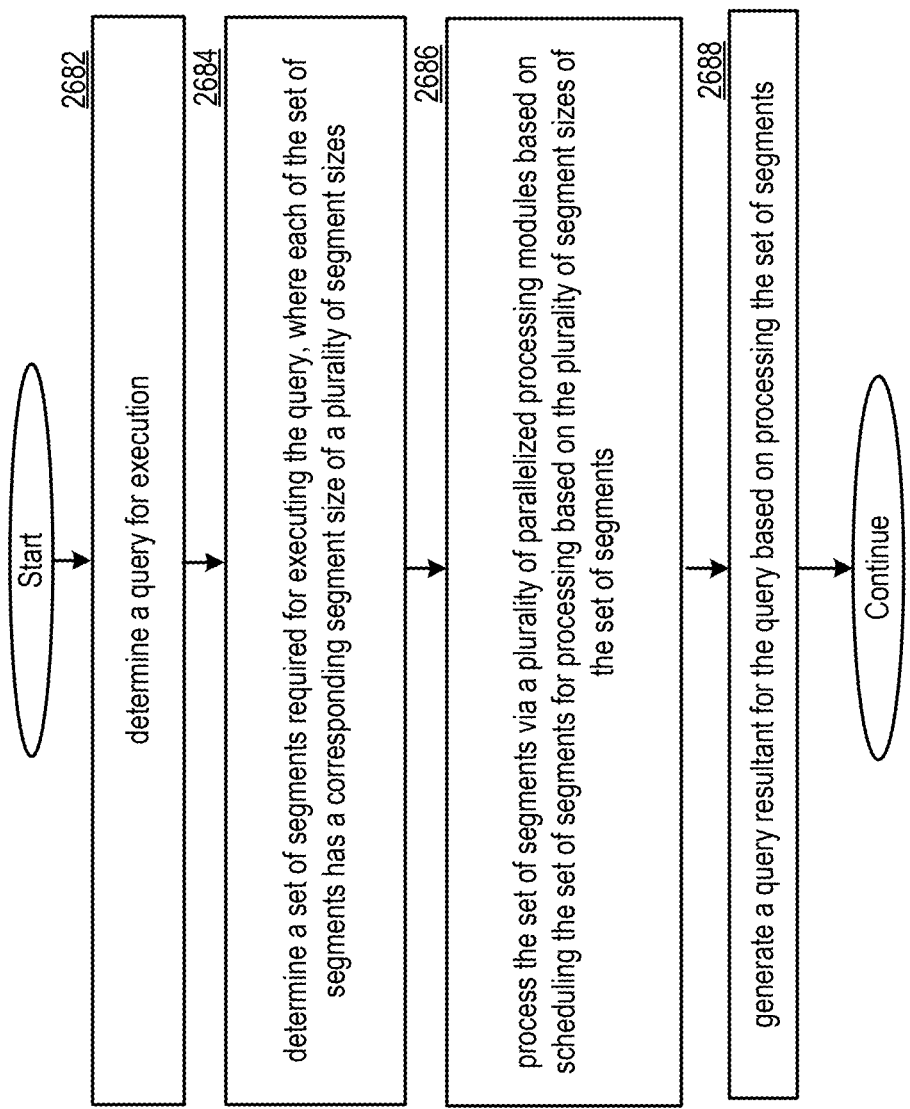
FIG. 26G is a logic diagram illustrating a method for execution in accordance with various embodiments.

FIG. 26G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26G, for example, based on participating in execution of a query being executed by the database system 10. Some or all of the method of FIG. 26G can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 26G based on implementing some or all of a plurality of processing modules 2610.1-2610.W, for example, as a corresponding plurality of processing core resources 48.1-48.W. Some or all of the steps of FIG. 26G can optionally be performed by any other one or more processing modules of the database system 10. Some or all of the steps of FIG. 26G can be performed to implement some or all of the functionality of the database system 10 as described in conjunction with FIGS. 26A-26F, for example, by implementing some or all of the functionality of query execution module 2504, one or more processing modules 2610, next row set selection module 2620, next row set processing module 2623, and/or scheduling module 2618. For example, some or all of the steps of FIG. 29D are based on executing at least one IO pipeline 2835 to process at least one corresponding segment 2424, for example, in conjunction with implementing an IO operator execution module 2840. Some or all steps of FIG. 26G can be performed by database system 10 in accordance with other embodiments of the database system 10 and/or nodes 37 discussed herein. Some or all of the steps of FIG. 26G can be performed in conjunction with performing some or all steps of any other method described herein.

Step 2682 includes determining a query for execution. Step 2684 includes determining a set of segments required for executing the query, where each of the set of segments has a corresponding segment size of a plurality of segment sizes. Step 2686 includes processing the set of segments via a plurality of parallelized processing modules based on scheduling the set of segments for processing based on the plurality of segment sizes of the set of segments. Step 2688 includes generating a query resultant for the query based on processing the set of segments.

In various examples, each segment size of the plurality of segment sizes are based on a number of rows includes in a corresponding one of the set of segments.

In various examples, a number of segments in the set of segments is strictly greater than a number of processing modules in the plurality of parallelized processing modules. In various examples, a first processing module of the plurality of parallelized processing modules serially processes multiple ones of the set of segments.

In various examples, a first segment of the multiple ones of the set of segments is serially processed first by the first processing module. In various examples, a final segment of the multiple ones of the set of segments is serially processed last by the first processing module. In various examples, a first segment size of the first segment is strictly greater than a second segment size of the final segment. In various examples, the first segment is processed serially before the final segment based on the first segment size being strictly greater than the second segment size.

In various examples, the method further includes determining a target number of rows per segment based on the set of segments required for executing the query. In various examples, the set of segments are scheduled for processing in accordance with applying a scheduling strategy based on applying the target number of rows per segment.

In various examples, a smallest segment of the set of segments is scheduled for processing to a first processing module for processing based on a total size of a plurality of other segments of the set of segments previously scheduled to the first processing module for processing exceeding the target number of rows per segment. In various examples, a smallest segment of the set of segments is scheduled for processing to a first processing module for processing based on the total size of the plurality of other segments of the set of segments previously scheduled to the first processing module for processing falling below the target number of rows per segment within a predetermined threshold amount.

In various examples, the set of segments are scheduled for processing in accordance with applying a scheduling strategy. In various examples, during a given period during processing of the set of segments, all of the plurality of parallelized processing modules each process exactly one corresponding one of the set of segments based on the scheduling strategy being configured to maximize utilization of the plurality of parallelized processing modules and/or further based on each of the plurality of parallelized processing modules processing a corresponding subset of the set of segments serially.

In various examples, an amount of time during processing of the set of segments where at least one of the plurality of parallelized processing modules is processing none of the set of segments is minimized based on based on the scheduling strategy being configured to maximize utilization of the plurality of parallelized processing modules.

In various examples, each of the set of segments are processed in full by exactly one of the plurality of parallelized processing modules.

In various examples, the set of segments are processed via the plurality of parallelized processing modules based on each processing module of the plurality of parallelized processing modules processing all rows in each segment included in a corresponding subset of the set of segments via serialized processing of the corresponding subset of the set of segments.

In various examples, the serialized processing of the corresponding subset of the set of segments by the each processing module is based on; automatically selecting, via the each processing module, a requested number of rows to be included in a corresponding next segment of the set of segments based on segment scheduling parameters; generating, via the each processing module, a scheduling request the corresponding next segment; and/or receiving, via the each processing module, each the corresponding next segment for processing in response to the scheduling request via access to the corresponding next segment.

In various examples, a scheduling module is operable to process a plurality scheduling requests for the query received across the plurality of parallelized processing modules executing the query based on dispersing the set of segments across the plurality of parallelized processing modules. In various examples, the serialized processing of the corresponding subset of the set of segments by the each processing module is further based on sending the scheduling request to the scheduling module. In various examples, the corresponding next segment is received based on the scheduling module assigning the corresponding next segment to the each processing module for processing in response to the scheduling module processing the scheduling request.

In various examples, the scheduling module assigns the corresponding next segment to the each processing module for processing based on selecting one segment of an unassigned subset of the set of segments not yet assigned to any of the plurality of parallelized processing modules based on a number of rows included in the corresponding segment size of the one segment being closer to the requested number of rows than all other segments of the unassigned subset of the set of segments.

In various examples, the segment scheduling parameters include: a total number of previously scheduled rows included in all previously scheduled segments assigned to the processing module for processing prior to the corresponding next segment; a read-ahead row count; and/or a target number of rows.

In various examples, the segment scheduling parameters include the target number of rows. In various examples, the target number of rows is a first predetermined value common across some or all of the plurality of parallelized processing modules. In various examples, the predetermined value is computed as a dividend of a total number of rows across the set of segments divided by a total number of parallelized processing modules in the plurality of parallelized processing modules.

In various examples, the segment scheduling parameters include the read-ahead row count. In various examples, the read-ahead row count is a second predetermined value common across some or all of the plurality of parallelized processing modules.

In various examples, the requested number of rows is automatically selected based on selecting, when the total number of previously scheduled rows is less than the target number of rows, the requested number of rows as a minimum of: the read-ahead row count and a remaining number of unscheduled rows computed as a difference between the target number of rows and the total number of previously scheduled rows. In various examples, the requested number of rows is automatically selected based on selecting, when the total number of previously scheduled rows is less than the target number of rows, the requested number of rows as a predetermined minimum number of requested rows.

In various examples, a smallest one of the set of segments is assigned to the each processing module when the requested number of rows is set as the predetermined minimum number of requested rows.

In various examples, the predetermined minimum number of requested rows is equal to one.

In various examples, all rows across the set of segments are included in a same relational database table that includes a plurality of columns. In various examples, filtering predicates of the query involve filtering based on a column of the plurality of columns, wherein processing of each segment of the set of segments includes generating an output row set for the each segment as a filtered subset of rows included in the each segment via applying the filtering predicates. In various examples, the query resultant is generated based on the output row set of the each segment.

In various examples, the query is executed via a plurality of nodes of the database system. In various examples, the plurality of parallelized processing modules are implemented via one node of the plurality of nodes. In various examples, the set of segments are processed via the plurality of parallelized processing modules based on the set of segments being assigned to the one node for processing. In various examples, the one node generates a partial query resultant via processing the set of segments. In various examples, a plurality of other partial query resultants are generated based on processing of a plurality of other sets of segments via other sets of parallelized processing modules of other nodes of the plurality of nodes. In various examples, the query resultant is generated based on a plurality of partial query resultants that includes the partial query resultant and the plurality of other partial query resultants.

In various embodiments, any one of more of the various examples listed above are implemented in conjunction with performing some or all steps of FIG. 26G. In various embodiments, any set of the various examples listed above can be implemented in tandem, for example, in conjunction with performing some or all steps of FIG. 26G, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26G, for example, in conjunction with further implementing any one or more of the various examples described above.

In various embodiments, the operational instructions, when executed by the at least one processor, cause the database system to: determine a query for execution; determine a set of segments required for executing the query, wherein each of the set of segments has a corresponding segment size of a plurality of segment sizes; process the set of segments via a plurality of parallelized processing modules based on scheduling the set of segments for processing based on the plurality of segment sizes of the set of segments; and/or generate a query resultant for the query based on processing the set of segments.

FIGS. 27A-27F present embodiments of implementing a second strategy for reducing skew in segment scheduling based on processing one or more segments of segment set 2612 via a plurality of different corresponding segment chunks 2714. Some or all features and/or functionality of FIGS. 27A-27F can implement any embodiment of database system 10 described herein.

In some embodiments, the effectiveness of the first strategy for reducing skew is limited by a few factors. For example, the first strategy can rely upon there being a variety of segment sizes available, and for those segments to be located on multiple devices such that accessing them doesn't introduce substantial IO contention. Further, if there are enough segments required for processing such that row-count-based scheduling decisions can be made, then the impact of the imbalance can be small relative to the total runtime of the query anyway. Finally, this approach's sensitivity to segment sizes and number of segments can also mean that more catastrophic cases where this approach did not work well can still persist.

In some embodiments, most direct case where serial query performance is affected by scheduling imbalance is when the number of segments is less than the parallelism factor, dictated by the number of available operator instances (e.g. the number of segments in segment set 2612 is less than W). The vm cores (e.g. processing modules 2610) that don't get assigned a corresponding operator instance can still be available for concurrent queries, but can't perform any work on the original query. Another case worth considering is when the number of segments narrowly exceeds the number of available operator instances. For example, if we have n operator instances and n+1 segments where each segment takes the same amount of time to process, the runtime of the query can be double the time it takes to process a single segment due to one core doing double the work of all the others. It is easy to construct many more similar cases from this demonstrative example.

In embodiments introducing such issues, reducing skew via the first strategy can be limited, especially in the cases where it has the largest impact on overall performance.

FIGS. 27A-27F present embodiment where a second strategy is implemented that enables processing of "segment chunks" corresponding to partial segments, where different subsets of rows of a given segment row set 2624 are processed separately as separate segment chunks, via different processing modules 2610 and/or via a same processing module 2610 serially at different times (e.g. in response to separate requests 2621).

The unideal cases affecting the first strategy of processing segments in full can be mitigated in using the strategy where segment chunks are processed. For example, reconsider the case where those cases is when the number of segments in the set of segments is less than the parallelism factor. Rather than being restricted to creating a number of operator instances equal to the number of segments in the case where a segment has to be processed in its entirety, implementing segment chunking enables a greater number of operator instances to be implemented via parallelized processing modules 2610. For example, a number of operator instances (e.g. a variable numOpInsts) can be created in accordance with implementing following logic:

numOpInsts=MIN(MAX(numTotalRowsInAllSegments/minChunkSize, numSegments), parallelismFactor)

In particular, implementing the maximum (via the MAX) can ensure that at least numSegments operator instances are created, and optionally more if there are enough rows such that each operator instance can get more than minChunkSize rows (e.g. where minChunkSize is a configured minimum chunk size, such as minimum segment chunk size 2838 described herein, and can be implemented as a variable seeking to quantify a transition point in a tradeoff between an additional compute cost of chunking and a gain in serial query performance. In some embodiments, each operator instance then requests avgRowsPerOpInst (e.g. target number of rows 2627) at execution time, rendering chunking of any segment with size between minChunkSize and avgRowsPerOpInst and subsequently, every operator instance can get some of the workload.

In some embodiments, another problematic case can occur when the number of segments slightly exceeds the number of available cores. This case can thus occur anytime numSegments % numCores (where % is the modulus operator) is small, since the first numSegments/numCores (integer division rounded toward 0) segments can generally be processed concurrently while the segments that constitute the mod (or remainder of the division) will get processed on the few remaining active cores during the tail of the query. However, since these cases are effectively an inductive extension to the case discussed previously paragraph, they can be addressed by the same logic. As the number of segments grows, the impact of the tail of the query can becomes smaller relative to the total processing time.

Figure 27A:
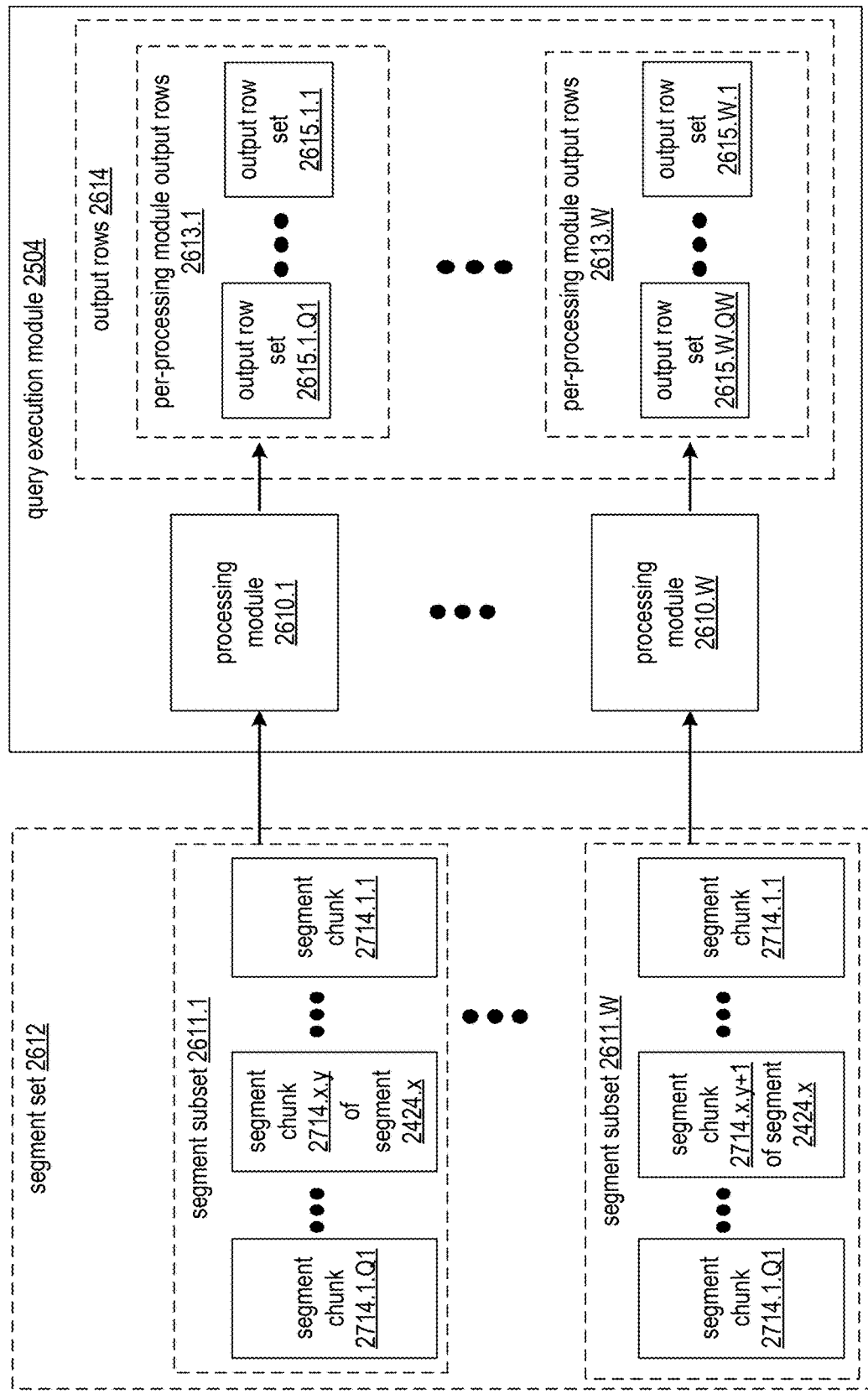
FIG. 27A is a schematic block diagram of a query execution module that generates output rows for a segment set based on processing segment chunks of segments in the segment set via a plurality of processing modules in accordance with various embodiments.

FIG. 27A illustrates an embodiment of database system 10 where a segment set 2612 (e.g. required for execution of a given query) is processed via a plurality of processing modules 2610 to generate output rows 2614 (e.g. a filtered subset of rows included in segments of the segment set, corresponding values of one or more columns to be projected and/or further processed in conjunction with the query, etc.) via processing of at least one segment, including segment 2424.x as a plurality of segment chunks 2414.x processed via different processing modules 2610. For example, such processing is implemented via reading of each corresponding segment chunk 2417 (e.g. reading of rows directly and/or utilizing index structures for the segment to process corresponding rows included in the segment chunk, and not rows included in other segment chunks), for example, via executing corresponding IO pipelines 2835 as discussed previously, and/or as adapted for segment chunks as discussed in conjunction with FIGS. 28A-28B. Some or all features and/or functionality of database system 10 and/or query execution module 2504 of FIG. 27A can implement any embodiment of database system 10 and/or query execution module 2504 described herein. Database system 10 and/or query execution module 2504 of FIG. 27A can be implemented in a similar fashion as database system 10 and/or query execution module 2504 of FIG. 26A, where segments can be processed via multiple different segment chunks via multiple processing modules 2610 rather than being processed as a whole by a single processing module 2610.

While not illustrated, the output rows 2614 can be further processed in conjunction with performing additional query operators of a given query to ultimately generate a query resultant. For example, the output rows 2614 are emitted via one or more nodes 37 implemented at IO level 2416 of a query execution plan 2405.

Each processing module 2610 of a set of parallelized processing modules responsible for processing the set of segments (e.g. some or all processing modules 2610 of query execution module 2504, such as processing modules available for executing the query, some or all processing modules on a corresponding node responsible for processing the set of segments 2612, and/or a set of processing modules that each implement one of the selected number of operator instances as a function of the number of available processing modules, minimum segment chunk size, and/or number of segments in segment set 2612 as discussed previously) can process segment chunks 2714 of a corresponding segment subset 2611 of the segment set. For example, a scheduling module 2618 assigns particular segments 2424 of the segment set 2612 for processing in accordance with applying a corresponding scheduling strategy. The segment chunks 2714 of a given segment subset 2611 are optionally not assigned to a corresponding processing module 2610 all at once (e.g. as a processing module 2610 needs more work it requests more segments). The segment chunks of a given segment subset 2611 are optionally not in any particular order relative to the segment set 2612/are optionally not in any particular order relative to their storage in memory drives.

Processing of each segment chunk 2714 by processing module 2610 can include generating a corresponding output row set 2615 for the corresponding segment chunk 2714 (e.g. a filtered subset of rows included the corresponding segment chunk, corresponding values in the segment of one or more columns to be projected and/or further processed in conjunction with the query, etc.). For example, such processing is implemented via reading of the corresponding segment (e.g. reading of rows directly and/or utilizing index structures for the segment), for example, via executing a corresponding IO pipeline 2835 configured for the segment as discussed herein, and/or only processing ones of the rows included in the segment that are included in the respective segment chunk 2714. Each processing module 2610 can thus generate its own per-processing module output rows 2613 as a plurality of output row sets (or optionally one or zero row sets if only one or zero segment chunks were processed). A given processing module 2610 can be processing a given segment chunk 2714 to generate a corresponding given output row set 2615, concurrently with, in parallel with, and/or independently from some or all other processing modules 2610 processing their own given segment chunks 2714 to generate their own corresponding given output row sets 2615.

Assignment of segment chunks to processing modules can guarantee that each given row included in a given segment of segment set 2612 is processed only once to guarantee query correctness. In some cases, such as in employing the second strategy discussed above, some or all segments are optionally processed via multiple processing modules, where different discrete segment chunks 2714 of the segment are processed separately, still ensuring that each given row included in a given segment of segment set 2612 is processed only once based on each row in the given segment being included in only one segment chunk processed via only one processing module 2610.

Different segment subsets 2611 of segment set 2612 can include same or different numbers of segment chunks (e.g. the value of Q1 is the same or different from the value of QW). Different segments chunks of a given segment subset 2611 can include same or different numbers of rows. Different segments chunks of a given segment 2424 can include same or different numbers of rows (e.g. segment chunk 2714.x.y includes a same or different number of rows as segment chunk 2714.x.y+1). One or more segment chunks 2714 of one or more segment subsets 2611 can optionally correspond to a full segment 2424, where such segments are each chunked into one segment chunk rather than multiple segment chunks.

Figure 27B:
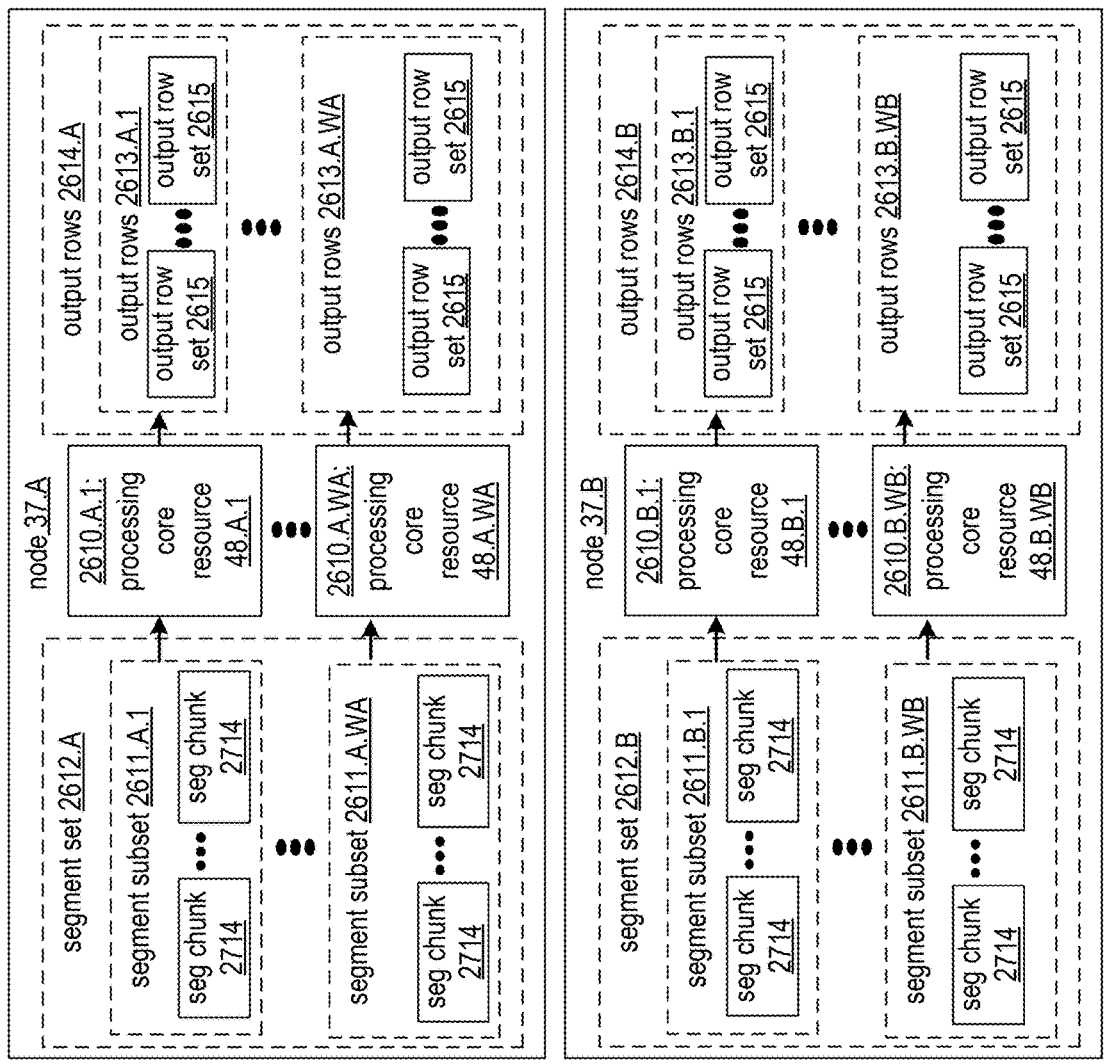
FIG. 27B is a schematic block diagram of a plurality of nodes of a database system that each generate output rows from a corresponding segment set via processing of segment chunks by a corresponding set of processing core resources in accordance with various embodiments.

FIG. 27B illustrates an example where the segment scheduling across processing modules 2610 of FIG. 27A is implemented via one or more individual nodes 37, such as some or all nodes executing the corresponding query via processing their own segment sets 2612 in conjunction with their participation at IO level 2416 of a corresponding query execution plan 2405. Some or all features and/or functionality of database system 10 and/or nodes 37 of FIG. 27B can implement any embodiment of database system 10 and/or nodes 37 described herein. Database system 10 and/or nodes 37 of FIG. 27B can be implemented in a similar fashion as database system 10 and/or nodes 37 of FIG. 26B, where segments can be processed via multiple different segment chunks via multiple processing core resources 48 of a node 37 rather than being processed as a whole by a single processing core resources 48.

In this example, node 37.A processes segment chunks of a first segment set 2612.A via a corresponding set of processing core resources 48.A.1-48.A.WA to generate corresponding output rows 2614.A that includes output row sets across a plurality of per processing module output rows 2613.A.1-2613.A.WA, where the processing core resources 48.A.1-48.A.WA are optionally implemented as a first set of processing modules 2610.1-2610.W. Meanwhile, node 37.B processes segment chunks of a second segment set 2612.B via a corresponding set of processing core resources 48.B.1-48.B.WB to generate corresponding output rows 2614.B that includes output row sets across a plurality of per processing module output rows 2613.B.1-2613.B.WB, where the processing core resources 48.B.1-48.B.WB are optionally implemented as a first set of processing modules 2610.1-2610.W.

FIG. 27C illustrates an embodiment communication between a scheduling module 2618 and a plurality of parallelized processing modules 2610.1-2610.W. Some or all features and/or functionality of processing modules 2610 and/or database system 10 of FIG. 27C can implement any embodiment of processing modules 2610 and/or database system 10 described herein. Processing modules 2610 and/or database system 10 of FIG. 27C can be implemented in a similar fashion as processing modules 2610 and/or database system 10 of FIG. 26C, where segment chunks of a segment can be selected and processed via a processing module rather than requiring segments be selected and processed as a whole via a corresponding processing module.

Scheduling of segment chunks 2714 for processing via processing modules 2610 can be in accordance with scheduling strategy instruction data 2619. For example, the scheduling strategy instruction data 2619 is determined based on being: predetermined; accessed in memory resources of database system 10; received from an external entity, such as a requesting entity, data supplier entity, and/or administrative entity; configured via user input; automatically determined and/or determined in part via artificial intelligence and/or an optimization performed via processing via database system 10; and/or otherwise determined. The scheduling strategy instruction data 2619 can be fixed or updated over time. The scheduling strategy instruction data 2619 can be the same of different for different queries, different datasets being accessed, different requesting entities requesting queries for execution, or other differences. The scheduling strategy instruction data 2619 can be implemented to render employing of the second strategy described above, a strategy configured to reduce idle time and/or to maximize core utilization, and/or to render implementation of any other strategy for scheduling segments via enabling processing of a given segment via multiple segment chunks.

An ith given segment chunk 2714 assigned to a given processing module 2610 for processing can be determined based on a next row set selection module 2620 sending a next row set request 2621.i to a scheduling module (e.g. via a call to a scheduleSegment( ) function), and a corresponding yth segment chunk 2714.x.y of a given segment x can be assigned in response, for example, via a response 2622.i to request 2424.i.

The scheduling module 2618 can be implemented via any processing and/or memory resources of query execution module 2504, or a corresponding node 37, and/or of database system 10. The scheduling module 2618 optionally can be implemented as functionality performed in response to execution of a scheduleSegment( ) function, where a given request 2621 corresponds to a given call to scheduleSegment( ) and/or where responses 2622 correspond to a result/output/data returned in response to the given call to scheduleSegment( ) Some or all such functionality can optionally be performed via processing/memory resources of the corresponding processing module 2610 making the call to scheduleSegment( ) The scheduling module 2618 can be implemented to ensure each given segment 2424 in segment set 2612 is processed via one or more discrete segment chunks 2714, collectively encompassing all rows in the given segment, each processed via exactly one processing module 2610.

The scheduling module 2618 can indicate which segment be selected based on parameters indicated in request 2621 and/or segment set data 2617. For example, the segment set data 2617 indicates which segments are included in segment set 2612, their respective sizes (e.g. number of rows and/or number of bytes), attributes of their respective IO pipelines, which index structures are employed, which segments are stored in which memory devices 2425/locations, which devices are most or least utilized at the given time and available for segment reads currently, which segment have already been assigned in full via one or more segment chunks, vs. having had one or more segment chunks assigned while having a remaining portion not yet assigned vs. not yet having had any segment chunks assigned, and/or other information. The scheduling module can select which segment chunk 2714.x.y of which segment 2424.x is best suited for processing by the processing module 2610 next, for example, based on the parameters indicated in request 2621 and relevant information in segment set data 2617, in accordance with the scheduling strategy instruction data 2619.

Based on this selection of segment chunk 2714.x.y for processing, a next row set processing module 2623 can generate an output row set 2615.i as a filtered subset of segment row subset 2734.x.y (e.g. via execution of a corresponding IO pipeline 2835 for segment 2424.x). For example, a plurality of row subsets 2734.1-2734.S are mutually exclusive and collectively exhaustive with respect to a full segment row set 2624.x of segment 2424.x, and can each be assigned to other processing modules in response to respective requests 2621. The plurality of row subsets 2734.1-2734.S are optionally contiguous sets of rows, and optionally are dispersed in order (e.g. the first 1/5 of rows are assigned for processing one processing module 2610.1 that sent a request first, the next 1/5 of rows are assigned for processing one processing module 2610.1 that sent a request second, etc.). Different row subsets 2734 of the segment 2424 can include same or different numbers of rows. These row subsets are optionally not pre-allocated, and can instead be selected by scheduling module in response to requests 2621 (e.g. bounds of segment subset 2734.x.y are selected to define a corresponding segment chunk 2714.x.y only once next row set request 2621.i is processed). This can include starting a next chunk of a selected segment from a next row immediately after a last row in a prior chunk of this selected segment that was previously allocated.

Subsequent segments can be requested in this manner by processing module 2610.1 in conjunction with execution of the given query (and/or optionally in conjunction with execution of concurrently executing queries). Meanwhile, other processing modules 2610.2-2610.W can be implementing their own next row set selection modules 2620 and next row set processing modules 2623 in a same or similar fashion to render identification and corresponding processing of their own segment chunks 2714.

In this fashion, segment chunks 2714 can be assigned to a given segment subset 2611 of a given processing module 2610 serially, and/or segments 2424 assigned to a segment subset 2611 can be processed serially to generate output row sets 2615 of per processing module output rows 2613 serially. For example, a given processing module 2610 generates its requests 2621 one at a time via next row set selection module 2620, and the segment chunks indicated in corresponding responses are processed via next row set processing module 2623 one at a time.

Meanwhile, while a given processing module 2610 processes its own segment chunks 2714 serially, the segment chunks across different segment subsets 2611 of segment set 2612 can be processed in parallel based on the processing modules 2610 being implemented as parallelized processing resources of database system 10. For example, at a given time, some or all processing modules 2610 of the W processing modules are in the midst of processing exactly one segment chunk 2714. Ideally, at any given time, all processing modules 2610 of the W processing modules are in the midst of processing exactly one segment chunk 2714. The scheduling strategy employed, and indicated in scheduling strategy instruction data 2619 executed by next row set selection modules 2620 of processing modules 2610 and/or by scheduling module 2618, can be implemented to minimize the amount of time less than all of the W processing modules are in the midst of processing exactly one segment chunk 2714 to maximize utilization in some or all cases of query execution.

Figure 27D:
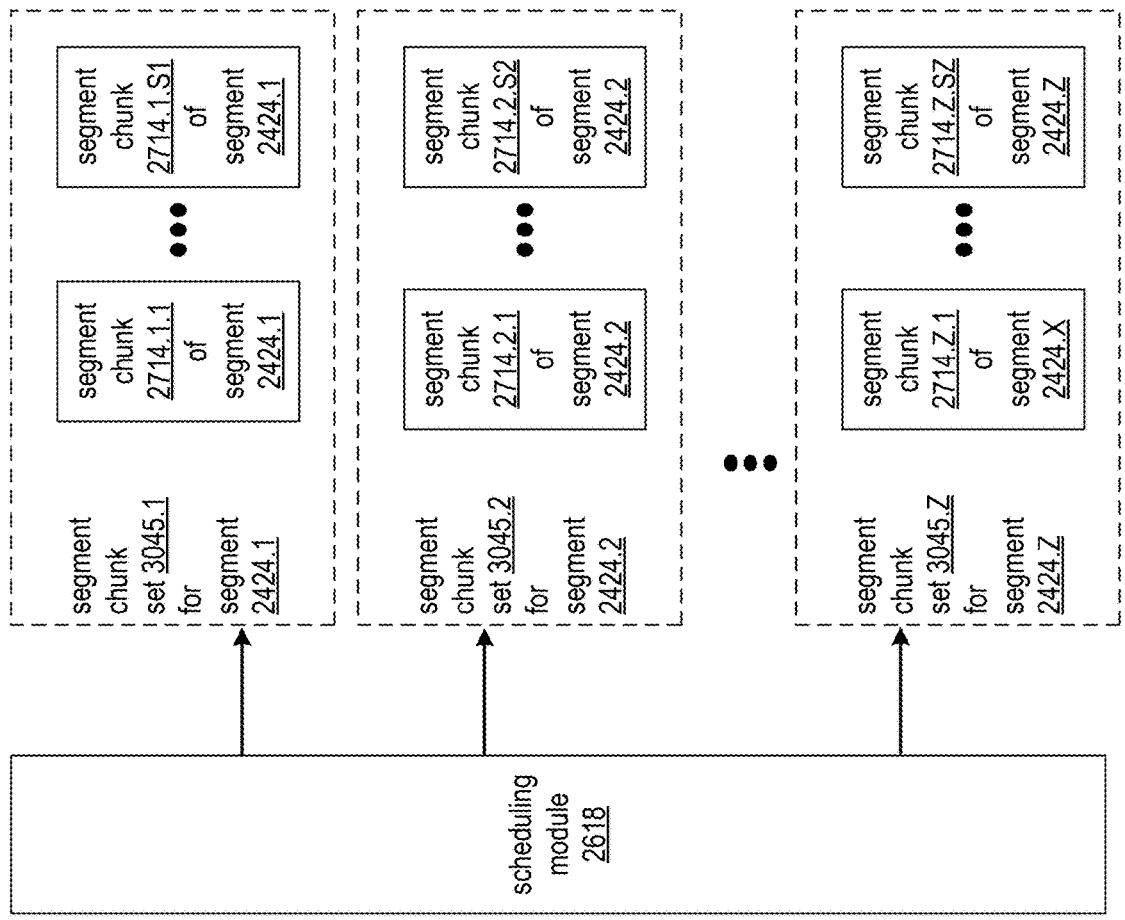
FIG. 27D is a schematic block diagram of a plurality of segment chunk sets for a plurality of segments scheduled for processing via a scheduling module.

FIG. 27D illustrates an embodiment of a scheduling module 2618 of database system 10 that assigns segment chunks of for different segments 2424, rendering distribution of a segment chunk set 3045 for a given segment across a set of parallelized processing modules 2610. Some or all features and/or functionality of scheduling module 2618 and/or database system 10 of FIG. 27C can implement any embodiment of scheduling module 2618 and/or database system 10 described herein.

As discussed previously, each next segment chunk of a given segment can be determined "on the fly" in response to a corresponding request. Alternatively, divvying of a segment into segment chunks can be predetermined, where a predetermined segment chunk is assigned in response to a corresponding request.

Different segment chunk sets 3045 can have same or different numbers of segment chunks (e.g. different segments have different numbers of segment chunks based on different sizes of the corresponding segments, and/or based on other factors considered in applying the scheduling strategy causing the different segments to have different numbers of segment chunks).

A given segment chunk sets 3045 can have segment chunks of same or different sizes (e.g. same or different number of rows/bytes). A first segment chunk set 3045 can have some or all segment chunks of a first size, while a second segment chunk set 3045 can have some or all segment chunks of a second size, which can be the same as or different from the first size.

Some or all segment chunks 2714 in a given segment chunk set can be processed via different processing modules 2610. For example, multiple segment chunks (e.g. non-consecutive chunks relative to row ordering) can be processed by a same processing module at different times, for example, when the number of chunks exceeds the number of processing modules 2610. Different segment chunks 2714 of a given segment can be processed across all W processing modules, or by less than all W processing modules.

One or more segment chunk sets 3045 can include exactly one segment chunk, corresponding to the full segment. For example, the full segment is processed based on the segment being small (e.g. smaller than a minimum chunk size or smaller than 2 times the minimum chunk size), or based on a determination that it is more efficient to process the segment as a whole without implementing chunking (e.g. based on which indexes are accessed in IO pipeline for the segment). For a given query in some or all cases, some segments can be chunked into multiple segment chunks, while others can be processed as a whole via exactly one segment chunk. For a given query in some or all cases, all segments can be chunked into multiple segment chunks.

Figure 27E:
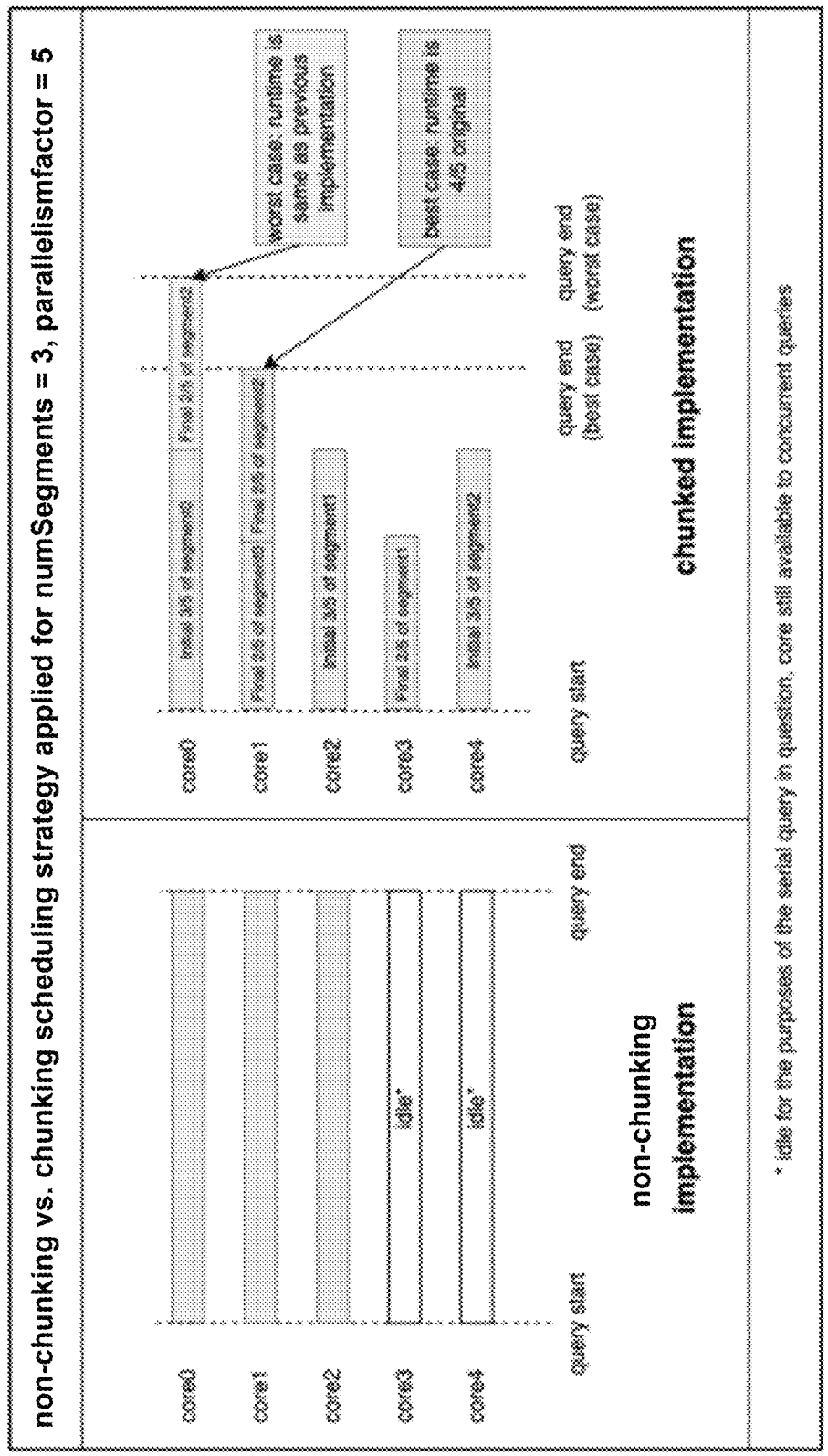
FIG. 27E illustrates example reduction of skew induced by idle time of processing modules via processing of segment chunks in accordance with various embodiments.

FIG. 27E illustrates an example embodiment of how segment scheduling of a given query execution can occur via a chunking-based scheduling strategy being employed (e.g. depending on segment sizes, minChunkSize, and nondeterministic timing) with equally-sized segments that take an equal amount of time to process. The diagram illustrates how a segment strategy employing chunked implementation (e.g. of the first strategy discussed in conjunction with FIGS. 26A-26G) can improve the core utilization over a segment strategy employing non-chunking implementation (e.g. of the segment strategy). For example, as illustrated in the diagram, the order in which chunks are scheduled can affect the overall runtime. In some cases, the chunked implementation of scheduling can actually result in slower query execution. However, a combination of minChunkSize enforcement and scheduling slowdown in the tail of the query due to a check on outstandingOpRows can result in seeing improvement in the aggregate. Embodiments of applying such segment scheduling parameters is discussed in further detail in conjunction with FIGS. 29A-29D.

Figure 27F:
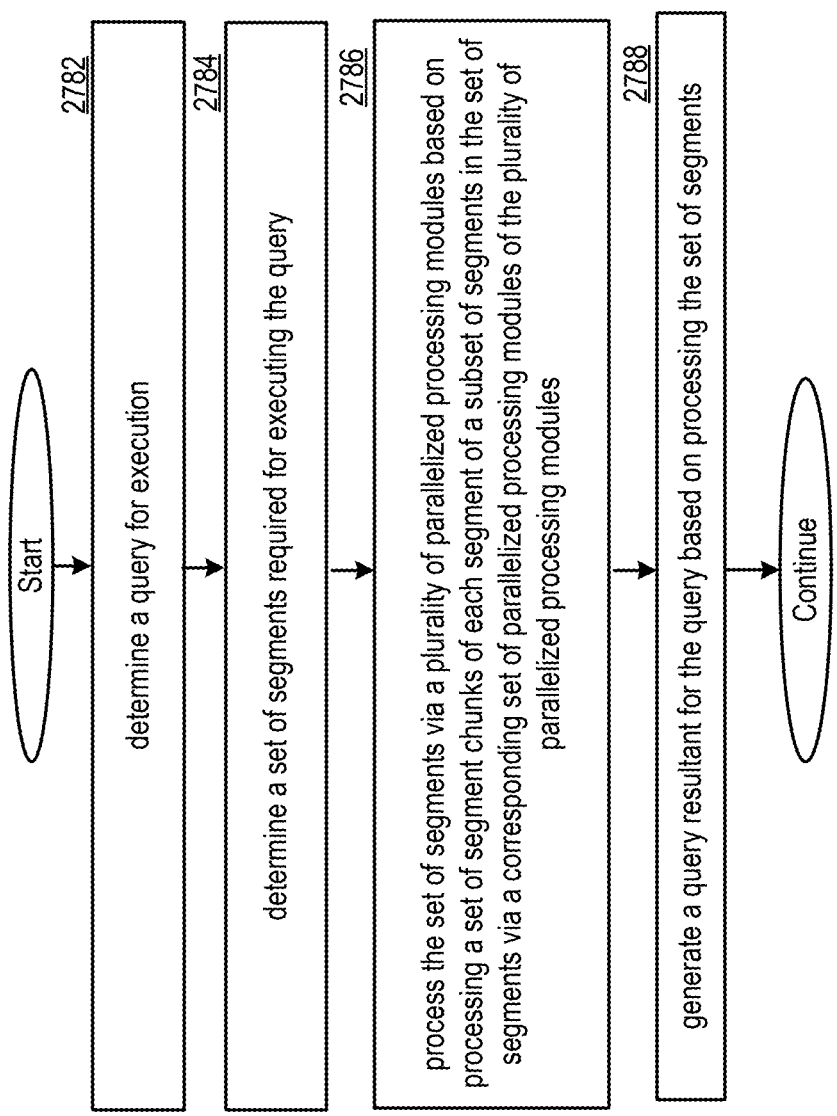
FIG. 27F is a logic diagram illustrating a method for execution in accordance with various embodiments.

FIG. 27F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27F, for example, based on participating in execution of a query being executed by the database system 10. Some or all of the method of FIG. 27F can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 27F based on implementing some or all of a plurality of processing modules 2610.1-2610.W, for example, as a corresponding plurality of processing core resources 48.1-48.W. Some or all of the steps of FIG. 27F can optionally be performed by any other one or more processing modules of the database system 10. Some or all of the steps of FIG. 27F can be performed to implement some or all of the functionality of the database system 10 as described in conjunction with FIGS. 27A-27E, for example, by implementing some or all of the functionality of query execution module 2504, one or more processing modules 2610, next row set selection module 2620, next row set processing module 2623, and/or scheduling module 2618. For example, some or all of the steps of FIG. 27F are based on executing at least one IO pipeline 2835 to process at least one corresponding segment 2424, for example, in conjunction with implementing an IO operator execution module 2840. Some or all steps of FIG. 27F can be performed by database system 10 in accordance with other embodiments of the database system 10 and/or nodes 37 discussed herein. Some or all of the steps of FIG. 27F can be performed in conjunction with performing some or all steps of any other method described herein.

Step 2782 includes determining a query for execution. Step 2784 includes determining a set of segments required for executing the query. Step 2786 includes process the set of segments via a plurality of parallelized processing modules based on processing a set of segment chunks of each segment of a subset of segments in the set of segments via a corresponding set of parallelized processing modules of the plurality of parallelized processing modules. Step 2788 includes generating a query resultant for the query based on processing the set of segments.

In various examples, the subset of segments includes all segments in the set of segments.

In various examples, the subset of segments is a proper subset of the set of segments based on at least one segment of the set of segments being processed via one processing module of the plurality of parallelized processing modules.

In various examples, a first segment of the subset of segments in the set of segments is processed as a first plurality of segment chunks based on each of the first plurality of segment chunks being processed via a corresponding processing module of a first subset of the plurality of parallelized processing modules. In various examples, a second segment of the subset of segments in the set of segments is processed as a second plurality of segment chunks based on each of the second plurality of segment chunks being processed via a corresponding processing module of a second subset of the plurality of parallelized processing modules.

In various examples, the first plurality of segment chunks includes more segment chunks than the second plurality of segment chunks based on the first segment being larger than the second segment. In various examples, the first plurality of segment chunks includes more segment chunks than the second plurality of segment chunks based on at least one of the second plurality of segment chunks including more rows than at least one of the first plurality of segment chunks.

In various examples, the first subset and the second subset are mutually exclusive sets of processing modules.

In various examples, at least one processing module of the plurality of parallelized processing modules is included in both the first subset and the second subset based on processing at least one segment chunk of the first segment and based on further processing at least one segment chunk of the second segment.

In various examples, all of the first subset of processing modules process exactly one segment chunk of the first plurality of segment chunks.

In various examples, at least one of the first subset of processing modules processes more than one segment chunk of the first plurality of segment chunks.

In various examples, a third segment in the set of segments is not included in the subset of segments based on the third segment being processed in full by exactly one processing module of the plurality of parallelized processing modules based on: the first segment and the second segment being larger than the third segment, and/or the third segment having fewer rows than a predetermined target number of rows per processing module.

In various examples, the method further includes selecting a number of parallelized processing modules for utilization in processing the set of segments. In various examples, the plurality of parallelized processing modules that process the set of segments includes exactly the number of parallelized processing modules selected for utilization.

In various examples, the number of parallelized processing modules is selected as a minimum of a first value and a second value. In various examples, the first value is computed as a maximum of a third value and a fourth value, and/or the second value corresponds to a total number of available parallelized processing resources. In various examples, the third value is computed as a dividend computed by dividing a total number of rows across the set of segments by a minimum row set size. In various examples, the fourth value corresponds to a number of segments included in the set of segments.

In various examples, the each of the set of segment chunks corresponds to a row set that includes at least a number of rows of the each segment that is greater than or equal to a minimum number of rows indicated by the minimum row set size.

In various examples, the set of segments are processed via the plurality of parallelized processing modules based on each processing module of the plurality of processing modules processing a corresponding subset of the set of segments via serialized processing of a set of row sets of the corresponding subset of the set of segments.

In various examples, the serialized processing of each row set of the set of row sets of the corresponding subset of the set of segments by the each processing module is based on: automatically selecting, via the each processing module, a requested number of rows to be included in the each row set based on row scheduling parameters; generating, via the each processing module, a scheduling request for the requested number of rows; and/or receiving, via the each processing module, each row set for processing in response to the scheduling request via access to one segment of the set of segments required for execution of the query.

In various examples, all rows across the set of segments are included in a same relational database table that includes a plurality of columns. In various examples, filtering predicates of the query involve filtering based on a column of the plurality of columns. In various examples, processing of each segment chunk of the set of segment chunks of each segment of the subset of segments in the set of segments includes generating an output row set for the each segment chunk as a filtered subset of rows included in the each segment chunk via applying the filtering predicates. In various examples, the query resultant is generated based on the output row set of the each segment chunk.

In various examples, generating the output row set for the each segment chunk as the filtered subset of rows included in the each segment chunk includes executing an IO pipeline generated for the each segment based on the IO pipeline implementing chunk-based row filtering via at least one pipeline element of the set of pipeline elements to configure processing of only rows included in the each segment chunk to guarantee emitting only ones of the rows included in the each segment chunk.

In various examples, the query is executed via a plurality of nodes of the database system. In various examples, the set of parallelized processing modules are implemented via one node of the plurality of nodes. In various examples, the set of segments are processed via the set of parallelized processing modules based on the set of segments being assigned to the one node for processing. In various examples, the one node generates a partial query resultant via processing the set of segments, wherein a plurality of other partial query resultants are generated based on processing of a plurality of other sets of segments via other sets of parallelized processing modules of other nodes of the plurality of nodes. In various examples, the query resultant is generated based on a plurality of partial query resultants that includes the partial query resultant and the plurality of other partial query resultants.

In various embodiments, any one of more of the various examples listed above are implemented in conjunction with performing some or all steps of FIG. 27E. In various embodiments, any set of the various examples listed above can be implemented in tandem, for example, in conjunction with performing some or all steps of FIG. 27E, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27E, for example, in conjunction with further implementing any one or more of the various examples described above.

In various embodiments, the operational instructions, when executed by the at least one processor, cause the database system to: determine a query for execution; determine a set of segments required for executing the query; process the set of segments via a plurality of parallelized processing modules based on processing a set of segment chunks of each segment of a subset of segments in the set of segments via a corresponding set of parallelized processing modules of the plurality of parallelized processing modules; and/or generate a query resultant for the query based on processing the set of segments.

Figure 28A:
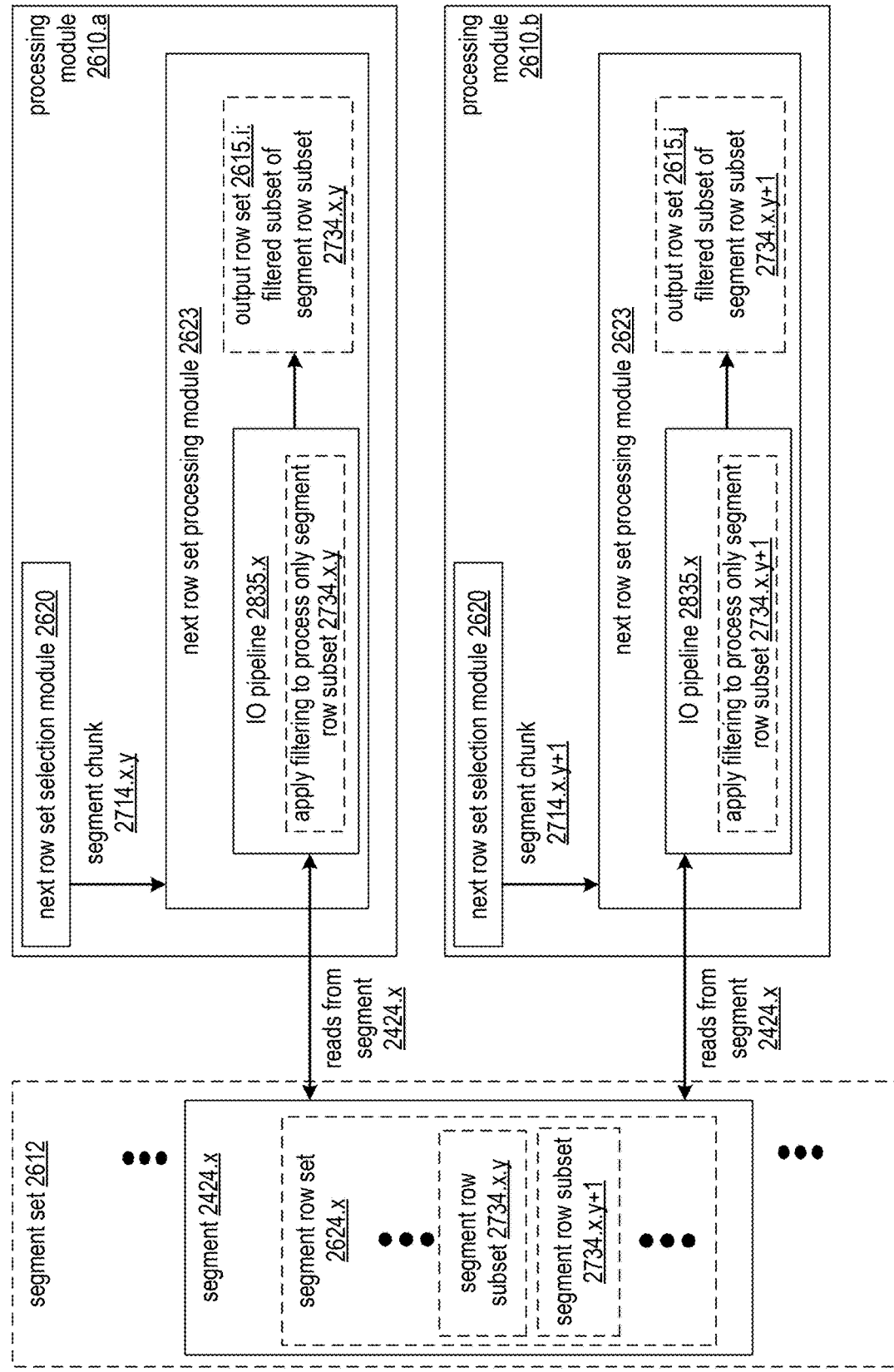
FIG. 28A is a schematic block diagram of a plurality of processing modules that each execute an IO pipeline to process segment chunks of a segment in accordance with various embodiments.
Figure 28B:
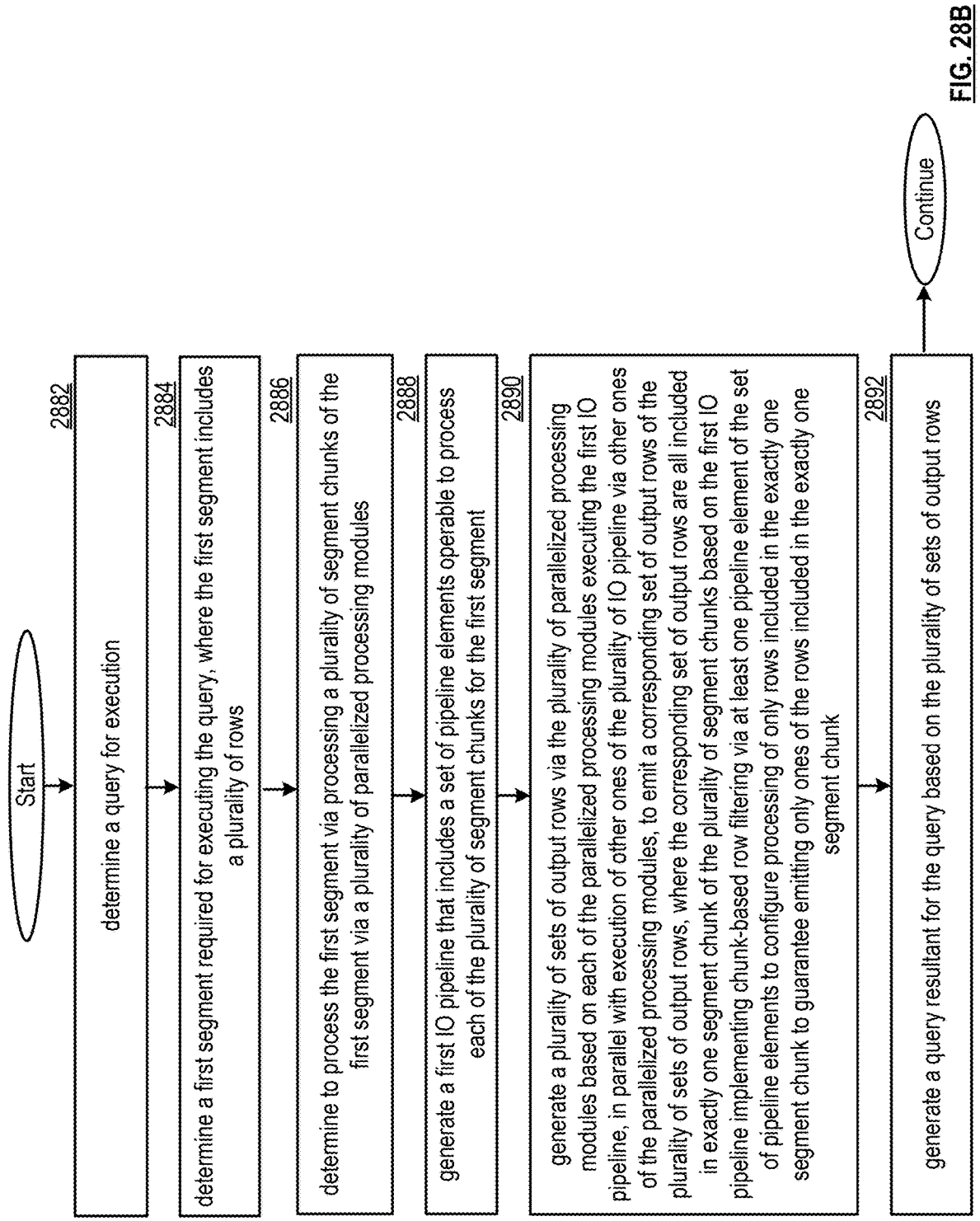
FIG. 28B is a logic diagram illustrating a method for execution in accordance with various embodiments.

FIGS. 28A-28B present embodiments of separately processing segment chunks 2714 of a segment 2424 via filtering for corresponding rows applied via execution of an IO pipeline 2835 for the segment 2424. Some or all features and/or functionality of FIGS. 28A-28B can implement any embodiment of database system 10 described herein.

Implementing support for partial segments (i.e. "segment chunks") can be accomplished via modification to the existing infrastructure in the IO layer (e.g. via any of the implementation of implementing IO pipelines to process full segments described herein). For example, the row filtering capability supported by IO pipelines can be leveraged to process and emit only a given subset of a segment's rows. In some embodiments, this is achieved via modifying a at least one pipeline element to only return rows that fall within the bounds of the segment chunk the pipeline is currently processing (e.g. via modifying a pipeline element base class pipelineElement_t::pullDownstream( ) to only return rows that fall within the bounds of the segment chunk the pipeline is currently processing. In some cases, pipeline processing starts at row 0 and advance until we have covered all the rows in the segment. In some embodiments, fast paths, (e.g. implemented in pullDownstream( )) enable advancing directly to the start of the chunk or end of segment (e.g. whichever is applicable based on where chunk bounds sit in segment) for example, such that no IO or other compute is performed for rows not contained in the chunk.

Another case requiring special consideration is applying a set difference and/or set complement to a row list (e.g. setPipelineElement_t's implementation of rowlist complement). This can be implemented as a commonly-used pipeline element, for example, created upstream of a single index probe that is negated or upstream of a disjunction containing only negated index probes. Although the index lookup itself is adapted to only probe for rows that fall within the chunk, the negation (e.g. performed by a set complement element, such as a set difference element) can also be adapted to respect the chunk bounds (e.g. otherwise, all rows that fall outside the chunk bounds would be considered active/non-filtered).

FIG. 28A presents an embodiment of different processing modules processing different segment chunks 2714 of a given segment 2424.*x* via each processing module 2610 implementing next row set processing module 2623 to execute an IO pipeline 2835.*x* for segment 2424.*x* via applying filtering to process only rows included in the segment row subset 2734 of the corresponding segment chunk 2714 to generate a corresponding output row set 2615 as a filtered subset of the respective segment row subset 2734. Some or all features and/or functionality of next row set processing module 2823, processing module 2610, and/or database system 10 of FIG. 28A can implement any embodiment of next row set processing module 2823, processing module 2610, and/or database system 10 described herein.

In the example of FIG. 28A, two different processing modules 2610.*a* and 2610.*b* of the set of processing modules 2610.1-2610.W process different segment chunks 2714.*x*.y and 2714.*x*.y+1, respectively, of a given segment 2424.*x* via each processing module 2610 implementing next row set processing module 2623 to execute the IO pipeline 2835.*x* for segment 2424.*x*. For example, processing modules 2610.*a* and 2610.*b* execute the IO pipeline 2835.*x* to process the respective segment chunks of segment x concurrently, in overlapping time frames, or distinct time frames, for example, depending on ordering of when the corresponding segment chunks were scheduled for processing by these processing modules.

The IO pipeline 2835.*x* can be implemented via a same arrangement of IO pipeline elements, for example, configured for the respective segment based on the segment (e.g. index elements operable to access index structures for the segment as applicable, etc.). While this IO pipeline is optionally executed multiple times slightly differently to filter for only rows in the corresponding segment, the same IO pipeline is executed, optionally in parallel via different processing modules (e.g. if different chunks are scheduled for execution via different processing modules) or at different times via the same processing module (e.g. if different chunks are scheduled for execution via this same processing module at different times), the same IO pipeline structuring is executed (e.g. the same arrangement of pipeline elements of the pipeline 2835.*x* configured for the given segment 2424.*x*, for example, via IO pipeline generator module 2834 based on segment configuration data 2833.

Such multiple executions of the same IO pipeline 2835.*x* to facilitate processing of different segment chunks of the same given segment 2424.*x* can optionally include traversing some or all rows of the segment multiple times, accessing the same index structure of the segment multiple times, etc., as required for each execution via executing corresponding pipelines, where filtering optionally occurs after such traversals/accesses as required by corresponding structuring of the segment/corresponding index structures. Some filtering can be optionally fast tracked to enable jumping over certain rows, starting from the starting row of the segment chunk and/or ceasing processing after reaching the end row of the segment chunk, etc.

Corresponding chunk-based filtering in each execution of the given IO pipeline 2835.*x* can be applied to guarantee that the output row set 2615 for a given segment chunk includes only rows included in the segment row subset 2734, via processing of all rows of the segment row subset 2734 via the IO pipeline, and filtering out any rows not included in the segment row subset automatically, to ensure no rows appear in multiple different output row sets of different segment chunks of the same segment. Such filtering can be based on generating and filtering via a row list that only includes row numbers for rows included in the segment row subset 2734 of the respective segment chunk 2714 (e.g. applying an intersection of this row list with output of another pipeline element to filter out rows not included in the segment row subset 2734), guaranteeing no negations include rows included outside the segment row subset 2734 (e.g. implementing the set difference in implementing negation to include a set difference of an incoming row list from a row list corresponding to the subset 2734, and not the full segment row set 2624), skipping over/ignoring rows not included in the subset when sourcing rows and/or applying an index element to identify rows in an index structure, and/or otherwise ensuring that rows not included in the subset 2734 are filtered out if processed, or not processed at all.

Meanwhile, different IO pipelines can be executed for segment chunks of different segments, based on being configured to process the different segments. For example, different IO pipeline structuring is executed (e.g. different arrangements of pipeline elements of corresponding different pipeline 2835 configured for different segments 2424, for example, via IO pipeline generator module 2834 based on different segments having different segment configuration data 2833. Execution of each IO pipeline for multiple segment chunks of any given segment of the set of different segments can similarly include adapting the IO pipeline for this given segment to render appropriate filtering for the respective segment chunk accordingly, which can include different adaptations for different segments based on having different types/arrangements of elements in their pipelines.

The next row set processing module 2623 can be implemented to process segment chunks in this fashion based on implementing some or all functionality of the segment chunking-based segment scheduling strategy discussed herein, for example, in conjunction with at least FIGS. 27A-27F. While not illustrated, any other segment chunks processed by processing modules can be similarly processed via adapting a corresponding IO pipeline for the given segment 2424.*x* to filter for row bounds for rows included within the corresponding segment chunk.

In some embodiments, the IO pipeline generator module 2834, IO pipeline 2835, and/or IO operator execution module 2840 implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING" and filed May 28, 2021; U.S. Utility application Ser. No. 17/450,109, entitled "MISSING DATA-BASED INDEXING IN DATABASE SYSTEMS" and filed Oct. 6, 2021; U.S. Utility application Ser. No. 18/310,177, entitled "OPTIMIZING AN OPERATOR FLOW FOR PERFORMING AGGREGATION VIA A DATABASE SYSTEM" and filed May 1, 2023; U.S. Utility application Ser. No. 18/355,505, entitled "STRUCTURING GEOSPATIAL INDEX DATA FOR ACCESS DURING QUERY EXECUTION VIA A DATABASE SYSTEM" and filed Jul. 20, 2023; and/or U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES" and filed Oct. 12, 2023; all of which hereby incorporated herein by reference in its entirety and made part of the present U.S. Utility Patent Application for all purposes. For example, the database system 10 can implement the processing of segment chunks 2714 of segments 2424 via IO pipeline execution for accessing segments 2424 during query execution via implementing some or all features and/or functionality as described in U.S. Utility application Ser. Nos. 17/303,437, 17/450,109, 18/310,177, 18/355,505, and/or 18/485,861, for example, further adapted to only process the rows of the given segment chunk (e.g. via a corresponding filtering element and/or applying corresponding filtering in applying some or all IO pipeline elements) as discussed in conjunction with FIG. 28A to enable some or all functionality of processing segment chunks described herein.

FIG. 28B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28B, for example, based on participating in execution of a query being executed by the database system 10. Some or all of the method of FIG. 28B can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 28B based on implementing some or all of a plurality of processing modules 2610.1-2610. W, for example, as a corresponding plurality of processing core resources 48.1-48.W. Some or all of the steps of FIG. 28B can optionally be performed by any other one or more processing modules of the database system 10. Some or all of the steps of FIG. 28B can be performed to implement some or all of the functionality of the database system 10 as described in conjunction with FIG. 28A, for example, by implementing some or all of the functionality of query execution module 2504, and/or one or more processing modules 2610. For example, some or all of the steps of FIG. 28B are based on executing at least one IO pipeline 2835 to process at least one corresponding segment 2424, for example, in conjunction with implementing an IO operator execution module 2840. Some or all steps of FIG. 28B can be performed by database system 10 in accordance with other embodiments of the database system 10 and/or nodes 37 discussed herein. Some or all of the steps of FIG. 28B can be performed in conjunction with performing some or all steps of any other method described herein.

Step 2882 includes determining a query for execution. Step 2884 includes determining a first segment required for executing the query, where the first segment includes a plurality of rows. Step 2886 includes determining to process the first segment via processing a plurality of segment chunks of the first segment via a plurality of parallelized processing modules. Step 2888 includes generating a first IO pipeline that includes a set of pipeline elements operable to process each of the plurality of segment chunks for the first segment. Step 2890 includes generating a plurality of sets of output rows via the plurality of parallelized processing modules based on each of the parallelized processing modules executing the first IO pipeline (e.g. in parallel with execution of other ones of the plurality of IO pipeline via other ones of the parallelized processing modules) to emit a corresponding set of output rows of the plurality of sets of output rows. In various examples, where the corresponding set of output rows are all included in exactly one segment chunk of the plurality of segment chunks based on the first IO pipeline implementing chunk-based row filtering via at least one pipeline element of the set of pipeline elements to configure processing of only rows included in the exactly one segment chunk to guarantee emitting only ones of the rows included in the exactly one segment chunk. Step 2892 includes generating a query resultant for the query based on the plurality of sets of output rows.

In various examples, the method further includes determining a plurality of segments required for executing the query. In various examples, the plurality of segments includes at least the first segment and a second segment, wherein the second segment includes a second plurality of rows distinct from the plurality of rows.

In various examples, the method further includes generating a plurality of IO pipelines for the plurality of segments. In various examples, the plurality of IO pipelines includes the first IO pipeline. In various examples, the plurality of IO pipelines further includes a second IO pipeline that includes a second set of pipeline elements operable to process the second segment.

In various examples, the method further includes generating a plurality of additional pluralities of output rows. In various examples, each additional plurality of output rows of the plurality of additional pluralities of output rows is emitted via a corresponding set of processing modules processing a corresponding other segment of the plurality of segments via execution of a corresponding IO pipeline of the plurality of IO pipelines. In various examples, the query resultant is further generated based on the plurality of additional pluralities of output rows. In various examples, a first plurality of output rows of the plurality of additional pluralities of output rows is generated via the plurality of parallelized processing modules as the plurality of sets of output rows. In various examples, a second plurality of output rows of the plurality of additional pluralities of output rows is generated via a second set of processing modules via processing the second segment.

In various examples, the method further includes determining to process the second segment via processing a second plurality of segment chunks via a second plurality of parallelized processing modules as the second set of processing modules. In various examples, the second plurality of parallelized processing modules generates the second plurality of output rows as a second plurality of sets of output rows of the plurality of additional pluralities of sets of output rows based on each of the parallelized processing modules of the second plurality of parallelized processing modules executing the second IO pipeline to emit a corresponding set of output rows of the second plurality of sets of output rows. In various examples, the corresponding set of output rows of the second plurality of sets of output rows is a subset of rows included in exactly one segment chunk of the second plurality of segment chunks based on the first IO pipeline implementing the chunk-based row filtering via at least one pipeline element of the second set of pipeline elements to configure processing of only rows included in the exactly one segment chunk of the second segment to guarantee emitting only ones of the rows included in the exactly one segment chunk of the second segment.

In various examples, the method further includes determining to process the second segment via processing all of the second segment chunks via a single processing module. In various examples, the second set of processing modules includes only the single processing module. In various examples, the second plurality of output rows is generated as a single set of output rows generated via the single processing module based on the single processing module executing the second IO pipeline. In various examples, the second IO pipeline processes all rows of the second segment based on foregoing the chunk-based row filtering.

In various examples, the first IO pipeline is configured via a first arrangement of pipeline elements selected based on the first segment. In various examples, the second IO pipeline is configured via a second arrangement of pipeline elements selected based on the second segment. In various examples, the first arrangement of pipeline elements is different from the second arrangement of pipeline elements based on the first segment being different from the second segment.

In various examples, the plurality of rows and the second plurality of rows belong to a same relational database table that includes a plurality of columns. In various examples, filtering predicates of the query involve filtering based on a column of the plurality of columns. In various examples, a first indexing strategy is applied to a column of the plurality of columns in the first segment, and/or a second indexing strategy is applied to the column of the plurality of columns in the second segment. In various examples, the first IO pipeline is configured, based on the first indexing strategy, to apply the filtering predicates via the first arrangement of IO pipeline elements. In various examples wherein the second IO pipeline is configured, based on the second indexing strategy, to apply the filtering predicates via the second arrangement of IO pipeline elements. In various examples the first arrangement of pipeline elements is different from the second arrangement of pipeline elements based on the first indexing strategy being different from the second indexing strategy.

In various examples, a plurality of parallelized nodes generate the plurality of sets of output rows and the plurality of additional pluralities of output rows. In various examples, each of the plurality of segments are assigned for query processing via a single corresponding node the plurality of parallelized nodes. In various examples, the plurality of sets of output rows is generated via the plurality of parallelized query resources based on a first node implementing the plurality of parallelized query resources and/or further based on the first segment being assigned to the first node for query processing. In various examples, the second plurality of sets of output rows is generated via the second set of query resources based on a second node implementing the second set of query resources and/or further based on the second segment being assigned to the second node for query processing.

In various examples, the plurality of segment chunks collectively include all of the plurality of rows of the segment. In various examples, a plurality of corresponding proper subsets of the plurality of rows across the plurality of segment chunks are mutually exclusive and collectively exhaustive with respect to the plurality of rows.

In various examples, the first pipeline element of the set of pipeline elements is operable to emit all rows included in the each segment chunk and not other rows included in any other segment chunks. In various examples, the corresponding proper subset corresponds to the all rows included in the each segment chunk.

In various examples, the plurality of sets of output rows constitute only a proper subset of the plurality of rows included in the segment based on, for at least one of the parallelized processing modules, the corresponding set of output rows being a proper subset of rows included in the exactly one segment chunk of the plurality of segment chunks based on the first IO pipeline being operable to further filter the corresponding proper subset of the plurality of rows in conjunction with applying at least one query predicate of the query.

In various examples, the corresponding set of output rows is a proper subset of rows included in the exactly one segment chunk of the plurality of segment chunks based on execution of at least one other pipeline element that is implemented as at least one of: a source element, an index element, a filter element, a set intersect element, or a set difference element.

In various examples, the set of pipeline elements includes a set difference element. In various examples, the set difference element is configured to emit rows corresponding to set difference between a filtered set of rows generated by at least one previous pipeline element of the set of pipeline elements serially before the set difference element, and the corresponding proper subset of the plurality of rows of the first segment. In various examples, the rows emitted by the set difference element includes no rows included in any other ones of the plurality of segment chunks.

In various examples, the each of the parallelized processing modules executes the first IO pipeline in parallel with execution of the first IO pipeline via other ones of the parallelized processing modules.

In various examples, the plurality of rows have a corresponding plurality of row numbers. In various examples, the chunk-based row filtering is implemented based on applying row number-based filtering parameters to render processing only rows of the plurality of rows having row numbers comparing favorably to at least one of: a lower row number bound of the row number-based filtering parameters, or an upper row number bound of the row number-based filtering parameters.

In various examples, the chunk-based row filtering is implemented based on the at least one pipeline element processing a row list as input and emitting a subset of the row list as output. In various examples, the row list includes only row numbers comparing favorably to the row number-based filtering parameters.

In various embodiments, any one of more of the various examples listed above are implemented in conjunction with performing some or all steps of FIG. 28B. In various embodiments, any set of the various examples listed above can be implemented in tandem, for example, in conjunction with performing some or all steps of FIG. 28B, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28B, for example, in conjunction with further implementing any one or more of the various examples described above.

In various embodiments, the operational instructions, when executed by the at least one processor, cause the database system to: determine a query for execution; determine a first segment required for executing the query, wherein the first segment includes a plurality of rows;

determine to process the first segment via processing a plurality of segment chunks of the first segment via a plurality of parallelized processing modules; generate a first IO pipeline that includes a set of pipeline elements operable to process each of the plurality of segment chunks for the first segment; generate a plurality of sets of output rows via the plurality of parallelized processing modules based on each of the parallelized processing modules executing the first IO pipeline, in parallel with execution of other ones of the plurality of IO pipeline via other ones of the parallelized processing modules, to emit a corresponding set of output rows of the plurality of sets of output rows, wherein the corresponding set of output rows are all included in exactly one segment chunk of the plurality of segment chunks based on the first IO pipeline implementing chunk-based row filtering via at least one pipeline element of the set of pipeline elements to configure processing of only rows included in the exactly one segment chunk to guarantee emitting only ones of the rows included in the exactly one segment chunk; and/or generate a query resultant for the query based on the plurality of sets of output rows.

FIGS. 29A-29D present embodiments of implementing segment chunk-based segment scheduling based on processing modules 2610 selecting a requested number of rows 2631 for processing and being assigned segment chunks 2714 based on the requested number of rows and segment set data 2617. Some or all features and/or functionality FIGS. 29A-29D can implement any embodiment of database system 10 described herein.

In some embodiments, the scheduling module 2618 (e.g. implemented via a corresponding TKT segment scheduler interface) can be adapted to enable requests 2621 (e.g. calls to scheduleSegment( ) to return both a segment 2424 (e.g. tktSegment_i) as well as the bounds of the segment that the processing module (e.g. corresponding caller implemented via the corresponding operator instance) needs to return results for. These chunk bounds can be any subset of [0, segmentRowCount), subject to restrictions imposed by the segment scheduling instruction data 2619.

To allow operator instances implemented via corresponding processing module 2610 to make decisions about how many rows they get per call, the requests 2621 can be implemented based on row set scheduling parameters 2625 (e.g. scheduleSegment( ) can be implemented via corresponding arguments). The requests 2621 can include and/or be based row set scheduling parameters 2625 that include/are based on some or all of the following: requestedRowCount (e.g. requested number of rows 2631); minChunkSize (e.g. minimum segment chunk size 2838); and/or canChunk.

In some embodiments, requestedRowCount (e.g. requested number of rows 2631) corresponds to an upper bound on the number of rows the operator instance would like to get in the segment chunk returned from this call. It may get fewer rows if there is no unprocessed segment with enough rows or there is an in-progress segment (with rows remaining in final chunk<requestedRowCount) that still need to finish. It may get more rows than requested if the request is less than the minChunkSize. This argument can allow operator instances to request fewer rows as they near their target number of rows to process, which allows for more granular scheduling of work in the tail of the query.

In some embodiments, minChunkSize (e.g. minimum segment chunk size 2838) corresponds to the minimum size (e.g. in number of rows) of segment chunk the scheduler should return for this call. This can be ultimately set via a runtime-mutable vm core configuration parameter (e.g. configured by the processing module 2610 in generating the call). The scheduling module 2618 can be implemented to ensure in each scheduleSegment( ) call that the scheduling module doesn't end up with less than minChunkSize rows remaining to hand out next call—in that case, the scheduling module 2618 can extend the rows returned to the end of the segment even if that results in returning more than requestedRowCount rows. This can be an important tuning variable in addressing the tradeoff between more granular scheduling and the added cost of chunking a segment.

In some embodiments, canChunk is implemented as a lambda taking a tktSegment_i as an argument and returning whether or not that segment can be chunked. This function can be optionally evaluated under the TKT segment scheduler's mutex, and/or can be a quickly-executable conservative check rather than an exact one. For example, an exact check can necessitate effectively compiling the pipeline and checking if it contains elements that prevent chunking. In our case, this fast check disables chunking if: a stats sampling query is the query being executed, as downsamplePipelineElement_t shouldn't have anything downstream; there is a legacy CK index present on the segment, even if the query won't necessarily create a legacyClusterKeyIndex-SourcePipelineElement_t due to the plan; and/or a SEGMENT DISTINCT query is the query being executed, as it may invoke the index distinct optimization whose pipeline element doesn't allow downstream elements.

In some embodiments, if a chunk of a segment is handed out, the scheduling strategy is implemented to continue handing out chunks of that segment until the entirety of it has been given to operator instances to increase the likelihood that its CK indexes will still be in the partition cache. If we ultimately implement delayed segment loading or a similar effort to move necessary segment metadata out of memory, whatever caching mechanism is used there will perform better if chunks of the same segment are scheduled within the smallest window of time possible. Given that op instances are more likely to request fewer rows towards the tail of the query, it made sense to return to giving out segments in order of descending row count.

In some embodiments, the responsibility of deciding how many rows to request per call to scheduleSegment( ) is in the hands of the operator instances themselves.

In some embodiments, alternatively or in addition to the minChunkSize, another configurable vm core param called maxInflightRatio (e.g. max inflight ratio 2839) can optionally be implemented as a configured maximum ratio of the number of target rows (avgRowsPerOpInst) that an operator instance should have scheduled but not yet processed at any given time. For example, this can be useful to ensure that if an operator instance has scheduled but hasn't yet processed a substantial portion of its target, it shouldn't claim another segment chunk and should instead wait until it makes progress on the segments it has already claimed. This can be an applicable case to optimize for, for example, in cases where the database system 10 has longest running operator instances that otherwise often claims several read-ahead segments near the tail of the query.

For the first segment to be scheduled, the operator instances each request the avgRowsPerOpInst (e.g. as a corresponding value received from the scheduler and/or otherwise determined for the query). This can render the largest segment available if the avgRowsPerOpInst is substantially larger than the segment sizes (e.g. can happen if numSegments>>parallelismFactor), or the share of total rows the operator instance expects to process if numSegments is close to or less than parallelismFactor. Using avgRowsPerOpInst can be useful in either case. In addition, the operator instance can limit itself to scheduling one segment during its first cycle to give other operator instances time to take their share of the rows.

For subsequent calls to scheduleSegment( ) the operator instance can choose the number of rows to request, for example, via implementing some of all of the following logic:

```
outstandingOpRows = rowsScheduled - rowsProcessed
if (avgRowsPerOpInst - rowsScheduled <= minChunkSize):
    if (outstandingOpRows < minChunkSize):
        rowsToRequest = minChunkSize
    else:
        exit
else if outstandingOpRows >= maxInflightRatio * avgRowsPerOpInst:
    exit
else:
    rowsToRequest = MAX(minChunkSize, avgRowsPerOpInst - rowsScheduled)
```

For example, the rowsToRequest is set as the minChunkSize when avgRowsPerOpInst−rowsScheduled<=minChunkSize and when outstandingOpRows <minChunkSize to ensure that once the target number of rows has been scheduled less than minChunkSize rows are outstanding, request another minChunkSize-sized chunk is requested. Meanwhile when avgRowsPerOpInst−rowsScheduled<=minChunkSize and when outstandingOpRows>minChunkSize, the request is not made at the corresponding time/is delayed because the target number of rows have been scheduled and have more than minChunkSize outstanding, ensuring the operator instance doesn't claim more than 2*minChunkSize rows. Additionally, when avgRowsPerOpInst−rowsScheduled> minChunkSize and outstandingOpRows>=maxInflightRatio*avgRowsPerOpInst, the request is similarly not made at the corresponding time/is delayed to ensure some of the outstanding rows are processed before claiming more. In some embodiments, the maxInflightRatio is not utilized and/or is set as 1.0 to effectively disable use of this variable. When none of these cases are true the rowsToRequest is set as MAX(minChunkSize, avgRowsPerOpInst−rowsScheduled). This can be the path most often taken for the bulk of query execution: request until the target number of rows is reached.

In some embodiments, the fact that that scheduling module 2618 knows how many rows remain to be given out for the query can be leveraged. For example, in implementing the operator-instance-driven approach described herein, an uncharacteristically fast operator instance may reach its target before the tail of the query is actually reached, and all the operator instances knows is that it has hit its own target. This can be utilized to enable operator instances to adapt their requested number of rows accordingly to further reduce idle time and/or to further improve core utilization.

Figure 29A:
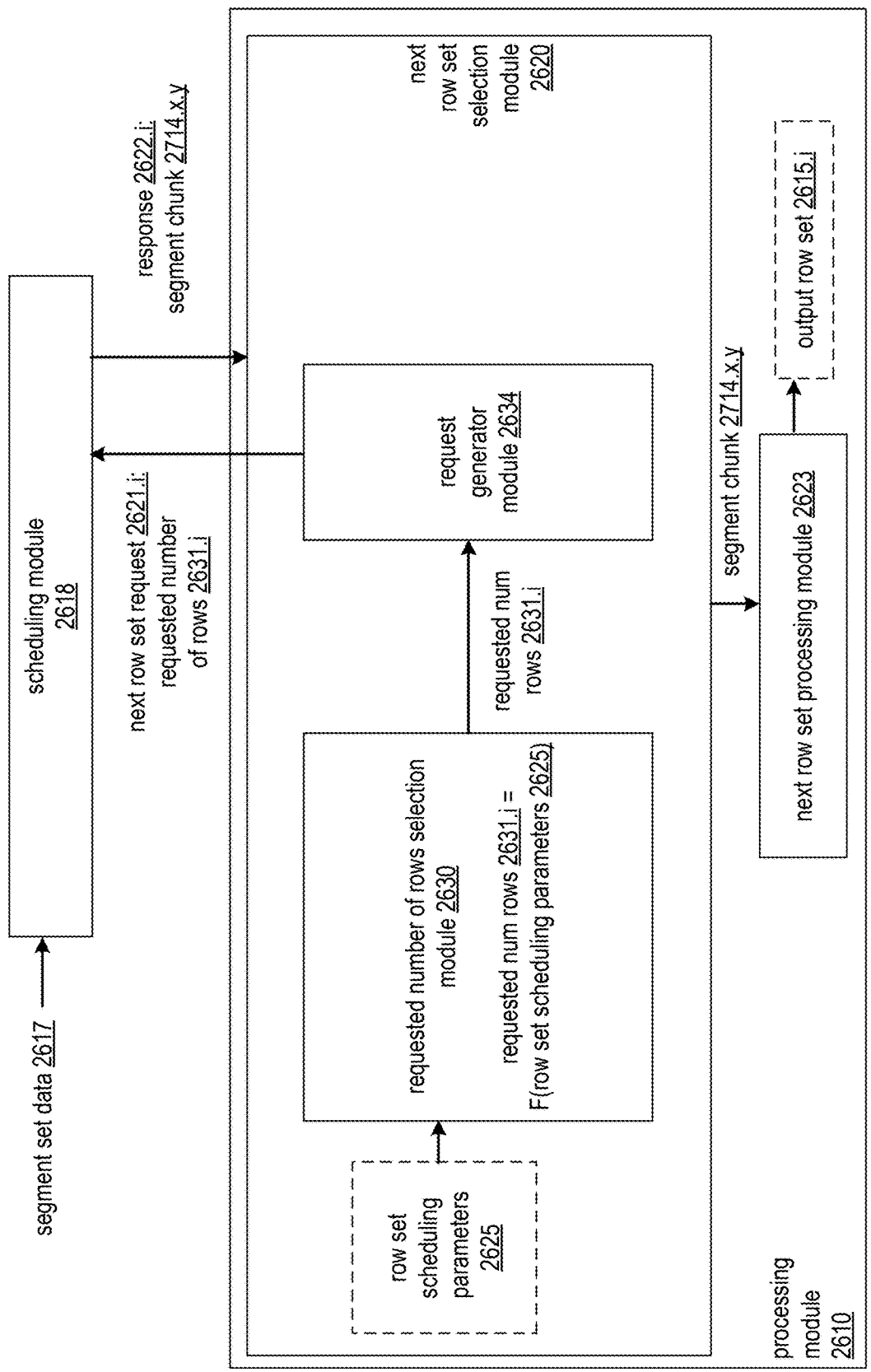
FIG. 29A is a schematic block diagram of a processing module that processes a segment chunk based a response to a requested number of rows in accordance with various embodiments.

FIG. 29A illustrates an embodiment of next row set selection module 2620 that implements a requested number of rows selection module 2630 to select a requested number of rows 2631.$i$ for the next segment chunk to be scheduled, where a request generator module 2634 generates the corresponding request to indicate this selected requested number of rows 2631.$i$. Some or all features and/or functionality of the next row set selection module 2620, processing module 2610, and/or database system 10 of FIG. 29A can implement any embodiment of the next row set selection module 2620, processing module 2610, and/or database system 10 described herein. Some or all features and/or functionality of next row set selection module 2620, processing modules 2610, and/or database system 10 of FIG. 29A can be implemented in a similar fashion as next row set selection module 2620, processing modules 2610 and/or database system 10 of FIGS. 26E, where the requested number of rows 2631 can dictate the number of rows included in a segment chunk assigned for processing, rather than the size of a full segment assigned for processing.

The requested number of rows 2631.$i$ can be selected as a function F of row set scheduling parameters 2625. For example, the scheduling strategy instruction data 2619 dictates the row set scheduling parameters 2625 and/or the function F.

The scheduling module 2618 can select the segment chunk 2714.$x$.$y$ based on the requested number of rows 2631.$i$ in the given next row set request 2621.$i$. For example, a segment chunk is configured to have exactly the same number of, or less than (e.g. close to), the number of rows to the requested number of rows 2631.$i$, where the requested number of rows 2631.$i$ is treated as an upper bound on the size of the segment chunk by the scheduling module 2618. The scheduling module can further select which segment to select the segment chunk from, for example, based on: being the segment from which a prior segment chunk was most recently assigned and having remaining rows to assign; based on having a number of remaining rows not yet scheduled in other chunks that is greater than/close to the requested number of rows 2631.$i$; being stored in a least utilized device (e.g. least utilized memory drive 2425/least utilized node 37) at the given time; and/or being stored in any of a set of the n least utilized device (e.g. least utilized memory drive 2425/least utilized node 37), where the number n devices to search is configurable/is set by the scheduling strategy instruction data 2619. Selection of segment chunk 2714.$x$.$y$ can otherwise be performed based on the requested number of rows 2631.$i$.

Figure 29B:
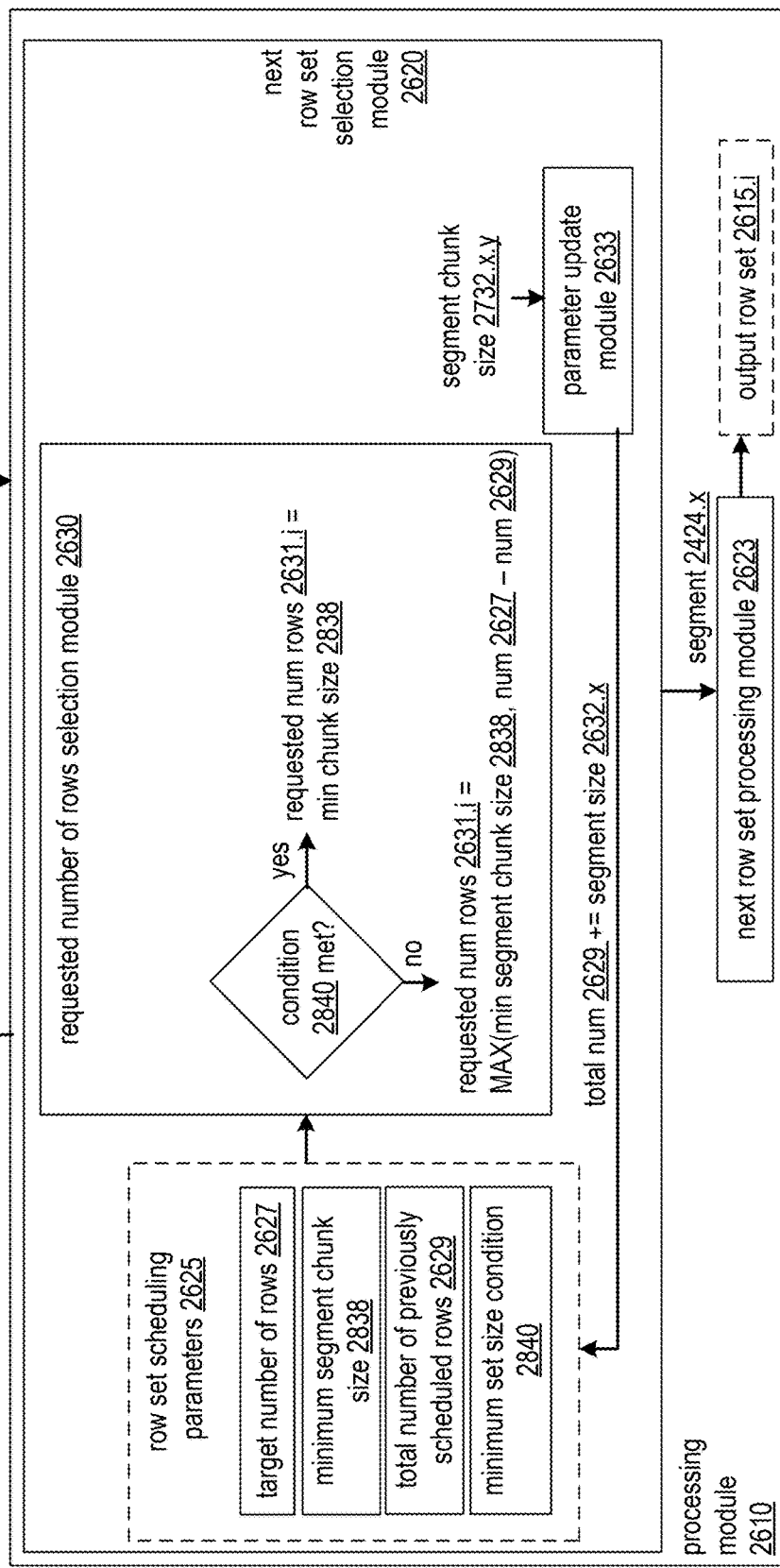
FIG. 29B is a schematic block diagram of a processing module that processes a segment chunk based a response to a requested number of rows selected based on row scheduling parameters in accordance with various embodiments.

FIG. 29B illustrates an example embodiment of requested number of rows selection module 2630 selecting the requested number of rows as a particular function of particular row scheduling parameters. Some or all features and/or functionality of the requested number of rows selection module 2630 and/or processing module 2610 of FIG. 29B can implement any embodiment of the next row set selection module 2620, processing module 2610, and/or database system 10 described herein.

The row set scheduling parameters 2625 can indicate a target number of rows 2627, a minimum segment chunk size 2838, a total number of previously scheduled rows 2629, and/or a minimum set size condition 2840.

The target number of rows can be computed as the dividend determined by dividing the total number of rows across all segments in segment set 2612 by the number of processing modules W being implemented to process the segment set 2612. This target number of rows can be common across all processing modules 2610 in processing the given query, for example, to ensure all processing modules aim to process the same number of rows. In other embodiments, different processing modules have different targets, for example, based on differences in processing efficiency of different processing modules processing a given segment set, where more efficient processing modules have higher targets than less efficient processing modules.

The minimum segment chunk size 2838 can be common across all processing modules 2610 in processing the given query, for example, to ensure segments are chunked in accordance with adhering to this minimum across all processing modules. In other embodiments, different processing modules have different minimum segment chunk sizes, for example, based on differences in processing efficiency of different processing modules processing a given segment set.

The requested number of rows selection module 2630 can determine whether the minimum set size condition 2840 is met. When the minimum set size condition 2840 is met, the requested number of rows 2631.*i* can be set as the minimum chunk size 2838. When the minimum set size condition 2840 is unmet the requested number of rows 2631.*i* can be set as a maximum of two values: the minimum segment chunk size 2838, or a difference computed as the target number of rows 2627 minus the total number of previously scheduled rows 2629.

A parameter update module 2633 can update the total number of previously scheduled rows 2629 based on the segment chunk size 2732.*x*.*y* of the given segment chunk, where the new total is utilized in generating the subsequent request 2621.*i*+1.

Figure 29C:
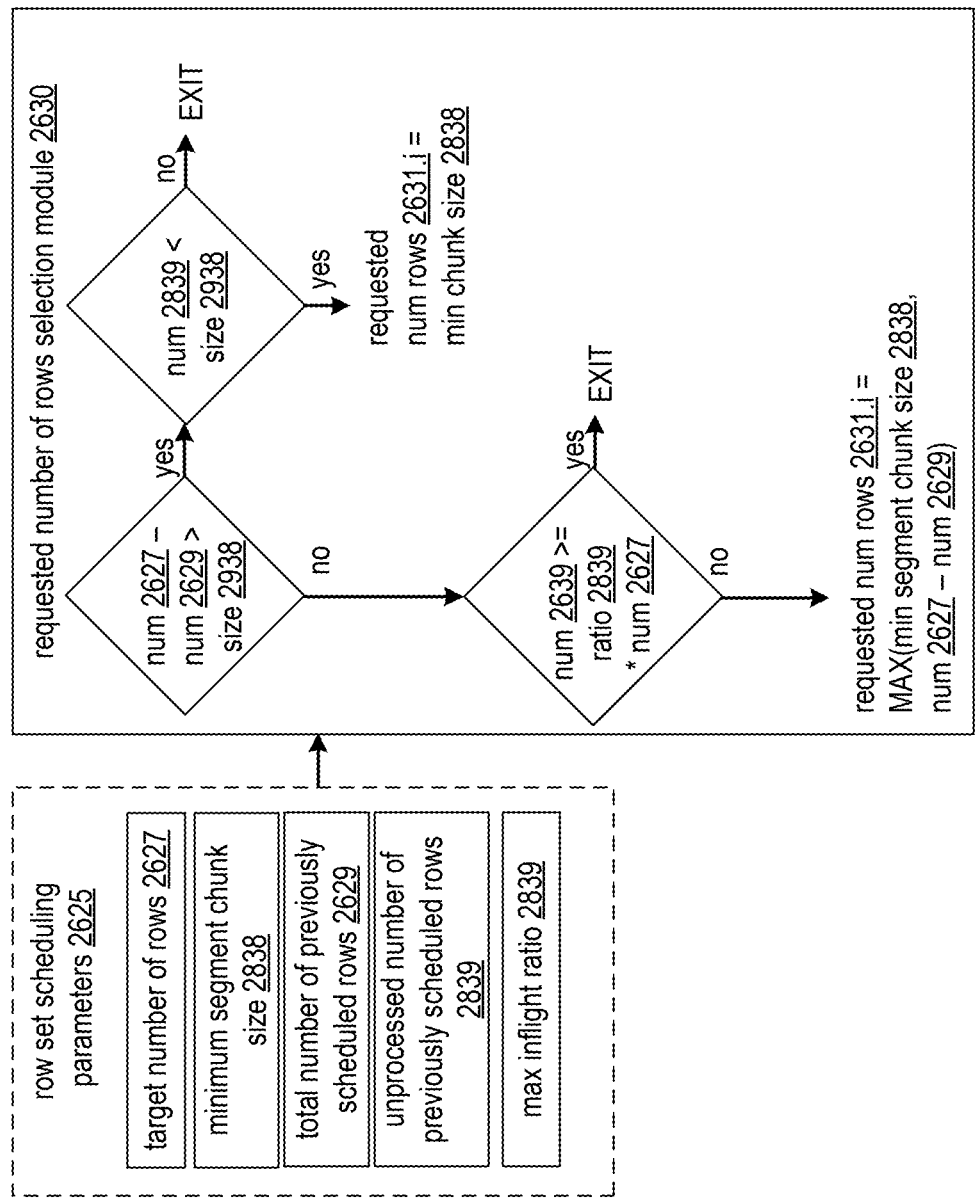
FIG. 29C is a schematic block diagram of a processing module selects a requested number of rows based on row scheduling parameters in accordance with various embodiments.
Figure 29D:
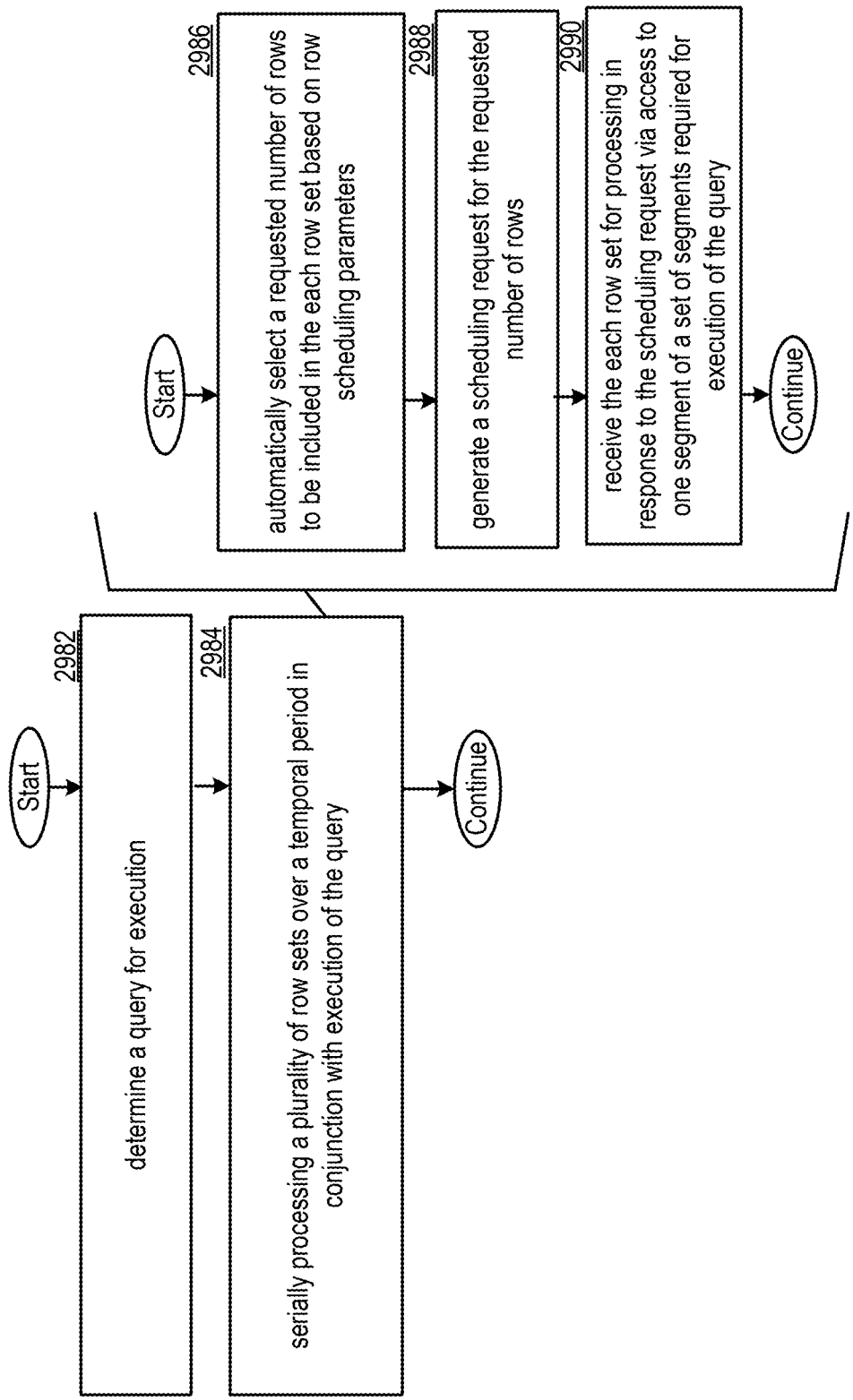
FIG. 29D is a logic diagram illustrating a method for execution in accordance with various embodiments.

FIG. 29C illustrates an example embodiment of next row set selection module 2620 selecting the requested number of rows as a particular function of particular row scheduling parameters. Some or all features and/or functionality of the next row set selection module 2620, processing module 2610, and/or database system 10 of FIG. 29C can implement any embodiment of the next row set selection module 2620, processing module 2610, and/or database system 10 described herein.

The row set scheduling parameters 2625 can further indicate an unprocessed number of previously scheduled rows 2839 and/or a max inflight ratio 2839. For example, the condition 2840 can be configured as a condition dictated by some or all of the row set scheduling parameters 2625.

The requested number of rows selection module 2630 can determine whether the difference computed as the target number of rows 2627 minus the total number of previously schedule rows 2629 is greater than the minimum segment chunk size 2838. This condition can optionally be a first sub-condition of minimum set size condition 2840. When the difference computed as the target number of rows 2627 minus the total number of previously schedule rows 2629 is greater than the minimum segment chunk size 2838, the requested number of rows selection module 2630 can exit (e.g. delay requesting for a later time) when the unprocessed number of previously scheduled rows 2839 is greater than or equal to the minimum segment chunk size, and/or can set the requested number of rows 2631.*i* as the minimum chunk size 2838 when the when the unprocessed number of previously scheduled rows 2839 is less than the minimum segment chunk size (e.g. this condition is optionally a second sub-condition of minimum set size condition 2840).

The requested number of rows selection module 2630 can determine whether the difference computed as the target number of rows 2627 minus the total number of previously schedule rows 2629 is less than or equal to the minimum segment chunk size 2838, the requested number of rows selection module 2630 can exit (e.g. delay requesting for a later time) when the unprocessed number of previously scheduled rows 2839 is greater than or equal to the max inflight ratio multiplied by the target number of rows 2627 (or optionally when the unprocessed number of previously scheduled rows 2839 is greater than or equal to target number of rows 2627 if the max inflight ratio is not implemented), and/or can set the requested number of rows 2631.*i* as the a maximum of two values: the minimum segment chunk size 2838, or a difference computed as the target number of rows 2627 minus the total number of previously scheduled rows 2629.

FIG. 29D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29D, for example, based on participating in execution of a query being executed by the database system 10. Some or all of the method of FIG. 29D can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 29D based on implementing some or all of a plurality of processing modules 2610.1-2610.W, for example, as a corresponding plurality of processing core resources 48.1-48.W. Some or all of the steps of FIG. 29D can optionally be performed by any other one or more processing modules of the database system 10. Some or all of the steps of FIG. 29D can be performed to implement some or all of the functionality of the database system 10 as described in conjunction with FIGS. 29A-29C, for example, by implementing some or all of the functionality of query execution module 2504, one or more processing modules 2610, next row set selection module 2620, next row set processing module 2623, and/or scheduling module 2618. For example, some or all of the steps of FIG. 29D are based on executing at least one IO pipeline 2835 to process at least one corresponding segment 2424, for example, in conjunction with implementing an IO operator execution module 2840. Some or all steps of FIG. 29D can be performed by a single processing module 2610, where multiple processing modules 2610 execute some or all steps of FIG. 29D, for example, in parallel and/or during overlapping time frames. Some or all steps of FIG. 29D can be performed by database system 10 in accordance with other embodiments of the database system 10 and/or nodes 37 discussed herein. Some or all of the steps of FIG. 29D can be performed in conjunction with performing some or all steps of any other method described herein.

Step 2982 includes determining a query for execution. Step 2984 includes serially processing a plurality of row sets over a temporal period in conjunction with execution of the query.

Performing step 2984 can include performing steps 2986, 2988, and/or 2990. For example, processing each row set of the plurality of row sets includes performing step 2986, step 2988, and/or 2990.

Step 2986 includes automatically selecting a requested number of rows to be included in the each row set based on row scheduling parameters. Step 2988 includes generating a scheduling request for the requested number of rows. Step

2990 includes receiving the each row set for processing in response to the scheduling request via access to one segment of a set of segments required for execution of the query.

In various examples, a query resultant for the query is generated based on processing of the plurality of row sets by the each of the set of parallelized processing modules.

In various examples, a scheduling module is operable to process a plurality scheduling requests for the query received across a set of parallelized processing modules executing the query that includes the processing module and the set of other processing modules based on dispersing a total plurality of rows included in the set of segments required for execution of the query for processing across the set of parallelized processing modules. In various examples, serially processing each row set of the plurality of row sets is further based on sending the scheduling request to the scheduling module. In various examples, the each row set is received based on the scheduling module assigning the each row set to the processing module for processing in response to the scheduling module processing the scheduling request.

In various examples, the each row set is selected by the scheduling module to include exactly the requested number of rows indicated in the scheduling request, or less than the requested number of rows indicated in the scheduling request.

In various examples, the scheduling module is operable to assign row sets for processing in conjunction with adhering to a minimum row set size. In various examples, the requested number of rows is automatically selected based on being lower bounded by the minimum row set size. In various examples, an actual number of rows included in the each row set is selected to not exceed the requested number of rows based on requested number of rows being guaranteed to be greater than or equal to the minimum row set size.

In various examples, the each row set is selected by the scheduling module as either all of a set of unassigned rows included in the one segment, or a proper subset of the set of unassigned rows included in the one segment.

In various examples, the each row set is selected by the scheduling module as all of a set of unassigned rows included in the one segment based on a number of unassigned rows of the one segment being less than or equal to the requested number of rows indicated in the scheduling request based on: the all of the set of unassigned rows included in the one segment corresponding to remaining rows included in the one segment based on all other rows in the one segment being already assigned for processing via at least one of the set of processing modules and further based on a number of remaining rows in the set of remaining rows being less than or equal to the requested number of rows indicated in the scheduling request; and/or the all of the set of unassigned rows included in the one segment corresponding to a full set of rows included the one segment based on none of the full set of rows in the one segment having yet been assigned for processing via any of the set of processing modules and further based on a total number of rows in the full set of rows being less than or equal to the requested number of rows indicated in the scheduling request.

In various examples, the each row set is selected by the scheduling module as a proper subset of the set of unassigned rows included in the one segment based on a number of unassigned rows included in the one segment being greater than or equal to the requested number of rows indicated in the scheduling request.

In various examples, the plurality of row sets are serially requested via a plurality of scheduling requests. In various examples, a first row set of the plurality of row sets is processed prior to all other ones of the plurality of row sets based on: automatically selecting a first number of rows to be included in the first row set based on a value of a predetermined initial number of rows; generating a first scheduling request of the plurality of scheduling requests, wherein the first scheduling request indicates the first number of rows, and wherein the first scheduling request is generated prior to generating all other ones of the plurality of scheduling requests; and/or receiving the first row set for processing.

In various examples, the method further includes determining the value of the predetermined initial number of rows based on the predetermined initial number of rows being computed as a function a total number of rows across the set of segments and a total number of parallelized processing modules in the set of parallelized processing modules.

In various examples, the first row set corresponds to all rows in a first segment of the set of segments based on the predetermined initial number of rows exceeding a total number of rows included in the first segment.

In various examples, the row scheduling parameters include: a total number of previously scheduled rows included in all previously scheduled row sets assigned to the processing module for processing in prior ones of the plurality of row sets serially before the each row set; an unprocessed number of previously scheduled rows included in the all previously scheduled row sets assigned to the processing module; a target number of rows; and/or a minimum row set size.

In various examples, the target number of rows is a predetermined value computed as a dividend of a total number of rows across the set of segments divided by a total number of parallelized processing modules in the set of parallelized processing modules.

In various examples, automatically selecting the requested number of rows to be included in the each row set based on the row scheduling parameters includes; determining whether a minimum set size request condition is met; selecting the requested number of rows as the minimum row set size when the minimum set size request condition is met; and/or, when the minimum set size request condition is not met, selecting the requested number of rows as a maximum of a first value and a second value. In various examples, the first value is the minimum row set size. In various examples, the second value is computed as a difference between the target number of rows and the total number of previously scheduled rows.

In various examples, the minimum set size request condition is met when both: a difference between the target number of rows and the total number of previously scheduled rows is greater than or equal to the minimum row set size; and the unprocessed number of previously scheduled rows is less than the minimum row set size. In various examples, the minimum set size request condition is met when at least one of: the difference between the target number of rows and the total number of previously scheduled rows is less than the minimum row set size; or the unprocessed number of previously scheduled rows is greater than or equal to the minimum row set size.

In various examples, the row scheduling parameters further include a maximum ratio value corresponding to predetermined maximum ratio of: the number of unprocessed number of previously scheduled rows to the target number of rows. In various examples, the predetermined maximum ratio corresponds to a maximum inflight ratio.

In various examples, each subsequent row set of the plurality of row sets processed after a first row set of the plurality of row sets are processed based on determining whether to request additional rows for processing at a current time based on evaluating a current state of the row scheduling parameters, wherein the scheduling request is generated at the current time in response to determining to request the additional rows for processing at the current time, and wherein the scheduling request is generated at a later time in response to determining to not request the additional rows for processing based on re-evaluating an updated state of the row scheduling parameters at the later time.

In various examples, the plurality of row sets include rows of only a proper subset of the set of segments processed by the processing module, based on the set of other processing modules of the set of parallelized processing modules processing segments included in a set difference of the set of segments and the proper subset of the set of segments.

In various examples, a second processing module processes other rows of a second proper subset of the set of segments via serially processing each of a second plurality of row sets in conjunction with execution of the query. In various examples, a given segment is included in a set intersection of the proper subset and the second proper subset based on the given segment being processed via a plurality of segment chunks that includes: a first segment chunk corresponding to one of the plurality of row sets processed by the processing module; and/or a second chunk corresponding to one of the second plurality of row sets processed by the second processing module. In various examples, the other rows included in the second plurality of row sets processed by the second processing module are distinct from the rows included in the plurality of row sets processed by the processing module.

In various examples, all rows across the set of segments are included in a same relational database table that includes a plurality of columns. In various examples, filtering predicates of the query involve filtering based on a column of the plurality of columns. In various examples, processing of the plurality of row sets further includes generating an output row set for the each row set as a filtered subset of the each row set via applying the filtering predicates. In various examples, the query resultant is generated based on the output row set of the each row set.

In various examples, the query is executed via a plurality of nodes of the database system. In various examples, the set of parallelized processing modules are implemented via one node of the plurality of nodes. In various examples, the set of segments are processed via the set of parallelized processing modules based on the set of segments being assigned to the one node for processing. In various examples, the one node generates a partial query resultant via processing the set of segments. In various examples, a plurality of other partial query resultants are generated based on processing of a plurality of other sets of segments via other sets of parallelized processing modules of other nodes of the plurality of nodes. In various examples, the query resultant is generated based on a plurality of partial query resultants that includes the partial query resultant and the plurality of other partial query resultants.

In various embodiments, any one of more of the various examples listed above are implemented in conjunction with performing some or all steps of FIG. 29D. In various embodiments, any set of the various examples listed above can be implemented in tandem, for example, in conjunction with performing some or all steps of FIG. 29D, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29D, for example, in conjunction with further implementing any one or more of the various examples described above.

In various embodiments, the at least one processor and at least one memory are included in a node of the database system. In various examples, the node includes a set of parallelized processing modules, where some or all of the set of parallelized processing modules are operable to perform some or all steps of FIG. 29D, for example, in conjunction with further implementing any one or more of the various examples described above. In various examples, each of the set of parallelized processing modules is operable to determine a query for execution and/or serially processing each row set of a plurality of row sets over a temporal period in conjunction with execution of the query based on: automatically selecting a requested number of rows to be included in the each row set based on row scheduling parameters; generating a scheduling request for the requested number of rows; and/or receiving the each row set for processing in response to the scheduling request via access to one segment of a set of segments required for execution of the query. In various examples, a query resultant for the query is generated based on processing of the plurality of row sets by the each of the set of parallelized processing modules.

FIGS. 30A-30D present embodiments where different segment chunking strategies 3040 are applied for different segments 2424 in implementing a corresponding scheduling strategy, for example, based on differences in IO pipelines of different segments. Some or all features and/or functionality of FIGS. 30A-30D can implement any embodiment of database system 10 described herein.

In some embodiment of implementing a segment chunking-based scheduling strategy, there is a performance tradeoff at play in between the reduced idle time due to scheduling imbalance and the additional work and/or IO introduced by chunked segments. The added cost due to chunking can depend on the pipeline elements present in the IO pipeline 2835 of the respective segment 2424, and/or can be sensitive to many outside factors such as the selectivities at different stages of the pipeline and/or on-disk size. The segment chunking-based scheduling strategy can be optionally implemented to account for such differences based on factoring in the cost of chunking on a per-pipeline basis (e.g. per-segment basis based on the corresponding pipelines) when considering how large of chunks can be justified.

In particular, different pipeline elements induce different amounts of duplicate work/IO that is performed when a corresponding segment is chunked, and when the IO pipeline is thus executed multiple times.

For example, IO cost of chunking a pipeline that includes a cluster key (CK) element, is affected by the fact that chunks from a single segment are handed out until the entire segment is scheduled, so this increases the likelihood that a required partition will still be in a corresponding silo's partition cache. To further reduce the likelihood of a cache miss/duplicate partition IO, a startRow/numRows in the index partition header can be leveraged to skip partitions not relevant to an incoming rowlist in primary CK elements. There will still be a chance of a cache miss for a relevant partition and duplicate partition IO. Meanwhile, compute cost of chunking a pipeline that includes a CK element can be affected by the fact that additional CK index traversals are performed compared to the non-chunked case. In some embodiments, primary CK elements can utilize the incoming rowlist to limit the amount of traversal work done for rows outside the chunk, but secondary CK elements cannot due to the fact that their rows are out of order with respect to the primary CK-based row ordering.

As another example, IO cost of chunking a pipeline that includes an inverted index element can be based on the fact that there's no row ordering of inverted index data (e.g. other than the packed pointer case) until the varlen area that stores per-value sorted rowlists. This can render duplicating essentially all IO for inverted index elements in processing each chunks, and/or all the blocks relevant to a given index probe are required for each chunk. Similar to IO cost, the compute cost of chunking a pipeline that includes an inverted index element can be based on the fact that the full index traversal is performed for each probe, and thus is duplicated for each segment chunk as the incoming rowlist cannot be utilized to avoid any compute. For example, the full matching rowlist and intersect is obtained with the downstream rowlist.

As another example, IO cost of chunking a pipeline that includes a fixed length (FL) table source element can be based on the FL table source element utilizing a row block mapper (e.g. inducing similar IO considerations as in CK Element for compression partition IO) to limit column data IO to blocks relevant to the incoming rowlist, so duplicating IO is only required for blocks where the chunks overlap. Meanwhile the compute cost of chunking a pipeline that includes a fixed length (FL) table source element can optionally have no added cost compared to the non-chunking case, for example, because rows from outside the segment chunk are not materialized.

Thus, some pipeline elements such as the inverted index element result in a much larger additional cost due to chunking when compared to other elements such as the FL table source element. Implementing an ideal scheduling strategy, for example, as presented in FIGS. 30A-30D, can include taking such differences in cost into account when considering the chunk sizes handed out.

Figure 30A:
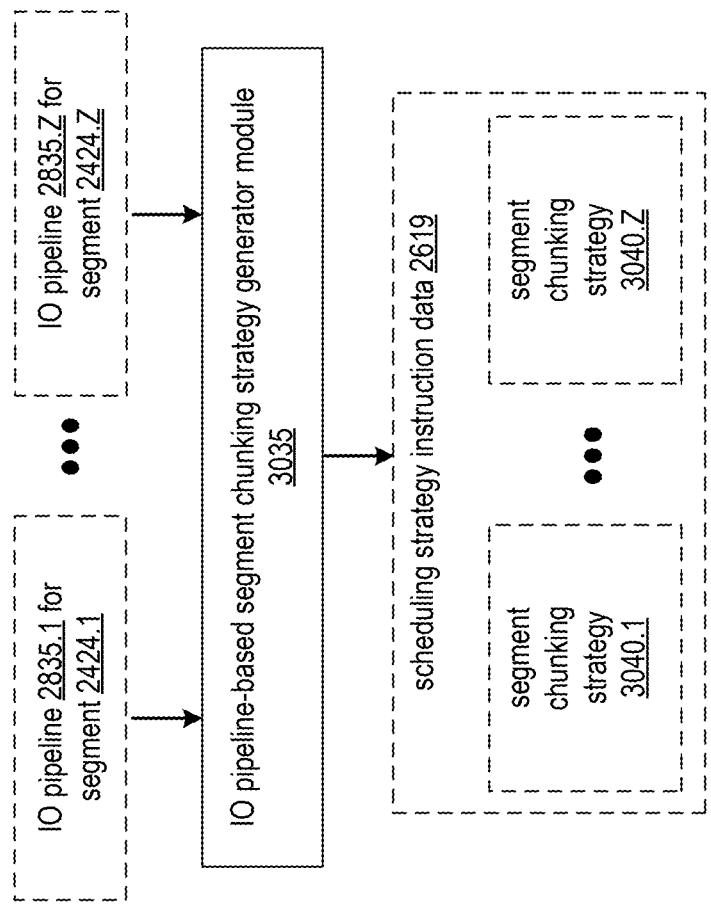
FIG. 30A is a schematic block diagram of an IO pipeline-based segment chunking strategy generator module that generates a plurality of segment chunking strategies for a plurality of segments based on a plurality of IO pipelines for the plurality of segments.

FIG. 30A illustrates an embodiment of a database system 10 that implements an IO pipeline-based segment chunking strategy generator module 3035 that generates a segment chunking strategy 3040 for some or all segments 2424 (e.g. of a segment set 2612) based on their respective IO pipelines 2835. Some or all features and/or functionality of database system 10 of FIG. 30A can implement any embodiment of database system 10 described herein.

For example, particular pipeline elements, types of indexes that are included in the segments and accessed in pipeline execution, and/or other differences in IO pipelines have predetermined costs and/or otherwise affect a chunking cost of the corresponding segment, such as difference compute costs or IO costs. Corresponding cost of chunking the segment can be determined, and/or the corresponding segment chunking strategy can be selected a function (e.g. via a predetermined mapping or other function) of such pipeline-induced costs of chunking. Different segment chunking strategies 3040 can render different segments having different numbers of chunks and/or different sized chunks (e.g. different corresponding minimum segment chunk sizes 2838). Some segment chunking strategies 3040 can indicate the corresponding segment cannot/should not be chunked at all, while other segment chunking strategies 3040 can indicate the corresponding segment can/should be chunked.

The IO pipeline-based segment chunking strategy generator module 3035 can be implemented via any processing and/or memory resources of database system 10. The IO pipeline-based segment chunking strategy generator module 3035 can be optionally implemented in conjunction with query execution module to generate segment chunking strategies for a given query being executed. For example, segment chunking strategies are further a function of the particular query, the number W of processing modules 2610 being implemented for the query, the total number of segments being processed for the query etc., where a given segment has different segment chunking strategies for different queries in which it is accessed. The IO pipeline-based segment chunking strategy generator module 3035 can be optionally implemented in conjunction with IO pipeline generator module 2834 to generate segment chunking strategies for IO pipeline as they are generated, for example, in response to corresponding segments 2424 being generated. For example, segment chunking strategies are fixed for a given segment over multiple queries.

Figure 30B:
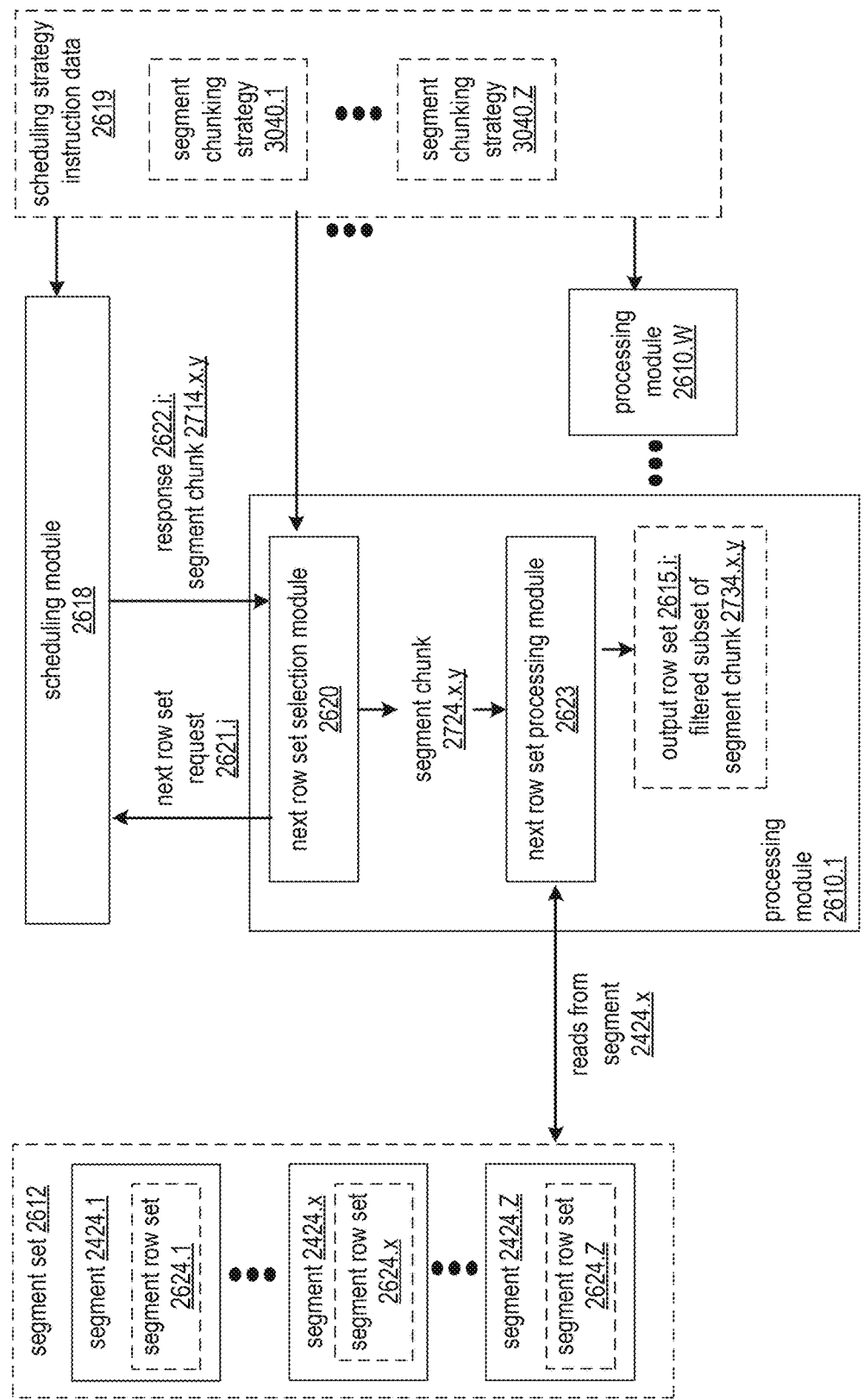
FIG. 30B is a schematic block diagram of a scheduling module that communicates with a plurality of processing modules based on a plurality of segment chunking strategies in accordance with various embodiments.

FIG. 30B illustrates an embodiment communication between a scheduling module 2618 and a plurality of parallelized processing modules 2610.1-2610.W, where corresponding scheduling of segments is performed accordance with corresponding segment chunking strategies 3040 indicated in segment strategy instruction data 2619. Some or all features and/or functionality of processing modules 2610 and/or database system 10 of FIG. 30B can implement any embodiment of processing modules 2610 and/or database system 10 described herein. Processing modules 2610 and/or database system 10 of FIG. 30B can be implemented in a similar fashion as processing modules 2610 and/or database system 10 of FIG. 27C, where segment chunks of a segment can be selected for assignment based on following a corresponding segment chunking strategy 3040.

For example, the scheduling module 2618 determines how many chunks a given segment be partitioned into and/or the sizes of segment chunks of a given segment. Segment chunks can optionally be selected based on selecting a segment with a segment chunking strategy enabling chunking of the corresponding segment into corresponding segment chunks having sizes close to a requested number of row 2631.$i$ of a given next row set request, and assigning a corresponding segment chunk of this segment in response 2622 accordingly. In some embodiments, segments requiring no chunking/larger sized chunks are assigned earlier in query execution, while segment allowing chunking/smaller sized chunks are assigned later in query execution, for example, as requests indicate smaller requested sizes as the tail of the query is approached.

Figure 30C:
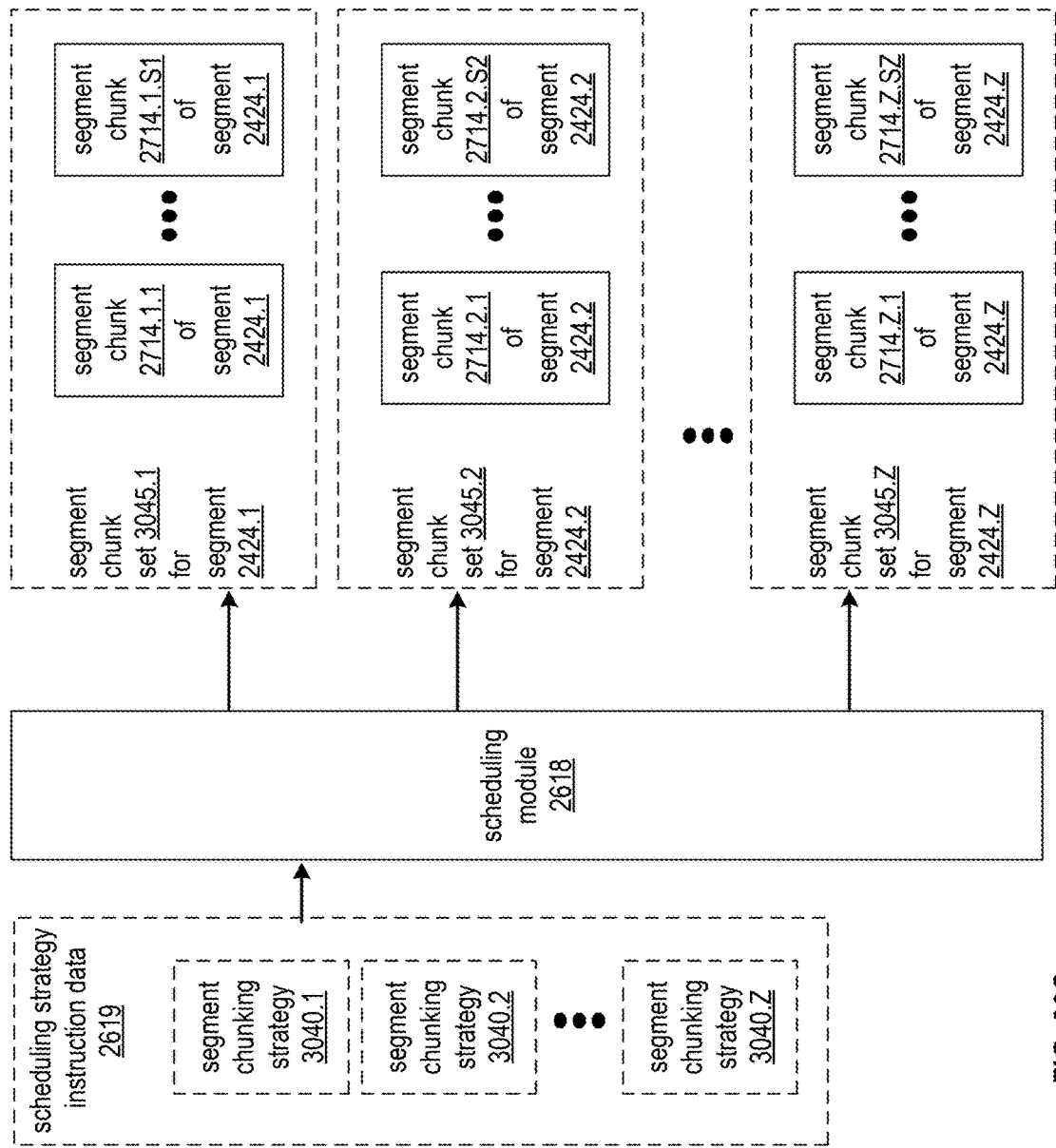
FIG. 30C is a schematic block diagram of a plurality of segment chunk sets for a plurality of segments scheduled for processing via a scheduling module based on a plurality of segment chunking strategies in accordance with various embodiments.

FIG. 30C illustrates an embodiment of a scheduling module 2618 of database system 10 that assigns segment chunks of for different segments 2424 in accordance with segment chunking strategies 3040 of scheduling strategy instruction data 2619, rendering distribution of a segment chunk set 3045 for a given segment across a set of parallelized processing modules 2610. Some or all features and/or functionality of scheduling module 2618 and/or database system 10 of FIG. 30C can implement any embodiment of scheduling module 2618 and/or database system 10 described herein. Scheduling module 2618 and/or database system 10 of FIG. 30C can be implemented in a similar fashion as scheduling module 2618 and/or database system 10 of FIG. 30C, where a given segment is divided into segment chunks for assignment based on following a corresponding segment chunking strategy 3040.

Different segments can be chunked into different numbers S of segment chunks, for example, based on having different sizes and/or based on numbers of segments/sizes of segments dictated by different segment chunking strategies 3040 (e.g. S1 is greater than S2 based on segment chunking strategy 3040.1 indicating segment 2424.1 be chunked via more chunks/smaller sized chunks and segment chunking strategy 3040.2 indicating segment 2424.2 be chunked via fewer chunks/larger sized chunks. One or more segment chunk sets 3045 can include only one segment chunk, corresponding to the full segment, based on a corresponding segment chunking strategy dictating the segment not be chunked.

FIG. 30D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30D, for example, based on participating in execution of a query being executed by the database system 10. Some or all of the method of FIG. 30D can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 30D based on implementing some or all of a plurality of processing modules 2610.1-2610.W, for example, as a corresponding plurality of processing core resources 48.1-48.W. Some or all of the steps of FIG. 30D can optionally be performed by any other one or more processing modules of the database system 10. Some or all of the steps of FIG. 30D can be performed to implement some or all of the functionality of the database system 10 as described in conjunction with FIGS. 30A-30C, for example, by implementing some or all of the functionality of query execution module 2504, one or more processing modules 2610, next row set selection module 2620, next row set processing module 2623, and/or scheduling module 2618. For example, some or all of the steps of FIG. 30D are based on executing at least one IO pipeline 2835 to process at least one corresponding segment 2424, for example, in conjunction with implementing an IO operator execution module 2840. Some or all steps of FIG. 30D can be performed by database system 10 in accordance with other embodiments of the database system 10 and/or nodes 37 discussed herein. Some or all of the steps of FIG. 30D can be performed in conjunction with performing some or all steps of any other method described herein.

Step 3082 includes determining a query for execution. Step 3084 includes determining a set of segments required for executing the query. Step 3086 includes determining a plurality of IO pipelines operable to process the set of segments. Step 3088 includes automatically selecting a plurality of segment chunking strategies for the set of segments based on the plurality of IO pipelines. Step 3090 includes processing the set of segments via executing the plurality IO pipelines via a plurality of parallelized processing modules based on applying the plurality of segment chunking strategies. Step 3092 includes generating a query resultant for the query based on processing the set of segments.

In various examples, a first IO pipeline of the plurality of IO pipelines corresponds to a first segment of the plurality of segment. In various examples, a second IO pipeline of the plurality of IO pipelines corresponds to a second segment of the set of segments. In various examples, a first segment chunking strategy is selected for the first IO pipeline based on the first IO pipeline. In various examples, a second segment chunking strategy is selected for the second IO pipeline based on the second IO pipeline. In various examples, the second segment chunking strategy is different from the first segment chunking strategy based on the second IO pipeline being different from the first IO pipeline.

In various examples, the second IO pipeline is different from the first IO pipeline based on: the first IO pipeline including a first type of index element for access to a first type of index structure indexing a first plurality of rows of the first segment; and/or the second IO pipeline including a second type of index element for access to a second type of index structure indexing a second plurality of rows of the second segment. In various examples, the first type of index element is different from the second type of index element based on the first type of index structure being different from the second type of index structure.

In various examples, the first segment chunking strategy indicates chunking the first segment via a first selected number of segment chunks. In various examples, the second segment chunking strategy indicates chunking the first segment via a second selected number of segment chunks. In various examples, the first selected number of segment chunks is strictly greater than the second selected number of segment chunks.

In various examples, the second selected number of segment chunks is equal to one based on the second segment chunking strategy indicating the second segment be processed in its entirety via a single processing module of the plurality of parallelized processing modules.

In various examples, the first segment chunking strategy indicates chunking the first segment via applying a first selected minimum number of rows per segment chunk of the first segment. In various examples, the second segment chunking strategy indicates chunking the first segment via applying a second selected minimum number of rows per segment chunk of the second segment. In various examples, the first selected minimum number of rows per segment chunk of the first segment is strictly less than the second selected minimum number of rows per segment chunk of the second segment.

In various examples, generating the plurality of segment chunking strategies is based on generating chunking cost data for each of the plurality of IO pipelines. In various examples, the first segment chunking strategy is selected based on first chunking cost data generated for the first IO pipeline. In various examples, the second segment chunking strategy is selected based on second chunking cost data generated for the second IO pipeline. In various examples, the first segment is processed via a first set of segment chunks that includes a first number of segment chunks based on applying the first segment chunking strategy. In various examples, the second segment is processed via a second set of segment chunks that includes a second number of segment chunks based on applying the second segment chunking strategy. In various examples, the first number of segment chunks is greater than the second number of segment chunks based on the first chunking cost data indicating lower cost of chunking than the second chunking cost data.

In various examples, the chunking cost data is generated for the each of the plurality of IO pipelines based on evaluating IO cost of the each of the plurality of IO pipelines induced by chunking and/or compute cost of each of the plurality of IO pipelines induced by chunking.

In various examples, the chunking cost data is generated for the each of the plurality of IO pipelines based on evaluating chunking cost induced by at least one pipeline element included in the each of the plurality of IO pipelines.

In various examples, evaluating the chunking cost induced by the at least one pipeline element is based on pipeline element cost mapping data indicating a set of predetermined pipeline element cost data mapped to a set of pipeline element types. In various examples, the pipeline element cost mapping data indicates first pipeline element cost data for a cluster key element type. In various examples, the pipeline element cost mapping data indicates second pipeline element cost data for an inverted index element type. In various examples, the pipeline element cost mapping data indicates third pipeline element cost data for a fixed length table source element type.

In various examples, the second pipeline element cost data for the inverted index element type indicates higher chunking cost than the first pipeline element cost data for the cluster key index element type. In various examples, the first pipeline element cost data for the cluster key index element type indicates higher chunking cost than the third pipeline element cost data for the fixed length table source element type.

In various examples, the first IO pipeline implements a filtering predicate of the query based on incorporation of a first pipeline element included in the first IO pipeline. In various examples, the second IO pipeline implements the filtering predicate of the query based on incorporation of a second pipeline element included in the second IO pipeline. In various examples, the first chunking cost data indicates lower cost of chunking than the second chunking cost data based on the first pipeline element being implemented via the cluster key index element type and the second pipeline element being implemented via the inverted index element type. In various examples, the first chunking cost data indicates lower cost of chunking than the second chunking cost data based on the first pipeline element being implemented via the fixed length table source element type and the second pipeline element being implemented via the inverted index element type. In various examples, the first chunking cost data indicates lower cost of chunking than the second chunking cost data based on the first pipeline element being implemented via the fixed length table source element type and the second pipeline element being implemented via the cluster key index element type.

In various examples, a first segment chunking strategy of the plurality of segment chunking strategies selected for a first segment of the set of segments indicates chunking the first segment via a plurality of segment chunks. In various examples, processing the first segment includes generating a plurality of sets of output rows via multiple ones of the plurality of parallelized processing modules based on each of the multiple ones of the plurality of parallelized processing modules executing the IO pipeline to emit a corresponding set of output rows of the plurality of sets of output rows. In various examples, the corresponding set of output rows are all included in exactly one segment chunk of the plurality of segment chunks based on the IO pipeline implementing chunk-based row filtering via at least one pipeline element of the set of pipeline elements to configure processing of only rows included in the exactly one segment chunk to guarantee emitting only ones of the rows included in the exactly one segment chunk.

In various examples, a second segment chunking strategy of the plurality of segment chunking strategies selected for a second segment of the set of segments indicates no chunking of the first segment. In various examples, processing the first segment includes generating a single set of output rows via a single processing module of the plurality of parallelized processing modules based on the single processing module executing the IO pipeline to emit a second corresponding set of output rows. In various examples, the IO pipeline forgoes the chunk-based row filtering to configure processing of all rows included in the second segment.

In various examples, the set of segments are processed via the plurality of parallelized processing modules based on each processing module of the plurality of parallelized processing modules processing a corresponding subset of the set of segments via serialized processing of a set of row sets of the corresponding subset of the set of segments.

In various examples, the serialized processing of each row set of a set of row sets of a subset of the set of segments by the each processing module is based on: automatically selecting, via the each processing module, a requested number of rows to be included in the each row set based on row scheduling parameters; generating, via the each processing module, a scheduling request for the requested number of rows; and/or receiving, via the each processing module, each row set for processing in response to the scheduling request via access to one segment of the set of segments required for execution of the query. In various examples, a number of rows included in the each row set is based on a corresponding segment chunking strategy selected for the one segment.

In various examples, all rows across the set of segments are included in a same relational database table that includes a plurality of columns. In various examples, filtering predicates of the query involve filtering based on a column of the plurality of columns. In various examples, each IO pipeline of the plurality of IO pipelines is configured to apply filtering predicates of the query in processing a corresponding segment. In various examples, executing each IO pipeline via a processing module of the plurality of parallelized processing modules includes generating an output row set for the corresponding segment as a filtered subset of rows included in the corresponding segment based on the filtering predicates being applied via execution of the each IO pipeline. In various examples, the query resultant is generated based on the output row set of the corresponding segment.

In various examples, the query is executed via a plurality of nodes of the database system. In various examples, the set of parallelized processing modules are implemented via one node of the plurality of nodes. In various examples, the set of segments are processed via the set of parallelized processing modules based on the set of segments being assigned to the one node for processing. In various examples, the one node generates a partial query resultant via processing the set of segments. In various examples, a plurality of other partial query resultants are generated based on processing of a plurality of other sets of segments via other sets of parallelized processing modules of other nodes of the plurality of nodes. In various examples, the query resultant is generated based on a plurality of partial query resultants that includes the partial query resultant and the plurality of other partial query resultants.

In various embodiments, any one of more of the various examples listed above are implemented in conjunction with performing some or all steps of FIG. 30D. In various embodiments, any set of the various examples listed above can be implemented in tandem, for example, in conjunction with performing some or all steps of FIG. 30D, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30D described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30D, for example, in conjunction with further implementing any one or more of the various examples described above.

In various embodiments, the operational instructions, when executed by the at least one processor, cause the database system to: determine a query for execution; determine a set of segments required for executing the query; determine a plurality of IO pipelines operable to process the set of segments; automatically select a plurality of segment chunking strategies for the set of segments based on the plurality of IO pipelines; process the set of segments via executing the plurality IO pipelines via a plurality of parallelized processing modules based on applying the plurality of segment chunking strategies; and/or generate a query resultant for the query based on processing the set of segments.

Figure 31A:
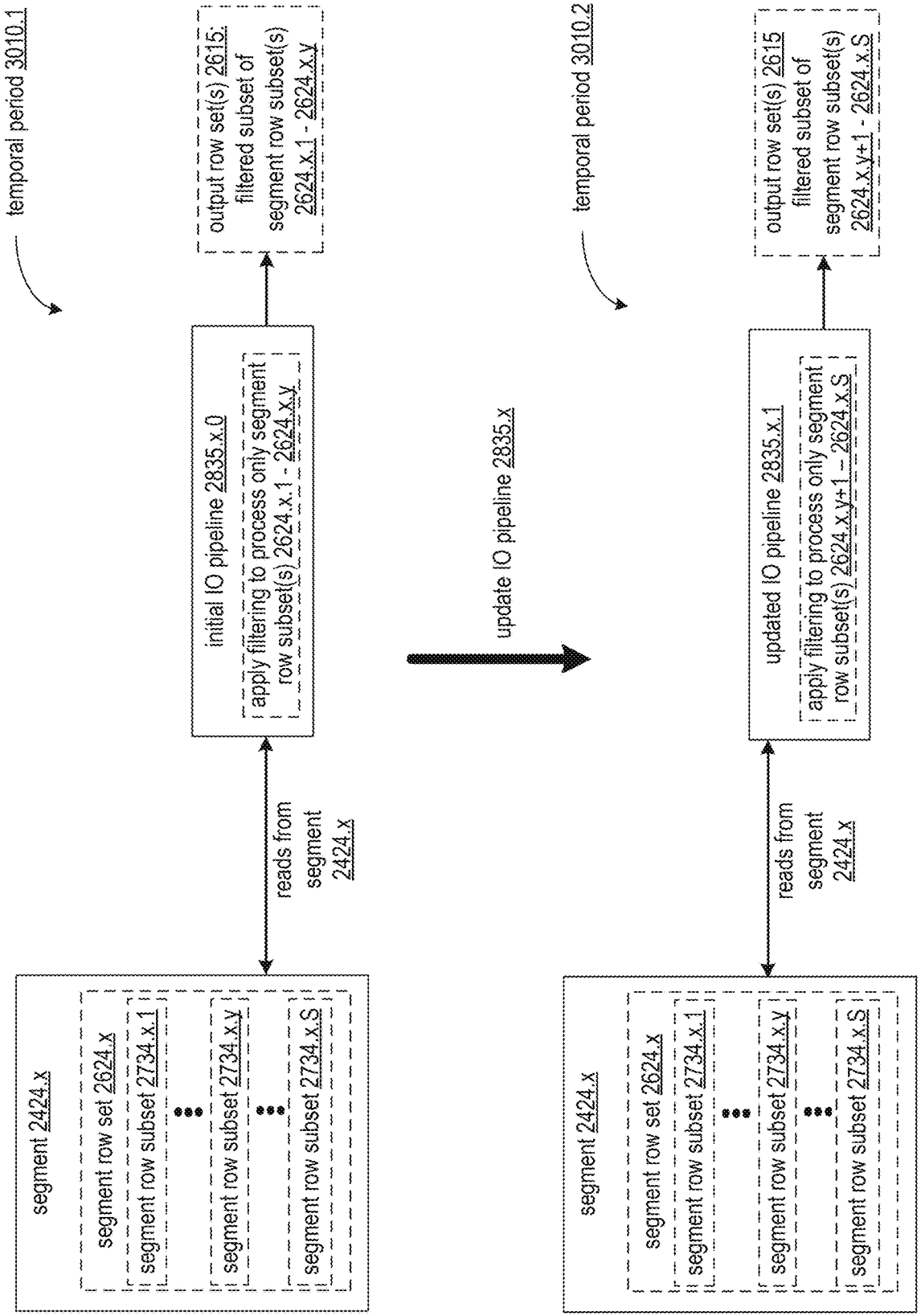
FIG. 31A is a schematic block diagram illustrating first executing an initial IO pipeline on at least one first segment chunk of a segment and then executing an updated IO pipeline on at least one second segment chunk of the segment.
Figure 31B:
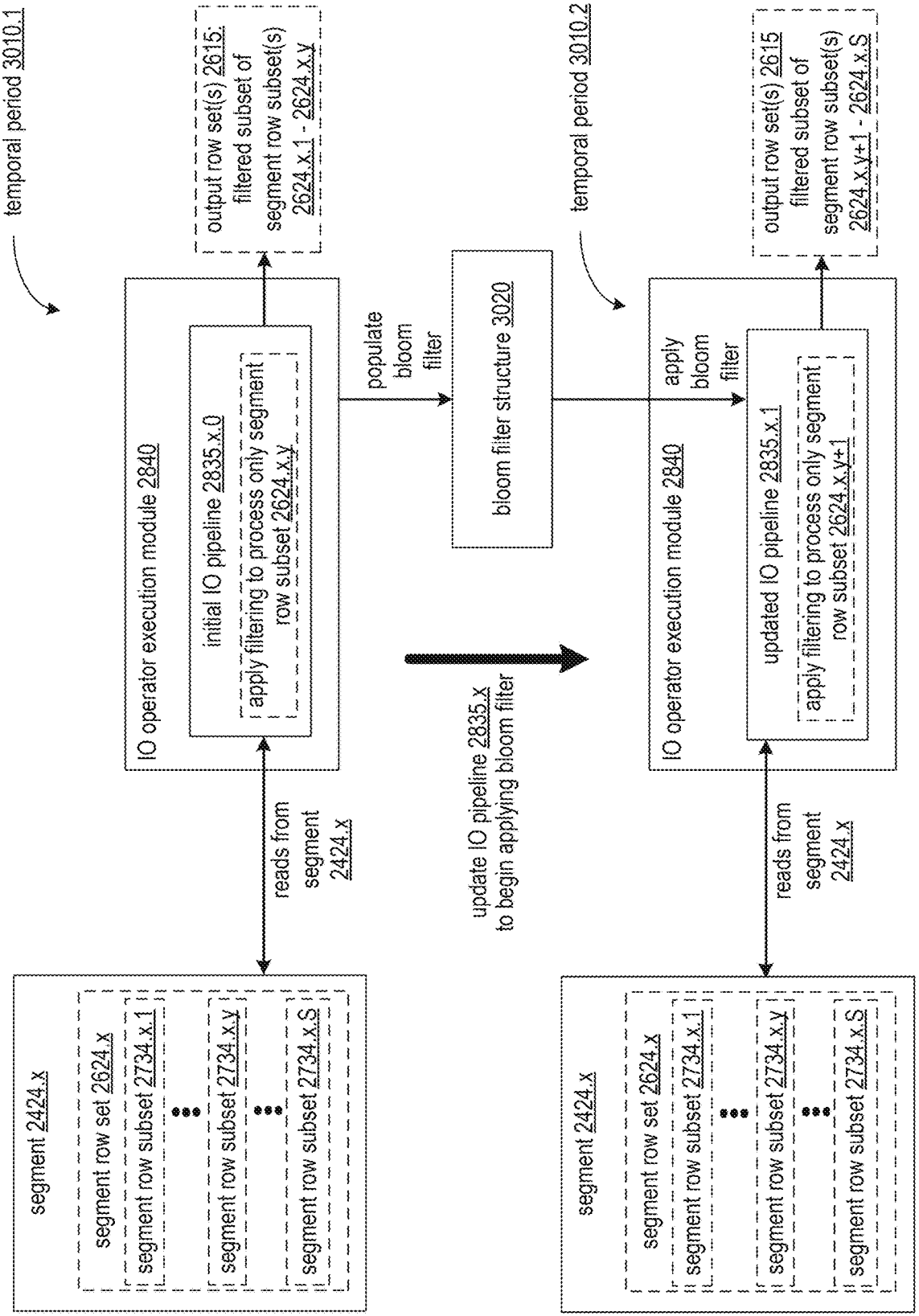
FIG. 31B is a schematic block diagram illustrating first executing an initial IO pipeline on at least one first segment chunk of a segment to populate a bloom filter and then executing an updated IO pipeline on at least one second segment chunk of the segment to apply the bloom filter.

FIGS. 31A-31C illustrate embodiments of a database system 10 where an initial IO pipeline is utilized to execute a first one or more segment chunks 2714 of a given segment 2424, while an updated IO pipeline is utilized to execute a second one or more segment chunks 2714, based on the IO pipeline being updated prior to all of the segment being processed, for example, due to a determination to update the IO pipeline for the segment based on progress/other attributes of processing the segment thus far. Some or all features and/or functionality of FIGS. 31A-31C can implement any embodiment of database system 10 described herein.

In some embodiments, the segment chunking infrastructure described herein adds a lot of flexibility to the pipeline operator by virtue of the fact that subsets of a segment's rows can be arbitrarily processed. This functionality can be leveraged to change a segment's IO pipeline mid-query, for example, after some chunks of a segment have been processed while a portion of the segment is pending processing. This can be based on updating the segment's IO pipeline to improve its efficiency, for example, due to how the IO pipeline has performed thus far and/or progress that has been made in building structures utilized for future processing.

As a particular example of employing this functionality consider the case where an expensive join operation results in a bloom filter getting pushed into the IO layer. In some embodiments of implementing bloom filter push-down can include storing the filter built after one segment is processed via being populated based on rows of that segment, and then adding it to the next pipeline compiled. However, the ability to processing a segment in separate segment chunks can enable the bloom filter to be utilized sooner. In particular, if a large segment is being processed, it may be a long time/large amount of compute before we finish the segment, so it may be more efficient to stop processing of the segment via the current pipeline, recompile a new pipeline with the bloom filter, and proceeding with processing with the remainder of the segment via the recompiled pipeline. This can thus be considered the segment being divided into two segment chunks-one for the initial pipeline and one for the updated pipeline, even if such chunking was not planned originally. For example, there's no straightforward way to add the bloom filter to the existing pipeline, as there may not be a filter element in the correct location. As such, it's easiest to stop processing the current pipeline, re-compile with the bloom filter, and treat the new pipeline as having chunk bounds starting at the last row emitted by the previous pipeline and ending at the previous segment's chunk upper bound. This ability to halt and recompile an in-progress pipeline can be similarly employed in other contexts.

FIG. 31A illustrates an embodiment where an initial IO pipeline 2835.$x$.0 is implemented during a first temporal period 3010.1 to generate one or more output row sets 2615 for one or more segment row subsets 2734 of a segment row set 2624 of a given segment 2424.$x$, and an updated IO pipeline 2835.$x$.is implemented during a second temporal period 3010.2 to generate one or more additional output row sets 2615 for one or more additional segment row subsets 2734 of the segment row set 2624 of the given segment 2424.$x$. Some or all features and/or functionality of executing an IO pipeline of FIG. 31A can implement any embodiment of executing an IO pipeline described herein, for example, by applying filtering to process only row subsets of a given segment chunk in applying a given IO pipeline as discussed in conjunction with FIG. 28A, where the initial IO pipeline 2835.$x$.0 is executed by a first one or more processing modules 2610 upon a first one or more segment chunks 2714 of the segment 2424.$x$, and/or the updated IO pipeline 2835.$x$.1 is executed by a second one or more processing modules 2610 upon a remaining one or more segment chunks 2714 of the segment 2424.$x$, where the second one or more processing modules 2610 are same or different from the first one or more processing modules 2610.

For example, a first portion of segment 2424.$x$ (e.g. one or more predetermined segment chunks, or a number of rows in processing the a large chunk or the segment as a whole until determining to update the IO pipeline) are processed in the first temporal period 3010.1. For example, the first temporal period ends and processing of the segment is halted based on determining to update the IO pipeline mid-processing of the segment. Alternatively, after one or more predetermined segment chunks are processed and prior to processing of remaining chunks, a determination is made to update the IO pipeline prior to remaining chunks being processed. The updating of IO pipeline 2835.$x$ can be in response to detecting a condition to update the pipeline based on processing of the segment so far (e.g. determining low efficiency, determining higher efficiency would be achieved if the pipeline were updated for the remainder of the query, etc.).

FIG. 31B illustrates a particular example of updating the IO pipeline mid-processing of a segment, where during a first temporal period 3010.1, a bloom filter is populated only based on processing of the rows of the first one or more segment chunks via the initial IO pipeline 2835.$x$.0, and where the bloom filter is applied in the updated IO pipeline 2835.$x$.1, based on the IO pipeline 2835.$x$ being updated to being applying of the bloom filter (e.g. via push down of the bloom filter to the IO level in a recompiled pipeline). Some or all features and/or functionality of executing an IO pipeline of FIG. 31A can implement any embodiment of executing an IO pipeline described herein, for example, by applying filtering to process only row subsets of a given segment chunk in applying a given IO pipeline as discussed in conjunction with FIG. 28A.

In some embodiments, the updating of the IO pipeline to apply the bloom filter can be performed based on having been sufficiently populated and/or based on a remaining amount of rows of the segment remaining such that it is more advantageous to recompile and use the bloom filter on the rest of the rows vs. continue processing the remaining rows without using the bloom filter, despite the bloom filter being sufficiently populated. A predetermined condition to update the pipeline to incorporate use of the bloom filter can be based on a predetermined bloom filter size (e.g. predetermined number of entries) and/or can be based on a predetermined minimum amount of remaining rows/time for processing, and detection of this predetermined condition can trigger the halting of processing for recompiling of the IO pipeline for use on the remaining rows. In some embodiments, the bloom filter structure 3020 is further populated in addition to being applied via processing of further rows of the segment.

In some embodiments, updating of the IO pipeline to apply the bloom filter includes changing the IO pipeline to include a bloom filter element that was not included in the initial IO pipeline. This bloom filter element can be implemented as a type of pipeline element that accesses the bloom filter, for example, to emit corresponding rows/values based on the entries of the bloom filter structure that were populated during the first temporal period, or optionally during the second temporal period.

In some embodiments, the bloom filter structure 3020, corresponding populating of the bloom filter, and/or corresponding applying of the bloom filter implements some or all features and/or functionality of the bloom filter as disclosed by U.S. Utility application Ser. No. 18/322,688, entitled "PROCESSING MULTI-COLUMN STREAMS DURING QUERY EXECUTION VIA A DATABASE SYSTEM", filed May 24, 2023, which is hereby incorporated herein by reference in its entirety and made part of the present U.S. Utility Patent Application for all purposes.

FIG. 31C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31C, for example, based on participating in execution of a query being executed by the database system 10. Some or all of the method of FIG. 31C can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 31C based on implementing some or all of a plurality of processing modules 2610.1-2610. W, for example, as a corresponding plurality of processing core resources 48.1-48.W. Some or all of the steps of FIG. 31C can optionally be performed by any other one or more processing modules of the database system 10. Some or all of the steps of FIG. 31C can be performed to implement some or all of the functionality of the database system 10 as described in conjunction with FIGS. 31A-31B, for example, by implementing some or all of the functionality of query execution module 2504, one or more processing modules 2610, next row set selection module 2620, next row set processing module 2623, and/or scheduling module 2618. For example, some or all of the steps of FIG. 31C are based on executing at least one IO pipeline 2835 to process at least one corresponding segment 2424, for example, in conjunction with implementing an IO operator execution module 2840. Some or all steps of FIG. 31C can be performed by database system 10 in accordance with other embodiments of the database system 10 and/or nodes 37 discussed herein. Some or all of the steps of FIG. 31C can be performed in conjunction with performing some or all steps of any other method described herein.

Step 3182 includes determining a query for execution. Step 3184 includes determining a first segment required for executing the query. Step 3186 includes determining an initial IO pipeline operable to process the first segment. Step 3188 includes processing at least one first segment chunk of the first segment based on executing the initial IO pipeline upon the at least one first segment chunk in conjunction with first partial execution of the query during a first temporal period. Step 3190 includes generating an updated IO pipeline in response to determining to change the initial IO pipeline. Step 3192 includes further processing at least one second segment chunk of the first segment based on executing the updated IO pipeline upon the at least one second segment chunk in conjunction with second partial execution of the query during a second temporal period strictly after the first temporal period. Step 3194 includes generating a query resultant for the query based on processing the at least one first segment chunk and further based on processing the at least one second segment chunk.

In various examples, the method further includes automatically detecting an IO pipeline update condition has been met based on processing the at least one first segment chunk of the first segment, wherein determining to change the initial IO pipeline is based on automatically detecting the IO pipeline update condition has been met.

In various examples, the method further includes determining to process all of the first segment in conjunction with execution of the query. In various examples, processing the at least one first segment chunk of the first segment is based on: initiating processing of the first segment, via the initial IO pipeline, at a first time based on determining to process all of the first segment; and/or terminating processing of the first segment via the initial IO pipeline at a second time after the first time in response to automatically detecting the IO pipeline update condition has been met at the second time. In various examples, only the first at least one segment chunk is processed prior to the second time based on the first at least one segment chunk corresponding to a first portion of the first segment having been successfully processed after initiating processing of the first segment at the first time. In various examples, further processing the at least one second segment chunk of the first segment is based on continuing processing of the first segment, via the updated IO pipeline, at a third time based on determining to process all of the first segment. In various examples, the only the second at least one segment chunk is processed after the third time based on the first at least one segment chunk corresponding to the first portion of the first segment having already been successfully processed after initiating processing of the first segment at the first time, and further based on the second at least one segment chunk corresponding to a remaining portion of the first segment not yet processed prior to the second time.

In various examples, the first segment includes a plurality of rows. In various examples, the at least one first segment chunk includes a first proper subset of the plurality of rows having a first set of row numbers. In various examples, the at least one second segment chunk includes a second proper subset of the plurality of rows having a second set of row numbers all strictly greater than the first set of row numbers. In various examples, the first proper subset and the second proper subset are mutually exclusive and collectively exhaustive with respect to the plurality of rows.

In various examples, processing the at least one first segment chunk of the first segment includes emitting a first set of output rows. In various examples, processing the at least one second segment chunk of the first segment includes emitting a second set of output rows. In various examples, the query resultant is generated for the query based on the first set of output rows and the second set of output rows. In various examples, the second set of output rows are all included in the second proper subset of the plurality of rows included in the at least one second segment chunk based on the updated IO pipeline implementing chunk-based row filtering via at least one pipeline element of a set of pipeline elements of the updated IO pipeline to configure processing of only rows included in the at least one second segment chunk to guarantee emitting only ones of the rows included in the at least one second segment chunk.

In various examples, the chunk-based row filtering is implemented based on identifying a start of the second set of contiguous row numbers based on determining a last row number of the first set of contiguous row numbers, corresponding to a last row emitted by the initial IO pipeline during the first temporal period. In various examples, the chunk-based row filtering is implemented based on applying row number-based filtering parameters via the last row number to render processing of only rows with row numbers greater than the last row number.

In various examples, the method further includes, during the first temporal period, populating a bloom filter based on processing a first subset of rows of a plurality of rows of the first segment included in the at least one first segment chunk. In various examples, executing the initial IO pipeline does not include applying the bloom filter to filter any of the first subset of rows based on the initial IO pipeline not including any IO pipeline element implemented to apply the bloom filter.

In various examples, a second subset of rows of the plurality of rows of the first segment included in the at least one second segment chunk are processed via executing the updated IO pipeline. In various examples, executing the updated IO pipeline includes applying the bloom filter to filter at least one of the second subset of rows based on the updated IO pipeline not including at least one IO pipeline element implemented to apply the bloom filter.

In various examples, determining to change the initial IO pipeline is based on determining to begin applying the bloom filter to remaining rows included in the first segment.

In various examples, the bloom filter is unpopulated prior to processing the first subset of rows of the plurality of rows during the first temporal period based on populating of the bloom filter initiating during the first temporal period.

In various examples, determining to change the initial IO pipeline is based on determining a bloom filter incorporation condition has been met at a first time corresponding to an end of the first temporal period based on populating the bloom filter during the first temporal period.

In various examples, the bloom filter incorporation condition includes a minimum bloom filter size condition. In various examples, the bloom filter incorporation condition is determined to be met based on a bloom filter size of the bloom filter meeting the minimum bloom filter size condition at the first time.

In various examples, the bloom filter incorporation condition includes a minimum remaining segment chunk size condition. In various examples, the bloom filter incorporation condition is determined to be met based on a chunk size of a portion of the first segment not yet processed meeting the minimum remaining segment chunk size condition at the first time. In various examples, the portion of the first segment not yet processed at the first time corresponds to the at least one second segment chunk of the first segment.

In various examples, the bloom filter incorporation condition includes a minimum remaining expected segment processing time condition. In various examples, the bloom filter incorporation condition is determined to be met based on an expected amount of time to process the portion of the first segment not yet processed at the first time meeting the minimum remaining expected segment processing time condition.

In various examples, the method further includes: determining a second query for execution; determining a second segment required for executing the second query; determining a second initial IO pipeline operable to process the second segment; initiating processing of the second segment based on executing the second initial IO pipeline upon the second segment in conjunction with execution of the second query during a third temporal period, where all of the second segment is processed via the second initial IO pipeline based on the bloom filter incorporation condition being unmet during the third temporal period; populating a second bloom filter during the third temporal period based on processing a second plurality of rows of the second segment. In various examples, a second query resultant is generated for the second query based on processing the second segment.

In various examples, the bloom filter incorporation condition is determined to be met in processing the first segment based on populating of the bloom filter during the processing of the first segment rendering a first bloom filter size meeting a minimum bloom filter size condition. In various examples, the bloom filter incorporation condition is determined to be unmet in processing the second segment based on populating of the bloom filter during the processing of the second segment rendering a second bloom filter size not meeting the minimum bloom filter size condition.

In various examples, the bloom filter incorporation condition is determined to be met in processing the first segment based on populating of the bloom filter during the processing of the first segment rendering a first bloom filter size meeting a minimum bloom filter size condition at the first time via processing the at least one first segment chunk, and/or further based on a portion of the first segment not yet processed at the first time, corresponding to the at least one second segment chunk of the first segment, meeting a minimum remaining segment chunk size condition, and/or an estimating remaining segment processing time condition. In various examples, the bloom filter incorporation condition is determined to be unmet in processing the second segment, despite populating of the second bloom filter during the processing of the second segment rendering a second bloom filter size meeting the minimum bloom filter size condition at a second time during processing of the second segment, based on a portion of the second segment not yet processed at the second time not meeting the minimum remaining segment chunk size condition and/or the estimating remaining segment processing time condition.

In various examples, the method further includes: determining a third segment required for executing the second query; after processing the second segment, generating a third IO pipeline for processing the third segment to apply the second bloom filter based on the populating of the second bloom filter during the processing of the second segment rendering the second bloom filter size meeting the minimum bloom filter size condition; and/or initiating processing of the third segment based on executing the third IO pipeline upon the third segment in conjunction with execution of the second query during a fourth temporal period. In various examples, all of the second segment is processed via the second initial IO pipeline based on the bloom filter incorporation condition being unmet during the third temporal period. In various examples, the second query resultant is generated for the second query further based on processing the third segment.

In various examples, the method further includes determining a plurality of segments required for executing the query. In various examples, the plurality of segments includes at least the first segment and a second segment. In various examples, the second segment includes a second plurality of rows distinct from a first plurality of rows of the first segment. In various examples, the method further includes generating a plurality of IO pipelines for the plurality of segments, where the plurality of IO pipelines includes the initial IO pipeline, and/or where the plurality of IO pipelines further includes a second IO pipeline that includes a second set of pipeline elements operable to process the second segment. In various examples, the method further includes generating a plurality of sets of output rows. In various examples, each set of output rows of the plurality of sets of output rows is emitted via at least one processing module of a plurality of parallelized processing modules processing a corresponding segment of the plurality of segments via execution of a corresponding IO pipeline of the plurality of IO pipelines. In various examples, the query resultant is generated based on the plurality of sets of output rows, wherein a first set of output rows of the plurality of sets of output rows corresponds to the first segment and includes both a first proper subset of the first set of output rows generated via executing the initial IO pipeline upon the at least one first segment chunk and a second proper subset of the second set of output rows generated via executing the updated IO pipeline upon the at least one second segment chunk. In various examples, a second set of output rows of the plurality of sets of output rows corresponds to the second segment.

In various examples, all rows across the plurality of segments are included in a same relational database table that includes a plurality of columns. In various examples, filtering predicates of the query involve filtering based on a column of the plurality of columns. In various examples, each IO pipeline of the plurality of IO pipelines is configured to apply filtering predicates of the query in processing a corresponding segment. In various examples, executing each IO pipeline via a processing module of the plurality of parallelized processing modules includes generating an output row set for the corresponding segment as a filtered subset of rows included in the corresponding segment based on the filtering predicates being applied via execution of the each IO pipeline. In various examples, the query resultant is generated based on the output row set of the corresponding segment.

In various examples, the query is executed via a plurality of nodes of the database system. In various examples, the plurality of parallelized processing modules are implemented via one node of the plurality of nodes. In various examples, the plurality of segments are processed via the plurality of parallelized processing modules based on the plurality of segments being assigned to the one node for processing. In various examples, the one node generates a partial query resultant via processing the plurality of segments. In various examples, a plurality of other partial query resultants are generated based on processing of a plurality of other sets of segments via other sets of parallelized processing modules of other nodes of the plurality of nodes. In various examples, the query resultant is generated based on a plurality of partial query resultants that includes the partial query resultant and the plurality of other partial query resultants.

In various embodiments, any one of more of the various examples listed above are implemented in conjunction with performing some or all steps of FIG. 31C. In various embodiments, any set of the various examples listed above can be implemented in tandem, for example, in conjunction with performing some or all steps of FIG. 31C, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 31C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 31C, for example, in conjunction with further implementing any one or more of the various examples described above.

In various embodiments, the operational instructions, when executed by the at least one processor, cause the database system to: determine a query for execution; determine a first segment required for executing the query; determine an initial IO pipeline operable to process the first segment; process at least one first segment chunk of the first segment based on executing the initial IO pipeline upon the at least one first segment chunk in conjunction with first partial execution of the query during a first temporal period; generate an updated IO pipeline in response to determining to change the initial IO pipeline; further process at least one second segment chunk of the first segment based on executing the updated IO pipeline upon the at least one second segment chunk in conjunction with second partial execution of the query during a second temporal period strictly after the first temporal period; and/or generate a query resultant for the query based on processing the at least one first segment chunk and further based on processing the at least one second segment chunk.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining-A matches-B or not (A) matches not (B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a processing module of a set of parallelized processing modules of a database system, comprising:
   determining a query for execution;
   serially processing a plurality of row sets over a temporal period in conjunction with execution of the query via processing each row set of the plurality of row sets based on:
     automatically selecting a requested number of rows to be included in the each row set based on row scheduling parameters, wherein the row scheduling parameters include:
       a total number of previously scheduled rows included in all previously scheduled row sets assigned to the processing module for processing in prior ones of the plurality of row sets serially before the each row set;
       an unprocessed number of previously scheduled rows included in the all previously scheduled row sets assigned to the processing module;
       a target number of rows;
       a minimum row set size; and
       a maximum ratio value corresponding to a predetermined maximum ratio of: the unprocessed number of previously scheduled rows to the target number of rows;
     generating a scheduling request for the requested number of rows; and
     receiving the each row set for processing in response to the scheduling request via access to one segment of a set of segments required for execution of the query;
   wherein a query resultant for the query is generated based on processing of the plurality of row sets over the temporal period, and further based on processing of an additional plurality of rows included in the set of segments via a set of other processing modules of the set of parallelized processing module implemented in parallel with the processing module.

2. The method of claim 1, wherein a scheduling module is operable to process a plurality scheduling requests for the query received across a set of parallelized processing modules executing the query that includes the processing module and the set of other processing modules based on dispersing a total plurality of rows included in the set of segments required for execution of the query for processing across the set of parallelized processing modules, and wherein serially processing each row set of the plurality of row sets is further based on:
sending the scheduling request to the scheduling module, wherein the each row set is received based on the scheduling module assigning the each row set to the processing module for processing in response to the scheduling module processing the scheduling request.

3. The method of claim 2, wherein the each row set is selected by the scheduling module to include one of:
exactly the requested number of rows indicated in the scheduling request; or
less than the requested number of rows indicated in the scheduling request.

4. The method of claim 3, wherein the scheduling module is operable to assign row sets for processing in conjunction with adhering to a minimum row set size, wherein the requested number of rows is automatically selected based on being lower bounded by the minimum row set size, and wherein an actual number of rows included in the each row set is selected to not exceed the requested number of rows based on requested number of rows being guaranteed to be greater than or equal to the minimum row set size.

5. The method of claim 3, wherein the each row set is selected by the scheduling module as one of:
all of a set of unassigned rows included in the one segment based on a number of unassigned rows of the one segment being less than or equal to the requested number of rows indicated in the scheduling request based on one of:
the all of the set of unassigned rows included in the one segment corresponding to remaining rows included in the one segment based on all other rows in the one segment being already assigned for processing via at least one of the set of processing modules and further based on a number of remaining rows in the set of remaining rows being less than or equal to the requested number of rows indicated in the scheduling request;
the all of the set of unassigned rows included in the one segment corresponding to a full set of rows included the one segment based on none of the full set of rows in the one segment having yet been assigned for processing via any of the set of processing modules and further based on a total number of rows in the full set of rows being less than or equal to the requested number of rows indicated in the scheduling request;
or
a proper subset of the set of unassigned rows included in the one segment based on a number of unassigned rows included in the one segment being greater than or equal to the requested number of rows indicated in the scheduling request.

6. The method of claim 1, wherein the plurality of row sets are serially requested via a plurality of scheduling requests, wherein a first row set of the plurality of row sets is processed prior to all other ones of the plurality of row sets based on:
automatically selecting a first number of rows to be included in the first row set based on a value of a predetermined initial number of rows; and
generating a first scheduling request of the plurality of scheduling requests, wherein the first scheduling request indicates the first number of rows, and wherein the first scheduling request is generated prior to generating all other ones of the plurality of scheduling requests; and receiving the first row set for processing.

7. The method of claim 6, further comprising:
determining the value of the predetermined initial number of rows based on the predetermined initial number of rows being computed as a function a total number of rows across the set of segments and a total number of parallelized processing modules in the set of parallelized processing modules.

8. The method of claim 6, wherein the first row set corresponds to all rows in a first segment of the set of segments based on the predetermined initial number of rows exceeding a total number of rows included in the first segment.

9. The method of claim 1, wherein the target number of rows is a predetermined value computed as a dividend of a total number of rows across the set of segments divided by a total number of parallelized processing modules in the set of parallelized processing modules.

10. The method of claim 1, wherein automatically selecting the requested number of rows to be included in the each row set based on the row scheduling parameters includes:
determining whether a minimum set size request condition is met;
when the minimum set size request condition is met, selecting the requested number of rows as the minimum row set size; and
when the minimum set size request condition is not met, selecting the requested number of rows as a maximum of:
the minimum row set size; and
a difference between the target number of rows and the total number of previously scheduled rows.

11. The method of claim 10,
wherein the minimum set size request condition is met when both:
a difference between the target number of rows and the total number of previously scheduled rows is greater than or equal to the minimum row set size; and
the unprocessed number of previously scheduled rows is less than the minimum row set size;
wherein the minimum set size request condition is met when at least one of:
the difference between the target number of rows and the total number of previously scheduled rows is less than the minimum row set size; or
the unprocessed number of previously scheduled rows is greater than or equal to the minimum row set size.

12. The method of claim 1, wherein each subsequent row set of the plurality of row sets processed after a first row set of the plurality of row sets are processed based on:
determining whether to request additional rows for processing at a current time based on evaluating a current state of the row scheduling parameters, wherein the scheduling request is generated at the current time in response to determining to request the additional rows for processing at the current time, and wherein the scheduling request is generated at a later time in response to determining to not request the additional rows for processing based on re-evaluating an updated state of the row scheduling parameters at the later time.

13. The method of claim 1, wherein the plurality of row sets include rows of only a proper subset of the set of segments processed by the processing module, based on the set of other processing modules of the set of parallelized processing modules processing segments included in a set difference of the set of segments and the proper subset of the set of segments.

14. The method of claim 13, wherein a second processing module processes other rows of a second proper subset of the set of segments via serially processing each of a second plurality of row sets in conjunction with execution of the query, wherein a given segment is included in a set intersection of the proper subset and the second proper subset based on the given segment being processed via a plurality of segment chunks that includes at least:
  a first segment chunk corresponding to one of the plurality of row sets processed by the processing module; and
  a second chunk corresponding to one of the second plurality of row sets processed by the second processing module;
  wherein the other rows included in the second plurality of row sets processed by the second processing module are distinct from the rows included in the plurality of row sets processed by the processing module.

15. The method of claim 1, wherein all rows across the set of segments are included in a same relational database table that includes a plurality of columns, wherein filtering predicates of the query involve filtering based on a column of the plurality of columns, wherein processing of the plurality of row sets further includes generating an output row set for the each row set as a filtered subset of the each row set via applying the filtering predicates, and wherein the query resultant is generated based on the output row set of the each row set.

16. The method of claim 1, wherein the query is executed via a plurality of nodes of the database system, wherein the set of parallelized processing modules are implemented via one node of the plurality of nodes, wherein the set of segments are processed via the set of parallelized processing modules based on the set of segments being assigned to the one node for processing, wherein the one node generates a partial query resultant via processing the set of segments, wherein a plurality of other partial query resultants are generated based on processing of a plurality of other sets of segments via other sets of parallelized processing modules of other nodes of the plurality of nodes, and wherein the query resultant is generated based on a plurality of partial query resultants that includes the partial query resultant and the plurality of other partial query resultants.

17. A node of a database system comprises:
  a set of parallelized processing modules, wherein each of the set of parallelized processing modules is operable to:
    determine a query for execution;
    serially process a plurality of row sets over a temporal period in conjunction with execution of the query via processing each row set of the plurality of row sets based on:
      automatically selecting a requested number of rows to be included in the each row set based on row scheduling parameters, wherein the row scheduling parameters include:
        a total number of previously scheduled rows included in all previously scheduled row sets assigned for processing in prior ones of the plurality of row sets serially before the each row set;
        an unprocessed number of previously scheduled rows included in the all previously scheduled row sets assigned to the processing module;
        a target number of rows;
        a minimum row set size; and
        a maximum ratio value corresponding to a predetermined maximum ratio of: the unprocessed number of previously scheduled rows to the target number of rows;
      generating a scheduling request for the requested number of rows; and
      receiving the each row set for processing in response to the scheduling request via access to one segment of a set of segments required for execution of the query;
    wherein a query resultant for the query is generated based on processing of the plurality of row sets by the each of the set of parallelized processing modules.

18. A non-transitory computer readable storage medium comprises:
  at least one memory section that stores operational instructions that, when executed by at least one processing module that includes a processor and a memory, causes the at least one processing module to:
    determine a query for execution;
    serially process a plurality of row sets over a temporal period in conjunction with execution of the query via processing each row set of the plurality of row sets based on:
      automatically selecting a requested number of rows to be included in the each row set based on row scheduling parameters, wherein the row scheduling parameters include:
        a total number of previously scheduled rows included in all previously scheduled row sets assigned for processing in prior ones of the plurality of row sets serially before the each row set;
        an unprocessed number of previously scheduled rows included in the all previously scheduled row sets assigned to the processing module;
        a target number of rows;
        a minimum row set size; and
        a maximum ratio value corresponding to a predetermined maximum ratio of: the unprocessed number of previously scheduled rows to the target number of rows;
      generating a scheduling request for the requested number of rows; and
      receiving the each row set for processing in response to the scheduling request via access to one segment of a set of segments required for execution of the query;
    wherein a query resultant for the query is generated based on processing of the plurality of row sets over the temporal period.

* * * * *